US012168614B2

(12) United States Patent
Garcia-Perez et al.

(10) Patent No.: US 12,168,614 B2
(45) Date of Patent: Dec. 17, 2024

(54) AMORPHOUS CARBONS FOR PHOSPHATE REMOVAL AND METHODS THEREOF

(71) Applicant: Washington State University, Pullman, WA (US)

(72) Inventors: Manuel Garcia-Perez, Richland, WA (US); Michael A. A. Apasiku, Albuquerque, NM (US); Sohrab Haghighi Mood, Pullman, WA (US); Jean-Sabin McEwen, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 17/476,891

(22) Filed: Sep. 16, 2021

(65) Prior Publication Data

US 2022/0081323 A1    Mar. 17, 2022

Related U.S. Application Data

(60) Provisional application No. 63/079,343, filed on Sep. 16, 2020.

(51) Int. Cl.
*C02F 1/28* (2023.01)
*B01J 20/02* (2006.01)
*B01J 20/04* (2006.01)
*B01J 20/20* (2006.01)
*C02F 101/10* (2006.01)

(52) U.S. Cl.
CPC ........... *C02F 1/283* (2013.01); *B01J 20/0229* (2013.01); *B01J 20/0259* (2013.01); *B01J 20/04* (2013.01);
(Continued)

(58) Field of Classification Search
CPC ...... C02F 1/283; C02F 1/28; C02F 2101/105; C02F 1/281; C02F 1/288; B01J 20/0229; B01J 20/04; B01J 20/0259; B01J 20/20; B01J 20/3206; B01J 20/3202; B01J 20/32; B01J 20/324; B01J 2220/42; B01J 2220/44; B01J 2220/445; B01J 2220/46; B01J 2220/4831; B01J 2220/4812; B01J 2220/48; B01J 2020/42; B01J 2020/44; B01J 2020/445; B01J 2020/46;
(Continued)

(56) References Cited

U.S. PATENT DOCUMENTS

2015/0144564 A1* 5/2015 Moller ................... C02F 1/283
                                                    210/201
2018/0016162 A1* 1/2018 Wang ..................... C01G 49/08

FOREIGN PATENT DOCUMENTS

CA      3129889 A1 *  8/2020  ............. B01D 53/58
CN    109929102 A  *  6/2019
(Continued)

OTHER PUBLICATIONS

Machine Translation for CN-111036266-A; Chen (Apr. 21, 2020) (10 pages) (Year: 2020).*
(Continued)

*Primary Examiner* — Joseph W Drodge
(74) *Attorney, Agent, or Firm* — Barnes & Thornburg LLP

(57) ABSTRACT

The present disclosure provides adsorbent compositions of carbon-containing material and nitrogen that are co-doped with a metal, such as magnesium or calcium. The disclosure also provides methods of adsorbing phosphate, as well as beneficial end products following the process of adsorption.

12 Claims, 104 Drawing Sheets

(52) U.S. Cl.
CPC ............ B01J 20/20 (2013.01); *B01J 2220/42* (2013.01); *B01J 2220/4831* (2013.01); *C02F 2101/105* (2013.01)

(58) Field of Classification Search
CPC ........ B01J 2020/4812; B01J 2020/4831; B01J 2020/48
See application file for complete search history.

(56) References Cited

FOREIGN PATENT DOCUMENTS

| CN | 111036266 A | * | 4/2020 | |
|---|---|---|---|---|
| CN | 111606405 A | * | 9/2020 | |
| WO | WO-2013126477 A1 | * | 8/2013 | .............. C02F 1/288 |
| WO | WO-2018006094 A1 | * | 1/2018 | .............. B01J 20/20 |

OTHER PUBLICATIONS

Production of Engineered Biochars for Phosphate Removal from Waste Lignocellulosic Materials; Department of Biological Systems Engineering, Washington State University; Ayiania et al.; (71 pages) (Year: 2019).*

Sanjay Mohanty et al, Publication: "Plenty of room for carbon on the ground: Potential applications of biochar for stormwater treatment", Science of the Total Environment, 2018, vol. 625, pp. 1644-1658. (Year: 2018).*

* cited by examiner

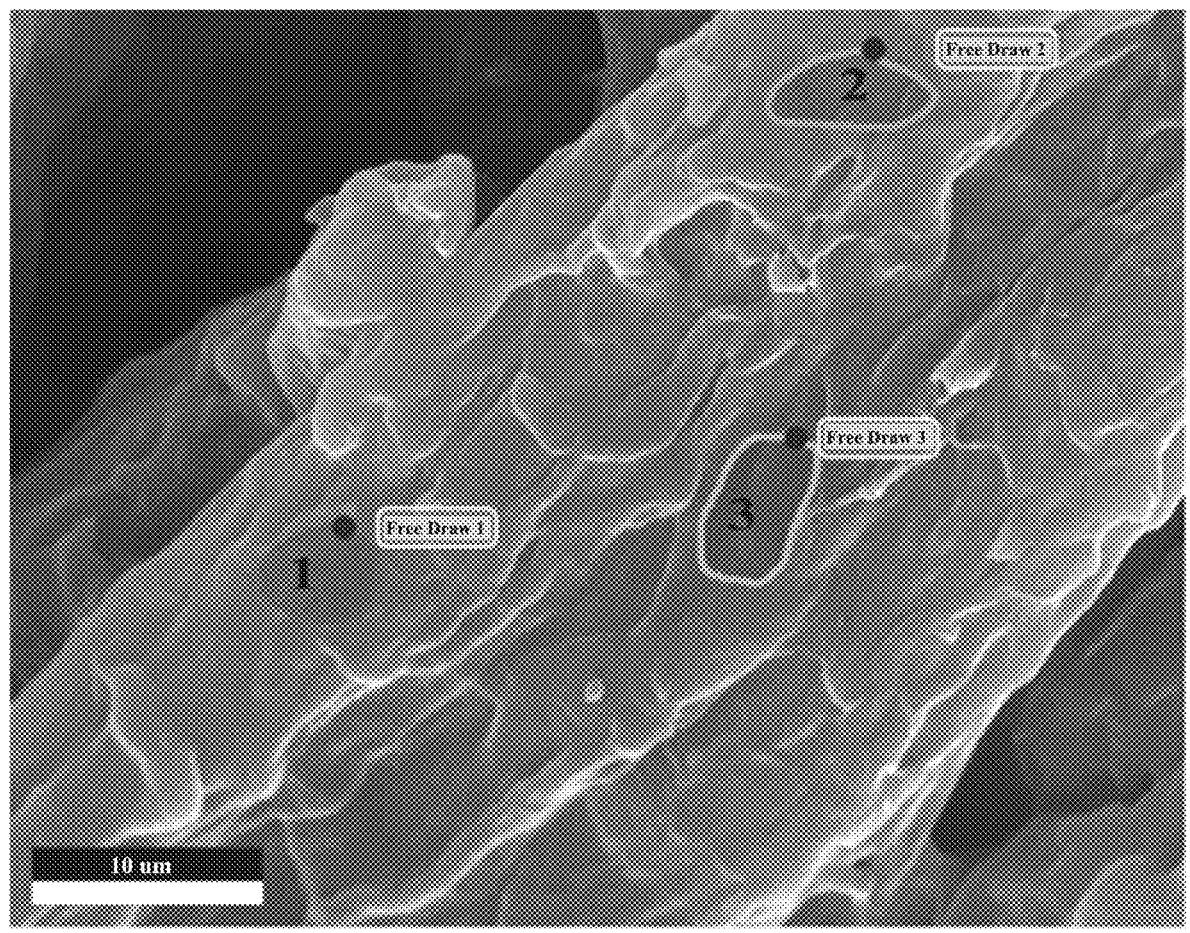
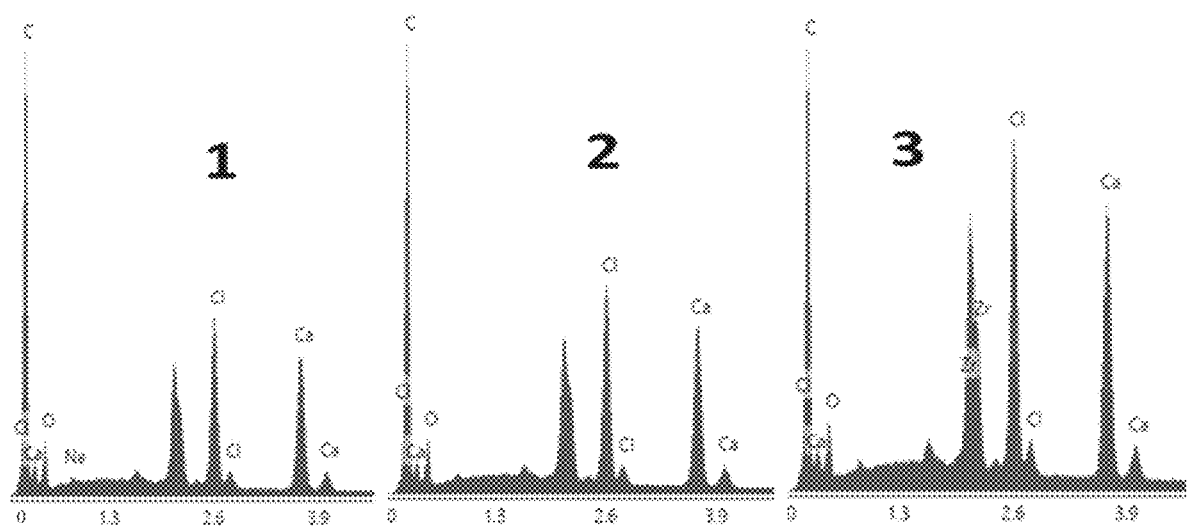
FIG. 7

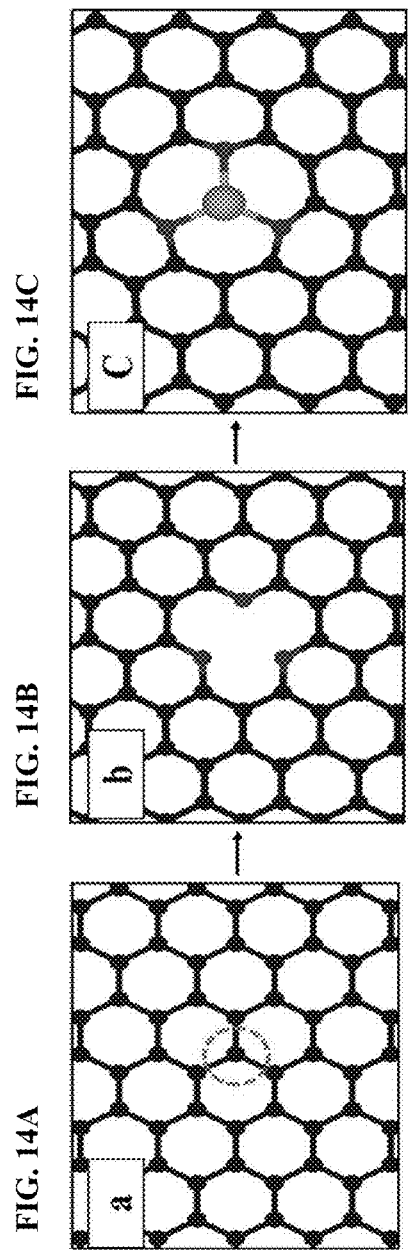

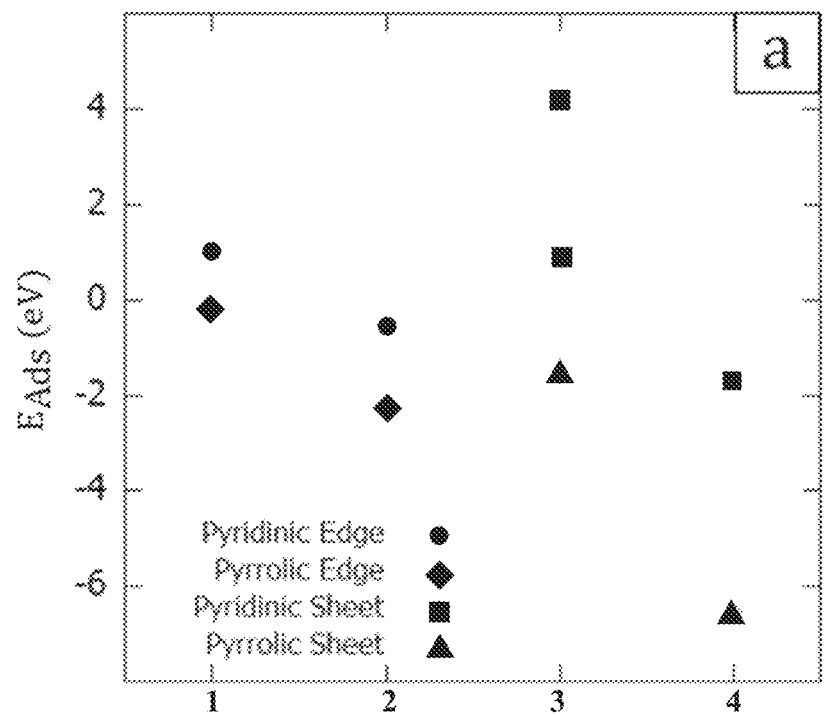
FIG. 19A
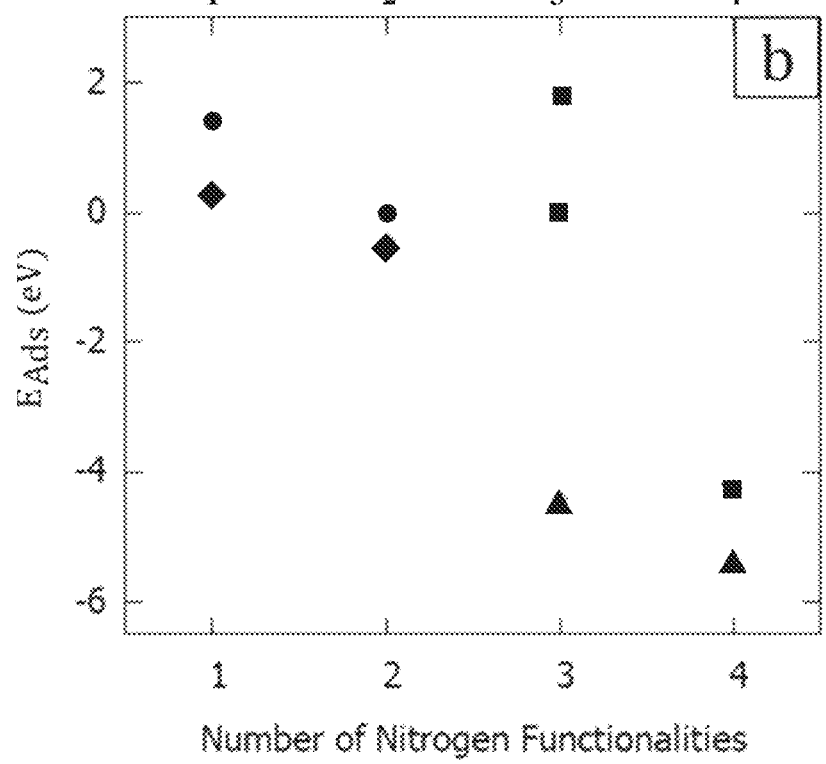
FIG. 19B
FIGS. 19A-19B

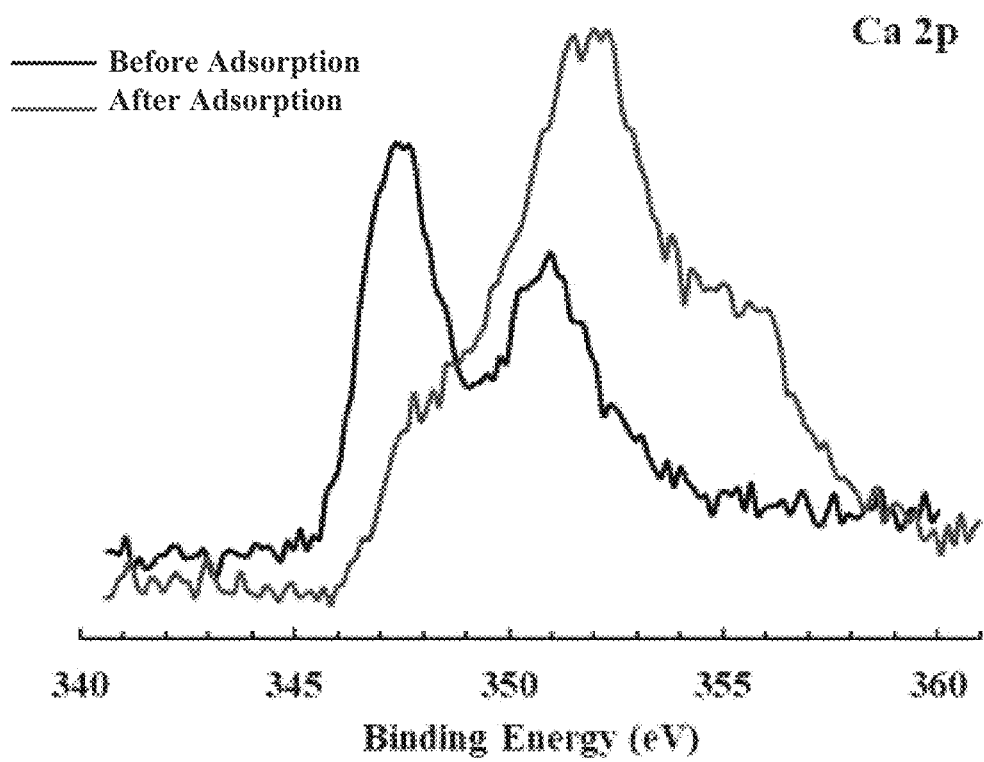
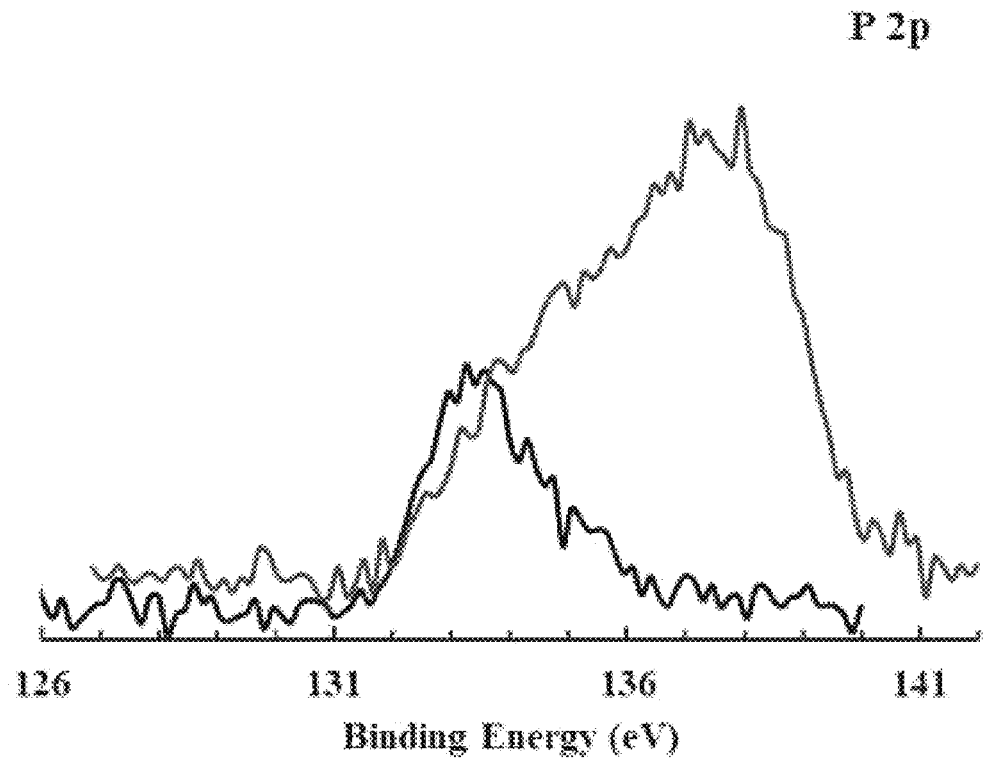
FIG. 23B

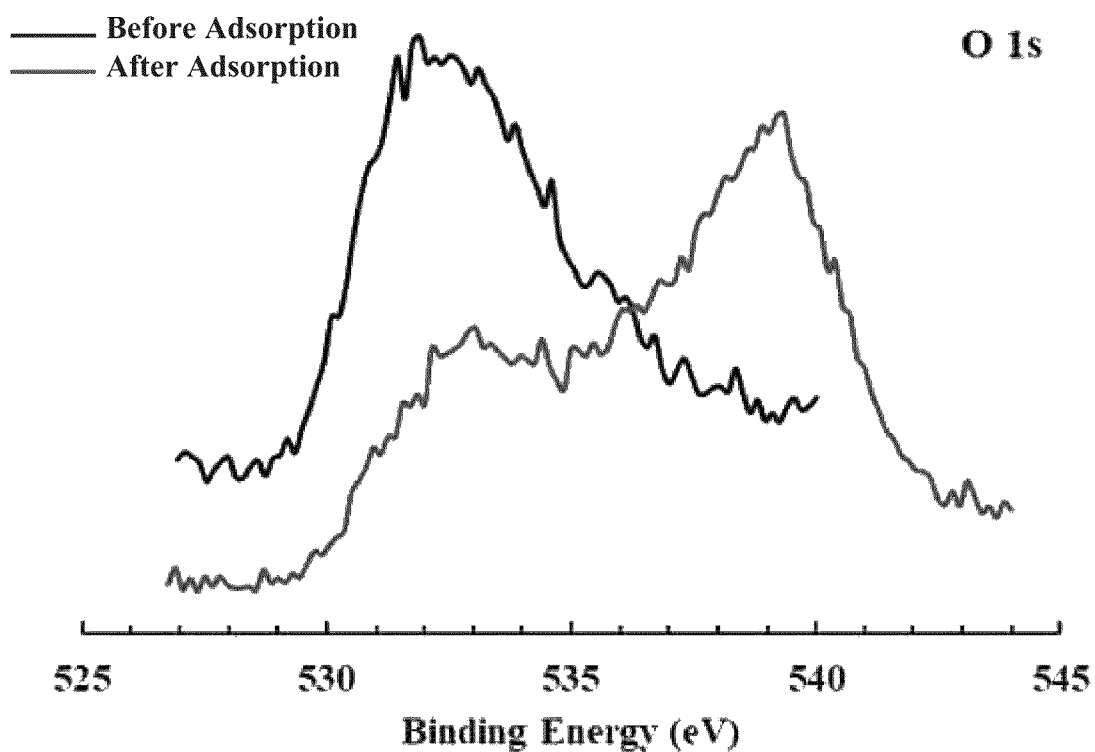
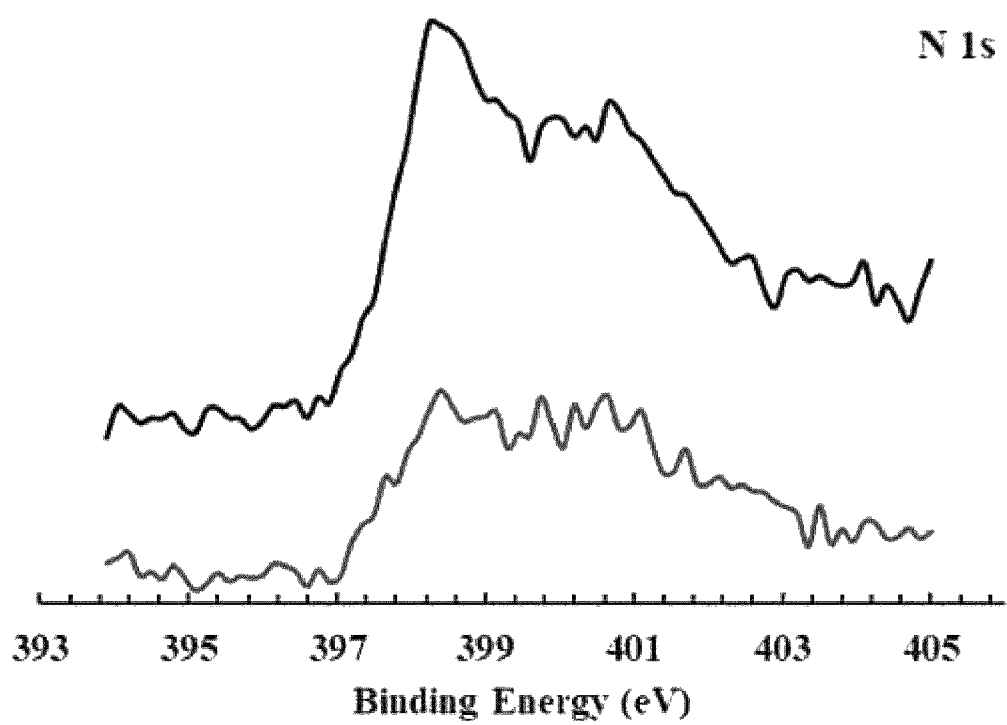
FIG. 25B

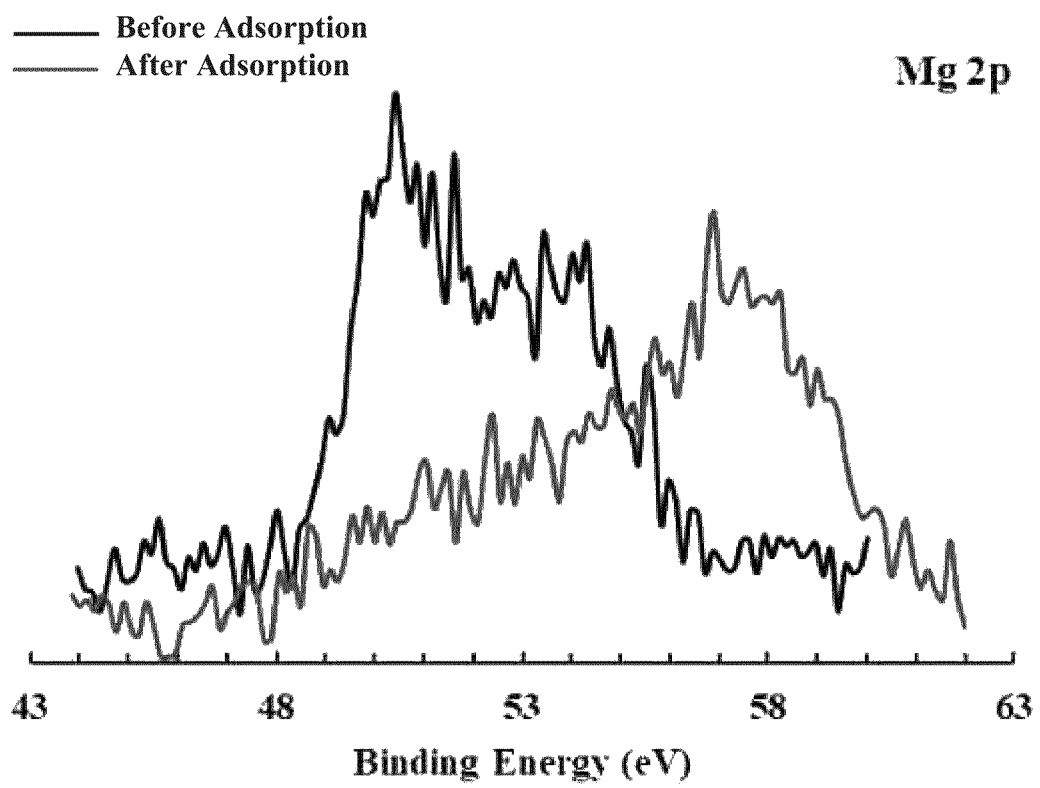
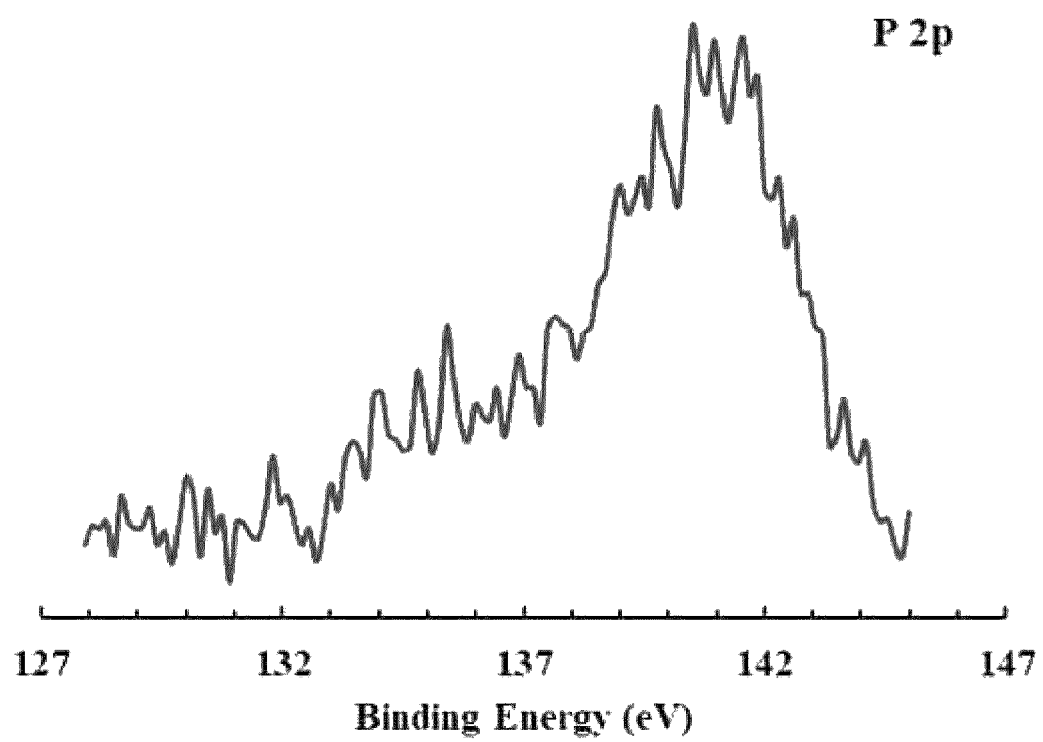
FIG. 25C

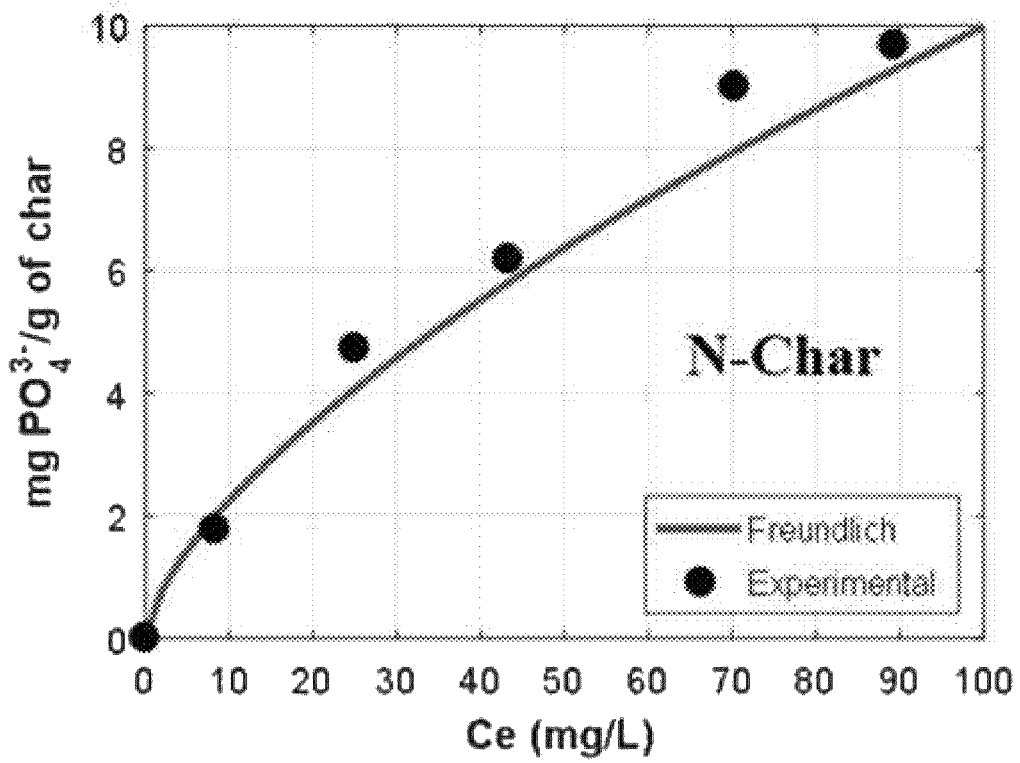
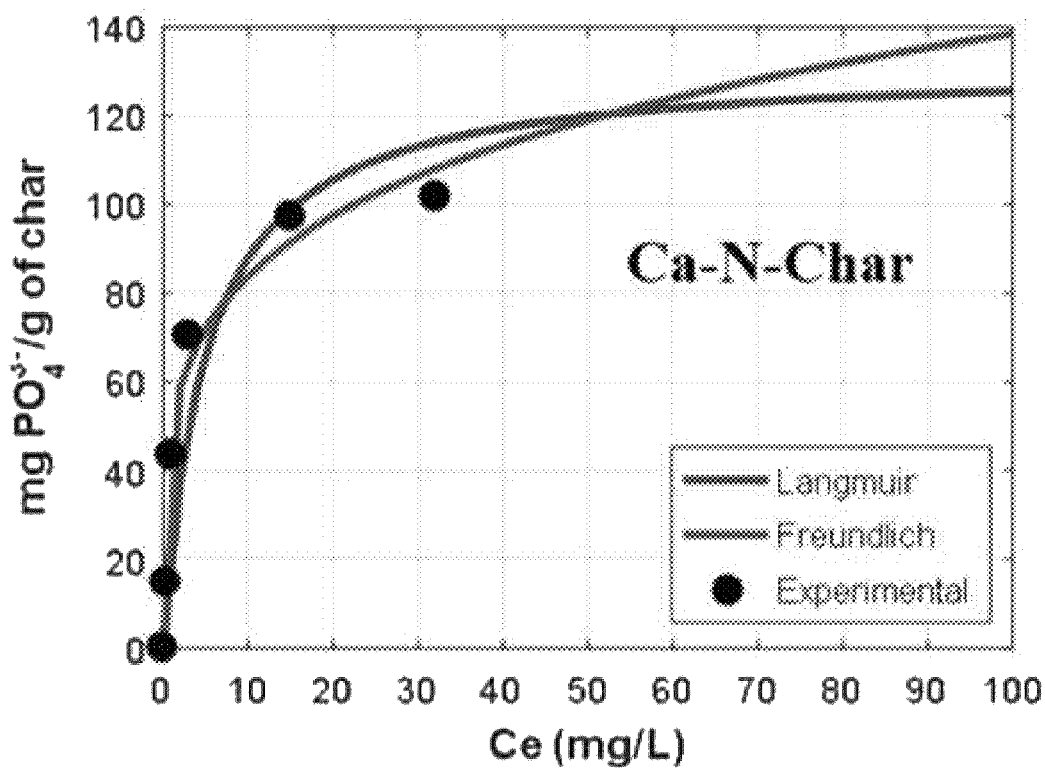
FIG. 32B

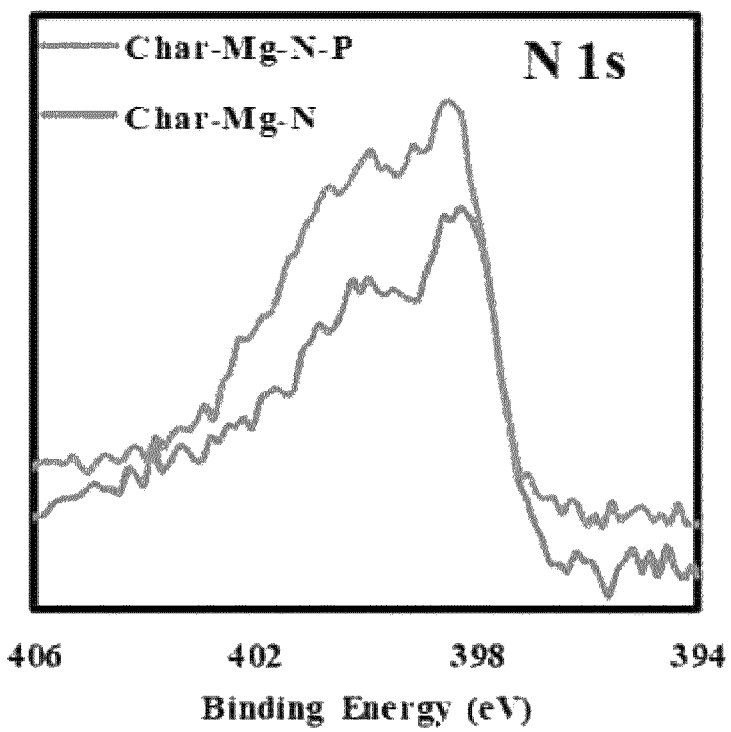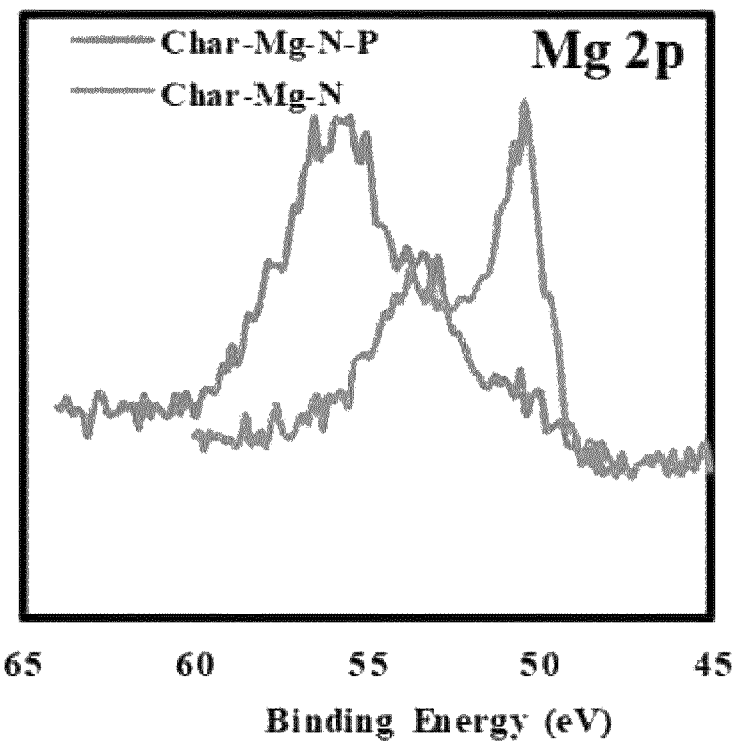
FIG. 37A

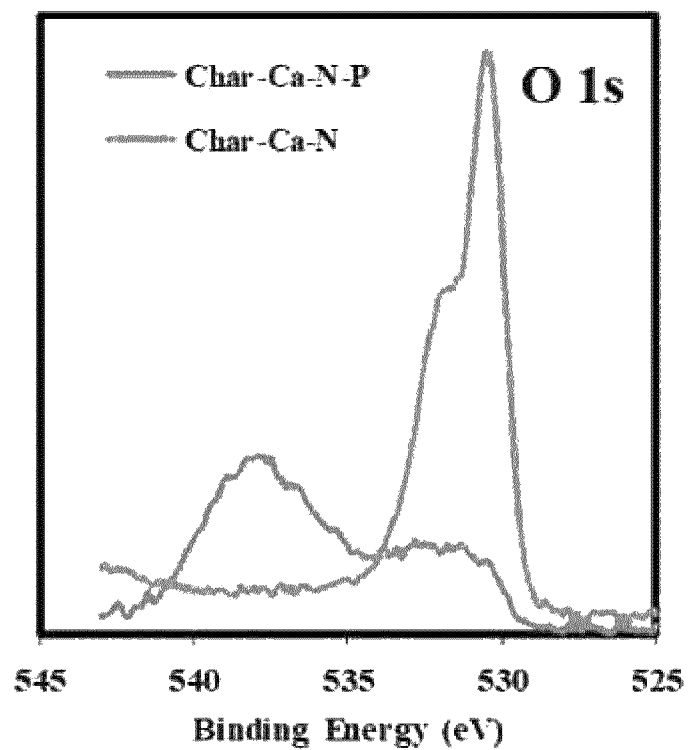
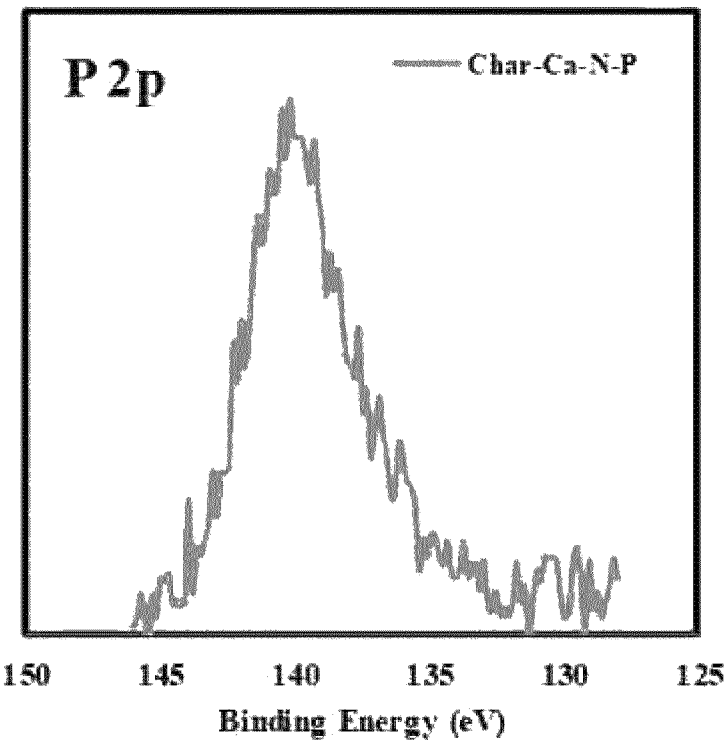
FIG. 38B

AMORPHOUS CARBONS FOR PHOSPHATE REMOVAL AND METHODS THEREOF

CROSS-REFERENCE TO RELATED APPLICATIONS

This application claims the benefit under 35 USC § 119 (c) of U.S. Provisional Application Ser. No. 63/079,343, filed on Sep. 16, 2020, the entire disclosure of which is incorporated herein by reference.

GOVERNMENT RIGHTS

This invention was made with government support under grant number 1703052 awarded by National Science Foundation and grant numbers 2014-38502-22598 and 2017-31100-06053 awarded by the United States Department of Agriculture through the National Institute of Food & Agriculture. The government has certain rights in the invention.

TECHNICAL FIELD

The invention relates to adsorbent compositions of carbon-containing material and nitrogen that are co-doped with a metal, such as magnesium or calcium. The invention includes compositions, methods, and end products associated with the adsorbent compositions.

BACKGROUND AND SUMMARY OF THE INVENTION

Excessive use of phosphorous in the fields of agriculture and industry has been shown to be detrimental to many aquatic environments. Phosphate in the environment, even in small amounts, can result in algal blooms. Furthermore, natural phosphorous reserves are projected to be depleted within the next 50-100 years. Thus, identifying mechanisms for effective phosphorous utilization and recovery are of extreme importance.

Several biological and physiochemical methods have been developed to manage the presence of phosphate in water. For instance, means such as coagulation-sedimentation, electrodialysis, crystallization, ionic exchange, and precipitation have been attempted for phosphorous removal, to various degrees of success. However, more effective and cost-efficient systems are highly desired.

Therefore, there exists a need for new compositions and methods that provide for phosphate recovery with a relatively low costs. Accordingly, the present disclosure provides adsorbent compositions of carbon-containing material and nitrogen that are co-doped with a metal, such as magnesium or calcium, which exhibit desirable properties and provide related benefits for improved removal of phosphate from mediums.

The present disclosure provides adsorbent compositions of carbon-containing material and nitrogen that are co-doped with a metal, such as magnesium or calcium. The disclosure also provides methods of adsorbing phosphate, as well as beneficial end products following the process of adsorption.

The adsorbent compositions and methods thereof according to the present disclosure provide several benefits. First, char can be utilized as a carbon-containing material in the compositions due to its material availability, easy operation, eco-friendliness, carbon sequestration, global warming mitigation, soil amelioration, and contaminant removal. Second, nitrogen doping of the carbon-containing material can introduce basic functional groups (such as pyridine) to the material, rendering them more positively charged for improved phosphate attraction.

Third, co-doping the carbon-containing material with metal and/or metal oxides can improve phosphate adsorption capacity since reaction of metals and metal oxides with oxyanions such as phosphate can then occur. Fourth, the co-doping of carbon-containing material with nitrogen and a metal demonstrates an unexpected synergistic effect that surprisingly results in increased adsorption of phosphates from media, including liquid compositions.

Fifth, analysis of the adsorbent compositions indicate that novel stability of magnesium and calcium "active sties" on the carbon-containing material. In particular, the nitrogenated and metallic structures at the edges of carbon-containing material provide a high probability to bind to phosphate ions. Finally, the end products of the adsorbent compositions could be utilized as extract compositions for application as a soil additive, plant treatment, seed treatment, and the like.

BRIEF DESCRIPTION OF THE DRAWINGS

FIG. 3A shows a $N_2$ adsorption isotherm and FIG. 3B shows a $CO_2$ adsorption isotherm.

FIG. 7 shows SEM-EDS images of N—Ca-Char. Region 1, 2 and 3 are regions without any Ca pores. The X and Y axis represents the energy of the x rays emitted measured in KeV and intensity measured in counts respectively.

FIG. 13A shows N-doped char, FIG. 13B shows Mg-Char, FIG. 13C shows N-Mg-doped char, FIG. 13D shows N-doped char, FIG. 13E shows Ca-char, and FIG. 13F shows N—Ca-oped char.

FIGS. 14A-14C show a chematic representation of the creation of the N-Metal graphene models. FIG. 14A shows the creation of a single point defect. FIG. 14B shows introduction of nitrogen to replace the dangling carbon forming pyridinic groups. FIG. 14C shows the metal atom is embedded in the matrix of the graphene.

FIGS. 19A-19B show adsorption energies of Mg and Ca with increasing number of pyridine and pyrrolic functional groups. FIG. 19A shows the N-Mg doped sheet and FIG. 19B shows the N—Ca doped sheet.

FIGS. 23A-23B show XPS survey and N1s, P2p and Ca2p XPS spectra of the ND-ADF (One Step) char samples before and after phosphate adsorption.

FIGS. 25A-25C show XPS survey and O1s, C1s, N1s, Mg2p and P2p XPS spectra of the ND-DFW (One Step)-Mg char sample before and after phosphate adsorption.

FIG. 28A: ND-ADF (One Step) char before phosphate adsorption. FIG. 28N: ND-DFW (One Step)-Mg char after phosphate adsorption.

FIGS. 31A-31J show XRD spectrum of the ND-ADF (One Step) char (before and after phosphorus adsorption; FIGS. 31A and 31B), ND-WS (One Step) char (before and after phosphorus adsorption; FIGS. 31C and 31D) ND-DFW (One Step) char (before and after phosphorus adsorption; FIGS. 31E and 31F), DFW-Mg (before and after phosphorus adsorption; FIGS. 31G and 31H), and ND-DFW (One Step)-Mg (before and after phosphorus adsorption; FIGS. 31I and 31J).

FIGS. 32A-32C show phosphorous adsorption isotherm of metal-N-doped biochars derived from cellulose.

FIGS. 34A, 34C, and 34D show SEM images. FIG. 34B shows corresponding element maps showing the distribution of elements overlay (Ca, P, and O). FIG. 34E shows before phosphate adsorption.

FIGS. 35A, 35C, and 35D show SEM images after phosphorus adsorption. FIG. 35B shows corresponding element maps showing the distribution of elements overlay (Ca, P, and O). FIG. 35E shows SEM image before phosphate adsorption.

FIGS. 36A-36C SEM image after phosphate adsorption.

FIGS. 37A-37B show XPS analysis of N-Mg-Char before and after adsorption process.

FIGS. 38A-38B show XPS analysis of N—Ca-Char before and after adsorption process.

FIG. 40A is $P_6N$-Mg-$PO_4^{3-}$, FIG. 40B is $2P_6N$-Mg-$PO_4^{3-}$, FIG. 40C is $P_5N$-Mg-$PO_4^{3-}$, and FIG. 40D is $2P_6N$-Mg-$PO_4^{3-}$.

FIGS. 41A-42B show a structural configuration of N—Ca-graphene sheet and phosphate.

FIGS. 42A-42D show a comparison of adsorption energy of single and double pyrrolic and pyridine groups, where FIG. 42A is $P_6N$—Ca—$HPO_4^{2-}$, FIG. 42B is $2P_6N$—Ca—$HPO_4^2$, FIG. 42C is $P_5N$—Ca—$HPO_4^{2-}$ and FIG. 42D is $2P_6N$—Ca—$HPO_4^{2-}$.

FIG. 43A: N-Mg doped sheet and FIG. 43B: N—Ca doped sheet.

Figure 1:
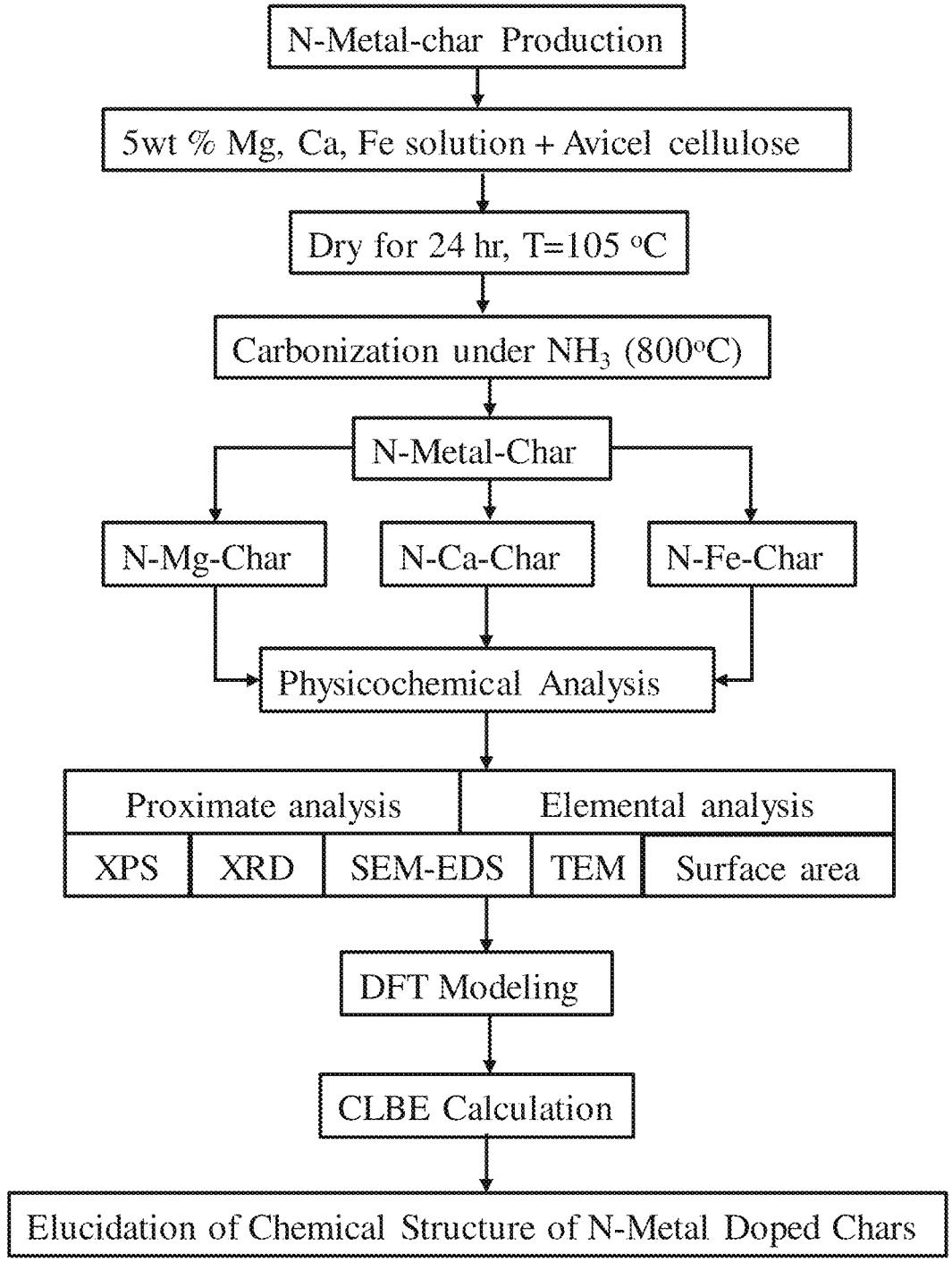
FIG. 1 shows a schematic representation of tasks for production of N-metal doped biochars.

Various embodiments of the invention are described herein as follows. In an aspect, an adsorbent composition is provided. The adsorbent composition comprises i) a carbon-containing material, ii) nitrogen, and iii) a metal, wherein the carbon-containing material is doped with the nitrogen and doped with the metal.

In an aspect, a method of adsorbing phosphate is provided. The method comprises the step of contacting an adsorbent composition with a liquid composition comprising the phosphate, wherein the phosphate in the liquid composition is adsorbed by the adsorbent composition, and wherein the adsorbent composition comprises i) a carbon-containing material, ii) nitrogen, and iii) a metal, wherein the carbon-containing material is doped with the nitrogen and doped with the metal.

In an aspect, a biochar extract composition is provided, wherein the biochar extract composition comprises magnesium phosphate, wherein the biochar extract is made by washing an adsorbent composition with an extraction media and capturing the extraction media with or without further processing for subsequent use of the biochar extract composition as a soil additive, plant treatment, or seed treatment.

In an aspect, a biochar extract composition is provided, wherein the biochar extract composition comprises calcium phosphate, wherein the biochar extract is made by washing an adsorbent composition with an extraction media and capturing the extraction media with or without further processing for subsequent use of the biochar extract composition as a soil additive, plant treatment, or seed treatment.

In an embodiment, an adsorbent composition is provided. An adsorbent composition refers to a composition capable of adsorbing one or more substances. For instance, an adsorbent composition can be capable of adsorbing phosphate from a composition such as a liquid composition.

The adsorbent composition comprises i) a carbon-containing material, ii) nitrogen, and iii) a metal, wherein the carbon-containing material is doped with the nitrogen and doped with the metal. Any carbon-containing material can be utilized, with biochar being the preferred carbon-containing material. For instance, biochar can refer to solid material obtained from the thermochemical conversion of biomass in an oxygen-limited environment. Biochars are known in the art to be stable solids that are rich in carbon. In some aspects, the adsorbent composition is configured for adsorption of phosphate The adsorbent compositions of the present disclosure are co-doped with both nitrogen and a metal. The metal is present in the adsorbent composition in two main forms. The first form is strongly linked in porphyrin-like structures on the carbon-containing material. The second form is weakly linked to nitrogen functional groups on the edges of the polyaromatic ring system of the carbon-containing material. Surprisingly, the metal that is weakly attached to the edges of the carbon structure is solubilized in the presence of phosphate. Also surprisingly, metal in the porphyrin-like structures can provide a nucleation center at which phosphate contacted to the metal will precipitate in order to form an amorphous solid.

In an embodiment, the carbon-containing material comprises anaerobically digested carbon. In an embodiment, the carbon-containing material comprises anaerobically digested fiber (ADF). In an embodiment, the carbon-containing material comprises wheat straw (WS). In an embodiment, the carbon-containing material comprises Douglas fir wood (DFW). In an embodiment, the carbon-containing material comprises cellulose. In an embodiment, the carbon-containing material comprises microcrystalline cellulose.

In an embodiment, the carbon-containing material comprises an ash content of between 10% to 40% wt. %. In an embodiment, the ash content is between 10% to 15% wt. %. In an embodiment, the ash content is between 15% to 20% wt. %. In an embodiment, the ash content is between 20% to 25% wt. %. In an embodiment, the ash content is between 25% to 30% wt. %. In an embodiment, the ash content is between 30% to 35% wt. %. In an embodiment, the ash content is between 35% to 40% wt. %.

In an embodiment, the adsorbent composition comprises a surface area of between 100 to 1500 $m^2g^{-1}$. In an embodiment, the surface area is between 100 to 500 $m^2g^{-1}$. In an embodiment, the surface area is between 500 to 1000 $m^2g^{-1}$. In an embodiment, the surface area is between 1000 to 1500 $m^2g^{-1}$. In an embodiment, the surface area is between 100 to 200 $m^2g^{-1}$. In an embodiment, the surface area is between 200 to 300 $m^2g^{-1}$. In an embodiment, the surface area is between 300 to 400 $m^2g^{-1}$. In an embodiment, the surface area is between 400 to 500 $m^2g^{-1}$. In an embodiment, the surface area is between 500 to 600 $m^2g^{-1}$. In an embodiment, the surface area is between 600 to 700 $m^2g^{-1}$. In an embodiment, the surface area is between 700 to 800 $m^2g^{-1}$. In an embodiment, the surface area is between 800 to 900 $m^2g^{-1}$. In an embodiment, the surface area is between 900 to 1000 $m^2g^{-1}$. In an embodiment, the surface area is between 1000 to 1100 $m^2g^{-1}$. In an embodiment, the surface area is between 1100 to 1200 $m^2g^{-1}$. In an embodiment, the surface area is between 1200 to 1300 $m^2g^{-1}$. In an embodiment, the surface area is between 1300 to 1400 $m^2g^{-1}$. In an embodiment, the surface area is between 1400 to 1500 $m^2g^{-1}$.

In an embodiment, the adsorbent composition comprises a pH value between 5 to 13. In an embodiment, the pH value is between 5 to 6. In an embodiment, the pH value is between 6 to 7. In an embodiment, the pH value is between 7 to 8. In an embodiment, the pH value is between 8 to 9. In an embodiment, the pH value is between 9 to 10. In an embodiment, the pH value is between 10 to 11. In an embodiment, the pH value is between 11 to 12. In an embodiment, the pH value is between 12 to 13.

In an embodiment, the metal comprises magnesium, calcium, or a combination thereof. In an embodiment, the metal is magnesium. In an embodiment, the metal is calcium. In an embodiment, the carbon-containing material is biochar, and wherein the biochar comprises the metal embedded on a surface of the biochar. In an embodiment, the metal embedded on a surface of the biochar is a nanoparticle. In an embodiment, the nanoparticle has a diameter less than 5 nm. In an embodiment, the nanoparticle has a diameter between 5 and 50 nm. In an embodiment, the nanoparticle has a diameter between 5 and 10 nm. In an embodiment, the nanoparticle has a diameter between 10 and 20 nm. In an embodiment, the nanoparticle has a diameter between 20 and 30 nm. In an embodiment, the nanoparticle has a diameter between 30 and 40 nm. In an embodiment, the nanoparticle has a diameter between 40 and 50 nm.

In an embodiment, the carbon-containing material is doped with the nitrogen via a one-step doping process. In an embodiment, the carbon-containing material is doped with the nitrogen via a two-step doping process. The procedure for a one-step doping process and for a two-step doping process are known in the art. As shown in the examples described herein, a one-step doping process using pyrolysis under ammonia gas was successfully employed to improve phosphate adsorption capacity by adsorbent compositions. Furthermore, the two-step doping process was also successfully employed for the formation of adsorbent compositions. In particular, an unexpected synergistic effect of nitrogen and metals on the adsorbent compositions provided improved adsorption of phosphate.

In an embodiment, the adsorbent composition comprises nitrogen functionality on a surface of the carbon-containing material. In an embodiment, the nitrogen functionality comprises a pyridinic group. In an embodiment, the nitrogen functionality comprises a pyridone group. In an embodiment, the nitrogen functionality comprises a pyrolic group. In an embodiment, the nitrogen functionality comprises a graphitic group. In an embodiment, the nitrogen functionality comprises an oxidized group.

In an embodiment, the carbon-containing material comprises one or more active sites. An active site refers to the location on the carbon-containing material for which the nitrogen and/or the metal can contact phosphate for adsorption.

In an embodiment, the active site comprises the metal coordinated with the nitrogen. In an embodiment, the active site is an edge site, a centered site, or a combination thereof. In an embodiment, the active site is an edge site, for instance a site on the edge/periphery of the carbon-containing material. In an embodiment, the active site is a centered site for instance a site near the center of the carbon-containing material.

In an embodiment, the adsorbent composition comprises carbon, hydrogen, nitrogen, oxygen, and ash. In an embodiment, the carbon, hydrogen, nitrogen, oxygen, and ash are present at wt. % comprising carbon between 40% to 95%; hydrogen between 0.5% to 1.5%; nitrogen between 0.1% to 20%; oxygen between 0.5% to 10%; and ash between 0.01 to 45%.

In an aspect, a method of adsorbing phosphate is provided. The method comprises the step of contacting an adsorbent composition with a liquid composition comprising the phosphate, wherein the phosphate in the liquid composition is adsorbed by the adsorbent composition, and wherein the adsorbent composition comprises i) a carbon-containing material, ii) nitrogen, and iii) a metal, wherein the carbon-containing material is doped with the nitrogen and doped with the metal. The previously described embodiments of the adsorbent composition are applicable to the method of adsorbing phosphate described herein.

In an embodiment, the liquid composition comprises waste water. In an embodiment, the liquid composition comprises biomass feedstock. In an embodiment, the method further comprises a step of forming a crystalline structure comprising the metal and the phosphate. In an embodiment, the crystalline structure is magnesium phosphate. In an embodiment, the crystalline structure is calcium phosphate.

In an aspect, a biochar extract composition is provided, wherein the biochar extract composition comprises magnesium phosphate, wherein the biochar extract is made by washing an adsorbent composition with an extraction media and capturing the extraction media with or without further processing for subsequent use of the biochar extract composition as a soil additive, plant treatment, or seed treatment.

In an aspect, a biochar extract composition is provided, wherein the biochar extract composition comprises calcium phosphate, wherein the biochar extract is made by washing an adsorbent composition with an extraction media and capturing the extraction media with or without further processing for subsequent use of the biochar extract composition as a soil additive, plant treatment, or seed treatment.

The following numbered embodiments are contemplated and are non-limiting:

1. An adsorbent composition comprising i) a carbon-containing material, ii) nitrogen, and iii) a metal, wherein the carbon-containing material is doped with the nitrogen and doped with the metal.
2. The adsorbent composition of clause 1, any other suitable clause, or any combination of suitable clauses, wherein the carbon-containing material is biochar.
3. The adsorbent composition of clause 1, any other suitable clause, or any combination of suitable clauses, wherein the carbon-containing material comprises anaerobically digested carbon.
4. The adsorbent composition of clause 1, any other suitable clause, or any combination of suitable clauses, wherein the carbon-containing material comprises anaerobically digested fiber (ADF).
5. The adsorbent composition of clause 1, any other suitable clause, or any combination of suitable clauses, wherein the carbon-containing material comprises wheat straw (WS).
6. The adsorbent composition of clause 1, any other suitable clause, or any combination of suitable clauses, wherein the carbon-containing material comprises Douglas fir wood (DFW).
7. The adsorbent composition of clause 1, any other suitable clause, or any combination of suitable clauses, wherein the carbon-containing material comprises cellulose.
8. The adsorbent composition of clause 1, any other suitable clause, or any combination of suitable clauses, wherein the carbon-containing material comprises microcrystalline cellulose.
9. The adsorbent composition of clause 1, any other suitable clause, or any combination of suitable clauses, wherein the carbon-containing material comprises an ash content of between 10% to 40% wt. %.
10. The adsorbent composition of clause 9, any other suitable clause, or any combination of suitable clauses, wherein the ash content is between 10% to 15% wt. %.
11. The adsorbent composition of clause 9, any other suitable clause, or any combination of suitable clauses, wherein the ash content is between 15% to 20% wt. %.
12. The adsorbent composition of clause 9, any other suitable clause, or any combination of suitable clauses, wherein the ash content is between 20% to 25% wt. %.
13. The adsorbent composition of clause 9, any other suitable clause, or any combination of suitable clauses, wherein the ash content is between 25% to 30% wt. %.
14. The adsorbent composition of clause 9, any other suitable clause, or any combination of suitable clauses, wherein the ash content is between 30% to 35% wt. %.
15. The adsorbent composition of clause 9, any other suitable clause, or any combination of suitable clauses, wherein the ash content is between 35% to 40% wt. %.
16. The adsorbent composition of clause 1, any other suitable clause, or any combination of suitable clauses, wherein the adsorbent composition comprises a surface area of between 100 to 1500 $m^2g^{-1}$.
17. The adsorbent composition of clause 16, any other suitable clause, or any combination of suitable clauses, wherein the surface area is between 100 to 500 $m^2g^{-1}$.
18. The adsorbent composition of clause 16, any other suitable clause, or any combination of suitable clauses, wherein the surface area is between 500 to 1000 $m^2g^{-1}$.
19. The adsorbent composition of clause 16, any other suitable clause, or any combination of suitable clauses, wherein the surface area is between 1000 to 1500 $m^2g^{-1}$.
20. The adsorbent composition of clause 16, any other suitable clause, or any combination of suitable clauses, wherein the surface area is between 100 to 200 $m^2g^{-1}$.
21. The adsorbent composition of clause 16, any other suitable clause, or any combination of suitable clauses, wherein the surface area is between 200 to 300 $m^2g^{-1}$.
22. The adsorbent composition of clause 16, any other suitable clause, or any combination of suitable clauses, wherein the surface area is between 300 to 400 $m^2g^{-1}$.

23. The adsorbent composition of clause 16, any other suitable clause, or any combination of suitable clauses, wherein the surface area is between 400 to 500 $m^2g^{-1}$.
24. The adsorbent composition of clause 16, any other suitable clause, or any combination of suitable clauses, wherein the surface area is between 500 to 600 $m^2g^{-1}$.
25. The adsorbent composition of clause 16, any other suitable clause, or any combination of suitable clauses, wherein the surface area is between 600 to 700 $m^2g^{-1}$.
26. The adsorbent composition of clause 16, any other suitable clause, or any combination of suitable clauses, wherein the surface area is between 700 to 800 $m^2g^{-1}$.
27. The adsorbent composition of clause 16, any other suitable clause, or any combination of suitable clauses, wherein the surface area is between 800 to 900 $m^2g^{-1}$.
28. The adsorbent composition of clause 16, any other suitable clause, or any combination of suitable clauses, wherein the surface area is between 900 to 1000 $m^2g^{-1}$.
29. The adsorbent composition of clause 16, any other suitable clause, or any combination of suitable clauses, wherein the surface area is between 1000 to 1100 $m^2g^{-1}$.
30. The adsorbent composition of clause 16, any other suitable clause, or any combination of suitable clauses, wherein the surface area is between 1100 to 1200 $m^2g^{-1}$.
31. The adsorbent composition of clause 16, any other suitable clause, or any combination of suitable clauses, wherein the surface area is between 1200 to 1300 $m^2g^{-1}$.
32. The adsorbent composition of clause 16, any other suitable clause, or any combination of suitable clauses, wherein the surface area is between 1300 to 1400 $m^2g^{-1}$.
33. The adsorbent composition of clause 16, any other suitable clause, or any combination of suitable clauses, wherein the surface area is between 1400 to 1500 $m^2g^{-1}$.
34. The adsorbent composition of clause 1, any other suitable clause, or any combination of suitable clauses, wherein the adsorbent composition comprises a pH value between 5 to 13.
35. The adsorbent composition of clause 34, any other suitable clause, or any combination of suitable clauses, wherein the pH value is between 5 to 6.
36. The adsorbent composition of clause 34, any other suitable clause, or any combination of suitable clauses, wherein the pH value is between 6 to 7.
37. The adsorbent composition of clause 34, any other suitable clause, or any combination of suitable clauses, wherein the pH value is between 7 to 8.
38. The adsorbent composition of clause 34, any other suitable clause, or any combination of suitable clauses, wherein the pH value is between 8 to 9.
39. The adsorbent composition of clause 34, any other suitable clause, or any combination of suitable clauses, wherein the pH value is between 9 to 10.
40. The adsorbent composition of clause 34, any other suitable clause, or any combination of suitable clauses, wherein the pH value is between 10 to 11.
41. The adsorbent composition of clause 34, any other suitable clause, or any combination of suitable clauses, wherein the pH value is between 11 to 12.
42. The adsorbent composition of clause 34, any other suitable clause, or any combination of suitable clauses, wherein the pH value is between 12 to 13.
43. The adsorbent composition of clause 1, any other suitable clause, or any combination of suitable clauses, wherein the adsorbent composition is configured for adsorption of phosphate.
44. The adsorbent composition of clause 1, any other suitable clause, or any combination of suitable clauses, wherein the metal comprises magnesium, calcium, or a combination thereof.
45. wherein the metal is magnesium.
46. The adsorbent composition of clause 1, any other suitable clause, or any combination of suitable clauses, wherein adsorbent composition of clause 1, any other suitable clause, or any combination of suitable clauses, wherein the metal is calcium.
47. The adsorbent composition of clause 1, any other suitable clause, or any combination of suitable clauses, wherein the carbon-containing material is biochar, and wherein the biochar comprises the metal embedded on a surface of the biochar.
48. The adsorbent composition of clause 47, any other suitable clause, or any combination of suitable clauses, wherein the metal embedded on a surface of the biochar is a nanoparticle.
49. The adsorbent composition of clause 48, any other suitable clause, or any combination of suitable clauses, wherein the nanoparticle has a diameter less than 5 nm.
50. The adsorbent composition of clause 48, any other suitable clause, or any combination of suitable clauses, wherein the nanoparticle has a diameter between 5 and 50 nm.
51. The adsorbent composition of clause 48, any other suitable clause, or any combination of suitable clauses, wherein the nanoparticle has a diameter between 5 and 10 nm.
52. The adsorbent composition of clause 48, any other suitable clause, or any combination of suitable clauses, wherein the nanoparticle has a diameter between 10 and 20 nm.
53. The adsorbent composition of clause 48, any other suitable clause, or any combination of suitable clauses, wherein the nanoparticle has a diameter between 20 and 30 nm.
54. The adsorbent composition of clause 48, any other suitable clause, or any combination of suitable clauses, wherein the nanoparticle has a diameter between 30 and 40 nm.
55. The adsorbent composition of clause 48, any other suitable clause, or any combination of suitable clauses, wherein the nanoparticle has a diameter between 40 and 50 nm.
56. The adsorbent composition of clause 1, any other suitable clause, or any combination of suitable clauses, wherein the carbon-containing material is doped with the nitrogen via a one-step doping process.
57. The adsorbent composition of clause 1, any other suitable clause, or any combination of suitable clauses, wherein the carbon-containing material is doped with the nitrogen via a two-step doping process.
58. The adsorbent composition of clause 1, any other suitable clause, or any combination of suitable clauses, wherein the adsorbent composition comprises nitrogen functionality on a surface of the carbon-containing material.
59. The adsorbent composition of clause 58, any other suitable clause, or any combination of suitable clauses, wherein the nitrogen functionality comprises a pyridinic group.

60. The adsorbent composition of clause 58, any other suitable clause, or any combination of suitable clauses, wherein the nitrogen functionality comprises a pyridone group.
61. The adsorbent composition of clause 58, any other suitable clause, or any combination of suitable clauses, wherein the nitrogen functionality comprises a pyrrolic group.
62. The adsorbent composition of clause 58, any other suitable clause, or any combination of suitable clauses, wherein the nitrogen functionality comprises a graphitic group.
63. The adsorbent composition of clause 58, any other suitable clause, or any combination of suitable clauses, wherein the nitrogen functionality comprises an oxidized group.
64. The adsorbent composition of clause 1, any other suitable clause, or any combination of suitable clauses, wherein the carbon-containing material comprises one or more active sites.
65. The adsorbent composition of clause 64, any other suitable clause, or any combination of suitable clauses, wherein the active site comprises the metal coordinated with the nitrogen.
66. The adsorbent composition of clause 64, any other suitable clause, or any combination of suitable clauses, wherein the active site is an edge site, a centered site, or a combination thereof.
67. The adsorbent composition of clause 64, any other suitable clause, or any combination of suitable clauses, wherein the active site is an edge site.
68. The adsorbent composition of clause 64, any other suitable clause, or any combination of suitable clauses, wherein the active site is a centered site.
69. The adsorbent composition of clause 1, any other suitable clause, or any combination of suitable clauses, wherein the adsorbent composition comprises carbon, hydrogen, nitrogen, oxygen, and ash.
70. The adsorbent composition of clause 69, any other suitable clause, or any combination of suitable clauses, wherein the carbon, hydrogen, nitrogen, oxygen, and ash are present at the following wt. %:
    carbon between 40% to 95%;
    hydrogen between 0.5% to 1.5%;
    nitrogen between 0.1% to 20%;
    oxygen between 0.5% to 10%; and
    ash between 0.01 to 45%.
71. A method of adsorbing phosphate, said method comprising the step of contacting an adsorbent composition with a liquid composition comprising the phosphate,
    wherein the phosphate in the liquid composition is adsorbed by the adsorbent composition, and
    wherein the adsorbent composition comprises i) a carbon-containing material, ii) nitrogen, and iii) a metal, wherein the carbon-containing material is doped with the nitrogen and doped with the metal.
72. The method of clause 71, any other suitable clause, or any combination of suitable clauses, wherein the liquid composition comprises waste water.
73. The method of clause 71, any other suitable clause, or any combination of suitable clauses, wherein the liquid composition comprises biomass feedstock.
74. The method of clause 71, any other suitable clause, or any combination of suitable clauses, wherein the method further comprises a step of forming a crystalline structure comprising the metal and the phosphate.
75. The method of clause 74, any other suitable clause, or any combination of suitable clauses, wherein the crystalline structure is magnesium phosphate.
76. The method of clause 74, any other suitable clause, or any combination of suitable clauses, wherein the crystalline structure is calcium phosphate.
77. The method of clause 71, any other suitable clause, or any combination of suitable clauses, wherein the carbon-containing material is biochar.
78. The method of clause 71, any other suitable clause, or any combination of suitable clauses, wherein the carbon-containing material comprises anaerobically digested carbon.
79. The method of clause 71, any other suitable clause, or any combination of suitable clauses, wherein the carbon-containing material comprises anaerobically digested fiber (ADF).
80. The method of clause 71, any other suitable clause, or any combination of suitable clauses, wherein the carbon-containing material comprises wheat straw (WS).
81. The method of clause 71, any other suitable clause, or any combination of suitable clauses, wherein the carbon-containing material comprises Douglas fir wood (DFW).
82. The method of clause 71, any other suitable clause, or any combination of suitable clauses, wherein the carbon-containing material comprises cellulose.
83. The method of clause 71, any other suitable clause, or any combination of suitable clauses, wherein the carbon-containing material comprises microcrystalline cellulose.
84. The method of clause 71, any other suitable clause, or any combination of suitable clauses, wherein the carbon-containing material comprises an ash content of between 10% to 40% wt. %.
85. The method of clause 84, any other suitable clause, or any combination of suitable clauses, wherein the ash content is between 10% to 15% wt. %.
86. The method of clause 84, any other suitable clause, or any combination of suitable clauses, wherein the ash content is between 15% to 20% wt. %.
87. The method of clause 84, any other suitable clause, or any combination of suitable clauses, wherein the ash content is between 20% to 25% wt. %.
88. The method of clause 84, any other suitable clause, or any combination of suitable clauses, wherein the ash content is between 25% to 30% wt. %.
89. The method of clause 84, any other suitable clause, or any combination of suitable clauses, wherein the ash content is between 30% to 35% wt. %.
90. The method of clause 84, any other suitable clause, or any combination of suitable clauses, wherein the ash content is between 35% to 40% wt. %.
91. The method of clause 71, any other suitable clause, or any combination of suitable clauses, wherein the adsorbent composition comprises a surface area of between 100 to 1500 $m^2g^{-1}$.
92. The method of clause 91, any other suitable clause, or any combination of suitable clauses, wherein the surface area is between 100 to 500 $m^2g^{-1}$.
93. The method of clause 91, any other suitable clause, or any combination of suitable clauses, wherein the surface area is between 500 to 1000 $m^2g^{-1}$.
94. The method of clause 91, any other suitable clause, or any combination of suitable clauses, wherein the surface area is between 1000 to 1500 $m^2g^{-1}$.

95. The method of clause 91, any other suitable clause, or any combination of suitable clauses, wherein the surface area is between 100 to 200 $m^2g^{-1}$.
96. The method of clause 91, any other suitable clause, or any combination of suitable clauses, wherein the surface area is between 200 to 300 $m^2g^{-1}$.
97. The method of clause 91, any other suitable clause, or any combination of suitable clauses, wherein the surface area is between 300 to 400 $m^2g^{-1}$.
98. The method of clause 91, any other suitable clause, or any combination of suitable clauses, wherein the surface area is between 400 to 500 $m^2g^{-1}$.
99. The method of clause 91, any other suitable clause, or any combination of suitable clauses, wherein the surface area is between 500 to 600 $m^2g^{-1}$.
100. The method of clause 91, any other suitable clause, or any combination of suitable clauses, wherein the surface area is between 600 to 700 $m^2g^{-1}$.
101. The method of clause 91, any other suitable clause, or any combination of suitable clauses, wherein the surface area is between 700 to 800 $m^2g^{-1}$.
102. The method of clause 91, any other suitable clause, or any combination of suitable clauses, wherein the surface area is between 800 to 900 $m^2g^{-1}$.
103. The method of clause 91, any other suitable clause, or any combination of suitable clauses, wherein the surface area is between 900 to 1000 $m^2g^{-1}$.
104. The method of clause 91, any other suitable clause, or any combination of suitable clauses, wherein the surface area is between 1000 to 1100 $m^2g^{-1}$.
105. The method of clause 91, any other suitable clause, or any combination of suitable clauses, wherein the surface area is between 1100 to 1200 $m^2g^{-1}$.
106. The method of clause 91, any other suitable clause, or any combination of suitable clauses, wherein the surface area is between 1200 to 1300 $m^2g^{-1}$.
107. The method of clause 91, any other suitable clause, or any combination of suitable clauses, wherein the surface area is between 1300 to 1400 $m^2g^{-1}$.
108. The method of clause 91, any other suitable clause, or any combination of suitable clauses, wherein the surface area is between 1400 to 1500 $m^2g^{-1}$.
109. The method of clause 71, any other suitable clause, or any combination of suitable clauses, wherein the adsorbent composition comprises a pH value between 5 to 13.
110. The method of clause 71, any other suitable clause, or any combination of suitable clauses, wherein the pH value is between 5 to 6.
111. The method of clause 71, any other suitable clause, or any combination of suitable clauses, wherein the pH value is between 6 to 7.
112. The method of clause 71, any other suitable clause, or any combination of suitable clauses, wherein the pH value is between 7 to 8.
113. The method of clause 71, any other suitable clause, or any combination of suitable clauses, wherein the pH value is between 8 to 9.
114. The method of clause 71, any other suitable clause, or any combination of suitable clauses, wherein the pH value is between 9 to 10.
115. The method of clause 71, any other suitable clause, or any combination of suitable clauses, wherein the pH value is between 10 to 11.
116. The method of clause 71, any other suitable clause, or any combination of suitable clauses, wherein the pH value is between 11 to 12.
117. The method of clause 71, any other suitable clause, or any combination of suitable clauses, wherein the pH value is between 12 to 13.
118. The method of clause 71, any other suitable clause, or any combination of suitable clauses, wherein the adsorbent composition is configured for adsorption of phosphate.
119. The method of clause 71, any other suitable clause, or any combination of suitable clauses, wherein the metal comprises magnesium, calcium, or a combination thereof.
120. The method of clause 71, any other suitable clause, or any combination of suitable clauses, wherein the metal is magnesium.
121. The method of clause 71, any other suitable clause, or any combination of suitable clauses, wherein the metal is calcium.
122. The method of clause 71, any other suitable clause, or any combination of suitable clauses, wherein the carbon-containing material is biochar, and wherein the biochar comprises the metal embedded on a surface of the biochar.
123. The method of clause 122, any other suitable clause, or any combination of suitable clauses, wherein the metal embedded on a surface of the biochar is a nanoparticle.
124. The method of clause 123, any other suitable clause, or any combination of suitable clauses, wherein the nanoparticle has a diameter less than 5 nm.
125. The method of clause 123, any other suitable clause, or any combination of suitable clauses, wherein the nanoparticle has a diameter between 5 and 50 nm.
126. The method of clause 123, any other suitable clause, or any combination of suitable clauses, wherein the nanoparticle has a diameter between 5 and 10 nm.
127. The method of clause 123, any other suitable clause, or any combination of suitable clauses, wherein the nanoparticle has a diameter between 10 and 20 nm.
128. The method of clause 123, any other suitable clause, or any combination of suitable clauses, wherein the nanoparticle has a diameter between 20 and 30 nm.
129. The method of clause 123, any other suitable clause, or any combination of suitable clauses, wherein the nanoparticle has a diameter between 30 and 40 nm.
130. The method of clause 123, any other suitable clause, or any combination of suitable clauses, wherein the nanoparticle has a diameter between 40 and 50 nm.
131. The method of clause 71, any other suitable clause, or any combination of suitable clauses, wherein the carbon-containing material is doped with the nitrogen via a one-step doping process.
132. The method of clause 71, any other suitable clause, or any combination of suitable clauses, wherein the carbon-containing material is doped with the nitrogen via a two-step doping process.
133. The method of clause 71, any other suitable clause, or any combination of suitable clauses, wherein the adsorbent composition comprises nitrogen functionality on a surface of the carbon-containing material.
134. The method of clause 133, any other suitable clause, or any combination of suitable clauses, wherein the nitrogen functionality comprises a pyridinic group.
135. The method of clause 133, any other suitable clause, or any combination of suitable clauses, wherein the nitrogen functionality comprises a pyridone group.
136. The method of clause 133, any other suitable clause, or any combination of suitable clauses, wherein the nitrogen functionality comprises a pyrrolic group.
137. The method of clause 133, any other suitable clause, or any combination of suitable clauses, wherein the nitrogen functionality comprises a graphitic group.
138. The method of clause 133, any other suitable clause, or any combination of suitable clauses, wherein the nitrogen functionality comprises an oxidized group.

139. The method of clause 71, any other suitable clause, or any combination of suitable clauses, wherein the carbon-containing material comprises one or more active sites.
140. The method of clause 139, any other suitable clause, or any combination of suitable clauses, wherein the active site comprises the metal coordinated with the nitrogen.
141. The method of clause 139, any other suitable clause, or any combination of suitable clauses, wherein the active site is an edge site, a centered site, or a combination thereof.
142. The method of clause 139, any other suitable clause, or any combination of suitable clauses, wherein the active site is an edge site.
143. The method of clause 139, any other suitable clause, or any combination of suitable clauses, wherein the active site is a centered site.
144. The method of clause 71, any other suitable clause, or any combination of suitable clauses, wherein the adsorbent composition comprises carbon, hydrogen, nitrogen, oxygen, and ash.
145. The method of clause 144, any other suitable clause, or any combination of suitable clauses, wherein the carbon, hydrogen, nitrogen, oxygen, and ash are present at the following wt. %:
    carbon between 40% to 95%;
    hydrogen between 0.5% to 1.5%;
    nitrogen between 0.1% to 20%:
    oxygen between 0.5% to 10%; and
    ash between 0.01 to 45%.
146. A biochar extract composition comprising magnesium phosphate, wherein the biochar extract is made by washing an adsorbent composition with an extraction media and capturing the extraction media with or without further processing for subsequent use of the biochar extract composition as a soil additive, plant treatment, or seed treatment.
147. A biochar extract composition comprising calcium phosphate, wherein the biochar extract is made by washing an adsorbent composition with an extraction media and capturing the extraction media with or without further processing for subsequent use of the biochar extract composition as a soil additive, plant treatment, or seed treatment.

Example 1

A. Preparation of N-Metal Doped Biochar

For this section of the instant example, Avicel® cellulose was used as the starting material to produce biochar as the carbon-containing material. Various nitrogen-doped biochars were produced using ammonia through a one-step ammonization process at five different temperatures (e.g., 500, 600, 700, 800, 900° C.). This was conducted in a Quartz Tube furnace reactor with 50 mm OD by 44 mm ID at a length of 1.0 m. Briefly, cellulose was kept in a tubular furnace in contact with $N_2$ for 30 minutes at 25° C. Then, the temperature was increased from 25° C. to the desired set temperature at a heating rate of 10° C. $min^{-1}$ under an ammonia environment. When the final temperature was reached, the sample was allowed a residence time of 30 min in the reactor. Flow rate of 1000 mL $min^{-1}$ for ammonia was employed. The final biochar produced was cooled down to 25° C. at the same rate before storage and characterization.

Nitrogen-metal biochars were also produced using Avicel cellulose and 3 different metals, but all these studies were conducted at 800° C. (the temperature at which the highest incorporation of nitrogen was observed). Solutions of 5 wt. % Mg, Ca and Fe were prepared from $MgCl_2$, $CaCl_2$) and $FeCl_3$, respectively, and then mixed with cellulose in a ratio of 2.8:1 (Solution: Cellulose). The cellulose was fully covered with the solution to ensure a uniform distribution. The mixtures were then oven dried for 24 hours. FIG. 1 shows a schematic representation of tasks for production of N-metal doped biochars.

Table 1 presents the biochar yield of N-Chars and N-Metal biochars. The yield of N-Char decreased with increasing temperature due to the loss of volatiles by the pyrolysis reactions. The N-Metal biochars present higher yield than the N-chars because of the impregnated metal content in these biochars.

TABLE 1

Char yield of N-char and N-Metal biochars.

| Sample | 500° C. | 600° C. | 700° C. | 800° C. | 900° C. |
|---|---|---|---|---|---|
| N-Char | 20.3 ± 0.2 | 17.9 + 0.2 | 17.5 ± 0.4 | 16.8 ± 0.3 | 15.5 ± 0.6 |
| Mg-Char | | | | 34.0 ± 0.3 | |
| Mg-N-Char | | | | 30.1 ± 0.4 | |
| Ca-N-Char | | | | 32.5 ± 0.9 | |
| Fe-N-Char | | | | 29.8 ± 0.4 | |

B. Preparation of N-Metal Doped Biochars from Various Biomass Feedstocks

For this section of the instant example, three different biomass feedstocks were utilized to produce biochar co-doped with nitrogen and metal: Anaerobically Digested fiber (ADF), Wheat Straw (WS), and Douglas fir wood (DFW) (*Pseudotsuga menziesii*).

ADF was separated from a mesophilic mixed plug-flow digester in the Edaleen dairy located in Lynden, WA. It was air-dried to decrease the moisture content to less than 8% by weight and sieved to particle size below 1.41 mm. Wheat Straw (WS) and Douglas Fir (DFW) were air-dried and the same particle size as ADF used.

Four series of char were produced using $N_2$ or ammonia gas at different stages (Table 2): (1) char produced through pyrolysis under $N_2$, (2) char produced through pyrolysis under $N_2$ followed by $NH_3$ activation and (3) char produced through pyrolysis under $NH_3$, (4) .char produced through biomass impregnation with $MgCl_2$ and followed by pyrolysis under $NH_3$.

TABLE 2

Char production conditions

| Char sample | Feedstock source | Magnesium doping | Pyrolysis (step one) | Activation (step two) |
|---|---|---|---|---|
| ADF | Anaerobically Digested Fiber | — | Under $N_2$ gas for 1 h | — |
| WS | Wheat Straw | — | Under $N_2$ gas for 1 h | — |
| DFW | Douglas Fir Wood | — | Under $N_2$ gas for 1 h | — |
| ND-ADF (Two Steps) | Anaerobically Digested Fiber | — | Under $N_2$ gas for 1 h | Under $NH_3$ gas for 1 h |
| ND-WS (Two Steps) | Wheat Straw | — | Under $N_2$ gas for 1 h | Under $NH_3$ gas for 1 h |
| ND-DFW (Two Steps) | Douglas Fir Wood | — | Under $N_2$ gas for 1 h | Under $NH_3$ gas for 1 h |

TABLE 2-continued

Char production conditions

| Char sample | Feedstock source | Magnesium doping | Pyrolysis (step one) | Activation (step two) |
|---|---|---|---|---|
| ND-ADF (One Steps) | Anaerobically Digested Fiber | — | Under $NH_3$ gas for 1 h | — |
| ND-WS (One Steps) | Wheat Straw | — | Under $NH_3$ gas for 1 h | — |
| ND-DFW (One Steps) | Douglas Fir Wood | — | Under $NH_3$ gas for 1 h | — |
| WS-Mg | Wheat Straw | yes | Under $N_2$ gas for 1 h | — |
| DFW-Mg | Douglas Fir Wood | yes | Under $N_2$ gas for 1 h | — |
| ND-WS (One Step)-Mg | Wheat Straw | yes | Under $NH_3$ gas for 1 h | — |
| ND-DFW (One Step)-Mg | Douglas Fir Wood | yes | Under $NH_3$ gas for 1 h | — |

The first series of char was produced through pyrolysis of ADF, WS and DFW under nitrogen gas at 750° C. in a quartz tube furnace reactor of 50 OD×44 ID×1000 L, mm (2"D× 40" L). The heating up period was conducted under $N_2$. Briefly, ADF, WS and DFW were kept in tubular furnace in contact with $N_2$ for 30 minutes at 25° C. Then, the temperature increased from 25° C. to 750° C. at a heating rate of 10° C./min and kept at 750° C. for one hour. Flow rates of 500 mL min$^{-1}$ for $N_2$ was employed. Then chars produced were cooled down to 25° C. under $N_2$, and the solid products from ADF, WS and DFW were named as ADF, WS and DFW chars, respectively.

The second series of chars was produced in two steps (carbonization followed by ammonia activation). Briefly, the first step is similar to the first series of char, but after one-hour pyrolysis under $N_2$ gas, chars were exposed to the ammonia gas at 750° C. for one hour. Then chars were cooled down to 25° C. under $N_2$. The resulting chars produced from ADF, WS and DFW were named as ND-ADF (Two Steps), ND-DFW (Two Steps) and ND-WS (Two Steps) chars.

The third series of char was produced similar to the first series, but instead of nitrogen, ammonia gas was applied and the resulting chars produced from ADF, WS and DFW were named as ND-ADF (One step), ND-WS (One Step), and ND-DFW (One Step) chars. A flow rate of 500 mL min$^{-1}$ for $NH_3$ was employed.

A series of chars doped with Mg were also produced (fourth series). Briefly, DFW and WS were impregnated with $MgCl_2 \cdot 6H_2O$ solution at a solid: liquid ratio of 1:4 (g/ml) and stirred for 6 hr. The magnesium chloride solution was prepared by dissolving 11 g of $MgCl_2 \cdot 6H_2O$ in 100 mL of deionized water. Then the mixture was dried at 90° C. for 48 hr. After Mg-containing DFW and WS preparation, the same pyrolysis condition as first and third series of chars were applied to produce Mg impregnated chars (DFW-Mg Char, WS-Mg Char, ND-DFW (One Step)-Mg Char and ND-WS (One Step)-Mg char).

Figure 2:
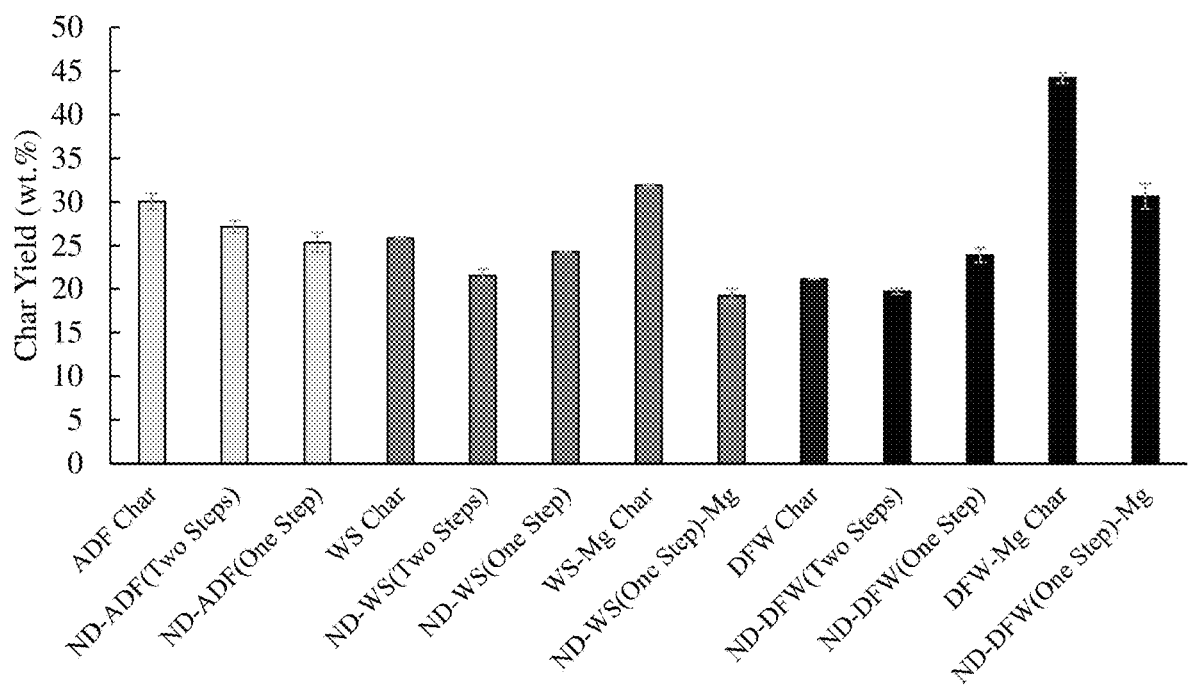
FIG. 2 shows yields of chars produced at 750° C.

The yields of char produced at 750° C. from ADF, WS and DFW are shown in FIG. 2. ADF resulted in the largest char yield likely due to higher ash content of this feedstock. Impregnation of biomass with $MgCl_2$ solution in the presence of $NH_3$ increased char yields (see DFW-Mg and WS-Mg chars). This could be attributed to catalytic effect of Mg in the presence of ammonia on the formation of polyaromatic ring systems. Furthermore, impregnation of low ash content biomass (e.g., DFW) with $MgCl_2$ and pyrolysis under ammonia gas can significantly improve adsorption capacity of chars toward phosphate.

Example 2

A. Analysis of N-Metal Doped Biochar

Elemental Analysis: For this section of the instant example, elemental analysis was performed using a TRUSPEC-CHN® elemental analyzer (LECO, U.S.). Briefly, 0.15 g of sample was used to determine total carbon (C), nitrogen (N) and hydrogen (H) contents. Oxygen (O) mass fraction was determined by subtracting the ash, C, N, and H contents from the total mass of the sample.

Proximate Analysis: Moisture, fixed carbon, volatile matter, and ash content in all biochars produced were determined using a thermogravimetric analyzer, SDTA851e (Mettler Toledo, U.S.). The percentage of fixed carbon was determined by subtracting the ash percentage from the volatile matter percentage, after assigning all weight loss up to 120° C. to loss of free and non-structural water. Briefly, moisture content was measured as the weight loss after the char was heated in a crucible from 25 to 120° C. and held at this temperature for 3 min under nitrogen gas environment at a flow rate of 50 mL/min. Then char was heated from 120 to 950° C. under nitrogen gas environment to determine volatile content. Then, it was held for 5 min and later cooled down to 450° C. Ash was determined after heating the char from 450° C. to 600° C. under oxygen gas flow (50 mL/min).

Gas physisorption analysis: Carbon dioxide ($CO_2$) and nitrogen adsorption isotherms were measured at 273 K and 77 K, respectively, on micromeritics TriStar II PLUS Surface Area and Porosity Analyzer (Norcross, GA, USA). Before each analysis, biochar samples were degassed at 250° C. for 18 hours under a vacuum of 0.05-0.1 mbar (the degassing temperature was chosen based on the production temperature of the biochar to avoid sample degradation during preparation). $CO_2$ adsorption isotherms were measured between the partial pressure range of $P/P_o=10^{-5}$ to $P/P_o=0.03$ using 75 set equilibration points and nitrogen isotherm was measured between $P/P_o=10^{-5}$ to 0.99 and desorption between $P/P_o=0.99$ to 0.01. Where the relative pressure ($P/P_o$) is the ratio of absolute gas pressure to saturation pressure. The saturation pressure of $N_2$ at 77 K is 101.3 kPa. Surface area and micropore volumes were estimated for $CO_2$ and nitrogen adsorption using the Dubin-Radushkevich (DR) equation and BET model, respectively.

Table 3 shows the elemental analysis of all N-doped biochars produced. Nitrogen content in the samples generally increased with processing temperature. The greatest nitrogen content appears at a temperature of 800° C. (12.5 wt. %).

TABLE 3

Elemental content of N-doped biochars from cellulose (dry basis).

| Samples | Dry basis | | | | |
|---|---|---|---|---|---|
| | C (wt. %) | H (wt. %) | N (wt. %) | O* (wt. %) | Ash (wt. %) |
| N-dopedchar__500 | 86.6 ± 0.4 | 3.1 ± 0.03 | 7.4 ± 0.1 | 2.9 ± 0.2 | <0.1 |
| N-dopedchar__600 | 87.5 ± 0.5 | 2.2 ± 0.01 | 7.8 ± 0.02 | 2.6 ± 0.2 | <0.1 |
| N-dopedchar__700 | 85.4 ± 0.5 | 1.2 ± 0.01 | 11.0 ± 0.05 | 2.4 ± 0.2 | <0.1 |
| N-dopedchar__800 | 84.7 ± 0.7 | 0.9 ± 0.01 | 12.5 ± 0.2 | 1.9 ± 0.3 | <0.1 |
| N-dopedchar__900 | 89.6 ± 0.7 | 0.6 ± 0.03 | 7.6 ± 0.1 | 2.1 ± 0.3 | 0.1 |

Figure 3A:
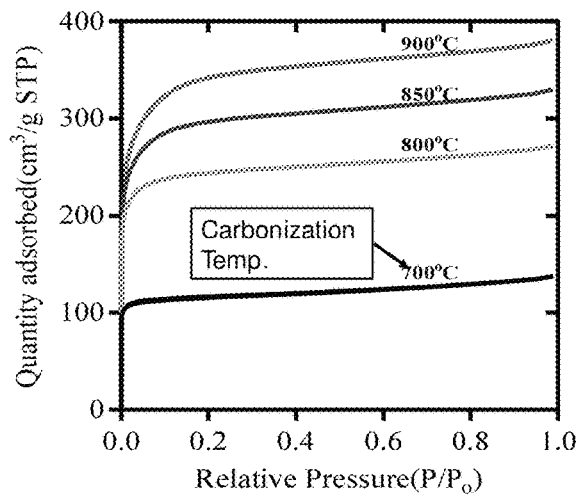
FIGS. 3A-3B show adsorption isotherms of nitrogen-doped biochars produced from cellulose.
Figure 3B:
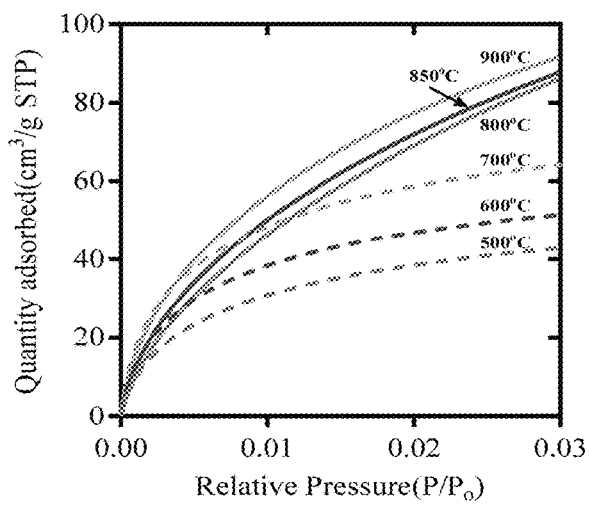

FIGS. 3A and 3B show the $CO_2$ and $N_2$ adsorption isotherms for all the N-doped biochars produced. High surface area was achieved through ammonia doping of cellulose biochar with ammonia serving as an activating agent. The surface area analysis shows an increase in surface area of the biochar as the production temperatures increases (500-900° C.). Note that specific surface area and pore volume are commonly determined by measurement of physisorption of $N_2$ and/or $CO_2$.

The maximum surface area (1314 $m^2$ $g^{-1}$, see Table 4) was achieved at 900° C. It is worth mentioning that high surface area and pore volume are key biochar properties pertaining to water and nutrient cycling, microbial activity as well as sorption of organic and inorganic compounds and gaseous pollutants.

TABLE 4

Surface area (Sa) and pore volume (PV) of N-doped biochars from cellulose.

| Sample | $Sa_{N2}$ ($m^2 g^{-1}$) | $Sa_{CO2}$ ($m^2 g^{-1}$) | $PV_{micro}$ ($cm^3 g^{-1}$) | $PV_{meso}$ ($cm^3 g^{-1}$) | $PV_{total}$ ($cm^3 g^{-1}$) |
|---|---|---|---|---|---|
| N-dopedchar__500 | — | 331.7 | 0.13 | — | — |
| N-dopedchar__600 | — | 386.2 | 0.15 | — | — |
| N-dopedchar__700 | 453.2 | 470.9 | 0.19 | 0.02 | 0.21 |
| N-dopedchar__800 | 934.1 | 761.0 | 0.30 | 0.12 | 0.42 |
| N-dopedchar__850 | 1169.9 | 764.2 | 0.31 | 0.20 | 0.51 |
| N-dopedchar__900 | 1314.8 | 793.4 | 0.32 | 0.27 | 0.59 |

The elemental and proximate analysis of biochar doped with metals and nitrogen is presented in Table 5. The presence of metals had a significant influence on the carbonization process. More nitrogen is being incorporated in the structure of the biochar, particularly for the N-Mg-char, which has 15.5 wt. % nitrogen as compared to 12.5 wt. % nitrogen for the N-doped biochar (Table 3). However, the carbon content decreases dramatically as compared to biochar without metals.

TABLE 5

Elemental composition (wt. %) of metal-N-doped biochar derived from cellulose produced at 800° C.

| Samples | Dry basis | | | | | | |
|---|---|---|---|---|---|---|---|
| | C | H | N | O | VC | FC | Ash |
| N-Char | 84.7 ± 0.7 | 0.9 ± 0.01 | 12.5 ± 0.2 | 1.9 ± 0.2 | 10.4 ± 0.3 | 89.6 ± 0.3 | 0.0 ± 0.01 |
| Mg-Char | 65.8 ± 0.03 | 0.8 ± 0.05 | 0.2 ± 0.02 | 5.1 ± 0.04 | 4.4 ± 0.1 | 67.5 ± 0.7 | 28.1 ± 0.7 |
| Mg-N-Char | 51.5 ± 0.5 | 1.0 ± 0.02 | 15.5 ± 0.1 | 7.8 ± 0.2 | 14.7 ± 0.4 | 61.0 ± 0.3 | 24.2 ± 0.1 |
| Ca-N-Char | 62.1 ± 2.3 | 0.6 ± 0.01 | 12.9 ± 0.03 | 0.7 ± 0.1 | 12.4 ± 1.0 | 64.2 ± 0.4 | 23.4 ± 0.7 |
| Fe-N-Char | 69.0 ± 0.3 | 0.8 ± 0.01 | 8.8 ± 0.01 | 2.8 ± 0.1 | 13.6 ± 0.4 | 67.8 ± 0.3 | 18.6 ± 0.1 |

Note
C (wt. %) + H (wt. %) + N (wt. %) + O (wt. %) + Ash (wt. %) = 100

B. Analysis of N-Metal Doped Biochars from Various Biomass Feedstocks

Proximate analysis: Proximate analysis was conducted to determine char moisture, fixed carbon, volatiles, and ash content using a thermogravimetric analyzer (TGA) SDTA851e (Mettler Toledo, US).

Elemental analysis: Elemental analysis was conducted using a TRUSPEC-CHN® (LECO, US) elemental analyzer. Briefly, 0.15 g of char was used to determine total carbon (C), nitrogen (N) and hydrogen (H). The oxygen (O) mass fraction was determined by difference (the ash content was considered for this calculation).

Gas physisorption analysis: Nitrogen ($N_2$) and Carbon dioxide ($CO_2$) adsorption isotherms were determined at 76.85 K and 273 K on micromeritics TriStar II PLUS Surface Area and Porosity Analyzer (Norcross, GA, USA). The micropore volumes were estimated from both $N_2$ and $CO_2$ adsorption using the Dubinine-Radushkevich (DR) equation. Density functional theory (DFT) calculations were carried out from $CO_2$ adsorption isotherms using commercial software (MicroActive™v.1.01, Micromeritics) to calculate the micropore size distribution assuming a slit pore shape. DFT also provided an independent assessment of the volume of micropores with entrance dimension <1 nm.

ICP-MS (Inductively coupled plasma mass spectroscopy): The samples were analyzed for the presence of metals. Metal analysis was conducted in an ICP-MS (Agilent 7500cx).

X-ray photoelectron spectroscopy (XPS): XPS measurements were conducted using an AXIS-165 (Kratos Analytical Inc. Manchester, UK) using achromatic x-ray radiation of 1253.6 eV (MgKα) to determine the elemental composition on the sample surface. A pass energy of 40 eV and spot size of approximately 120 μm are used to record all high-resolution spectra.

Char morphology: Scanning electron microscope (SEM) imaging analysis was carried out using Tescan Vega3 instrument combined with energy dispersive spectroscopy (EDS). Chars were mounted on a stub and gold coated prior to analysis. SEM and EDS were used to examine the structure and surface characteristics of the char before and after adsorption.

pH: pH analysis was conducted by adding a 0.4 g of char sample to 20 mL deionized water. This was mixed with a mechanical shaker at 40 rpm for 1 h and equilibrated for 5 min before measuring the pH with a pH meter (Fisher Scientific Accumet basic AB15).

X-ray powder diffraction (XRD): The crystallography of chars was identified using X-ray diffraction (Miniflex benchtop X-ray diffractometer) with Cu K α radiation and operated at 40 kV, 15 mA, with 0.01 degree-steps and a scanning rate of 0.5° $min^{-1}$. The scan range of interest for this analysis was 10-100°. Match! software was applied for XRD peak identification.

Fourier Transform Infrared Spectroscopy (FTIR): FTIR analysis was conducted to identify the functional groups on the sample chars. FTIR spectra were obtained using a Shimadzu IRPrestige spectrometer equipped with MIRacle single reflection ATR Ge probe.

Table 6 presents the results of proximate analysis (i.e., ash, volatile matter, fixed carbon) of all chars.

TABLE 6

Content of volatiles, fixed carbon and ash (wt. %) of chars produced 750° C.

| Sample | Volatile Mater | Fixed Carbon | Ash |
| --- | --- | --- | --- |
| ADF | 75.4 ± 1.2 | 16.7 ± 0.7 | 7.8 ± 0.6 |
| ADF char | 13.5 ± 0.7 | 62.3 ± 2.0 | 24.2 ± 2.6 |
| ND-ADF (Two Steps) char | 16.2 ± 0.8 | 56.9 ± 3.5 | 26.9 ± 2.7 |
| ND-ADF (One Step) char | 19.3 ± 0.5 | 48.3 ± 2.0 | 32.4 ± 2.6 |
| WS | 82.3 ± 1.5 | 14.9 ± 1.1 | 2.8 ± 0.4 |
| WS char | 9.0 ± 0.6 | 77.9 ± 0.4 | 13.0 ± 0.9 |
| ND-WS (Two Steps) char | 9.4 ± 1.2 | 74.4 ± 1.9 | 16.1 ± 1.8 |
| ND-WS (One Step) char | 9.5 ± 0.5 | 75.8 ± 1.1 | 14.7 ± 1.6 |
| WS-Mg char | 13.7 ± 0.2 | 63.0 ± 0.2 | 23.3 ± 0.05 |
| ND-WS (One Step)-Mg Char | 24.1 ± 0.6 | 34.1 ± 0.4 | 41.7 ± 0.9 |
| DFW | 87.0 ± 1.2 | 12.6 ± 1.1 | 0.3 ± 0.1 |
| DFW char | 5.3 ± 0.1 | 94.4 ± 0.3 | 0.3 ± 0.1 |
| ND-DFW (Two Step) char | 6.2 ± 0.4 | 93.6 ± 0.7 | 0.2 ± 0.3 |
| ND-DFW (One Step) char | 4.4 ± 0.02 | 95.5 ± 0.1 | 0.1 ± 0.02 |
| DFW-Mg char | 5.5 ± 0.3 | 77.8 ± 1.4 | 16.7 ± 0.5 |
| ND-DFW (One Step)-Mg Char | 10.4 ± 0.9 | 68.1 ± 0.1 | 21.6 ± 1.0 |

The content of metal in each of the chars produced and the feedstocks is shown in Table 7. The samples from ADF have much higher alkaline content than the samples from WS and DFW. The ash content increased dramatically as $MgCl_2$ was added. Char produced from impregnated DFW and WS have low fixed carbon following pyrolysis/carbonization under ammonia. Without being bound by any theory, it is believed that although char yield increased, it was the result of the formation of small polyaromatic rings.

TABLE 7

Mineral content (mg of metal/g of char) by ICP-MS analysis on chars

| Sample | Na | Mg | K | Ca | Fe | Al |
| --- | --- | --- | --- | --- | --- | --- |
| ADF Char | 10.8 | 31.2 | 17.2 | 41.9 | 2.6 | 1.4 |
| ND-ADF (Two Step) | 16.0 | 48.2 | 20.0 | 54.0 | 2.8 | 2.0 |
| ND-ADF (One Steps) | 12.8 | 29.6 | 31.0 | 65.8 | 3.3 | 1.2 |
| WS Char | 0.1 | 1.6 | 20.2 | 2.4 | 0.2 | 0.2 |
| ND_WS (Two Step) | 0.1 | 1.6 | 24.9 | 2.7 | 0.2 | 0.2 |
| ND-WS (One Step) | 0.02 | 1.4 | 22.8 | 1.4 | 0.2 | 0.1 |
| WS-Mg char | 0 | 74.4 | 25.8 | 0.4 | 0.3 | 0.1 |
| ND-WS (One Step)-Mg Char | 0 | 114.8 | 51.8 | 0.6 | 0.3 | 0.2 |
| DFW Char | 0.03 | 1.1 | 5.4 | 6.4 | 0.1 | 0.1 |
| ND-DFW (Two Step) | 0.02 | 0.3 | 1.9 | 2.4 | 0.03 | 0.03 |
| ND-DFW (One Step) | 0.04 | 0.4 | 1.8 | 1.9 | 0.2 | 0.05 |
| DFW-Mg char | 0 | 95 | 0.7 | 0.1 | 0.1 | 0.04 |
| ND-DFW (One Step)-Mg Char | 0 | 119.8 | 1.3 | 0.2 | 0.1 | 0.03 |

The elemental composition of feedstock and chars is presented in Table 8. In previous work, ammonia was applied to treat carbonized ADF for one hour at 750° C., and the nitrogen content increased to 8.7 wt. %. In the instant example, the entire pyrolysis process was carried out under ammonia gas. As shown in Table 8, the nitrogen doped char from anaerobic digested fiber (ND-ADF (One Step)) has 16.1 wt. % nitrogen content, which is much higher than the nitrogen content that can be achieved in a post-pyrolysis treatment (only 5.5 wt. %). Nitrogen doping seems to occur through reaction of ammonia and oxygenated species. In this example, chars produced from ADF received more nitrogen than other chars. Nitrogen doping was more successful for feedstocks with higher ash content. Chars produced from DFW without metal impregnation have a lower content of nitrogen (maximum 6.5 wt. %); after impregnation of DFW with MgCl$_2$ and pyrolysis under ammonia gas, the nitrogen content of char increased significantly (10.7 wt. %).

field emission gun electron source. All samples were prepared by coating with 3 nm of gold to enhance resolution

TABLE 8

Elemental composition (wt. %) and C/O and C/N ratio of biomass used and chars produced

| Sample | C | H | N | O* | Ash | C/O | C/N |
|---|---|---|---|---|---|---|---|
| ADF | 48.8 ± 2.8 | 5.8 ± 0.3 | 2.4 ± 0.2 | 38.9 ± 3.2 | 7.8 ± 0.6 | 1 | 20 |
| ADF char | 69.2 ± 0.1 | 0.8 ± 0.02 | 2.2 ± 0.4 | 3.5 ± 0.1 | 24.2 ± 2.6 | 20 | 30 |
| ND-ADF (Two Step) char | 61.3 ± 0.2 | 0.9 ± 0.01 | 5.5 ± 0.1 | 5.3 ± 0.1 | 26.9 ± 2.7 | 11 | 11 |
| ND-ADF (One Steps) char | 46.7 ± 0.4 | 0.6 ± 0.01 | 16.1 ± 0.04 | 4.2 ± 0.04 | 32.4 ± 2.6 | 11 | 3 |
| WS | 44.6 ± 0.3 | 5.7 ± 0.01 | 0.2 ± 0.02 | 46.7 ± 0.2 | 2.8 ± 0.4 | 1 | 189 |
| WS char | 80.5 ± 0.4 | 0.9 ± 0.02 | 0.6 ± 0.01 | 5.0 ± 0.3 | 13.0 ± 0.9 | 16 | 134 |
| ND_WS (Two Step) char | 74.4 ± 0.4 | 0.6 ± 0.01 | 6.7 ± 0.03 | 2.1 ± 0.4 | 16.1 ± 1.8 | 35 | 11 |
| ND-WS (One Step) char | 61.8 ± 0.8 | 0.4 ± 0.04 | 9.82 ± 0.2 | 13.2 ± 0.05 | 14.7 ± 1.6 | 5 | 6 |
| WS-Mg Char | 57.8 ± 0.2 | 0.5 ± 0.01 | 2.5 ± 0.03 | 15.8 ± 0.15 | 36.7 ± 0.9 | 4 | 23 |
| ND-WS(One Step)-Mg | 39.5 ± 0.2 | 0.7 ± 0.01 | 9.7 ± 0.1 | 8.3 ± 0.7 | 41.7 ± 0.9 | 5 | 4 |
| DFW | 49.6 ± 0.2 | 5.9 ± 0.02 | 0.1 ± 0.01 | 44.0 ± 0.2 | 0.3 ± 0.1 | 1 | 526 |
| DFW char | 93.4 ± 0.01 | 1.0 ± 0.01 | 0.4 ± 0.02 | 4.9 ± 0.02 | 0.3 ± 0.1 | 19 | 207 |
| ND-DFW (Two Step) char | 89.5 ± 0.4 | 0.7 ± 0.03 | 6.5 ± 0.1 | 3.0 ± 0.6 | 0.1 ± 0.02 | 30 | 14 |
| ND-DFW (One Step) char | 91.9 ± 1.9 | 1.2 ± 0.03 | 4.1 ± 0.1 | 2.7 ± 2.1 | 0.1 ± 0.02 | 34 | 22 |
| DFW-Mg char | 74.6 ± 0.18 | 0.6 ± 0.04 | 0.6 ± 0.01 | 7.5 ± 0.1 | 16.7 | 9.9 | 132 |
| ND-DFW(One Step)-Mg | 60.1 ± 0.1 | 1.2 ± 0.04 | 10.7 ± 0.1 | 6.3 ± 0.0 | 21.6 | 9.5 | 5.6 |

Figure 4:
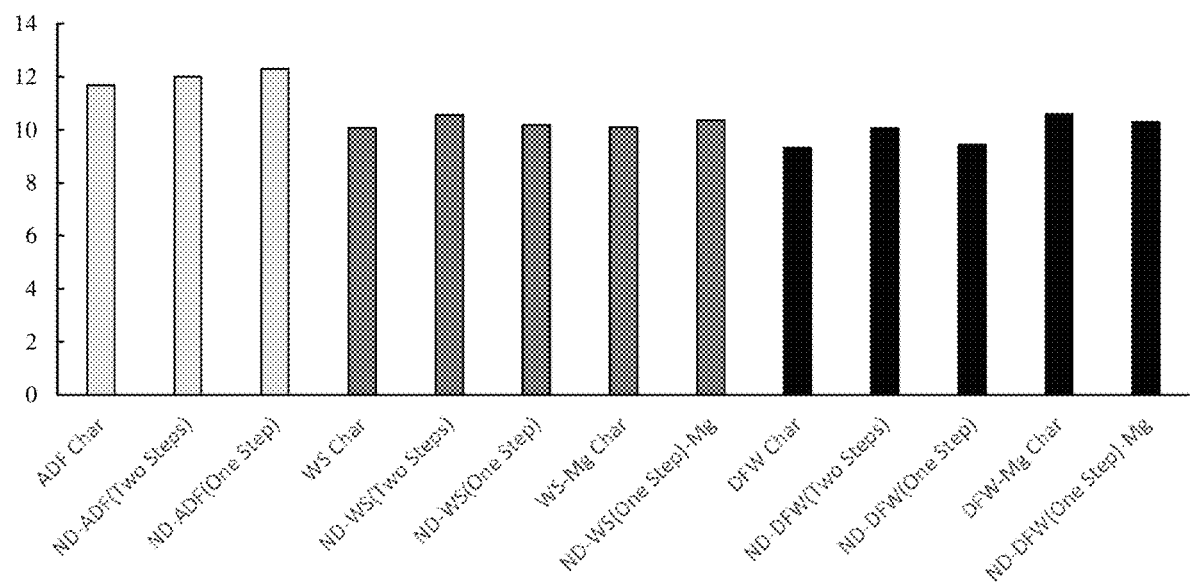
FIG. 4 shows pH value of chars produced from ADF, WS and DFW.
Figure 5A:
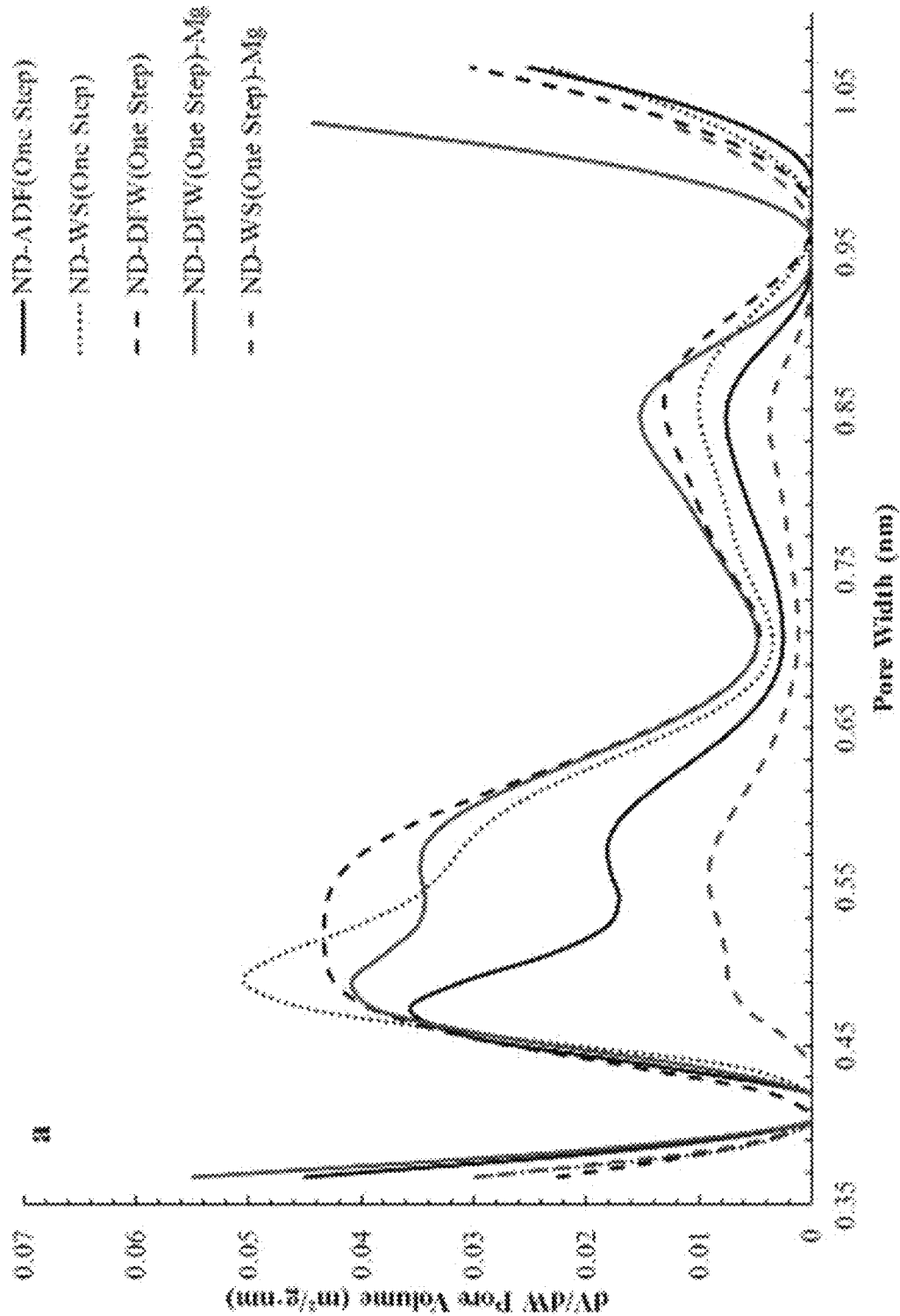
FIGS. 5A-5F show pore size distribution of chars obtained from $CO_2$ adsorption (FIGS. 5A-5C) and $N_2$ adsorption (FIGS. 5D-5F).
Figure 5B:
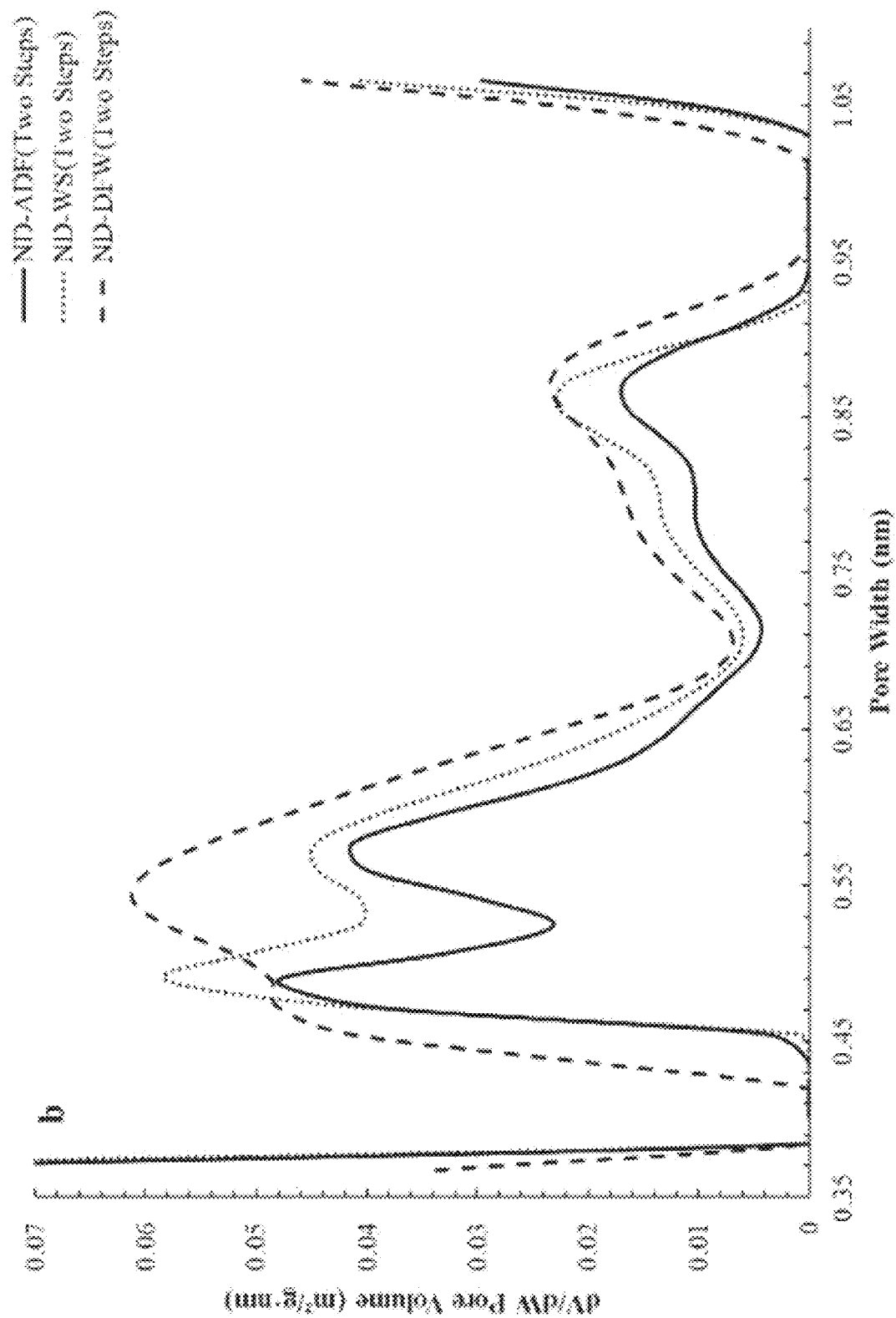
Figure 5C:
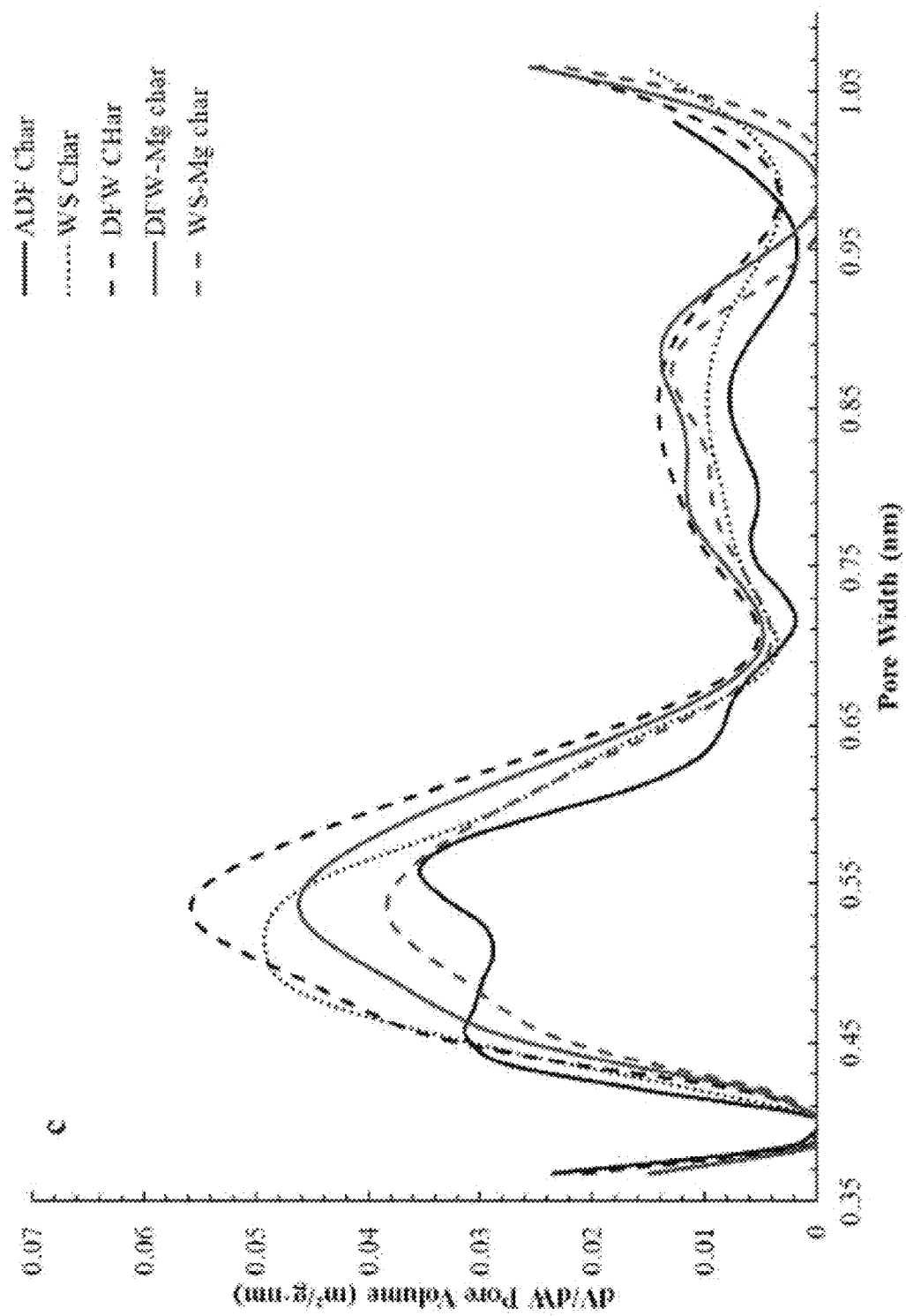
Figure 5D:
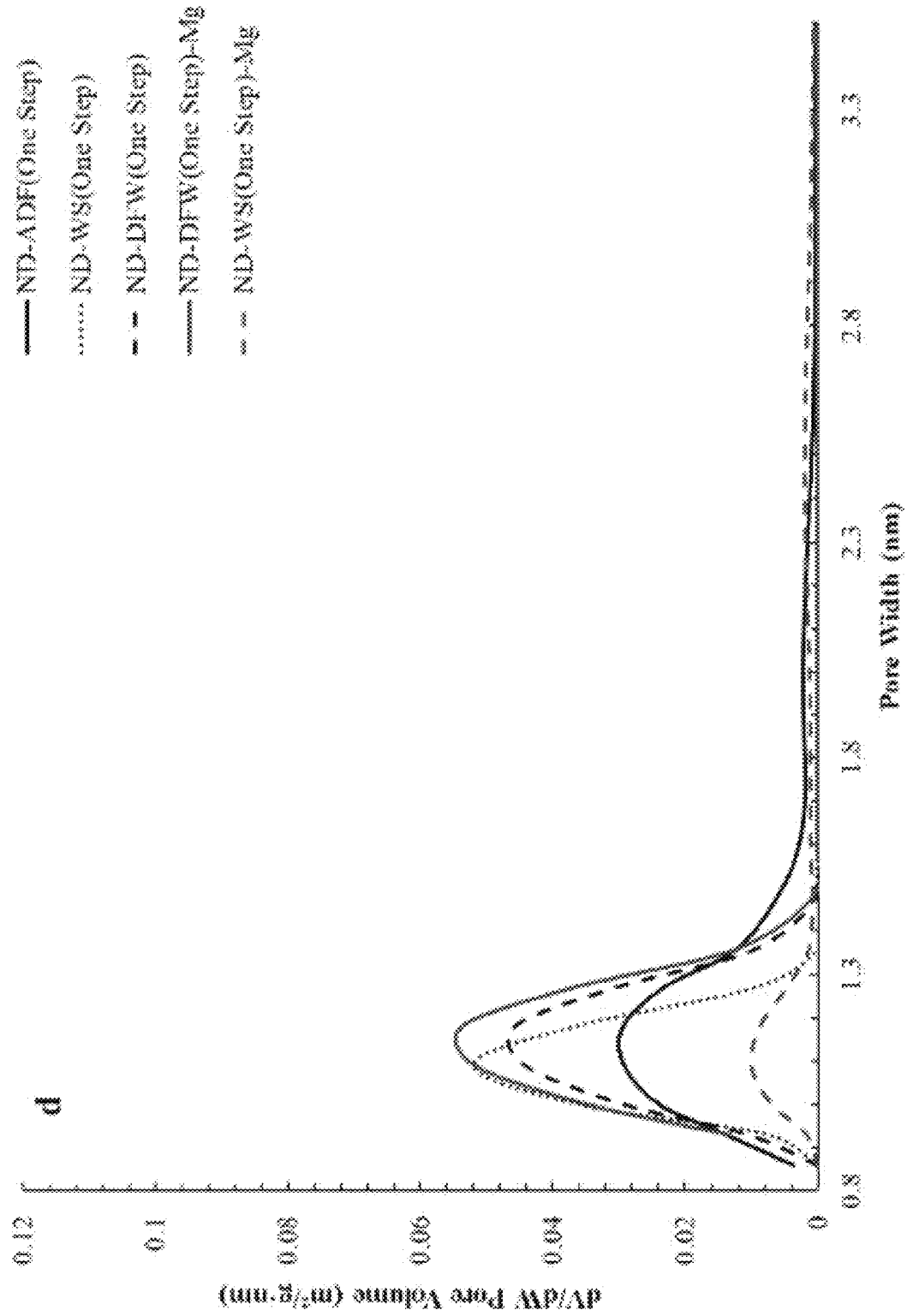
Figure 5E:
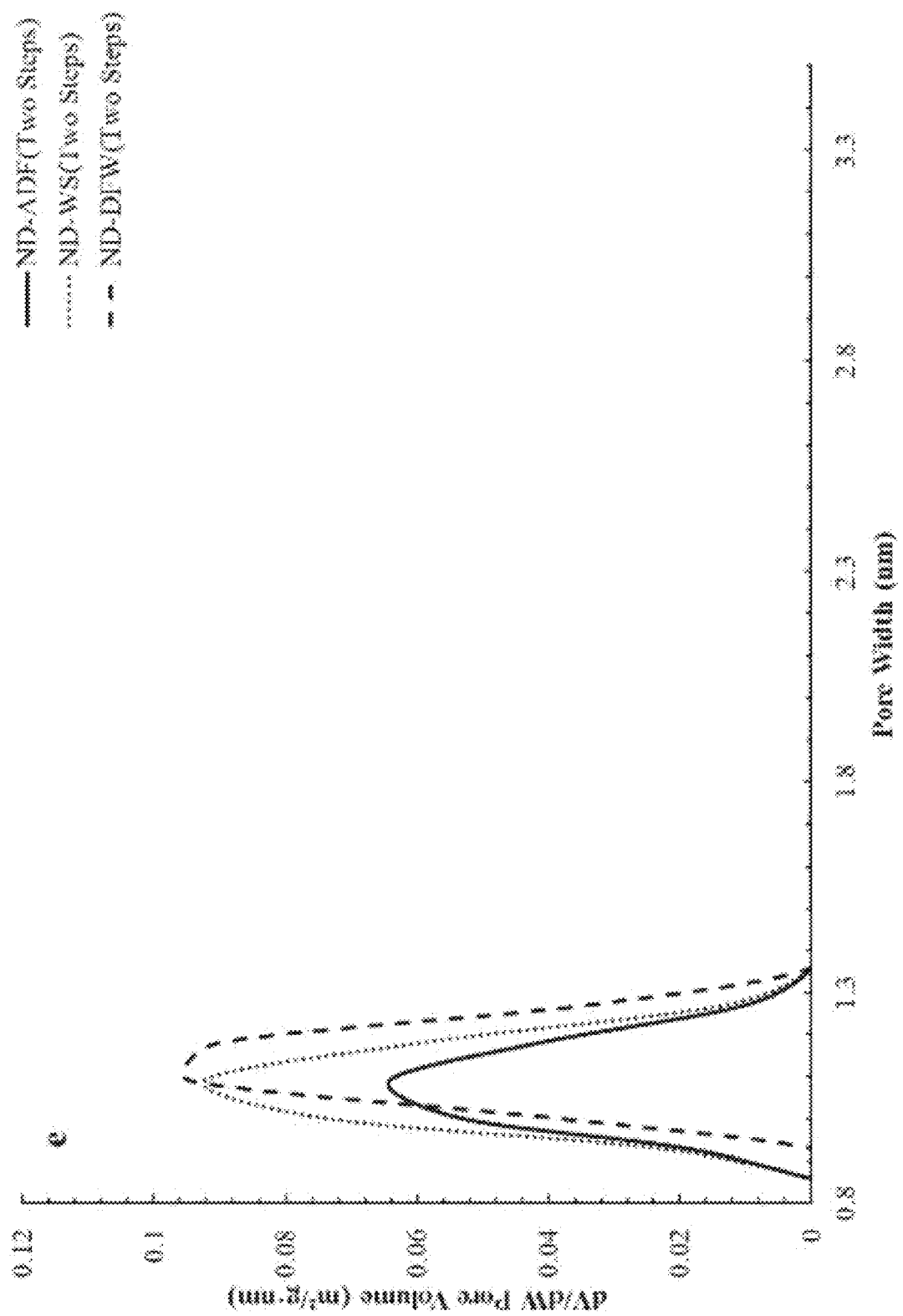
Figure 5F:
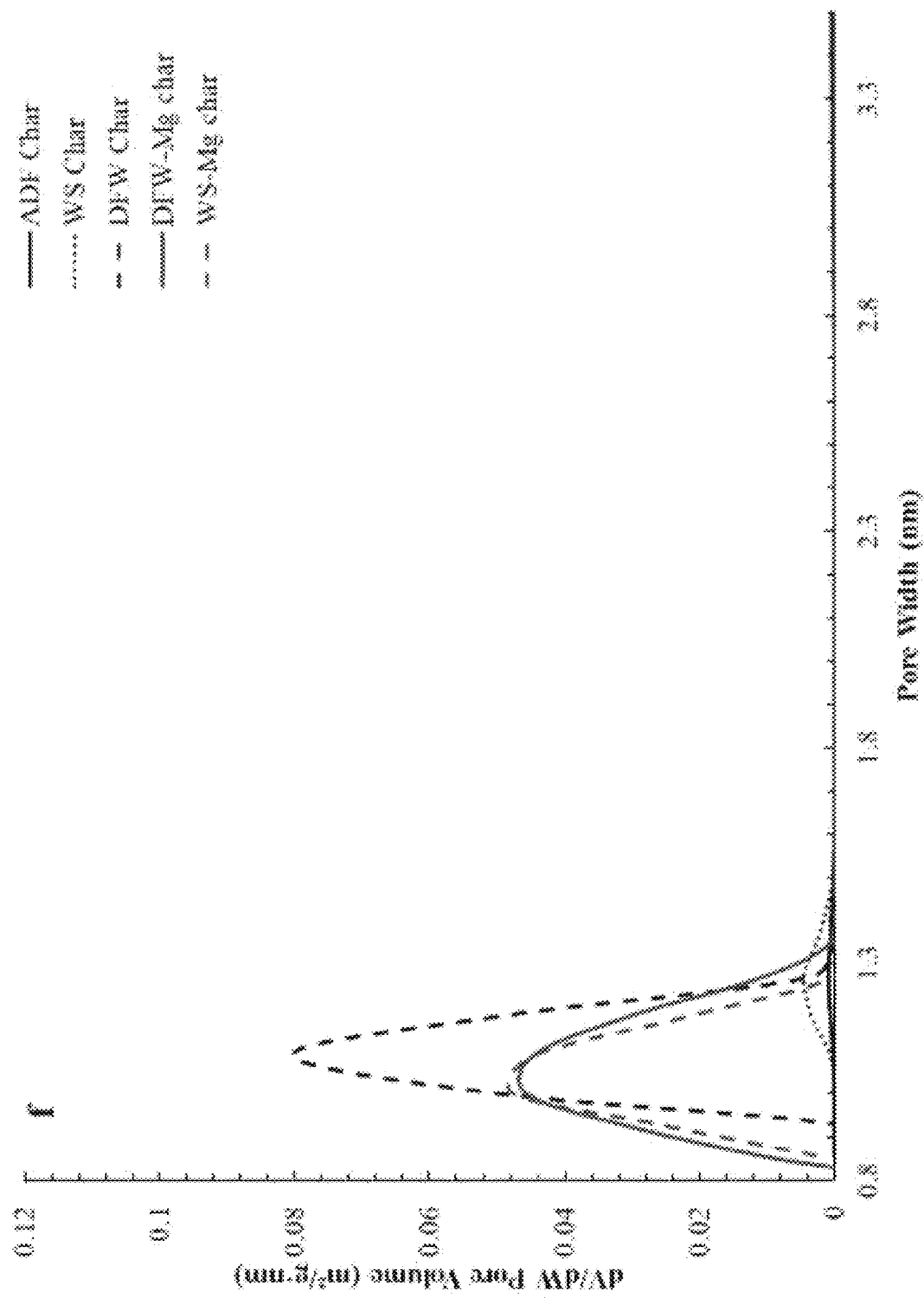

The pH values of chars are shown in FIG. 4. The higher pH value of chars produced from ADF are believed to be due to its higher content of ash and nitrogen. Impregnation of WS and DFW with MgCl$_2$ increased char pH likely due to the formation of magnesium oxides.

The surface areas and pore volumes of chars obtained with CO$_2$ and N$_2$ adsorption are presented in Table 9. Pyrolysis followed by ammonia activation resulted in increasing surface area compared to single step pyrolysis under N$_2$ or NH$_3$. Ammonia activation after pyrolysis under nitrogen increased surface area (obtained from CO$_2$ adsorption) of ADF, WS, and DFW chars by 53%, 51%, and 31%, respectively.

TABLE 9

Surface area and pore size volume determined by CO$_2$ and N$_2$ adsorptions

| Samples | Sa$_{N2}$ (m$^2$/g) | Sa$_{CO2}$ (m$^2$/g) | V$_{micro}$ (cm$^3$/g) |
|---|---|---|---|
| ADF Char | 20 | 299 | 0.12 |
| ND-ADF(Two Step) | 464 | 460 | 0.18 |
| ND-ADF(One Steps) | 254 | 271 | 0.11 |
| WS Char | 29 | 400 | 0.16 |
| ND_WS(Two Step) | 634 | 606 | 0.24 |
| ND-WS(One Step) | 348 | 375 | 0.15 |
| WS-Mg Char | 343 | 398 | 0.16 |
| ND-WS(One Step)-Mg | 167 | 118 | 0.05 |
| DFW Char | 451 | 527 | 0.21 |
| ND-DFW(Two Step) | 649 | 696 | 0.28 |
| ND-DFW(One Step) | 423 | 450 | 0.18 |
| DFW-Mg Char | 421 | 471 | 0.19 |
| ND-DFW(One Step)-Mg | 536 | 480 | 0.19 |

FIGS. 5A-5F shows the pore size distributions of chars obtained from CO$_2$ and N$_2$ adsorption and indicates that ammonia activation after pyrolysis under N$_2$ causes pore volume to grow Example 3

Morphological Structure of N-Metal Doped Biochars

Scanning electron micrographs (SEMs) of all chars were collected using an Apreo VolumeScope™ equipped with a field emission gun electron source. All samples were prepared by coating with 3 nm of gold to enhance resolution using a Cressiongton Hi-Res Sputter Coater. The images were collected under vacuum with a chamber pressure below 10 mPa. The accelerating voltage was set at 30 kV for all samples.

Figure 8:
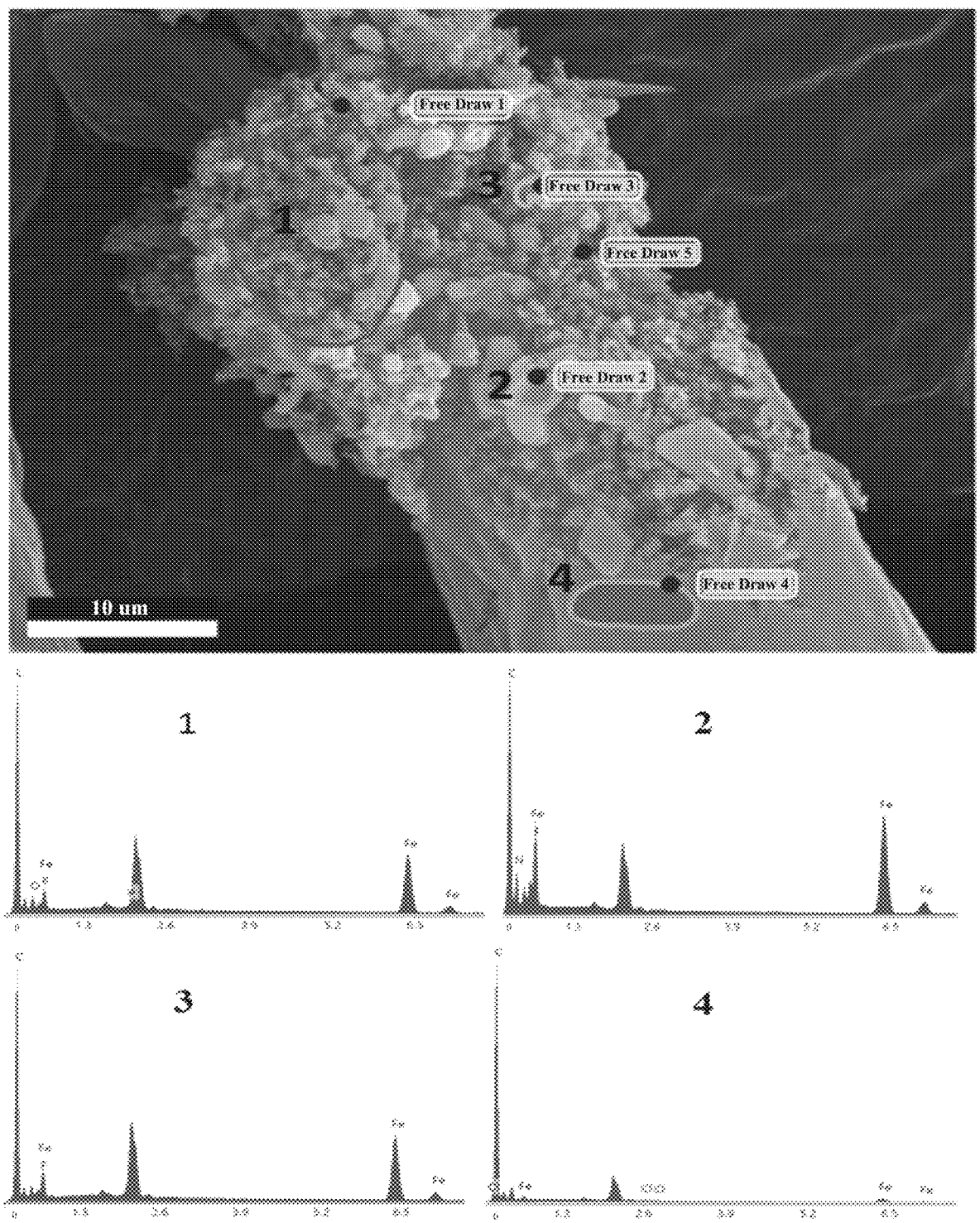
FIG. 8 shows SEM-EDS images of N—Fe-Char. Only region four does not show any presence of crystals. Note, region 5 was not shown in the figure because it has similar spectra to region 1, 2 and 3.

SEM-EDS studies aimed to determine if metals were in the form of crystals on the surface of the chars or embedded within the matrix of the biochar. The results of these studies are shown in FIG. 6, FIG. 7, and FIG. 8 for N-Mg-Char, N—Ca-Char and N—Fe-Char, respectively.

Figure 6:
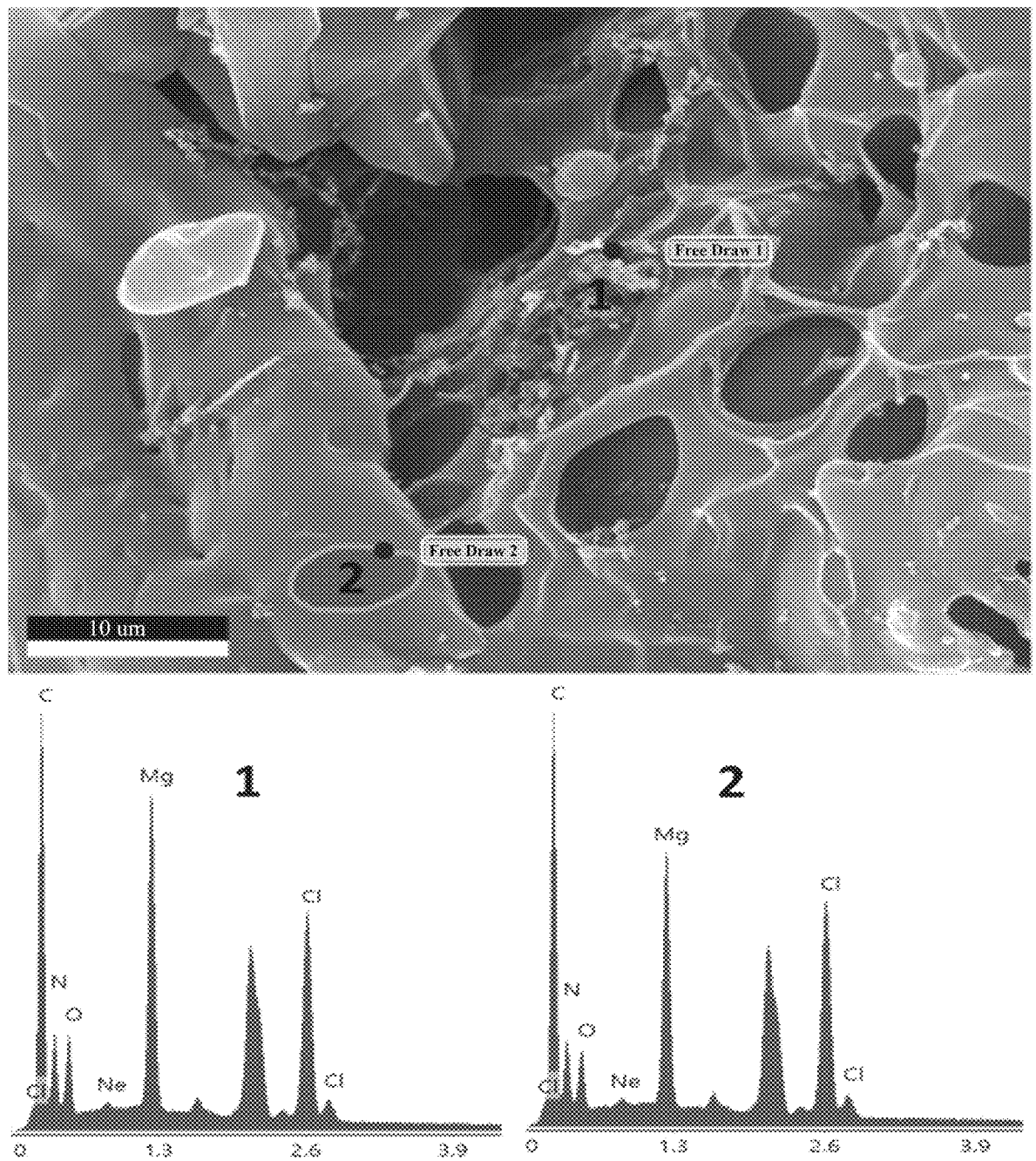
FIG. 6 shows SEM-EDS images of N-Mg-Char in the two different regions. Region 1 shows the presence of crystals while Region 2 is smooth. The X and Y axis represents the energy of the x rays emitted measured in KeV and intensity measured in counts, respectively.

FIG. 6 shows two regions indicating the presence of both a smooth and a rough surface with some micro cracks and shallow pores as a result of ammonia etching in the N-Mg-Char. Interestingly, metals were observed both in the form of crystals and embedded in the carbonaceous surface of the biochar. The EDS test results show Mg is present in both in the crystals and the carbonaceous structure. Because only a small fraction of the surface is covered by crystals, we can hypothesize that most of the Mg is embedded within the carbon matrix.

FIG. 7 shows three regions indicating the presence of a smooth surface rich in Ca without pores. FIG. 8 shows four regions indicating the SEM-EDS of the N—Fe-doped biochar. It was observed that most of the Fe is in the form of crystals deposited on the surface. The content of Fe in the carbonaceous matrix is very low, with crystals making up the majority of iron in the char.

Example 4

TEM Analysis

Specimens for the transmission electron microscope (TEM) study were prepared by grinding the biochar into a fine powder. A suspensions of DI water and the powdered biochar were prepared and deposited onto copper grids. Imaging was carried out at 200 kV and under vacuum conditions with a FEI Technai G2 20 Twin. Care was taken to minimize exposure to a focused electron beam in order to avoid specimen damage.

Figure 9:
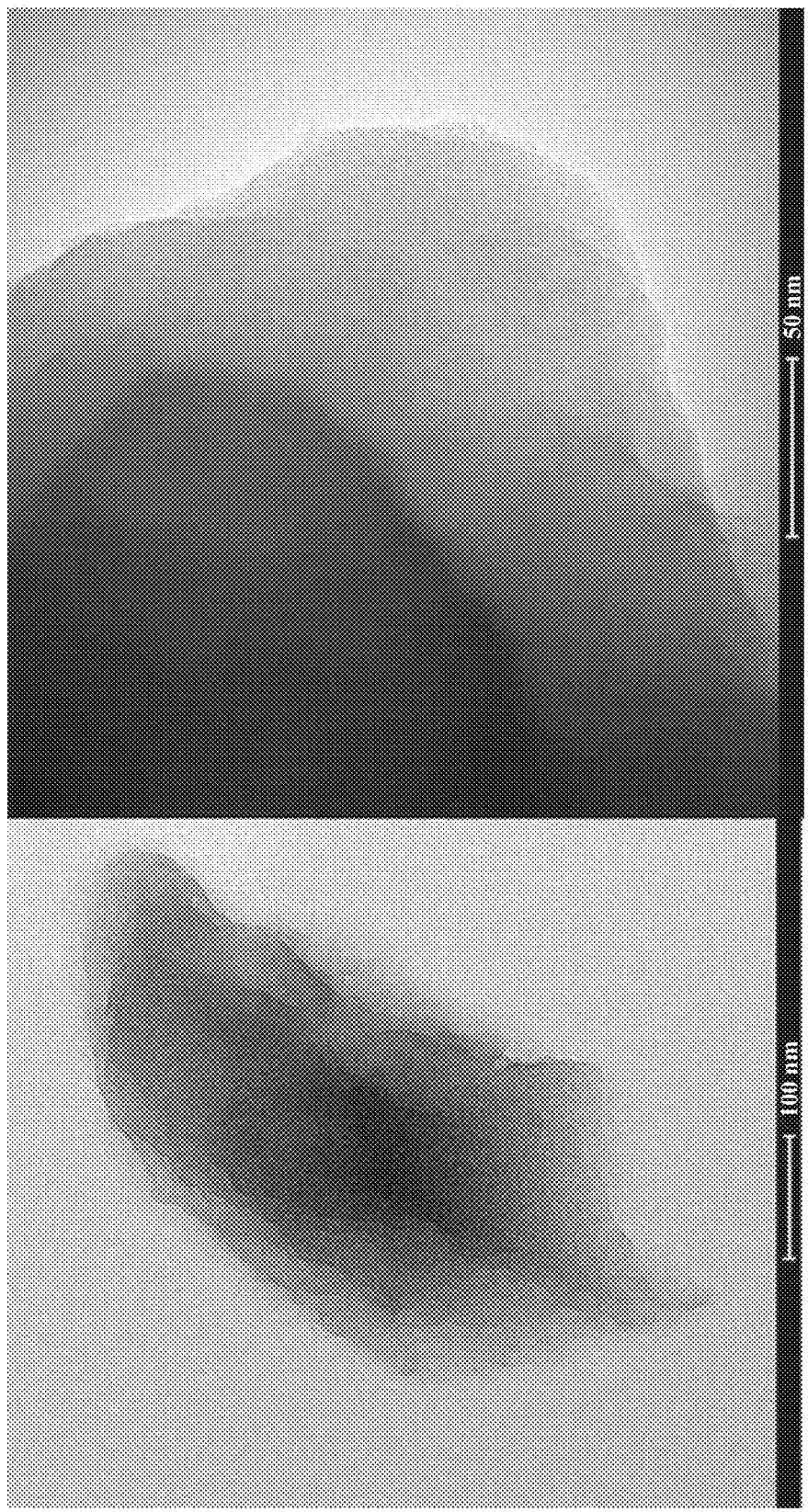
FIG. 9 shows a TEM picture of N-Mg-doped char.

FIG. 9 shows the TEM picture of the N-Mg-doped biochar. Evidence of the Mg forming nanocrystals was not observed. Although there are some crystals as indicated by the XRD peaks, EDS indicates most Mg is part of the polyaromatic carbon structure.

Figure 10:
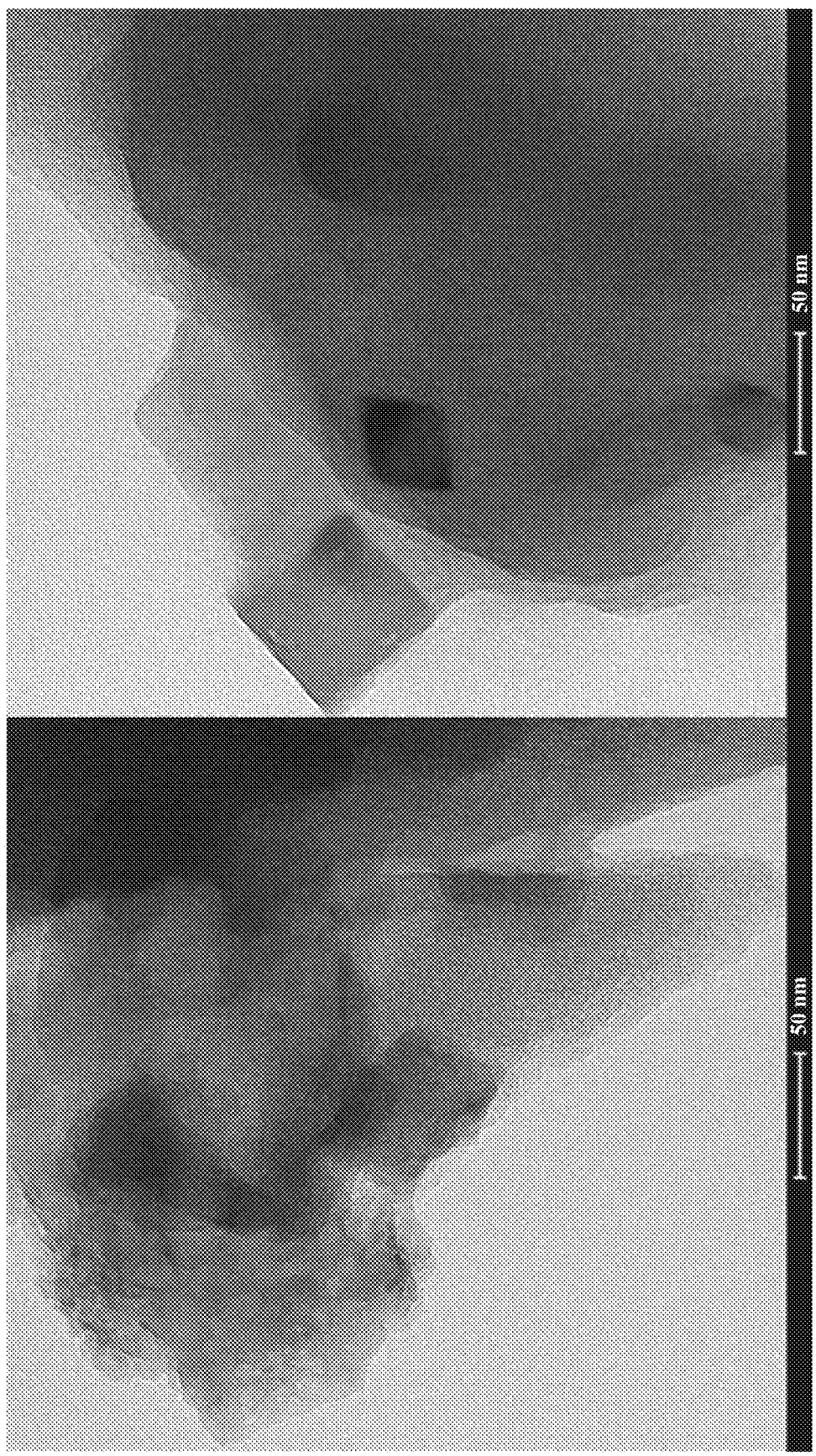
FIG. 10 shows a TEM picture of N—Ca-doped biochar.

FIG. 10 shows the TEM picture of the N—Ca-doped biochar. The presence of clusters or regions (likely nanocrystals in the range of 20-30 nm) was observed, indicating that although the Ca can be found as part of the carbonaceous structure, it may also form nanoparticles.

Figure 11:
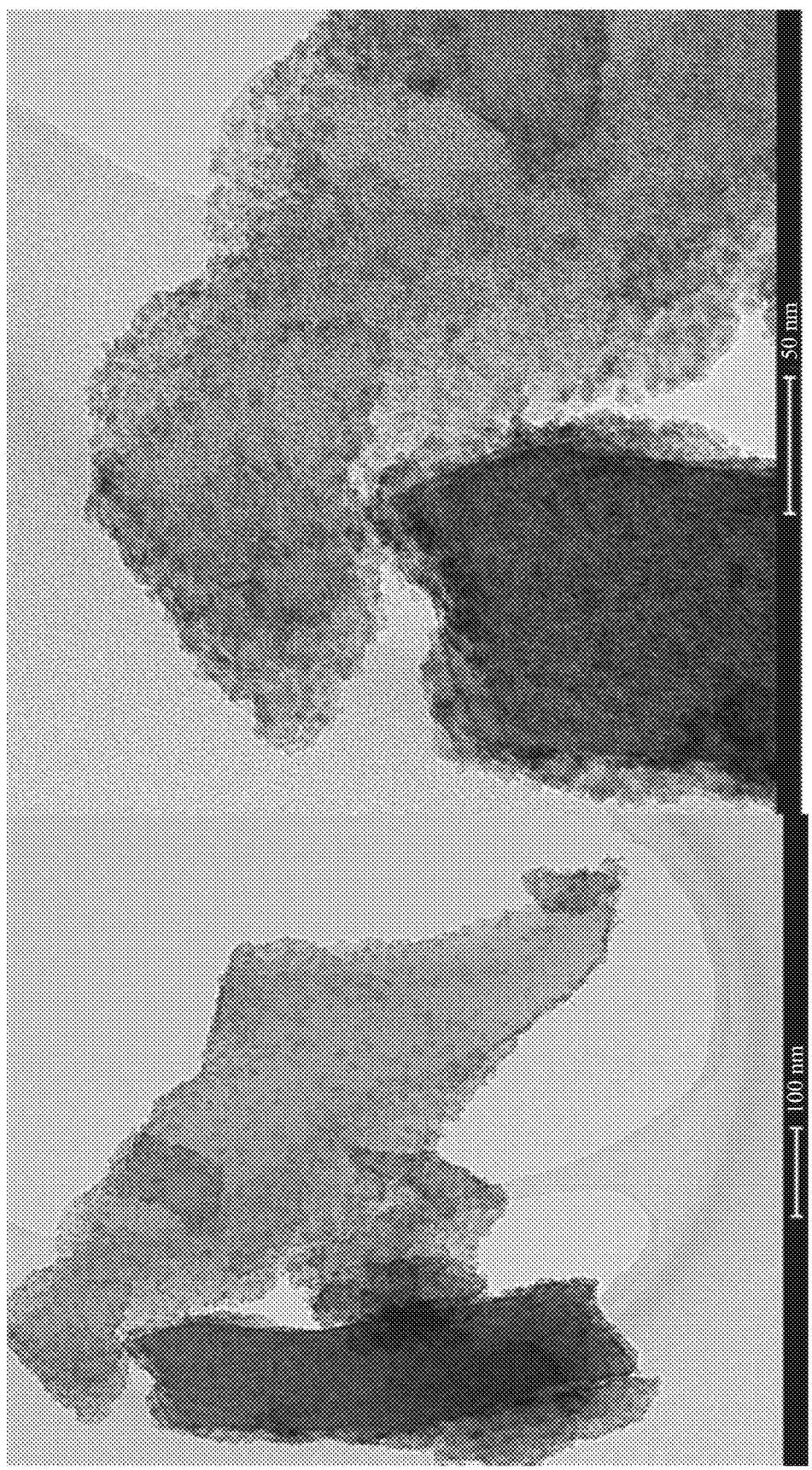
FIG. 11 shows a TEM picture of N—Fe doped biochars.

FIG. 11 shows the TEM of the N—Fe-doped biochars, where the formation of very small nanoparticles of less than 5 nm in the carbon matrix was observed.

Figure 12A:
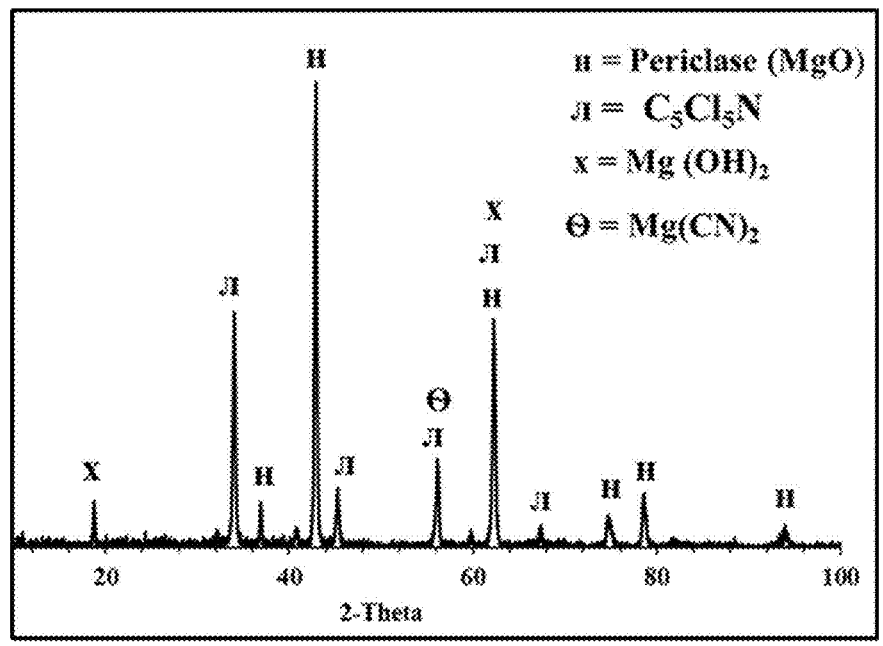
FIGS. 12A-12B show XRD of N-Mg-Char (FIG. 12A) and N—Fe-Char (FIG. 12B).
Figure 12B:
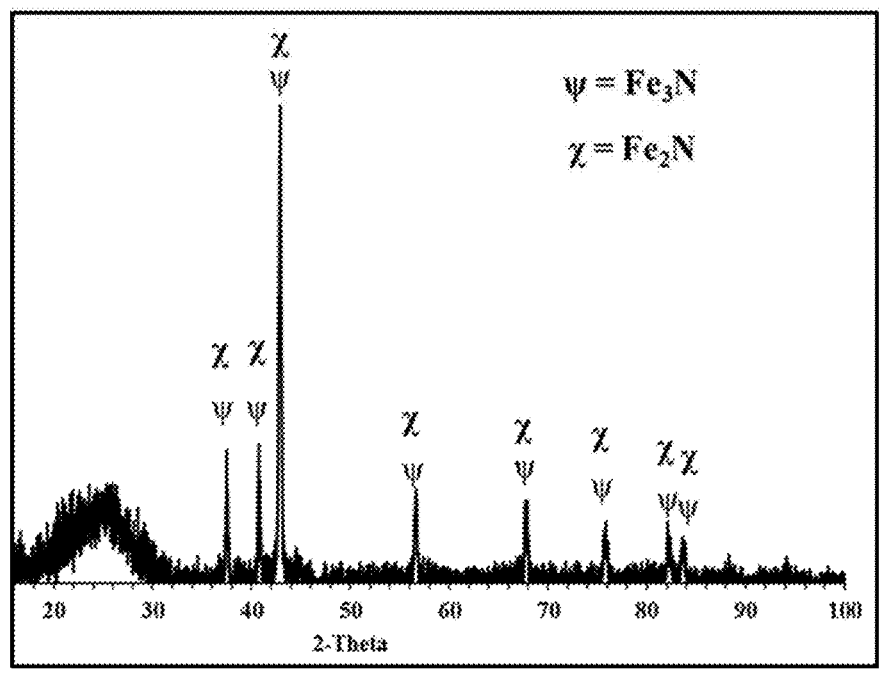

FIGS. 12A-12B show the wide angle XRD patterns of N-Mg, and N—Fe-biochar samples, respectively. The XRD data from N-Mg-Char confirmed the presence of highly crystalline MgO particles. The presence of $MgC_2N_2$ was observed with a crystallite size of about 9.5 nm. The broadness of the XRD peaks was used to calculate the crystalline size of MgO particles using the Scherrer equation. The results showed the presence of particles with size between 9.5 nm and 50 nm (Table 10).

TABLE 10

Crystallite size of the correlated phases in the N-Mg-Char.

| 2theta [deg] | Correlated phase(s) | Crystallite size [nm] |
| --- | --- | --- |
| 18.68 | $C_5Cl_5N$, $Mg(OH)_2$ | 9.45 |
| 33.93 | $C_5Cl_5N$ | 28.04 |
| 36.79 | MgO | 20.12 |
| 45.24 | $C_5Cl_5N$ | 31.3 |
| 55.99 | $C_5Cl_5N$, $Mg(CN)_2$ | 9.56 |
| 62.14 | MgO, $C_5Cl_5N$, $Mg(OH)_2$ | 21.37 |
| 67.19 | C5CL5N_300K | 18.68 |
| 74.65 | MgO, $C_5Cl_5N$ | 21.59 |
| 78.6 | MgO, $C_5Cl_5N$ | 50.19 |
| 93.85 | MgO, $C_5Cl_5N$ | 17.63 |

The XRD of N—Fe-char only presents crystals of iron oxides with a crystallite size between 14.9 and 164.5 nm (Table 11).

TABLE 11

Crystallite size of the correlated phases in the N-Mg-Char.

| 2theta [deg] | Correlated phase(s) | Crystallite size [nm] |
| --- | --- | --- |
| 37.45 | Fe3 N, Fe2 N | 14.91 |
| 40.74 | Fe3 N, Fe2 N | 44.24 |
| 42.82 | Fe3 N, Fe2 N | 164.5 |
| 56.54 | Fe3 N, Fe2 N | 24.78 |
| 67.85 | Fe3 N, Fe2 N | 22.63 |
| 75.75 | Fe3 N, Fe2 N | 24.59 |
| 82.22 | Fe3 N, Fe2 N | 24.45 |
| 83.43 | Fe3 N, Fe2 N | 24.68 |

Example 5

X-Ray Photoelectron Spectroscopy (XPS) and X-Ray Diffraction (XRD) Analysis

Analysis using XPS was performed using an AXIS-165 upgraded to an Ultra manufactured by Kratos Analytical Inc. Achromatic X-ray radiation of 1253.6 eV (MgKα) was used to analyze each material. All high-resolution spectra were recorded using a pass energy of 40 eV and spot size of approximately 120 μm. The spectrometer was calibrated against both the Au $4f_{7/2}$ peak at 84.0 eV and the Ag $3d_{5/2}$ peak at 368.3 eV. The minimum full width at half maximum (FWHM) for the Au $4f_{7/2}$ peak is approximately 0.85 eV, representing the absolute minimum possible broadness achievable for this configuration. Survey scans have been obtained using a pass energy of 80 eV and step sizes of 1 eV to determine the overall chemical composition of each sample. To determine the speciation of carbon, nitrogen and oxygen groups, high resolution scans of the C 1s, N 1s, O 1s and Mg 2p regions (280-295, 394-404, 527-538 eV, 45-60 eV respectively) were collected for each material using 0.1 eV step sizes.

X-ray diffraction (XRD) analysis was conducted to identify crystallographic structures in the biochar samples using a Rigaku (Miniflex 600) with Cu K α radiation operated at 40 kV, 15 mA in steps of 0.01° with a scanning rate at 0.5° $min^{-1}$ from 10° to 100°.

Figure 13A:
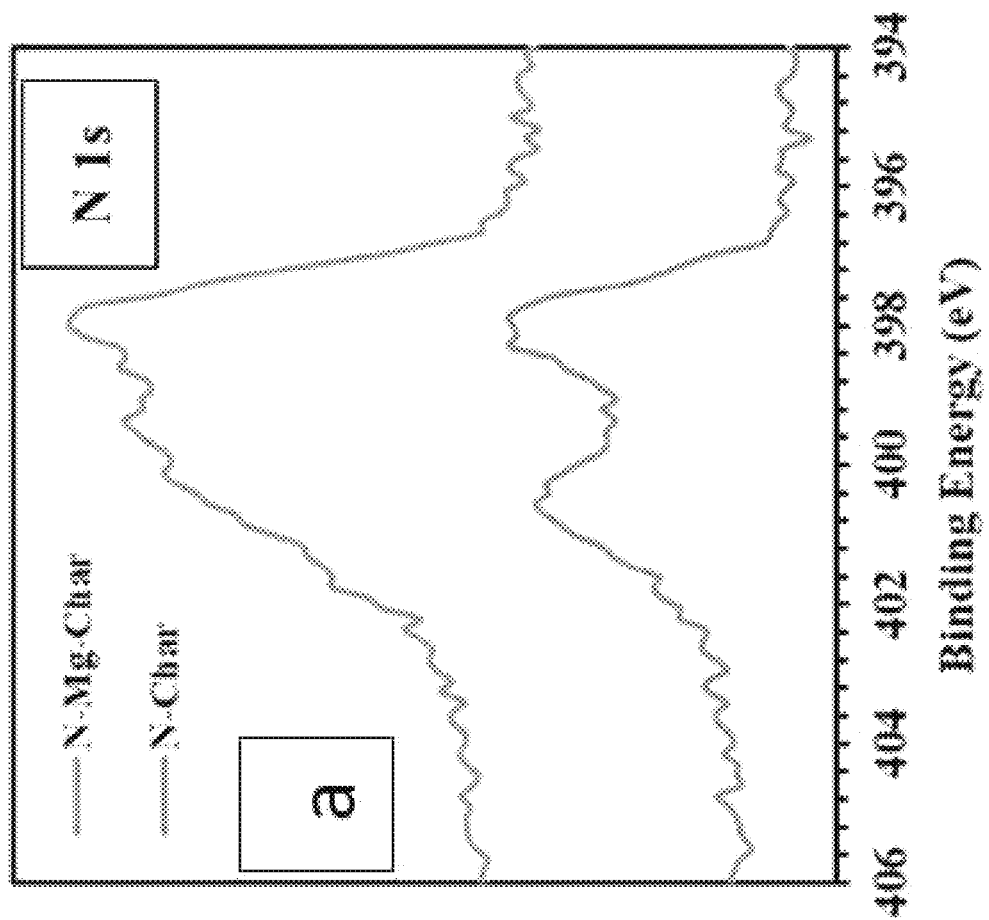
FIGS. 13A-13F show XPS spectra.
Figure 13B:
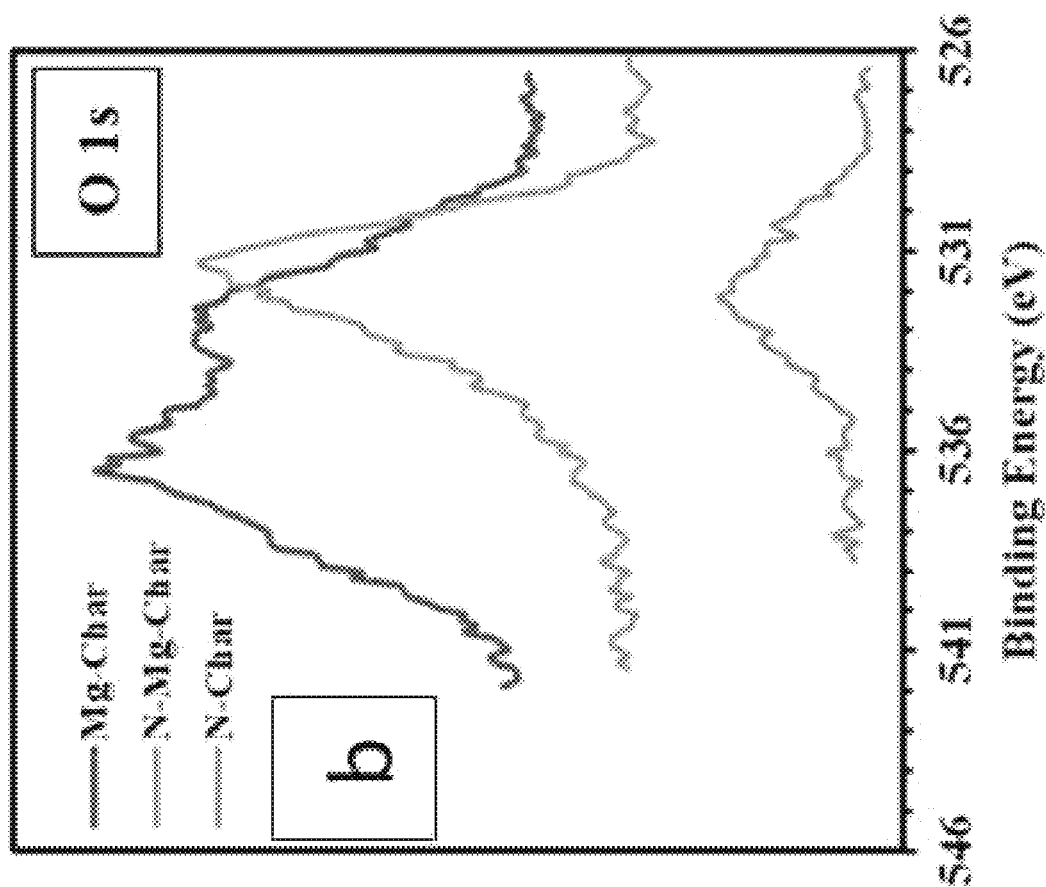
Figure 13C:
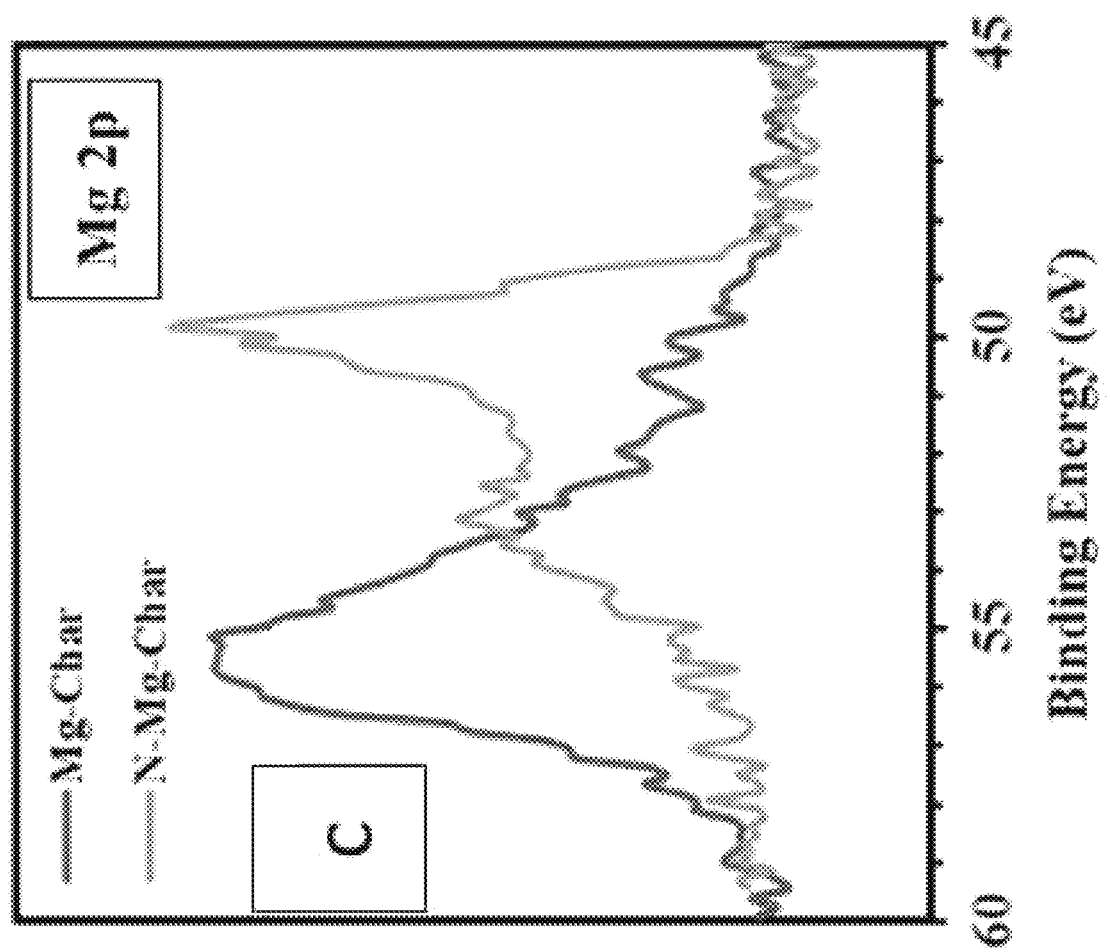
Figure 13D:
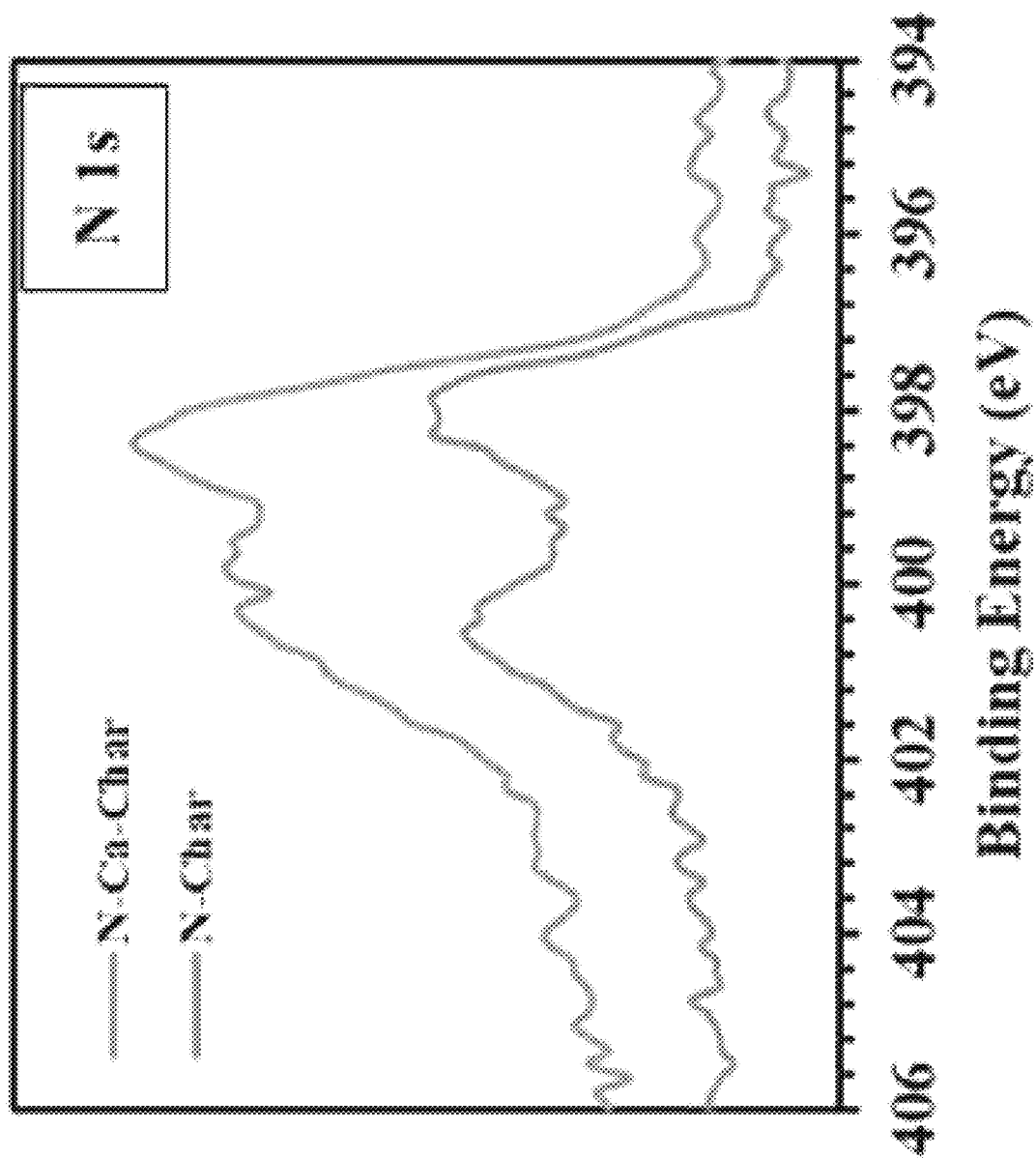
Figure 13E:
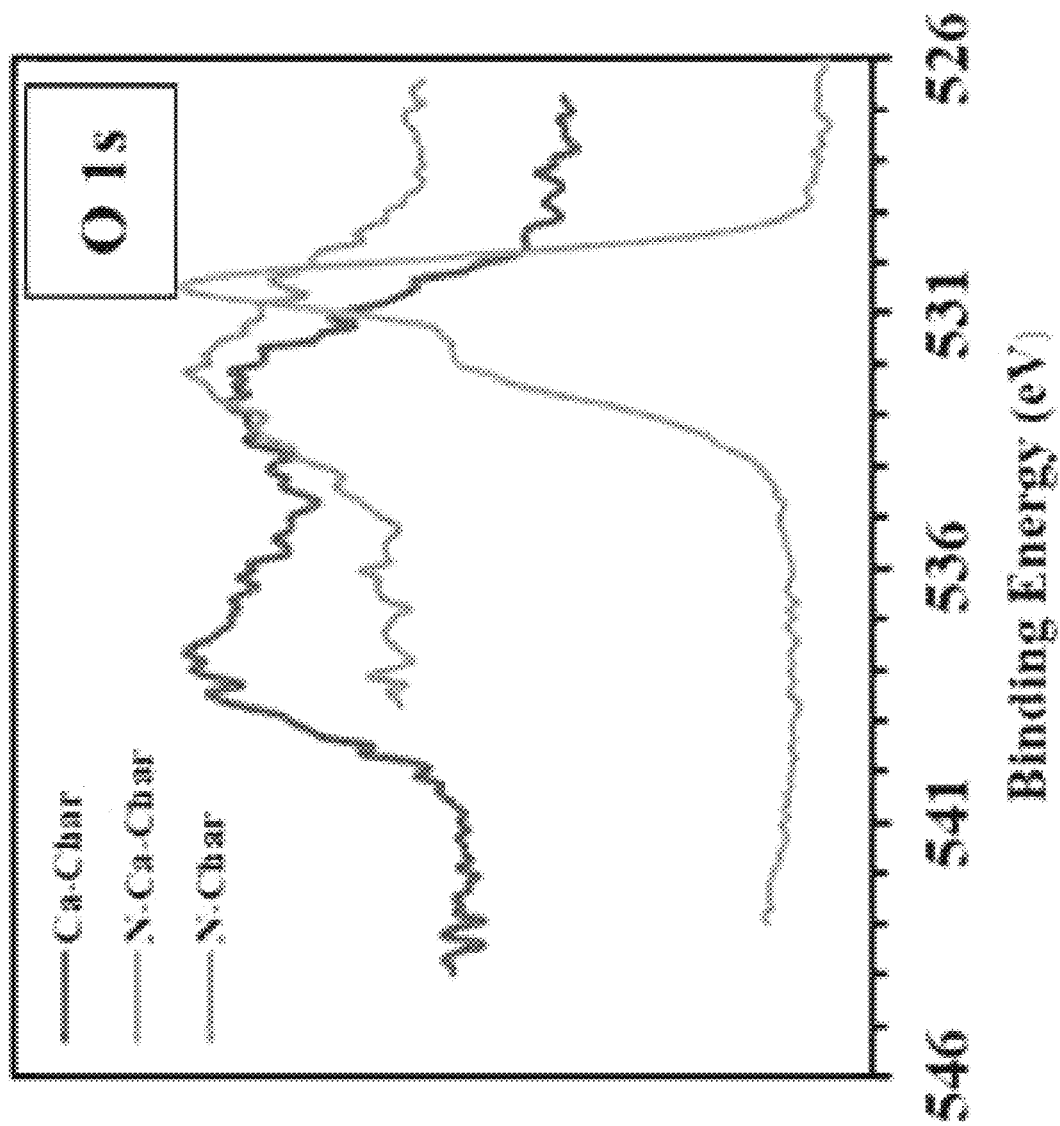
Figure 13F:
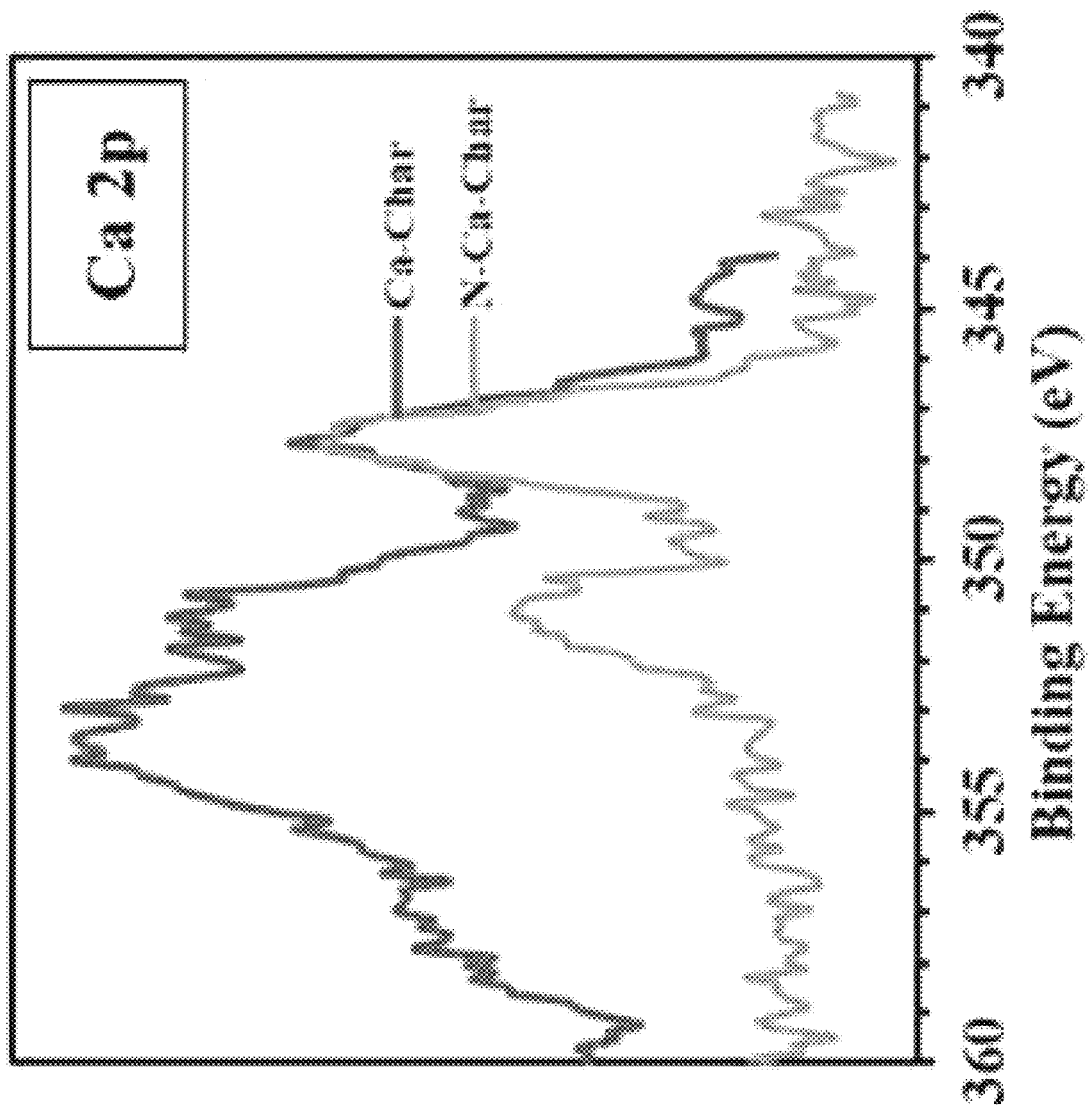

The high-resolution spectra taken for each of N-Mg and N—Ca biochars are shown in FIGS. 13A-13F. FIG. 13A shows N-doped char, FIG. 13B shows Mg-Char, FIG. 13C shows N-Mg-doped char, FIG. 13D shows N-doped char, FIG. 13E shows Ca-char, and FIG. 13F shows N—Ca-oped char. The Mg-Char presents a peak at 56 eV in the absence of nitrogen but in the presence of nitrogen in the structure (N-Mg-Char) this peak is replaced by one at to 53.15 eV, in addition to an entirely new peak at about 49.85 eV likely related to bonding between N-Mg. The nitrogen dramatically affects the O 1s spectra as well, completely eliminating a peak present at 538 eV for char without N. These findings demonstrate that the nitrogen might have stronger affinity towards the metal than the oxygen.

According to the adsorption energies computed, the edge active sites bind metals less favorably and might have the highest potential of binding to phosphate ions than the centered active sites. The XPS results clearly show an interaction between Mg and N in the polyaromatic ring system, resulting in pronounced Mg 2p core level binding energy shifts.

Example 6

XPS and Binding Energy Analysis

To better understand the effect of nitrogen functionality and metals (Mg/Ca), the stability of Mg/Ca centers supported by various types of nitrogen functional groups were computationally quantified. Using the energies generated computationally, adsorption energies for magnesium and calcium were calculated using the following equations:

$$E_{ads} = E_{Mg/Ca_{ads}} - (E_{surf} + E_{Mg/Ca_{bulk}})$$ Equation 1 where $E_{ads}$ denotes the calculated adsorption energy, $E_{Mg/Ca_{ads}}$ the energy of the entire surface-Mg/Ca structure, $E_{surf}$ the energy of the functionalized carbon surface, and $E_{Mg/Ca}$ the calculated energy of the bulk material. DFT calculations were carried out using the Vienna Ab Initio Simulation Package (VASP). The projector-augmented wave (PAW) method was used to model the core electrons (POTCARs released in 2002 for C, and N and 2001 for H, Mg, and 2000 for Ca) and a plane-wave basis set with an energy cutoff of 450 eV was used to model the valence electrons. To model the electron exchange and correlation, the Perdew-Burke-Ernzerhof (PBE) functional was applied.

The Gaussian smearing method was used to set partial occupancies of bands with a smearing width of 0.2 eV to facilitate Brillouin zone integration convergence, followed by extrapolation to zero Kelvin for total energy calculation. All ground state optimizations used the conjugate gradient method and were considered converged when the relaxed interatomic cartesian forces were smaller than 0.025 eV/Å. The SCF energy tolerance was set to $10^{-5}$ eV. Spin polarization was also used for all calculations to account for any magnetization. Calculations for bulk Mg were optimized to confirm a simple hexagonal cell with a lattice constant 3.19 Å and an a/c ratio of 1.624 using a (10×10×10) Monkhorst-Pack grid. Bulk Ca was optimized in the same fashion to obtain a face centered cubic cell with a lattice constant of 5.68 Å. Nitrogen and Metal functionalization was studied in a graphene nanoribbon with hydrogen terminated edges (29×17×21 Å). The graphene lattice constant was 2.467 Å. The integration of the Brillouin zone was conducted using a (1×2×3) Monkhorst-Pack grid. All structures were visualized using VESTA.

FIGS. 14A-14C show the strategy used to generate model of N-metal doped biochar structures for DFT calculations. Various structural configuration of nitrogen and metal (Mg/Ca) were proposed based on experimental and the stability and the core level binding energy shifts (CLBES) of these structures were calculated.

The structure with metal atoms at the center of pyridine-nitrogen or pyrrolic-nitrogen in graphene were created through two steps: (i) the creation of pyridine-nitrogen/pyrrolic-nitrogen, the substitution of under-coordinated carbons by N atoms forms a single vacancy or di-vacancy, as shown in FIG. 14A and FIG. 14B; (ii) metal atom incorporation in the center of single- or double-point defect, as shown in FIG. 14C.

To compare the DFT model systems of N-metal-doped carbon to the experimentally measured XPS spectra, the core level energy shifts ($E_{CLS}$) of the metal 2p states were calculated according to:

$$E_{CLS} = [E_{N\text{-}Me\text{-}Doped}(n_c-1) - E_{N\text{-}Me\text{-}Doped}(n_c)] \cdot [E_{bulk\text{-}Me}(n_c-1) - E_{bulk\text{-}Me}(n_c)]$$

Equation 2 where $n_c$ is the total number of core electrons in the system, $E_{N\text{-}Doped\ Metal}(n_c-1)$ is the total energy of the N-Metal-doped H-edge graphene model with a single core electron removed from the metal 2p state, $E_{N\text{-}Doped\ Metal}(n_c)$ is the total energy of the N-Metal doped H-edge model with all core electrons present in the system. $E_{bulk\text{-}Me}(n_c-1)$ is the total energy of a bulk-metal with a single core electron removed from a 2p state, and $E_{bulk\text{-}Me}(n_c)$ is the total energy of a bulk metal with all core electrons present in the system. The core level binding energy shift was calculated using the final state approximation. To obtain the core level binding energies from the core level binding energy shift values, we used the experimental binding of bulk metal (Magnesium) as the reference with a binding energy of 49.80 eV.

In order to better understand the specific functionalities formed, the stability of magnesium and calcium on internal and edge actives sites, supported by various types of nitrogen functional groups, were computationally quantified.

Figure 15A:
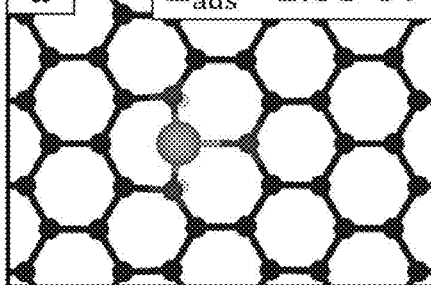
FIGS. 15A-15E show the molecular scheme of Mg-N-doped biochars within a graphene model structure-$3P_6N$-$MgH_2$ (FIG. 15A), $3P_5N$-Mg (FIG. 15B), $3P_6N$-Mg (FIG. 15C), $4P_5N$-Mg (FIG. 15D), and $4P_6N$-Mg (FIG. 15E).
Figure 15B:
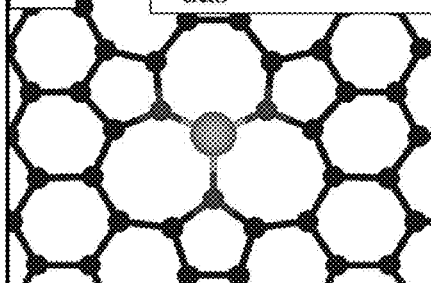
Figure 15C:
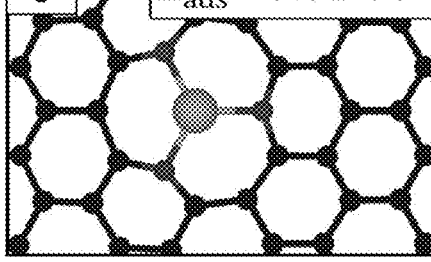
Figure 15D:
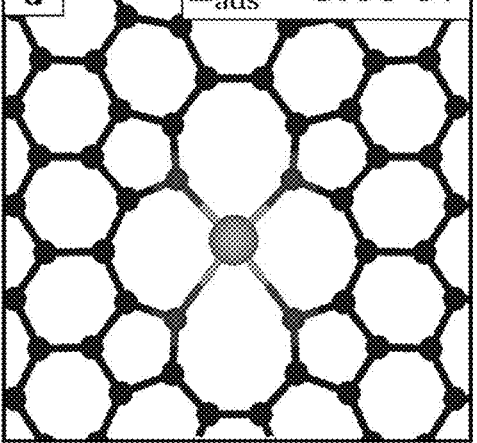
Figure 15E:
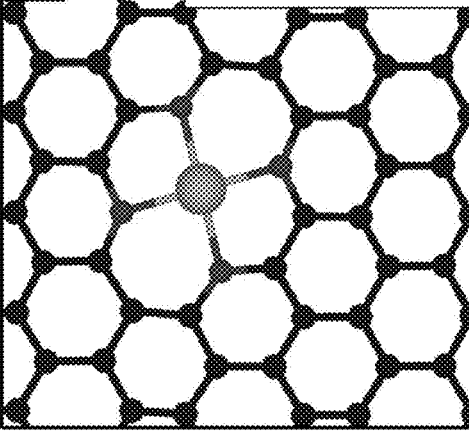
Figure 16A:
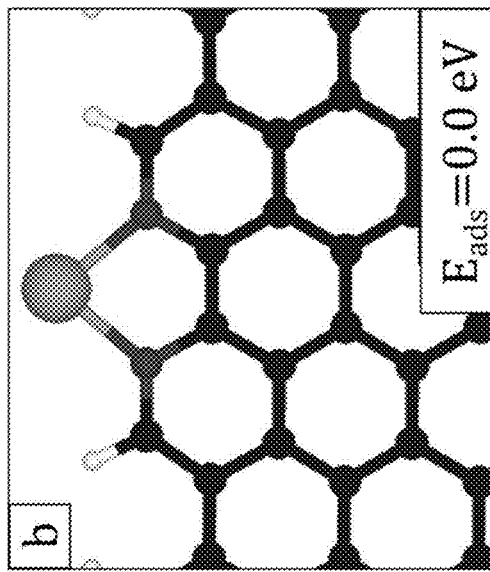
FIGS. 16A-16D show magnesium adsorption energies at edge of graphene with pyrrolic and pyridinic $P_6N$-Mg (FIG. 16A), $2P_6N$-Mg (FIG. 16B), $P_5N$-Mg (FIG. 16C), and $2P_5N$-Mg (FIG. 16D) functionality.
Figure 16B:
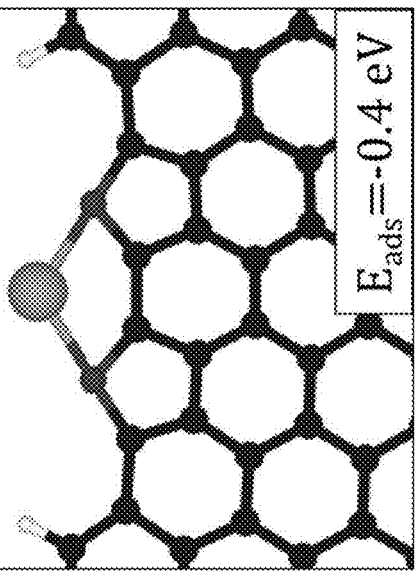
Figure 16C:
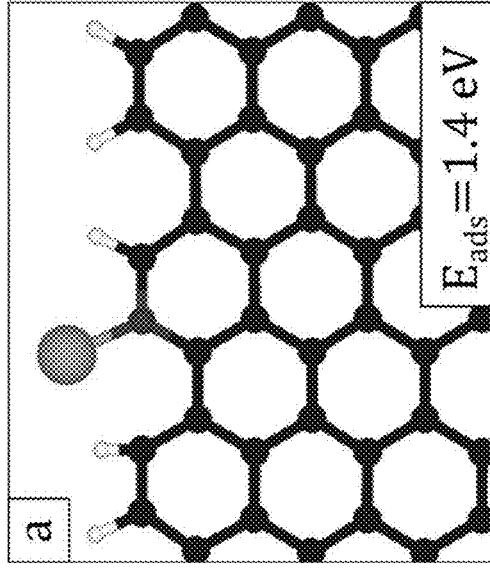
Figure 16D:
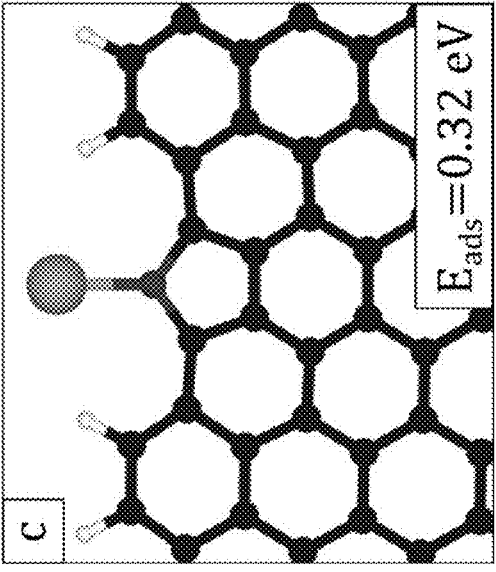
Figure 17A:
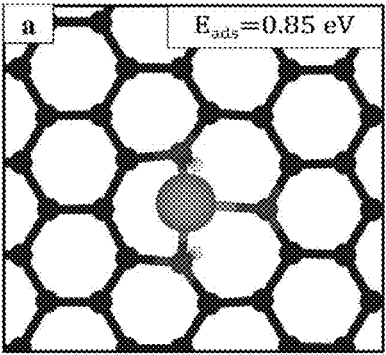
FIGS. 17A-17E show calcium adsorption energies at the center of graphene with pyrrolic and pyridine groups $3P_6N$-$MgH_2$ (FIG. 17A), $3P_5N$-Mg, (FIG. 17B) $3P_6N$-Mg, (FIG. 17C) $4P_5N$-Mg (FIG. 17D), and $4P_6N$-Mg (FIG. 17E) functionality.
Figure 17B:
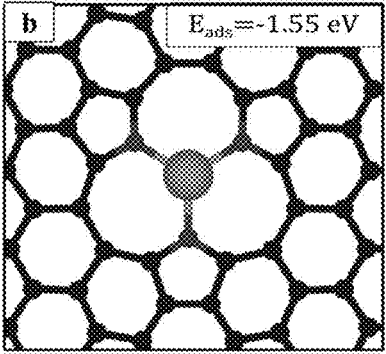
Figure 17C:
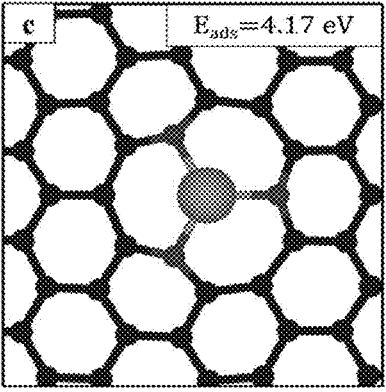
Figure 17D:
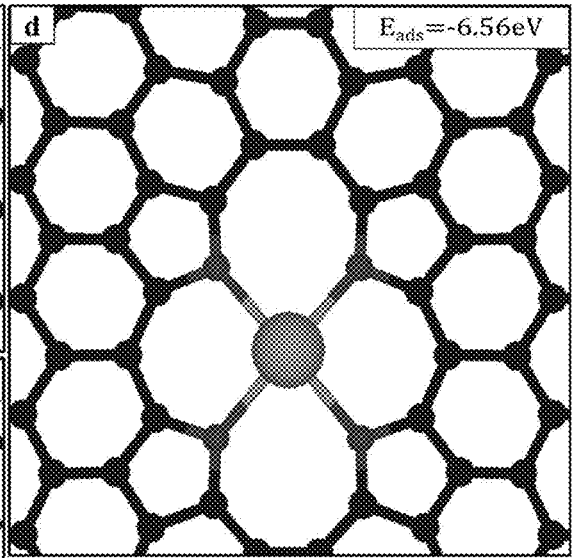
Figure 17E:
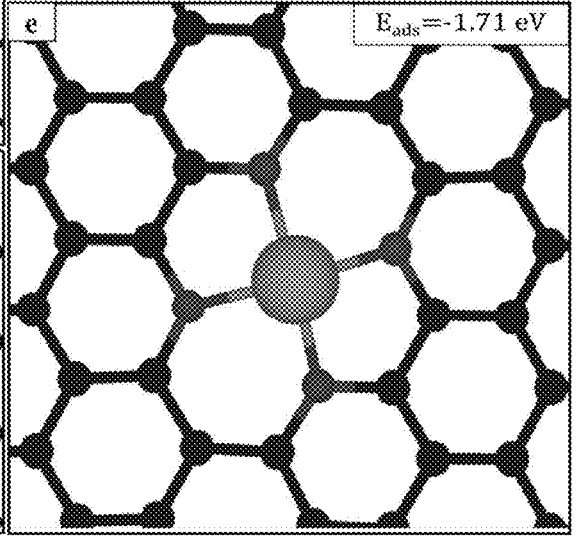
Figures 18A, 18B, 18C, 18D:
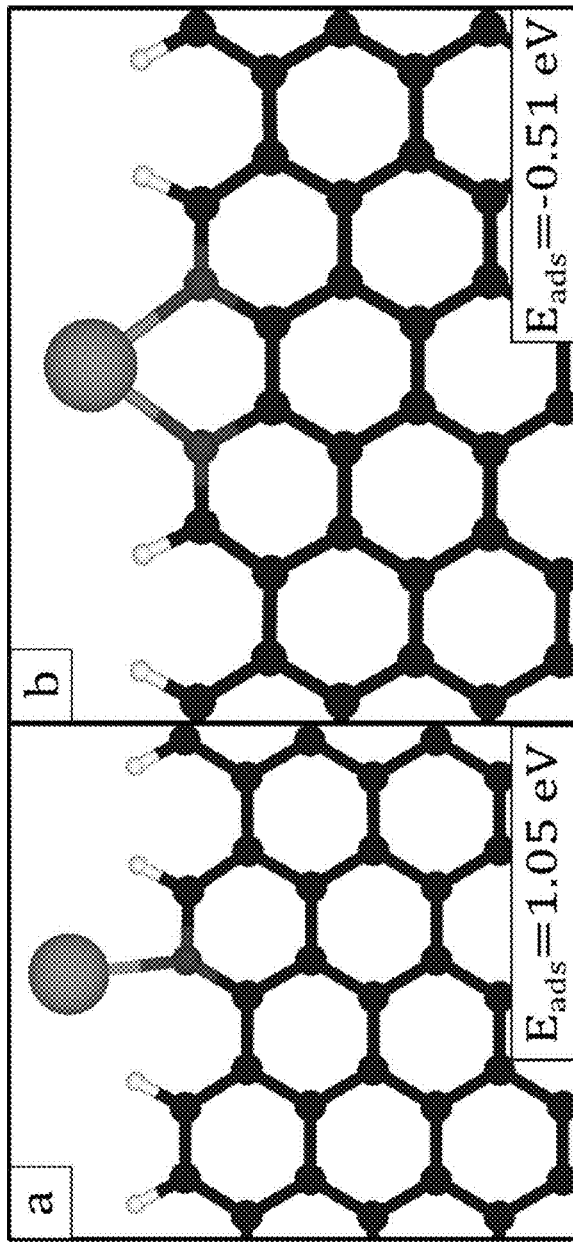
FIGS. 18A-18D shows calcium adsorption energies at edge of graphene with pyrrolic and pyridinic $P_6N$-Mg (FIG. 18A), $2P_6N$-Mg (FIG. 18B), P5N-Mg (FIG. 18C), and 2P5N-Mg (FIG. 18D) functionality.
Figure 20A:
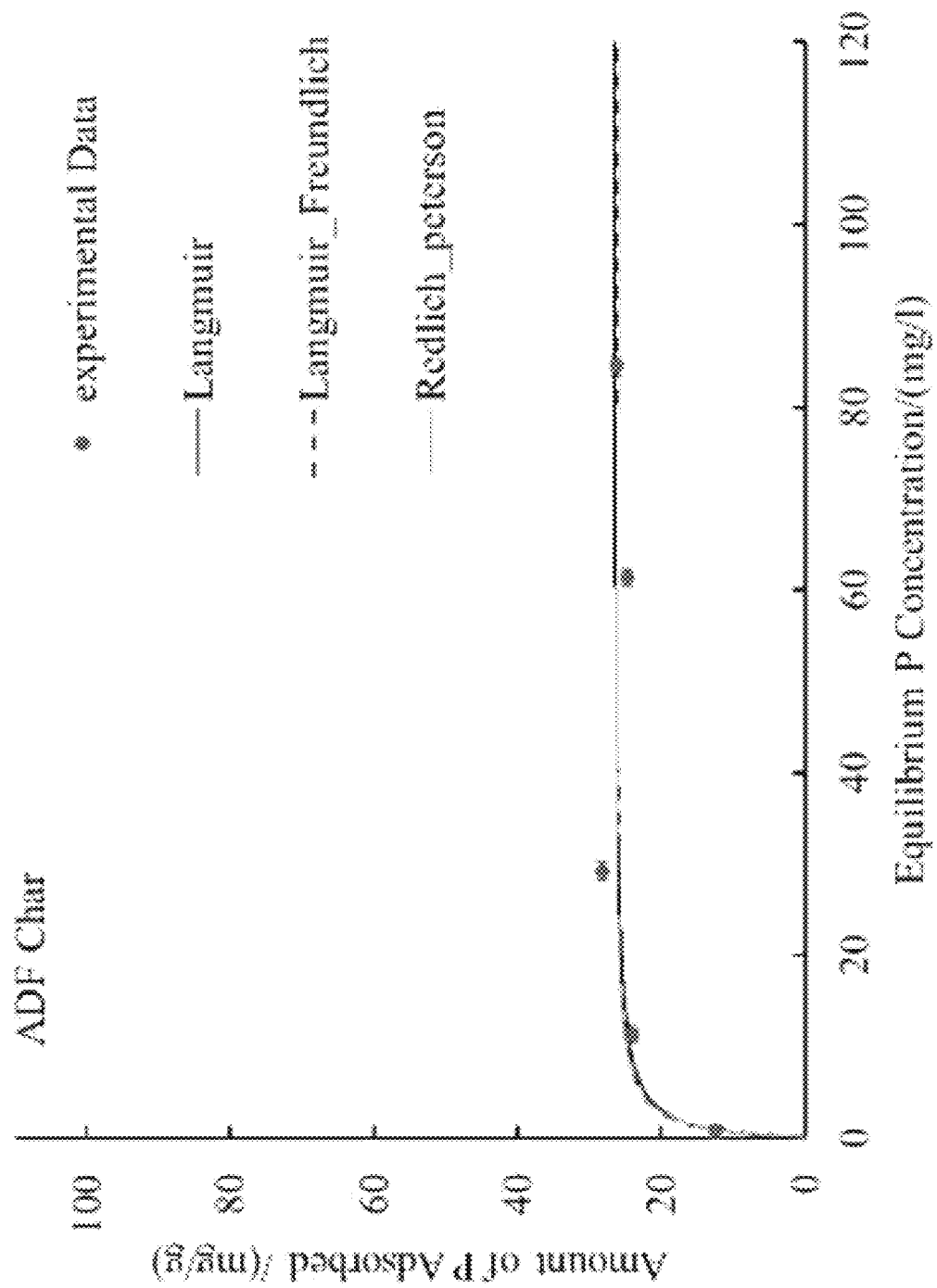
FIGS. 20A-20I show adsorption isotherm data and modeling for phosphate on chars.
Figure 20B:
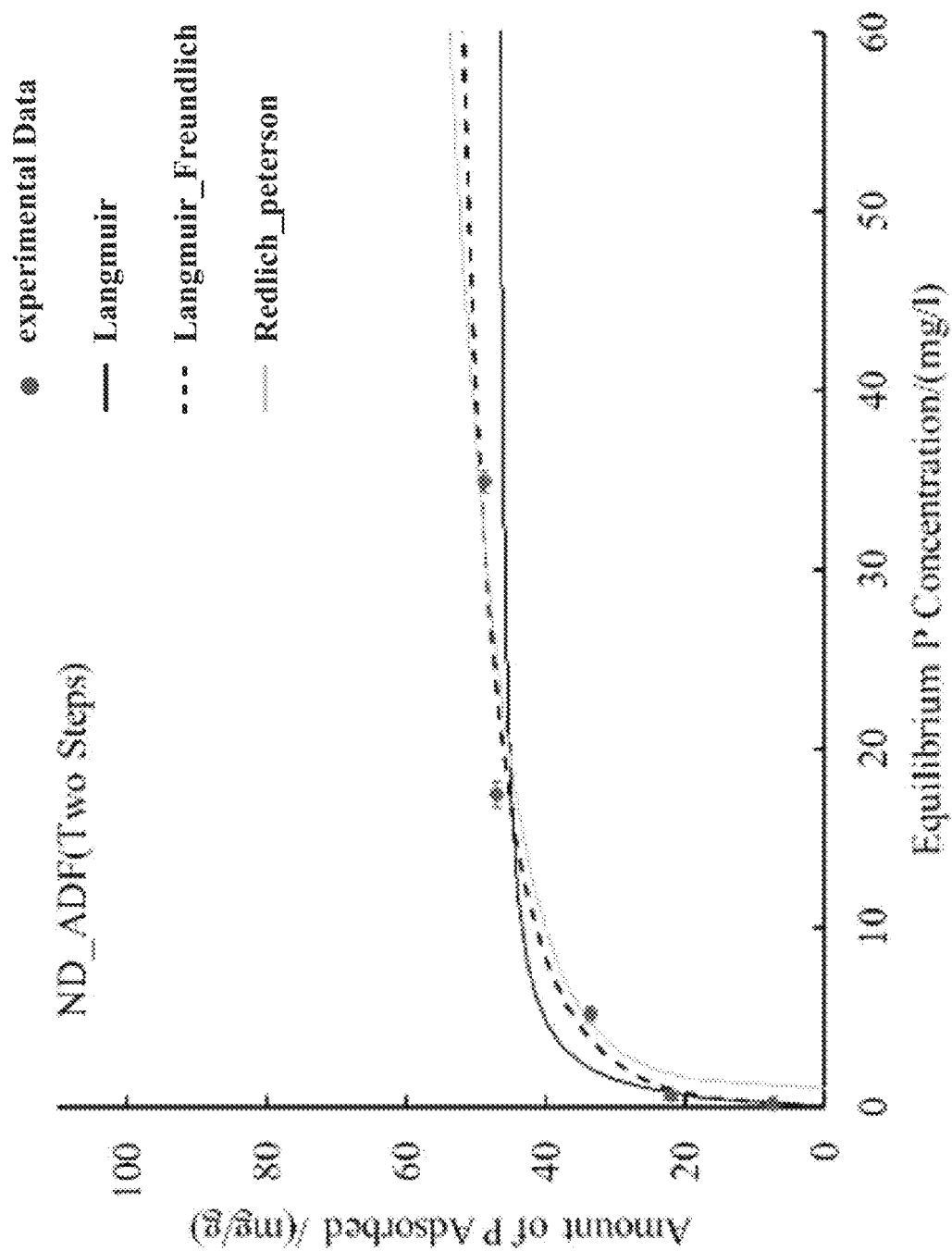
Figure 20C:
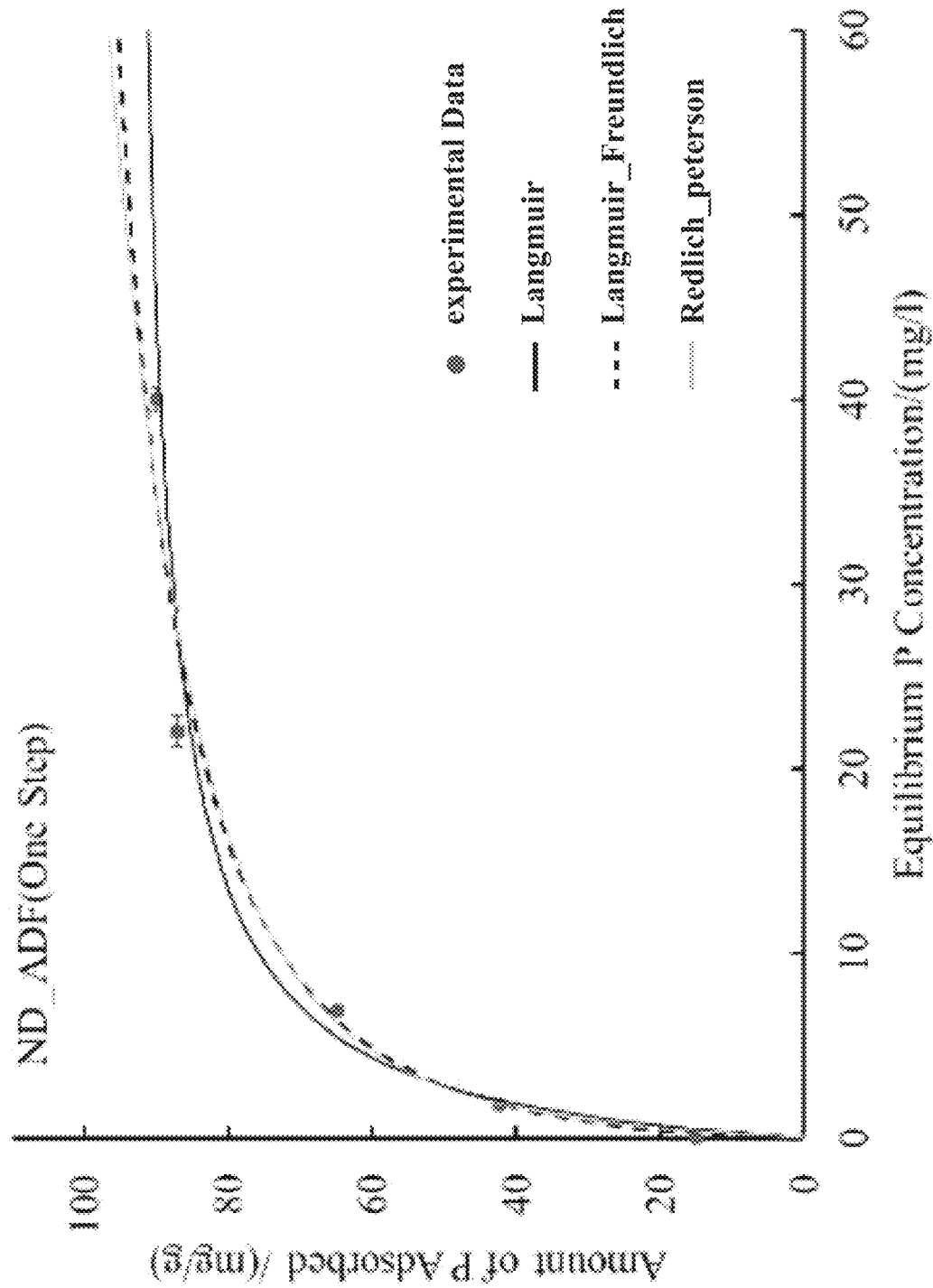
Figure 20D:
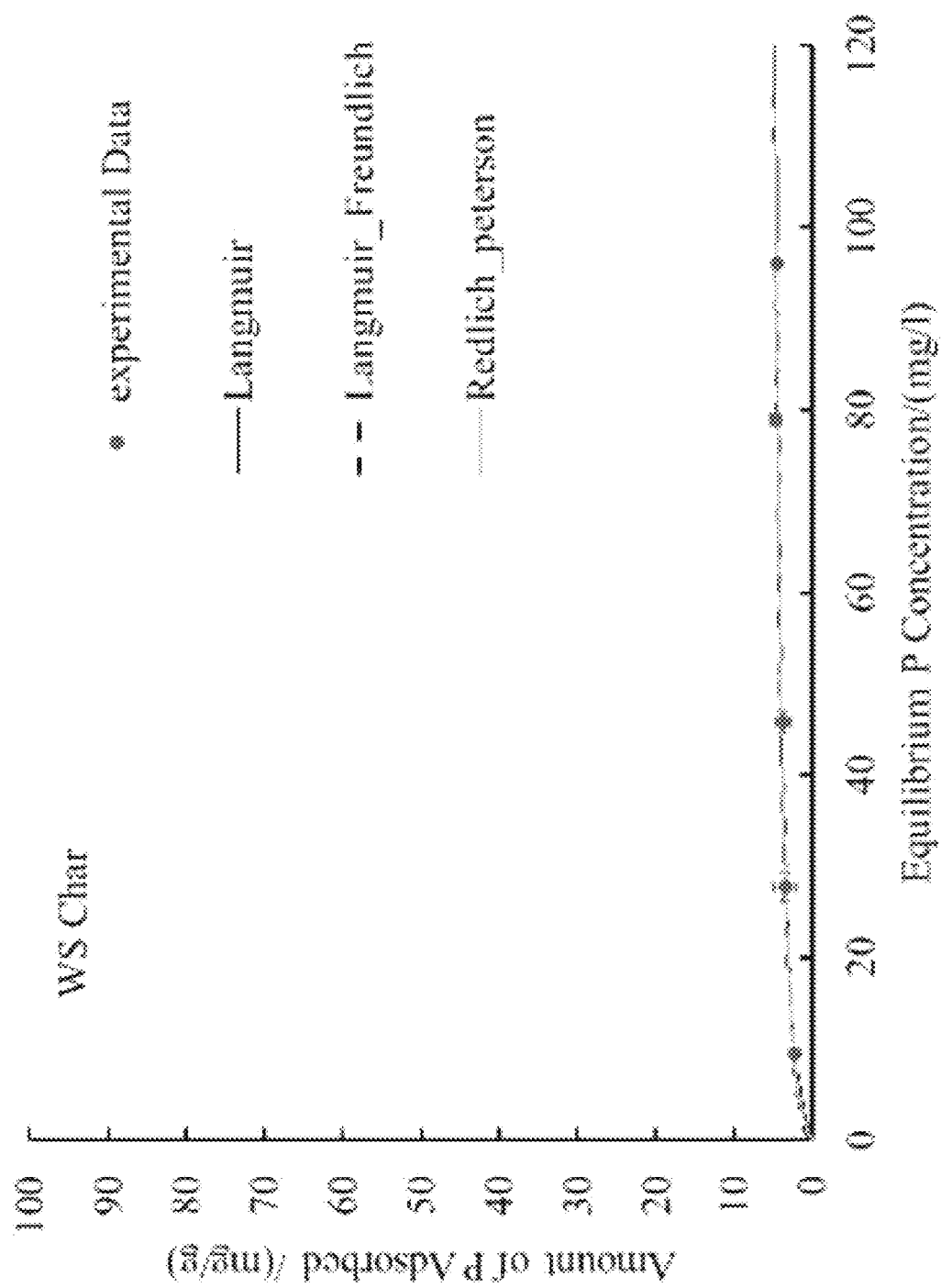
Figure 20E:
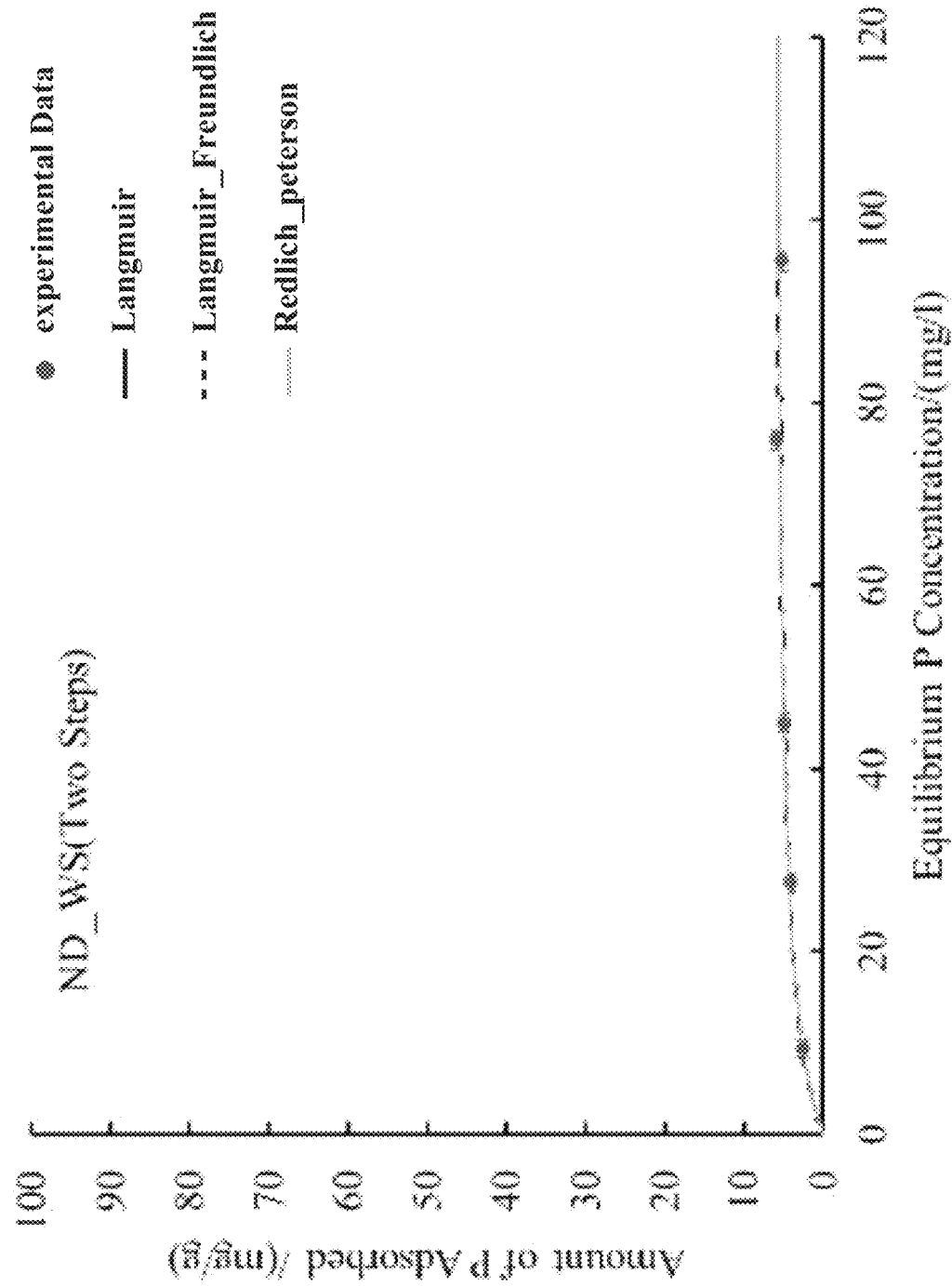
Figure 20F:
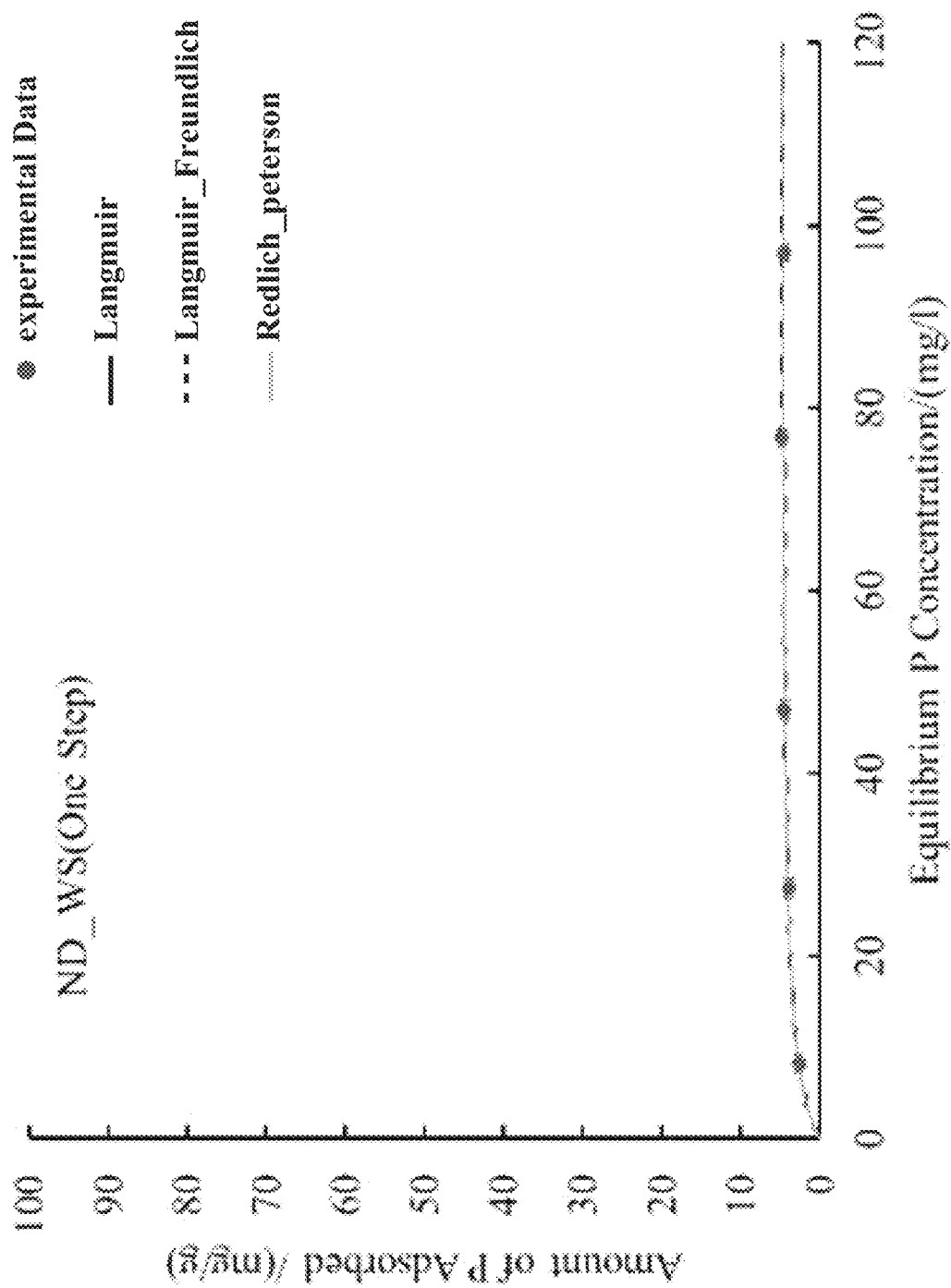
Figure 20G:
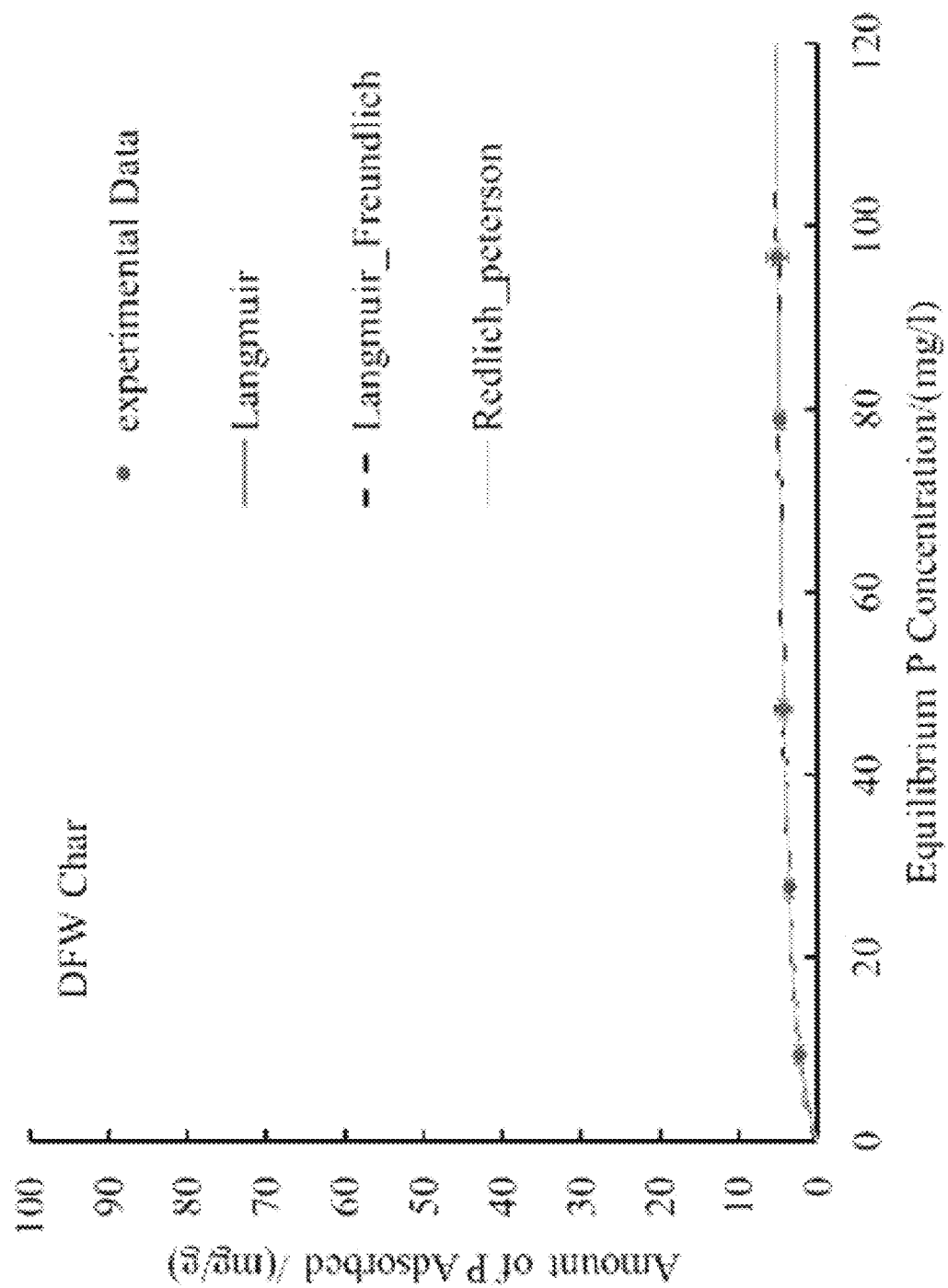
Figure 20H:
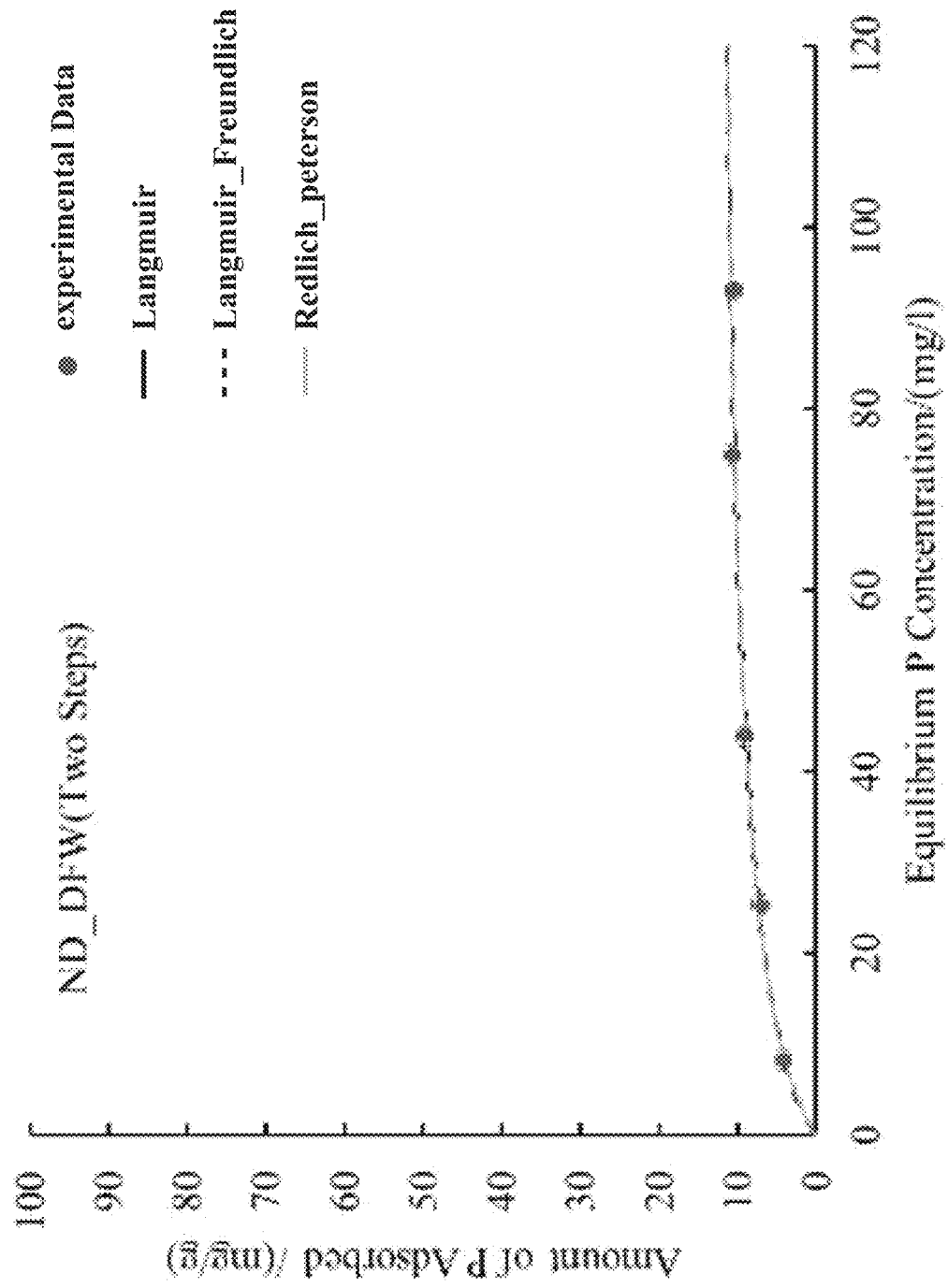
Figure 20I:
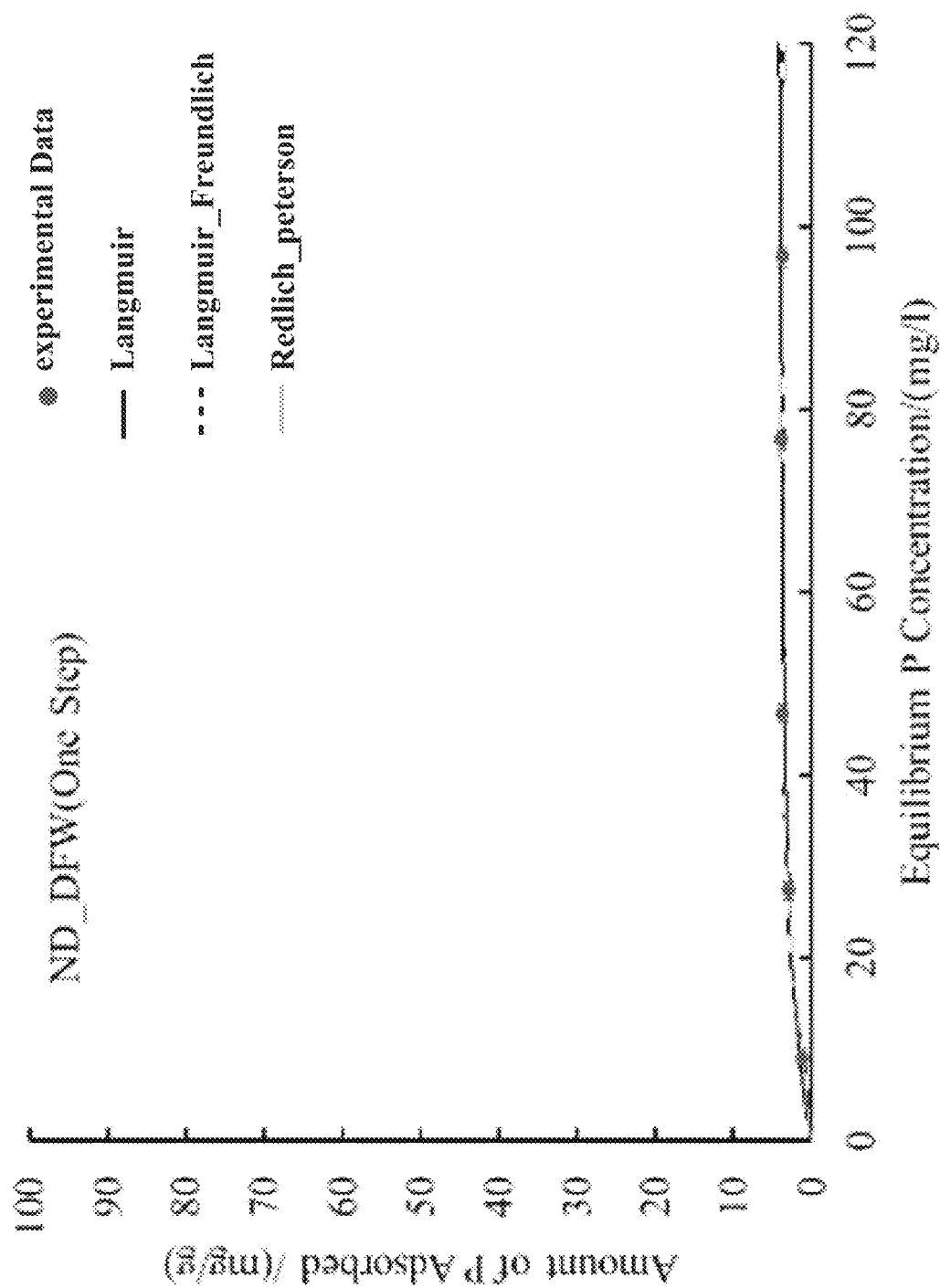
Figure 21A:
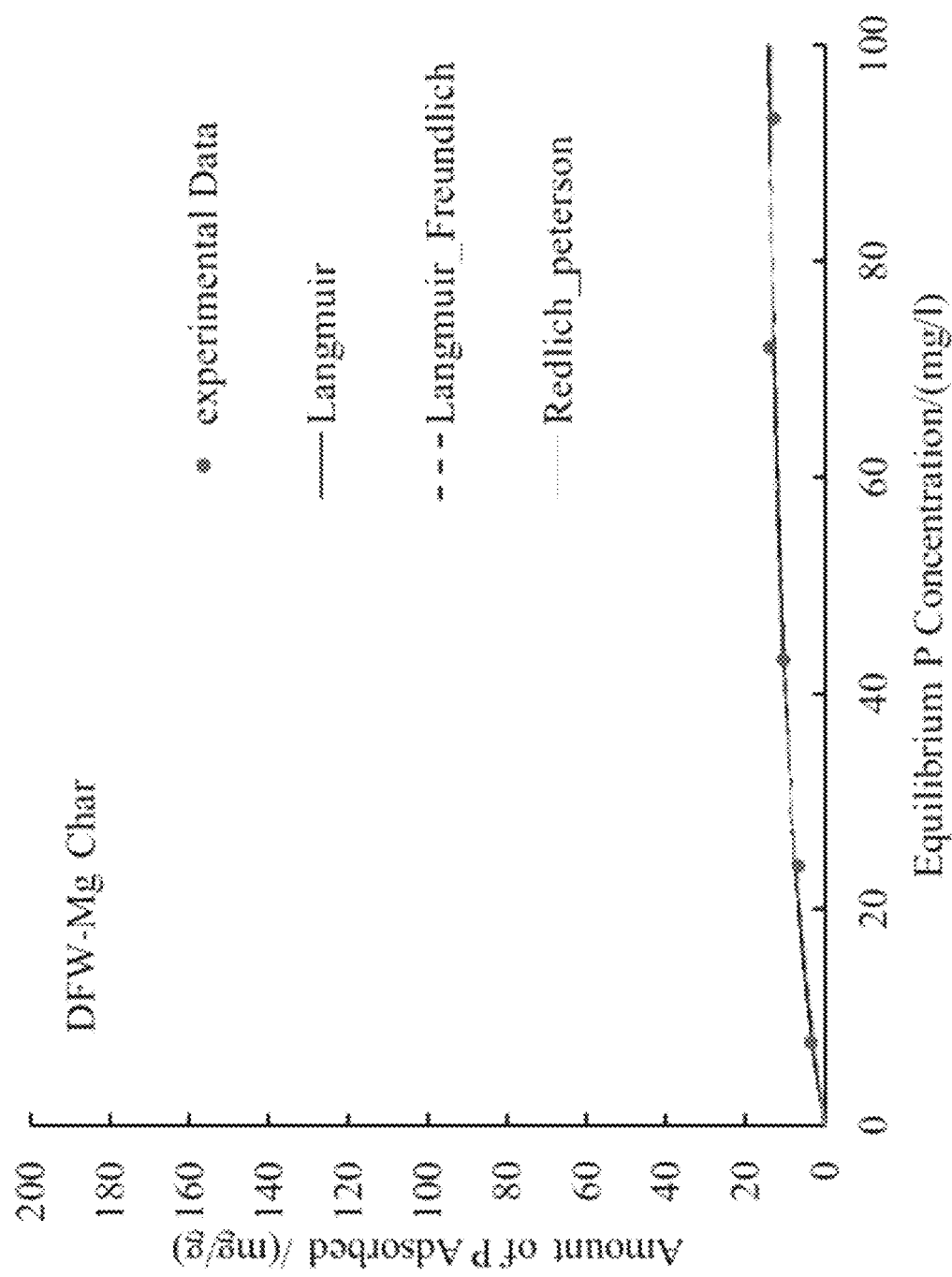
FIGS. 21A-21D show adsorption isotherm data and modeling for phosphate on chars produced from Mg-containing biomass.
Figure 21B:
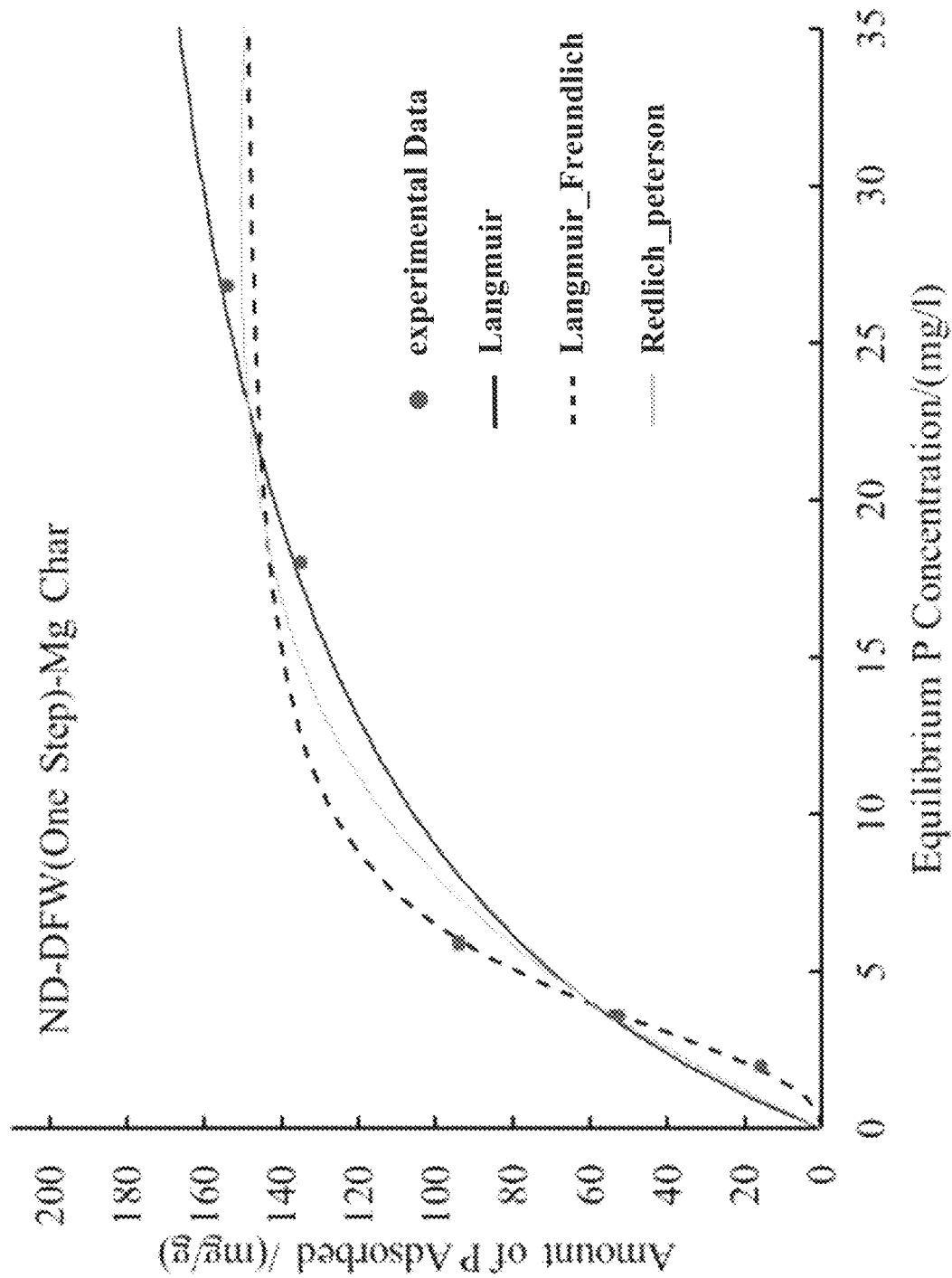
Figure 21C:
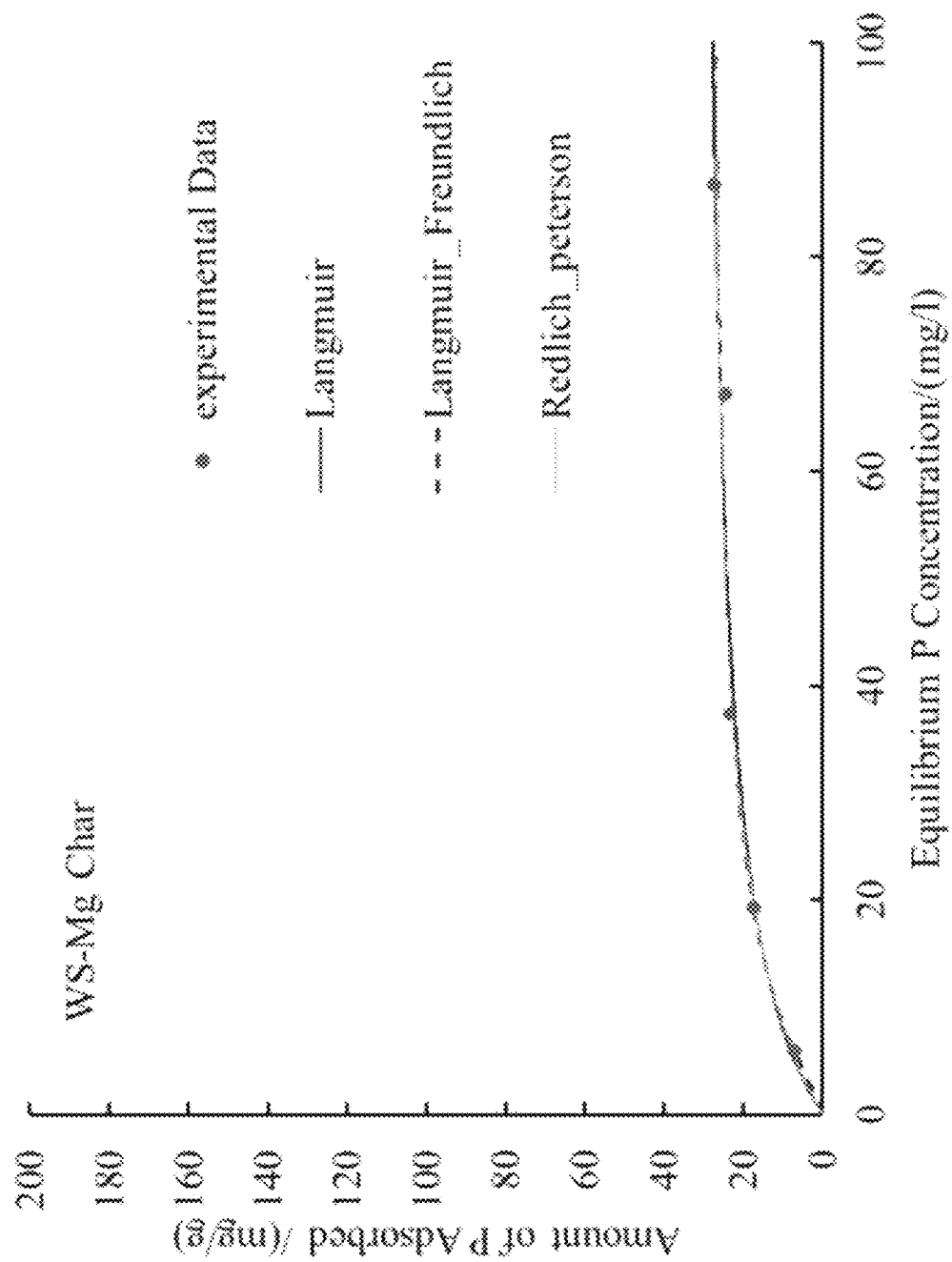
Figure 21D:
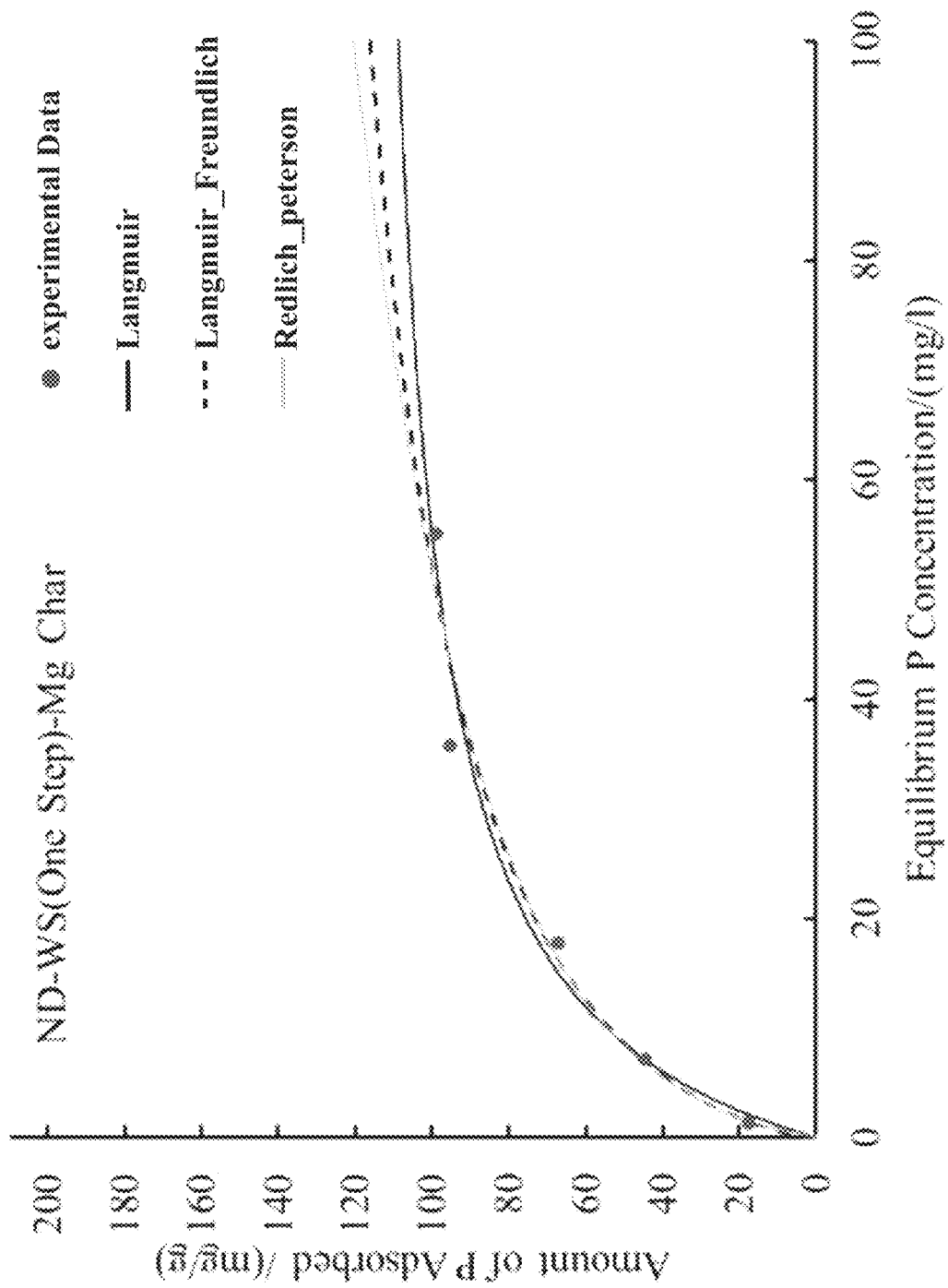

FIGS. 15A-15E show the molecular scheme of Mg-N-doped biochars within a graphene model structure—$3P_6N$-$MgH_2$ (FIG. 15A), $3P_5N$-Mg (FIG. 15B), $3P_6N$-Mg (FIG. 15C), $4P_5N$-Mg (FIG. 15D), and $4P_6N$-Mg (FIG. 15E).

FIGS. 16A-16D show magnesium adsorption energies at edge of graphene with pyrrolic and pyridinic $P_6N$-Mg (FIG. 16A), $2P_6N$-Mg (FIG. 16B), $P_5N$-Mg (FIG. 16C), and $2P_5N$-Mg (FIG. 16D) functionality.

FIGS. 17A-17E show calcium adsorption energies at the center of graphene with pyrrolic and pyridine groups $3P_6N$-$MgH_2$ (FIG. 17A), $3P_5N$-Mg, (FIG. 17B) $3P_6N$-Mg, (FIG. 17C) $4P_5N$-Mg (FIG. 17D), and $4P_6N$-Mg (FIG. 17E) functionality.

FIGS. 18A-18D shows calcium adsorption energies at edge of graphene with pyrrolic and pyridinic $P_6N$-Mg (FIG. 18A), $2P_6N$-Mg (FIG. 18B), P5N-Mg (FIG. 18C), and 2P5N-Mg (FIG. 18D) functionality.

Further, FIGS. 19A-19B show the nitrogen species that bind to Mg/Ca has a noticeable effect on the adsorption energy. While the mono-functional group at the edge sites, with the corresponding structures shown in FIGS. 16A-16D and FIGS. 18A-18D, does not binds favorably (since a positive value indicates unfavorable adsorption), a pronounced effect is shown on the adsorption energy with a di-functional group at the edge, with pyridine and pyrrole. FIGS. 19A-19B also explore the effect of increasing the pyridinic/pyrrolic group on the stability of Mg/Ca within a di- and tri-vacancy defect. With these configurations, the adsorption of Mg/Ca becomes energetically favorable (since the adsorption energies are negative). However, a mono-vacancy region with three pyridine groups (see FIG. 15C and FIG. 17C, $3P_6N$-Mg) coordinated to a Mg/Ca is not energetically stable due to steric effects. This structure becomes even less stable with the addition of two hydrogen atoms coordinated separately to nitrogen atoms as shown in the FIG. 15A and FIG. 17A.

Table 12 depicts the core level binding energies of the structures shown in FIGS. 15A-15E and FIGS. 16A-16D. The goal of this study is to identify the type of structure in which the Mg could be in the polyaromatic ring structure. Using a bulk magnesium as the reference structure, the energy shifts were calculated based on equation (1). Note that there are significant shifts in the core level binding energies for the $3P_5N$-Mg and the $3P_6N$-Mg structures with corresponding core level binding of energies 54.5 eV and 54.6 eV respectively. These energies are closer to the experimental values (53.15 eV) shown in FIGS. 11A-11C for N-Mg-Char. Structure $4P_6N$-Mg, $3P_6N$-$MgH_2$, $2P_6N$-Mg, $2P_5N$-Mg, and $P_5N$-Mg shows energies that practically match the experimental binding energy (49.85 eV) (see FIGS. 13A-13C, N-Mg-Char). These results indicate that we might have a mixture of these structures in the biochar based on the type of defect created, either single, double or triple-point defect.

TABLE 12

CLBE shifts of N-Mg-model coordination in a graphene sheet.

| Structures | CLBEs | Binding Energy (eV) | Experimental (eV) Reference (Steiner et al., 1978) |
|---|---|---|---|
| N-Mg-Structures (Centered actives sites) | | | |
| $3P_6N$-$MgH_2$ | 1.01 | 50.81 | |
| $3P_5N$-Mg | −0.70 | 49.10 | |
| $3P_6N$-Mg | −0.42 | 49.38 | |
| $4P_5N$-Mg | 2.04 | 51.84 | |
| $4P_6N$-Mg | −0.28 | 49.52 | 49.80 |
| N-Mg-Structures (Edge actives sites) | | | |
| $2P_6N$-Mg | −0.72 | 50.6 | |
| $P_5N$-Mg | −0.67 | 50.6 | |
| $2P_5N$-Mg | 0.13 | 51.4 | |

DFT calculations indicate that the shift in Mg 2p binding energy could be due to the formation of phthalocyanine-like structures and N-Mg complexes formed on the edges of the graphene sheet. Briefly, cellulose char doped with nitrogen and metals, such as Mg and Ca could produce phthalocyanine-like structures, which may be more stable and less likely to bind to phosphate ions. Further, nitrogenated and metallic structures at the edges of the carbon-containing material may have a higher probability to bind to phosphate ions.

Example 7

Analysis of Phosphate Adsorption

Adsorption isotherms of phosphate were conducted to evaluate adsorption efficiency of chars. 0.03 g of char was mixed with 45 mL of $KH_2PO_4$ (Fisher Scientific) solutions of different concentrations ranging from 10 to 100 mg·$L^{-1}$ in 50 mL tubes at temperature of 25° C. The tubes were shaken at 130 rpm in the mechanical shaker for 24 h until adsorption equilibrium occurs. The samples were filtered using a 0.45 μm filter to determine corresponding equilibrium concentration. pH of solutions was determined with a pH meter (Mettler Toledo, SevenEasy S20) before and after phosphate adsorption. Phosphate adsorptions were determined based on the initial and final aqueous concentrations, which were evaluated by a molybdovanadate method using the acid persulfate digestion method (1.0 to 100 mg$L^{-1}$). Adsorption kinetics of phosphate on the char were carried out by mixing 0.03 g of the char with 45 mL of 100 mg· $L^{-1}$ phosphate solution in 50 mL tubes. The tubes were then shaken at 130 rpm in a mechanical shaker and samples were withdrawn and filtered for analysis.

FIG. 20 show the adsorption isotherms of $PO_4^{3-}$ for all the chars produced. FIG. 21 shows the adsorption isotherm data and modeling for phosphate on chars produced from Mg-containing biomass.

In the instant example, three isotherms were used to evaluate char adsorption capacity: Langmuir (eq. 3.1), Langmuir-Frendlich (eq. 3.2), and Radlich Peterson (eq. 3.3). Table 13 shows the fitting parameters. obtained for each of these isotherms.

chars without $MgCl_2$ impregnation. Langmuir-Freundlich and Radlich Peterson models fit well to the data of chars produced from ADF and DFW. The maximum phosphate adsorption of the chars obtained from the isotherm study was greater than 95 mg·$g^{-1}$. This shows that one step pyrolysis with ammonia gas increased phosphate adsorption capacity more than 254% adsorption capacity of pristine ADF char is 26 mg·$g^{-1}$. The high adsorption capacity of ND-ADF (One Step) char can be attributed to higher nitrogen content of the char (16.1 wt. %) compared to ND-ADF (Two Steps) (5.5 wt. %) and ADF char (2.4 wt. %). One step pyrolysis under ammonia gas introduced nitrogen to the surface of the char. High phosphate adsorption capacity could also be ascribed to Ca—P and Mg-P precipitation formation. ND-ADF (One Step) has highest content of nitrogen and metals (Ca and Mg) resulting in high phosphate adsorption capacity.

To further evaluate metal and nitrogen functionalities in phosphate adsorption of chars, DFW and WS were impregnated with $MgCl_2·6H_2O$ solution, and the resulting Mg-containing DFW and WS were pyrolyzed under either $N_2$ or $NH_3$ gas.

The results show when Mg-containing DFW and WS were pyrolyzed under $N_2$, the phosphate adsorption capacity of char improved by 3 and 6-fold, respectively. Further, DFW and WS impregnation with $MgCl_2$ followed by pyrolysis under ammonia gas resulted in increasing adsorption capacity by 38 and 24-fold, respectively. The adsorption capacity of N-Mg co-doped chars produced from DFW and WS are 216 and 122 mg/g, respectively, indicating that the unexpected synergistic effect of N and Mg on phosphate adsorption.

TABLE 13

Isotherm parameter for adsorption of phosphate

| Char Sample | Langmuir | | | Langmuir-Freundlich | | | | Redlich-Peterson | | | |
|---|---|---|---|---|---|---|---|---|---|---|---|
| | K L·$mg^{-1}$ | Q mg·$g^{-1}$ | $R^2$ | K Ln·$mg^{-n}$ | Q mg·$g^{-1}$ | n | $R^2$ | K L·$g^{-1}$ | A Ln·$mg^{-n}$ | n | $R^2$ |
| ADF char | 1.0 | 27 | 0.95 | 0.99 | 26 | 1.1 | 0.95 | 23.2 | 0.8 | 1.0 | 0.95 |
| ND-ADF(Two Steps) | 1.2 | 47 | 0.95 | 0.59 | 60 | 0.6 | 0.95 | 102.6 | 3.3 | 0.9 | 0.96 |
| ND-ADF(One Step) | 0.4 | 95 | 0.93 | 0.41 | 110 | 0.7 | 0.94 | 57.4 | 0.9 | 0.9 | 0.94 |
| WS char | 0.1 | 5 | 0.96 | 0.13 | 7 | 0.6 | 0.98 | 0.8 | 0.4 | 0.8 | 0.98 |
| ND-WS(Two Steps) | 0.1 | 6 | 0.95 | 0.06 | 6 | 1.0 | 0.95 | 0.4 | 0.04 | 1.1 | 0.95 |
| ND-WS(One Step) | 0.1 | 5 | 0.97 | 0.13 | 5 | 1.0 | 0.93 | 0.6 | 0.1 | 1.0 | 0.97 |
| WS-Mg char | 0.1 | 33 | 0.98 | 0.03 | 29 | 1.3 | 0.99 | 1.5 | 0.02 | 1.2 | 0.99 |
| ND-WS(One Step)-Mg | 0.1 | 122 | 0.98 | 0.1 | 156 | 0.7 | 0.99 | 17.1 | 0.3 | 0.8 | 0.99 |
| DFW char | 0.07 | 6 | 0.99 | 0.10 | 7 | 0.7 | 1.00 | 0.6 | 0.2 | 0.9 | 1.00 |
| ND-DFW(Two steps) | 0.05 | 13 | 0.99 | 0.06 | 14 | 0.9 | 0.99 | 0.8 | 0.1 | 1.0 | 0.99 |
| ND-DFW(One Step) | 0.05 | 5 | 0.93 | 0.01 | 4 | 1.9 | 0.99 | 0.1 | 0.001 | 1.8 | 1.00 |
| DFW-Mg char | 0.02 | 20 | 0.97 | 0.02 | 19 | 1.1 | 0.97 | 0.3 | 0.0002 | 1.9 | 0.98 |
| ND-DFW(One Step)-Mg | 0.1 | 217 | 0.95 | 0.03 | 150 | 2.3 | 0.99 | 16.8 | 0.02 | 1.4 | 0.96 |

$$q = \frac{K\ Q\ Ce}{1 + K\ Ce} \quad \text{Langmuir} \quad (3.1)$$

$$q = \frac{K\ Q\ Ce^n}{1 + K\ Ce^n} \quad \text{Langmuir-Freundlich} \quad (3.2)$$

$$q = \frac{K\ Ce}{1 + a\ Ce^n} \quad \text{Redlich Peterson} \quad (3.3)$$

Figure 22:
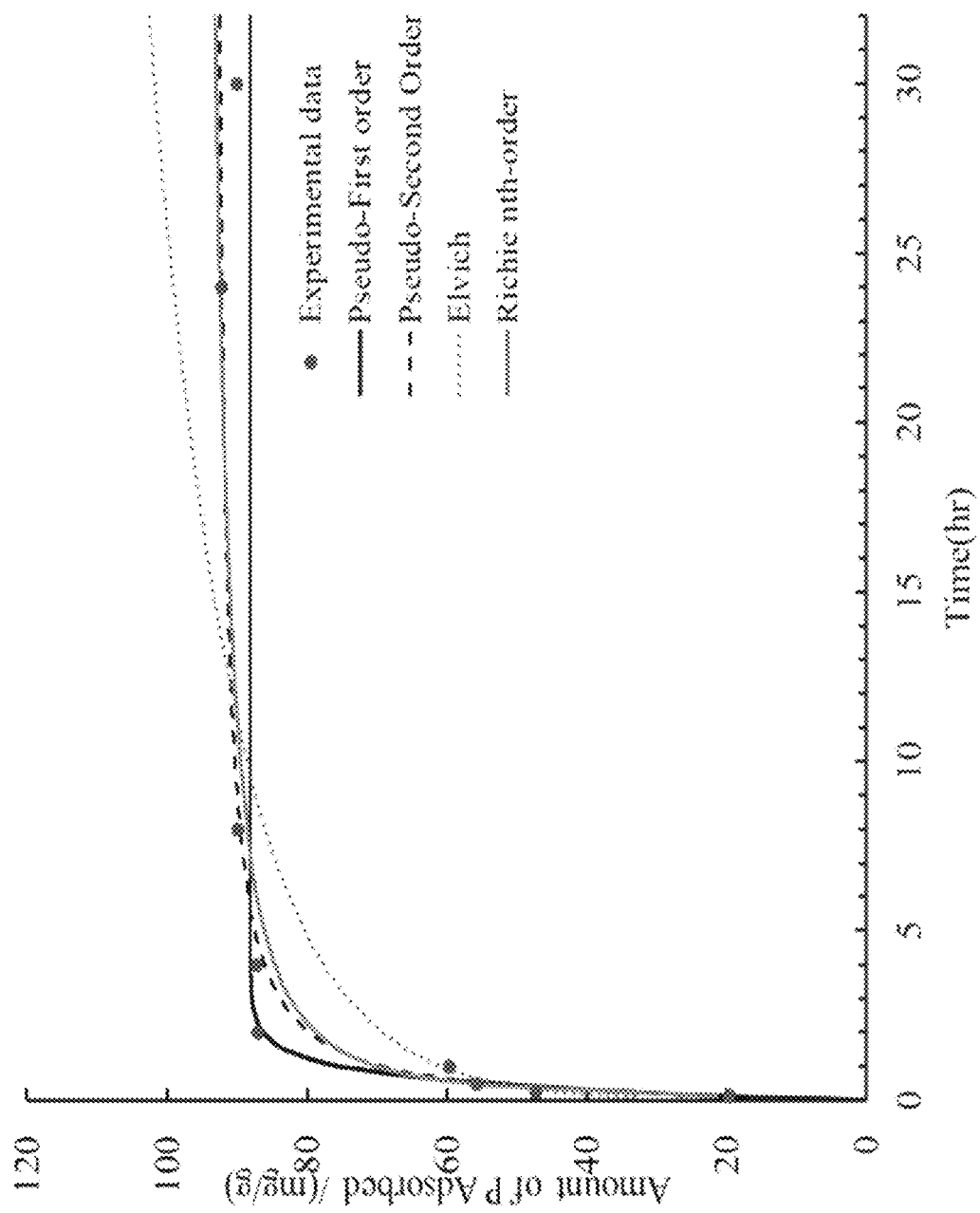
FIG. 22 shows adsorption kinetic of phosphate for ND-ADF (One Step) char.

The results indicate that ND-ADF (One Step) char has a higher phosphate adsorption capacity compared to other To further understand the adsorption behavior of phosphate on ND-ADF (One Step) char, the adsorption kinetics were determined and presented in FIG. 22. Kinetic study indicates that the sorption of phosphate on the ND-ADF (One Step) char increased significantly in the first two hours and slowed down until the adsorption equilibrium was reached after around 9 hours. Four mathematical models including pseudo-first-order (Eq. (3.4)), pseudo-second-order (Eq. (3.5)), Elovich (Eq. (3.6)) and Richie nth-order (Eq. (3.7)) models were applied to describe the adsorption kinetics of phosphate on ND-ADF char.

$$\frac{dq_t}{dt} = k_1(q_e - q_t) \quad \text{pseudo-first-order} \quad (3.4)$$

$$\frac{dq_t}{dt} = k_2(q_e - q_t) \quad \text{pseudo-second-order} \quad (3.5)$$

$$\frac{dq_t}{dt} = \alpha \exp(-\beta q_t) \quad \text{Elovich} \quad (3.6)$$

$$\frac{dq_t}{dt} = k_n(q_e - q_t)^n \quad \text{Richie nth-order} \quad (3.7)$$

In these equations, $q_e$ and $q_t$ represent the adsorbed amount (mg/g) of P at an equilibrium concentration (mg/g) and at time t, respectively; $k_1$ ($h^{-1}$), $k_2$ ($g \cdot mg^{-1} \cdot h^{-1}$) and $k_n$ ($gn^{-1} \cdot mg^{1-n} \cdot h^{-1}$) are the rate constants for the pseudo-first-order and pseudo-second-order and nth-order models; $\alpha$ (mg $g^{-1} \cdot h^{-1}$) and $\beta$ ($g \cdot mg^{-1}$) represent the initial adsorption rate, and desorption constant respectively. The Richie nth order model fits the kinetic adsorption data well, indicating that phosphate adsorption might be controlled by multiple mechanisms. Chemisorption may be the dominant adsorption mechanism (Table 14).

TABLE 14

Parameter Values of phosphate adsorption kinetics (Sample ND-ADF)

| Sample | Pseudo-First-Order | | Pseudo-Second-Order | | | Elvich | | | Richie nth-order | | |
|---|---|---|---|---|---|---|---|---|---|---|---|
| | $K_1$ $h^{-1}$ | Qe mg/g | $R^2$ | $K_2$ $g \cdot mg^{-1} \cdot h^{-1}$ | Qe mg/g | $R^2$ | $\alpha$ $mg \cdot g^{-1} \cdot h^{-1}$ | $\beta$ $g \cdot mg^{-1}$ | $R^2$ | $K_n$ $gn^{-1} \cdot mg^{1-n} \cdot h^{-1}$ | n | $R^2$ |
| ND-ADF | 1.9 | 88 | 0.91 | 0.031 | 94 | 0.95 | 1911 | 0.083 | 0.82 | 0.0015 | 2.8 | 0.96 |

Example 8

XPS Analysis of Adsorption Properties

X-ray photoelectron spectroscopy (XPS) measurements were conducted using an AXIS-165 (Kratos Analytical Inc. Manchester, UK) using achromatic x-ray radiation of 1253.6 eV (MgKα) to determine the elemental composition on the sample surface. A pass energy of 40 eV and spot size of approximately 120 μm are used to record all high-resolution spectra.

Figure 23A:
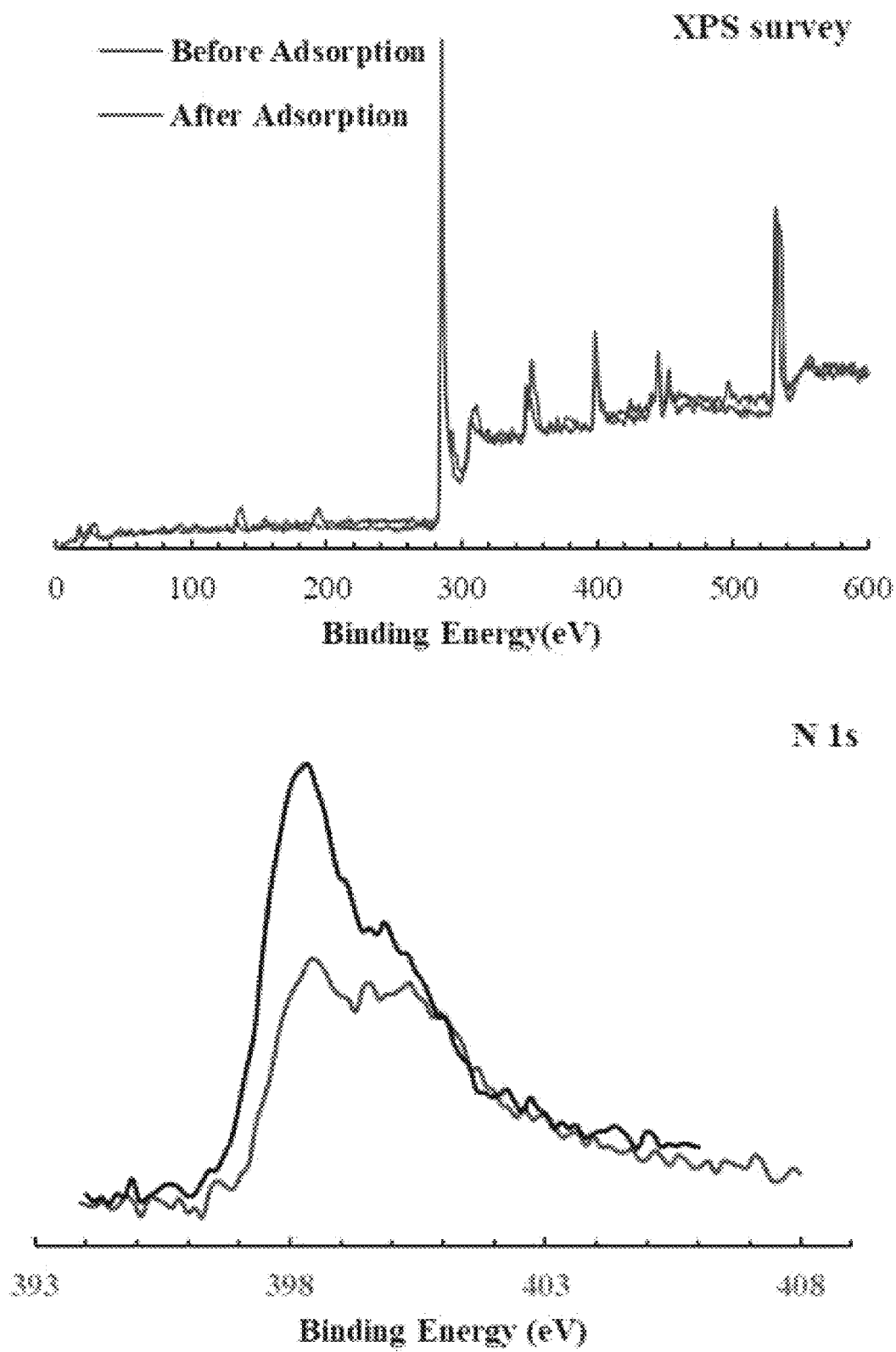
Figure 24A:
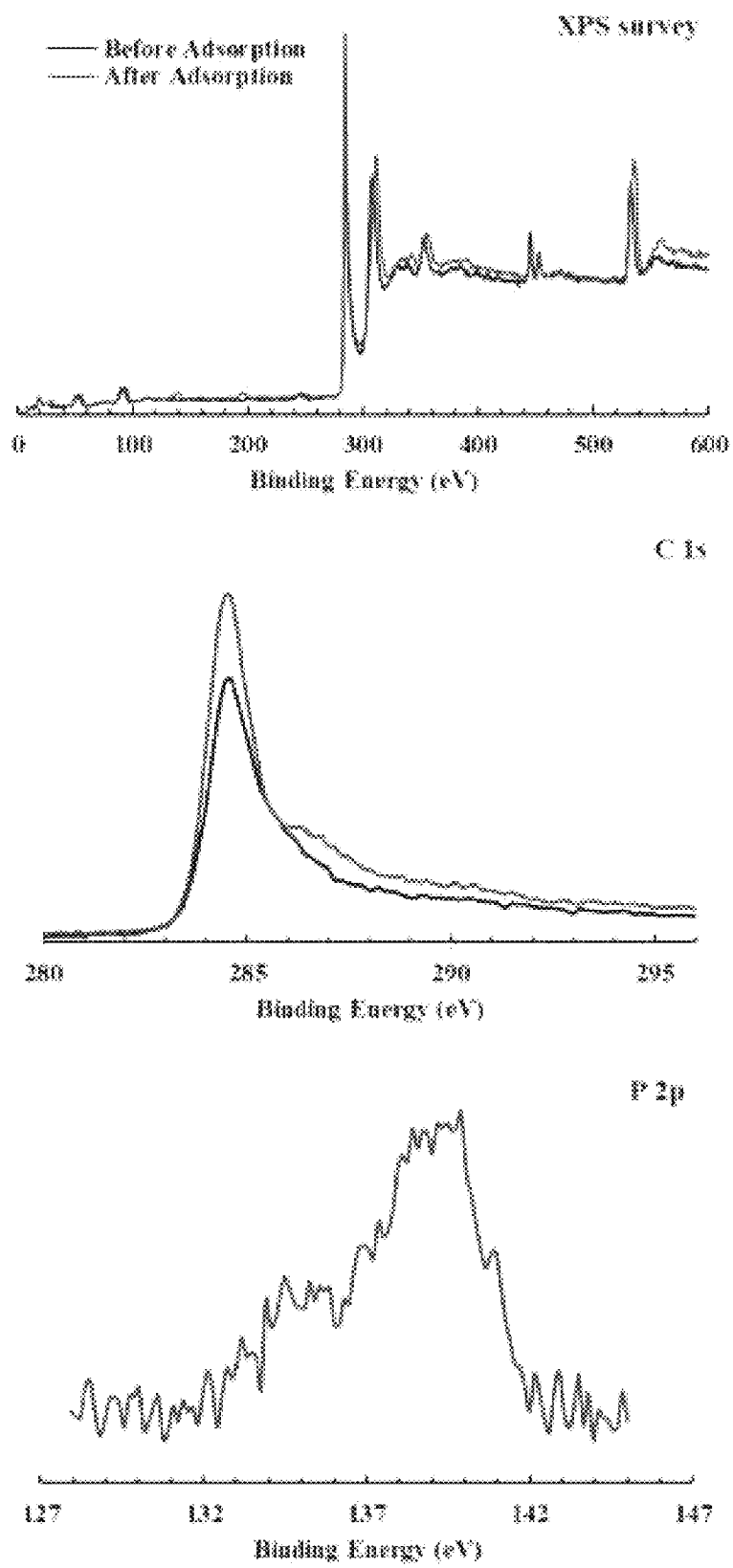
FIGS. 24A-24B show XPS survey and O1s, C1s, Mg2p and P2p XPS spectra of the DFW-Mg char sample before and after phosphate adsorption.
Figure 24B:
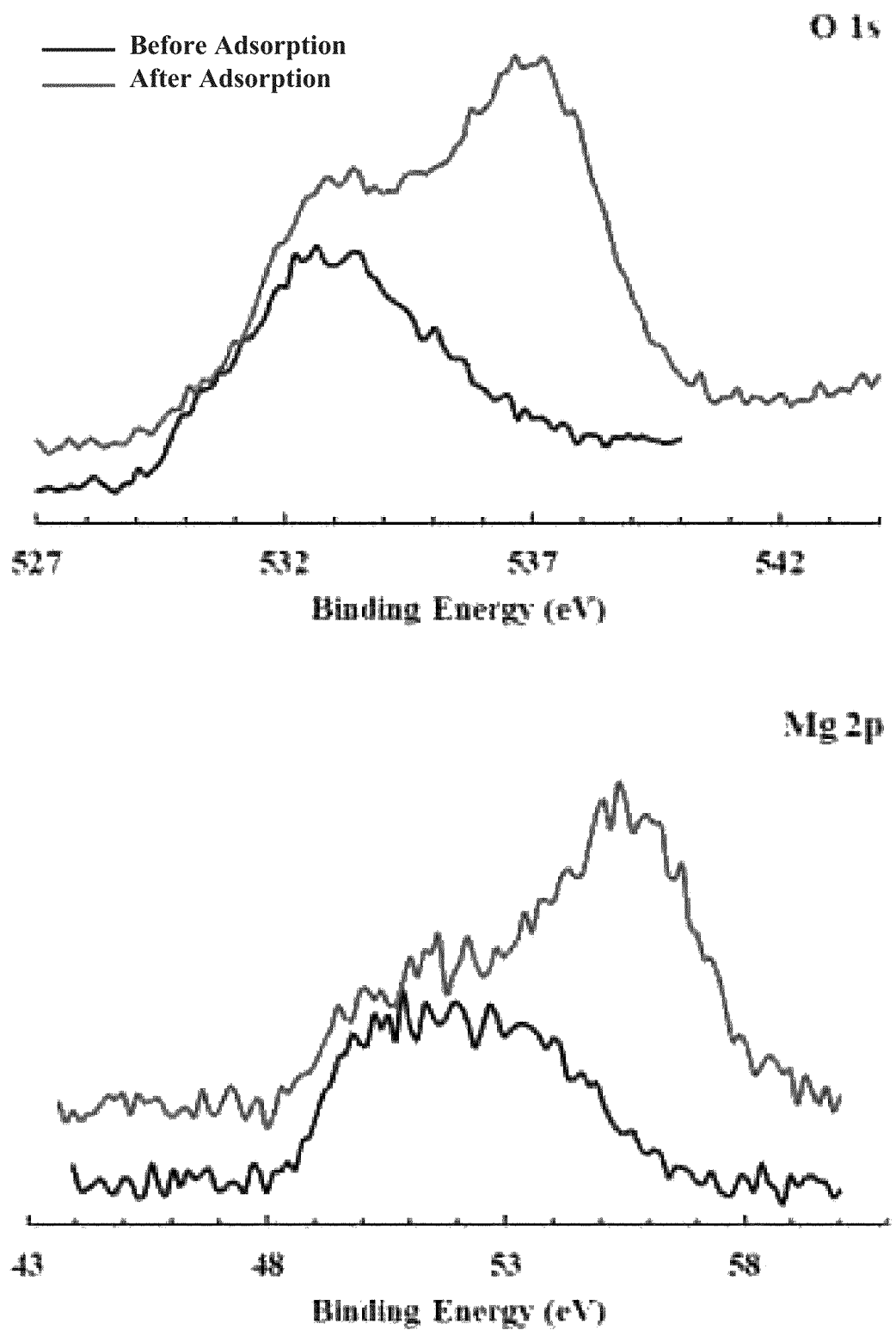
Figure 25A:
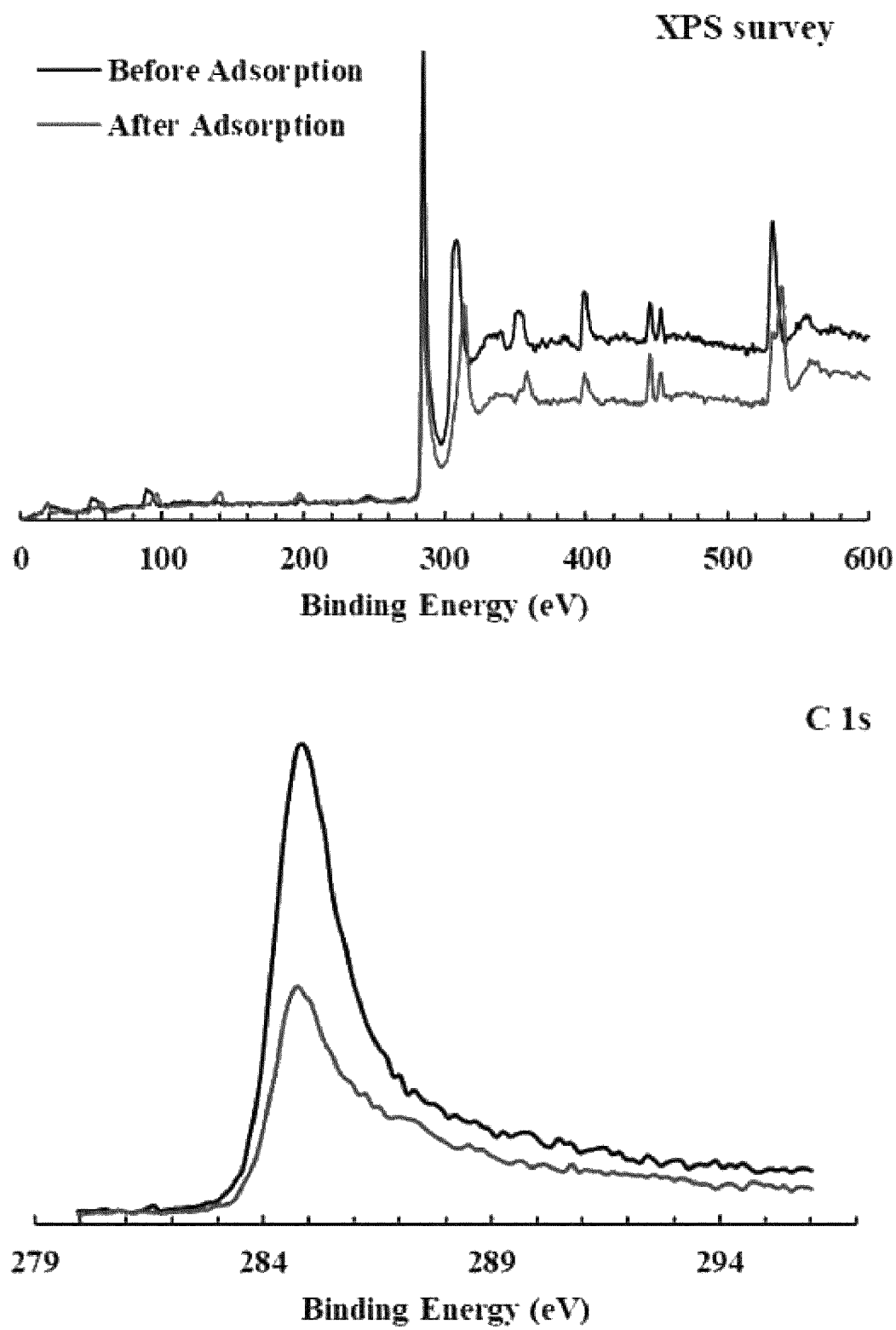

Representative XPS results obtained for the ND-ADF (One Step), ND-DFW (One Step), DFW-Mg and ND-DFW (One Step)-Mg char are shown in FIGS. 23-25. The main elements of the ND-ADF (One Step) were C and O. High resolution XPS analysis was conducted before and after adsorption to understand the environment modification of the different functional groups on the char surface. In high resolution XPS spectra of Ca2p (FIG. 23), two prominent peaks were observed in the spectra before phosphate adsorption. After phosphate adsorption three peaks are observed, with the first peak at 348 eV, the second peak (which is the most prominent) at 352 eV and the last peak at 356 eV (which is an evolved new peak). This new peak is shifted to higher binding energy value. The large shifts could be attributed to strong chemical affinity and the new formation of Ca—P complex.

The P2p spectra before the adsorption process seems to be partially symmetric with only one prominent peak. However, after adsorption, a new peak emerged at binding energy of 138 cV, which did not exist before adsorption. The XPS results showed the mass concentration of P increased from 0.7 to 2.9 at % (atomic), indicating that the phosphate was adsorbed on the surface of the ND-ADF (One Step) char. In general, the efficient removal of phosphate ions depends of nitrogen functionalities and the intrinsic metal content of the char, with calcium being the most dominant metal in the AD fiber char.

FIGS. 24 and 25 show representative XPS results obtained from DFW feedstock. It can be observed that N1s spectra of ND-DFW (One Step) and ND-DFW (One Step)-Mg chars are different, which could be attributed to introducing Mg to the surface of the char. Mg impregnation resulted in improved nitrogen doping. More pyridinic functional groups can be seen in ND-DFW (One Step)-Mg. In FIG. 24, O 1s and Mg 2p spectra have changed after adsorption. After adsorption, a new peak in O1s spectra at 537 cV appeared. A similar trend can be seen in Mg 2p spectra, which could be attributed to formation of Mg-P precipitation.

Figure 26A:
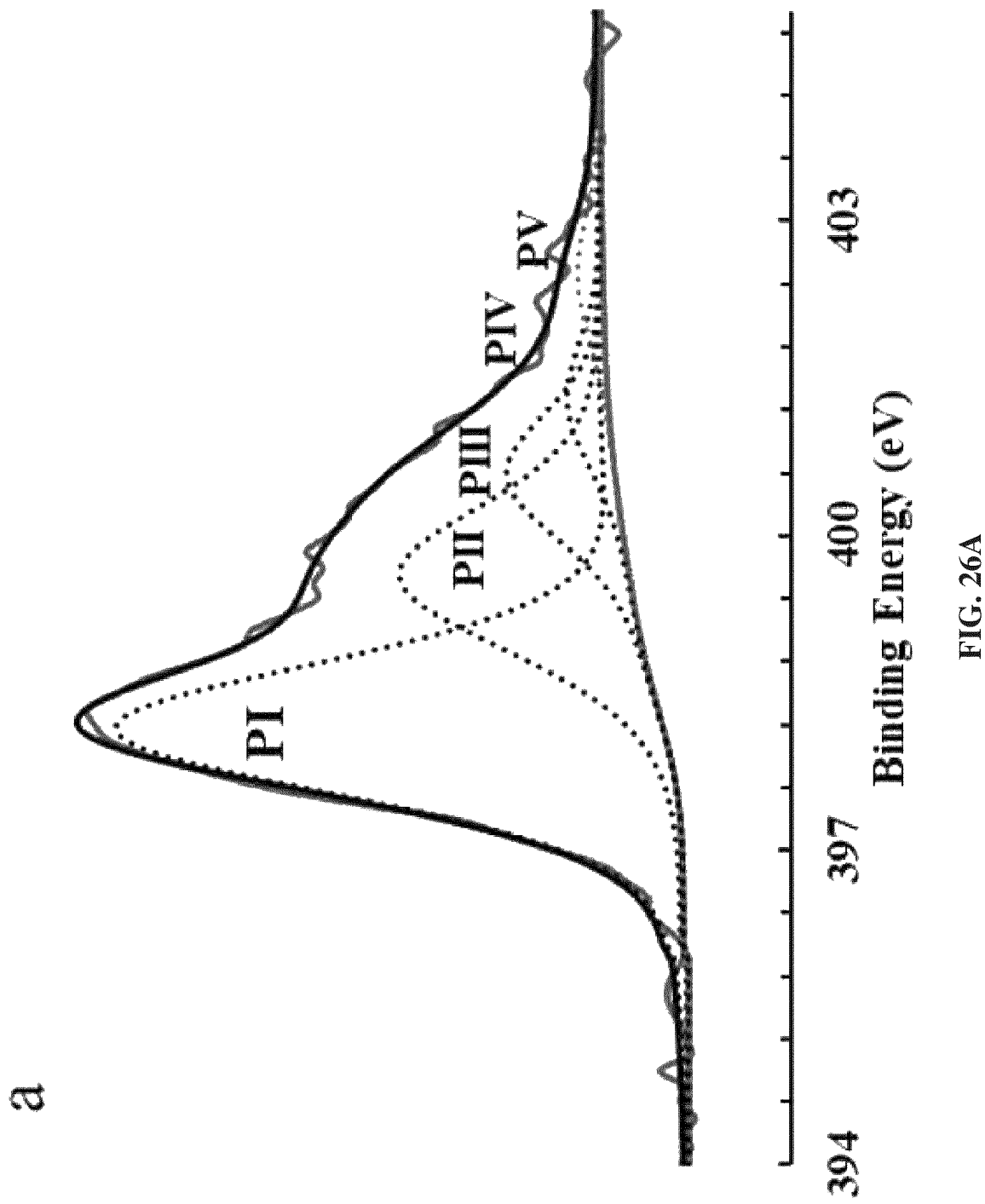
FIGS. 26A-26E show N 1s XPS spectra of ND-ADF (One Step) (FIG. 26A), ND-DFW (One Step)-Mg (FIG. 26C), and ND-DFW (One Step) (FIG. 26E) chars before phosphate adsorption. Further, ND-ADF (One Step) (FIG. 26B) and ND-DFW (One Step)-Mg (FIG. 26D) chars are shown after phosphate adsorption (PI: pyridinic group, PII: Pyridone group, PIII: Pyrrolic group, PIV: Graphitic nitrogen and PV: N-oxide group).
Figure 26B:
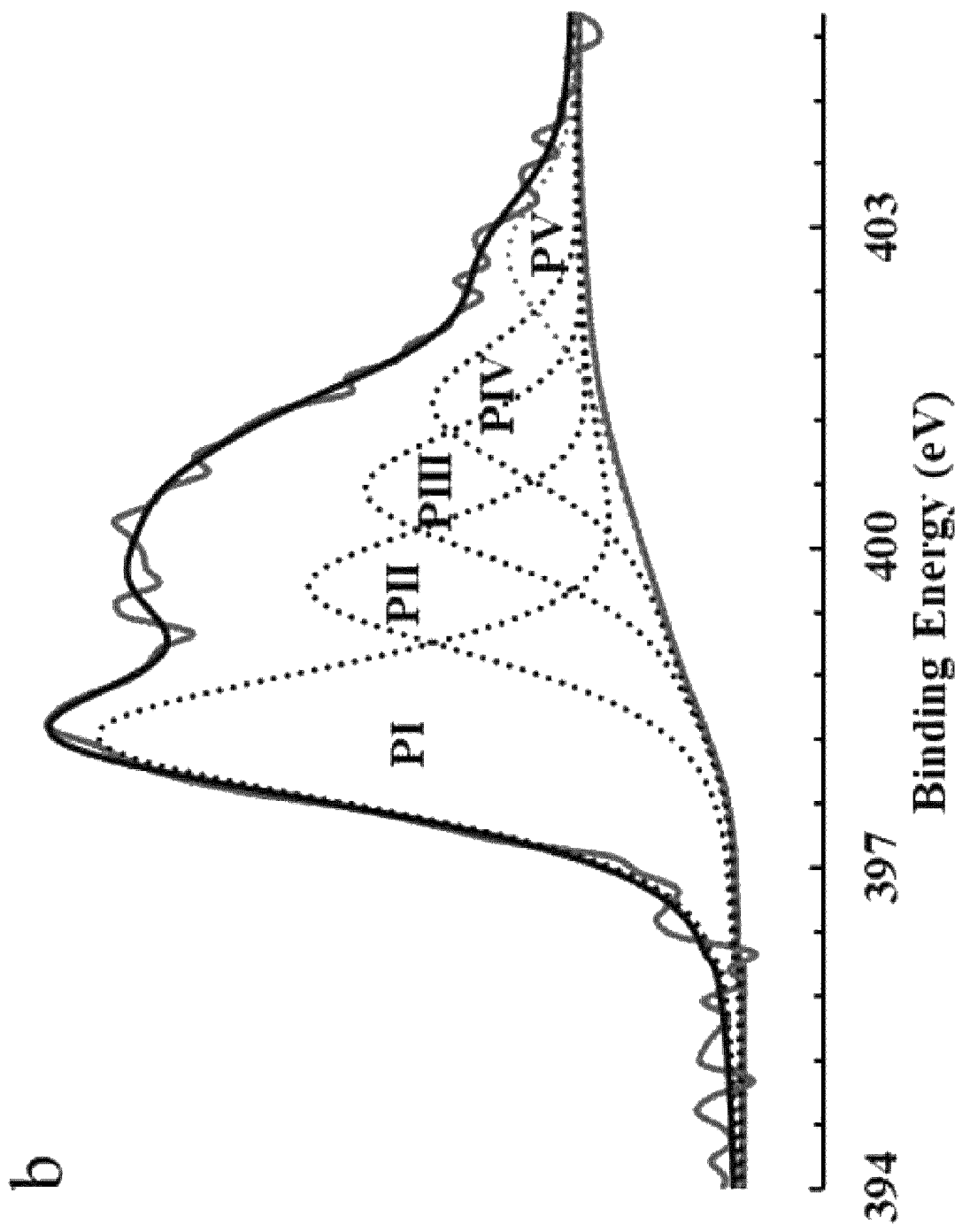
Figure 26C:
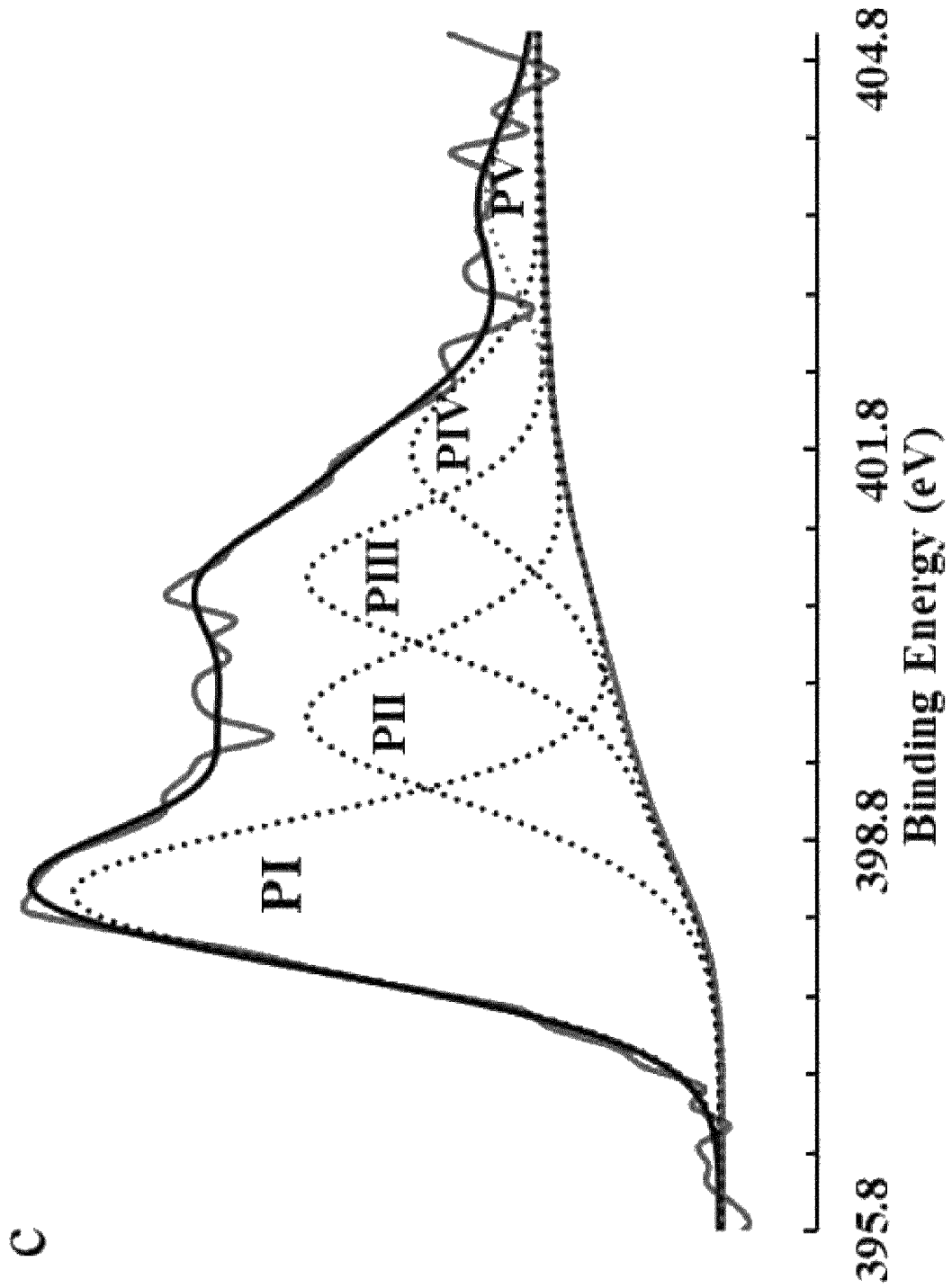
Figure 26D:
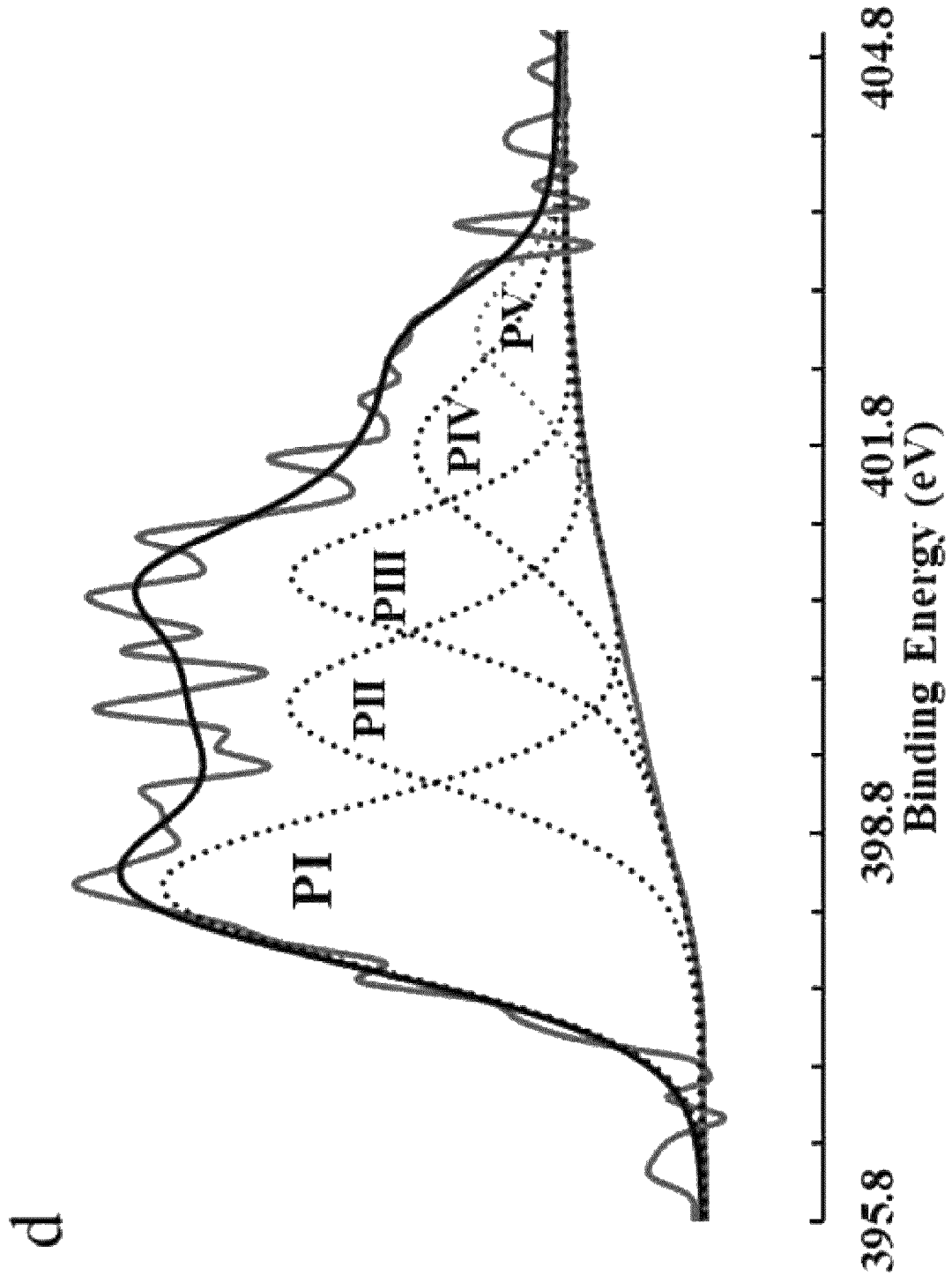
Figure 26E:
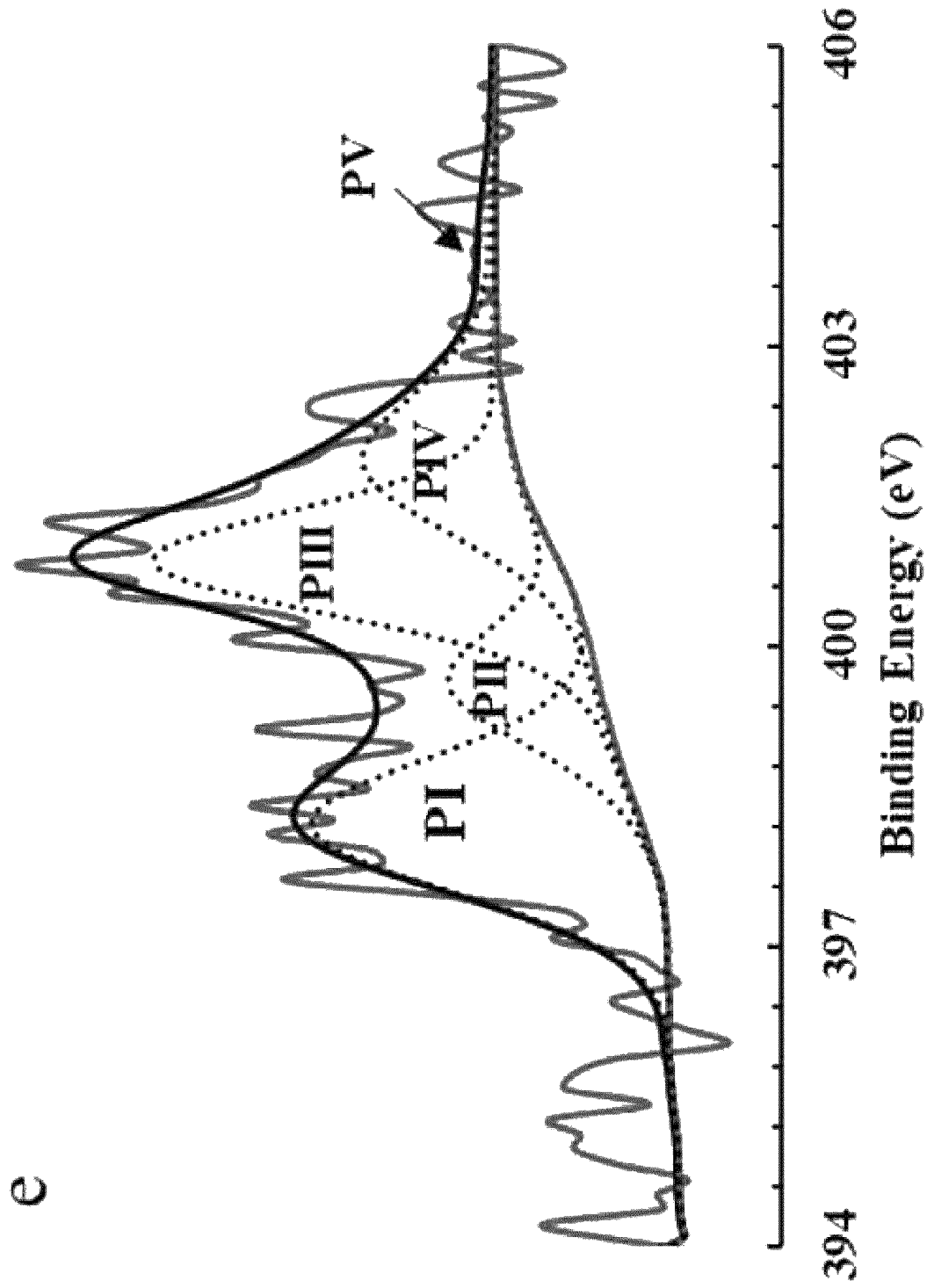

The N 1s spectra can be deconvoluted into five peaks, including: Pyridinic-N, Pyridone-N, Pyrolic-N, Graphitic-N and Oxidized-N. The pyridine functional group situated at 398.2 cV is the most dominant functional in the ND-ADF (One Step) (see FIGS. 26A-26E). The pyridine functional group is the most stable N group in carbonaceous materials. Pyridinic and graphitic nitrogen are reported as basic sites that can improve phosphate adsorption. FIG. 26A shows the spectrum before adsorption. The pyridinic groups (with binding energy of about 398.2 cV) are the most dominant nitrogen functionality, followed by a slightly broader peak centered at 400 eV that corresponds to pyrrolic groups. Interestingly, the spectra after phosphate retention in FIG. 26B shows a broader peak also centered at 400 eV. It can be observed that the pyridine peak remains practically unaltered compared to the rest of the peaks. The pyridinic group is an electron rich structure since it has six x and one unshared pair electron. The unshared pair electrons can contribute to adsorption. In FIGS. 26A-26E, similar pyridinic peaks before and after adsorption could be attributed to the stable structure of pyridinic and unshared pair electrons in nitrogen sp2 orbital, which could be involved the adsorption process. The high density of x electrons can improve basicity of char surface. The peaks above 400 cV are normally represented by pyrrolic, graphitic nitrogen and N-oxides. The broadness entails that the nitrogen group situated at 400 eV and above might be part of the driving force for the efficient removal of phosphate. Table 15 presents the percentage of each of the N functional groups. The results shows nitrogen content of ND-DFW (One Step)-Mg is 6.3 at. %, which is much higher than nitrogen content of ND-DFW (One Step) (2.2 at. %), indicating that presence of Mg on the DFW structure affected introduction of nitrogen on the surface of the char significantly. This could be attributed to the fact that N doping can occur through reactions between $NH_3$ and Mg functionalities. Mg could have a catalytic effect on reaction of $NH_3$ and O functionalities.

TABLE 15

Surface elemental composition of chars

| Sample | Surface Elemental Composition (Atom %) | | | | | | | |
|---|---|---|---|---|---|---|---|---|
| | N | C | O | Pyridinic-N | Pyridone-N | Pyrolic-N | Graphitic-N | Oxidized-N |
| ND-ADF(One Step) (Before Adsorption) | 8.1 | 80.5 | 11.3 | 57.2 | 26.5 | 10.4 | 3.9 | 2.5 |
| ND-ADF (One Step) (After Adsorption) | 8.0 | 70.5 | 21.4 | 43.7 | 23.4 | 16.9 | 11.3 | 5 |
| ND-DFW(One Step) - Mg (Before Adsorption) | 6.3 | 84.6 | 9.1 | 42.8 | 23.4 | 18.6 | 11.5 | 3.9 |
| ND-DFW(One Step) - Mg (After Adsorption) | 6.4 | 71.6 | 22.0 | 37.0 | 24.4 | 18.7 | 13.9 | 5.2 |
| ND-DFW(One Step) (Before Adsorption) | 2.4 | 93.7 | 4.2 | 31.6 | 13.0 | 32.3 | 16.1 | 0.5 |

Figure 27A:
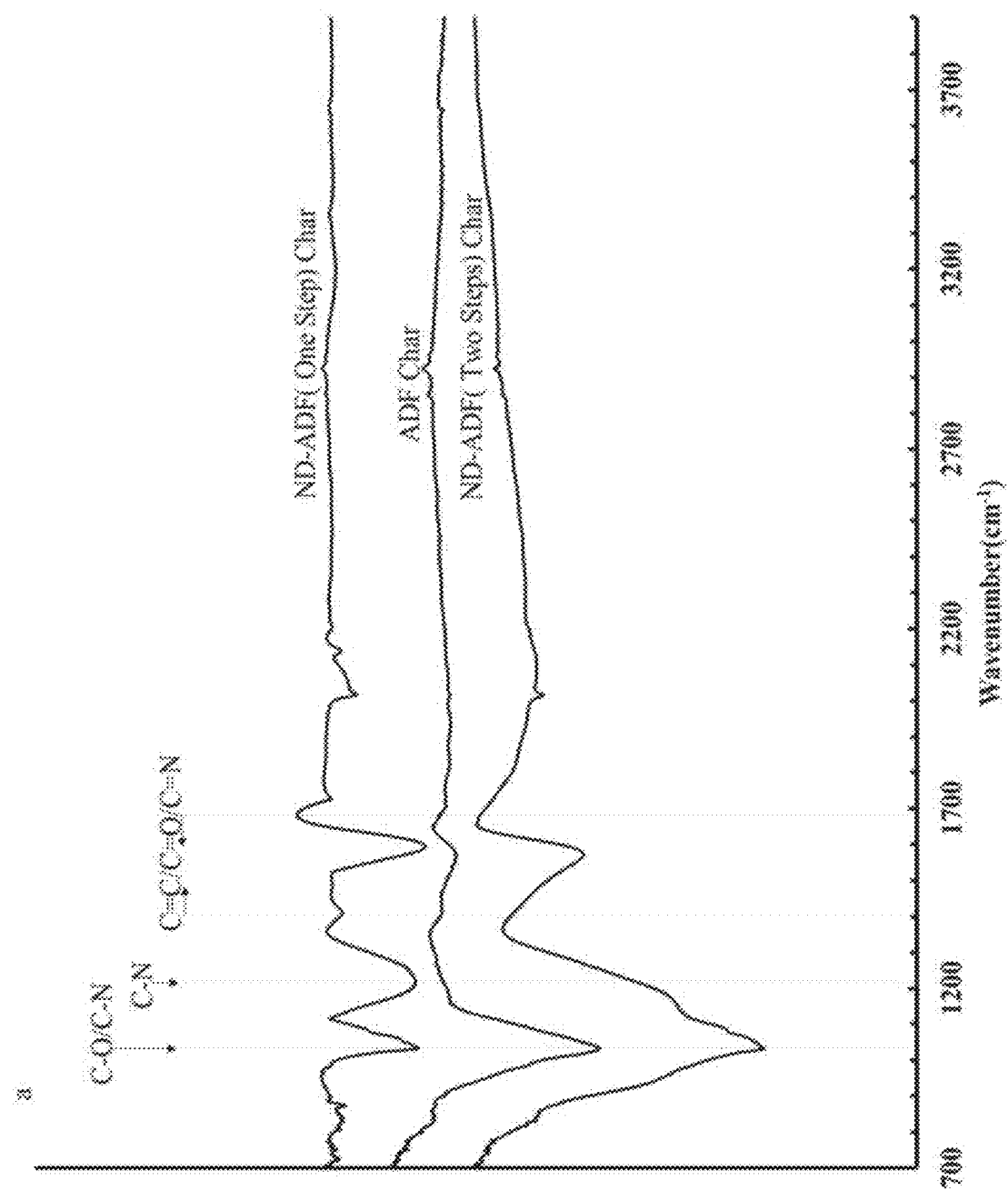
FIG. 27A shows FTIR spectra of ADF, ND-ADF (One Step) and ND-ADF (Two Steps) chars.
Figure 27B:
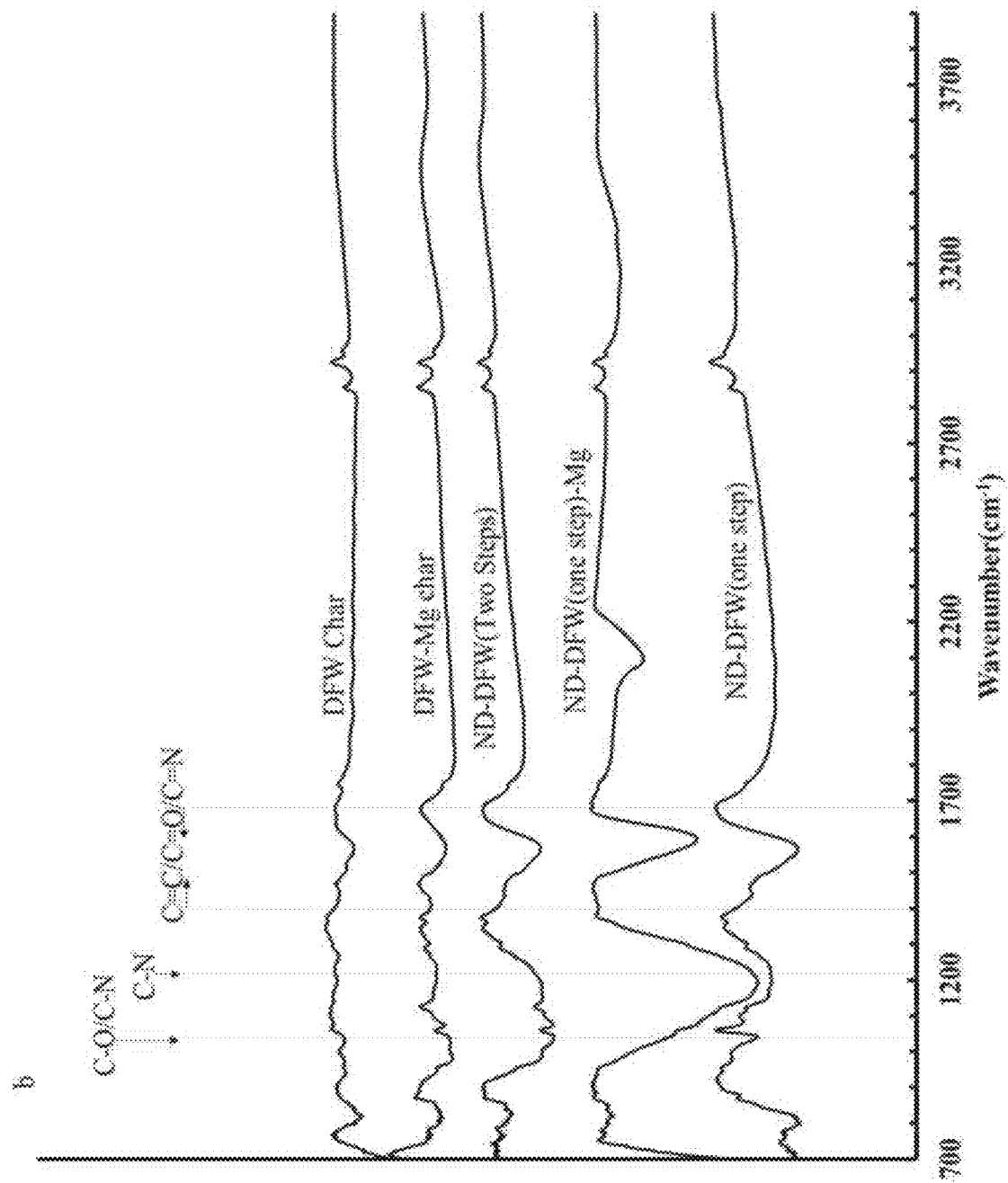
FIG. 27B shows FTIR spectra of DFW, ND-DFW (One Step) and ND-DFW (Two Steps), DFW-Mg and ND-DFW (One Step)-Mg cgrs.

FTIR was employed to analyze the presence of functional groups in ADF and DFW chars (FIGS. 27A-27B). The peak located at 1080 cm$^{-1}$ can be attributed to C—O/C—N stretching vibration. In the spectrum of ND-ADF (One step) char, the peak at 1220 cm-1 could be ascribed to C—N stretching, which was not observed in ADF char. Peaks between 1400 and 1680 cm$^{-1}$ could be attributed to C=C aromatic, C—O and C=N stretching. The char produced was doped with nitrogen and thus there is a high possibility of C=N formation. These functional groups contribute to changing the electronic environment of the char, thereby making it more effective for adsorption and catalytic processes.

Example 9

SEM and EDX Analyses of Adsorption Properties

Char morphology: Scanning electron microscope (SEM) imaging analysis was carried out using Tescan Vega3 instrument combined with energy dispersive spectroscopy (EDS). Chars were mounted on a stub and gold coated prior to analysis. SEM and EDS were used to examine the structure and surface characteristics of the char before and after adsorption.

pH: pH analysis was conducted by adding a 0.4 g of char sample to 20 mL deionized water. This was mixed with a mechanical shaker at 40 rpm for 1 h and equilibrated for 5 min before measuring the pH with a pH meter (Fisher Scientific Accumet basic AB15).

X-ray powder diffraction (XRD): The crystallography of chars was identified using X-ray diffraction (Miniflex benchtop X-ray diffractometer) with Cu K α radiation and operated at 40 kV, 15 mA, with 0.01 degree-steps and a scanning rate of 0.5° min$^{-1}$. The scan range of interest for this analysis was 10-100°. Match! software was applied for XRD peak identification.

Fourier Transform Infrared Spectroscopy (FTIR): FTIR analysis was conducted to identify the functional groups on the sample chars. FTIR spectra were obtained using a Shimadzu IRPrestige spectrometer equipped with MIRacle single reflection ATR Ge probe.

Figure 28A:
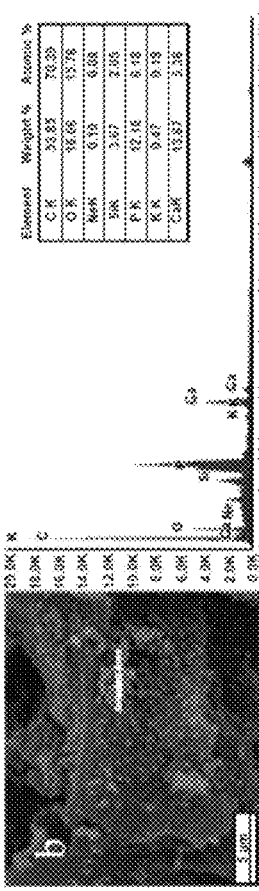
FIGS. 28A-28N show SEM images and EDS spectra.
Figure 28B:
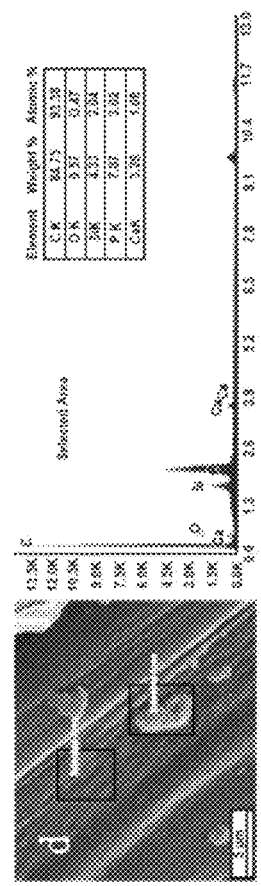
FIG. 28B: ND-ADF (One Step) char after phosphate adsorption.
Figure 28C:
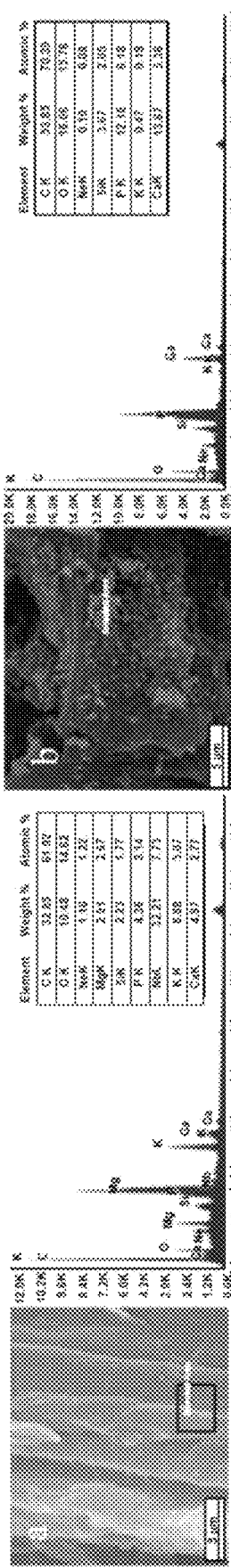
FIG. 28C: ND-WS (One Step) char before phosphate adsorption.
Figure 28D:
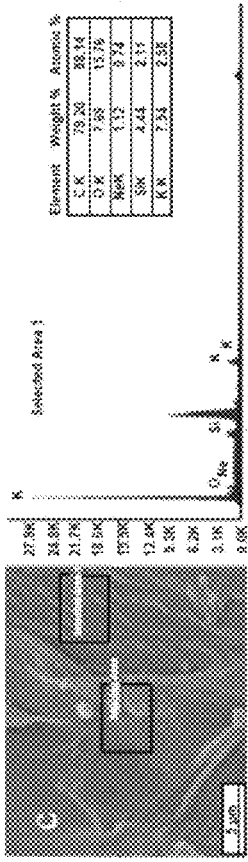
FIG. 28D: ND-WS (One Step) char after phosphate adsorption.
Figure 28F:
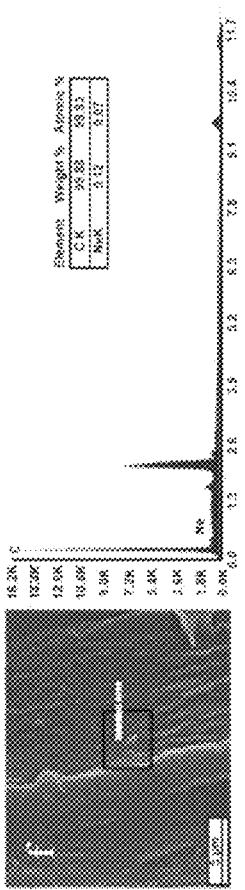
FIG. 28F: ND-DFW (One Step) char after phosphate adsorption.
Figure 28H:
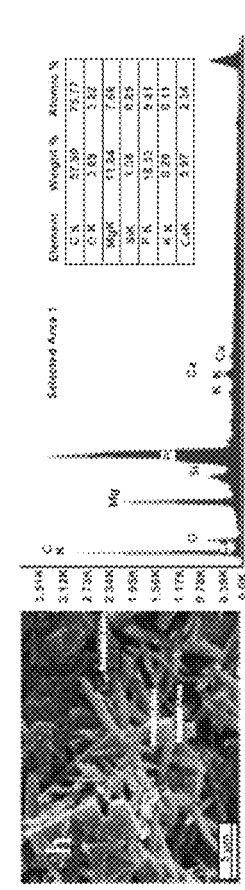
FIG. 28H: WS-Mg char after phosphate adsorption.
Figure 28E:
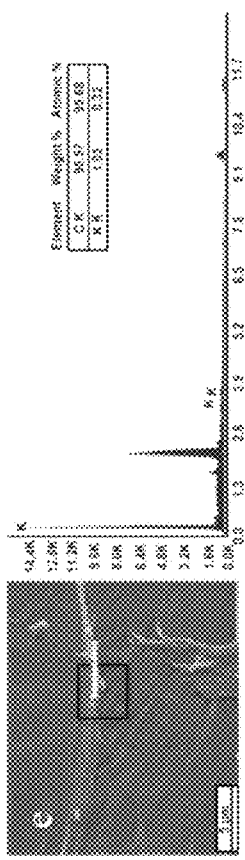
FIG. 28E: ND-DFW (One Step) char before phosphate adsorption.
Figure 28G:
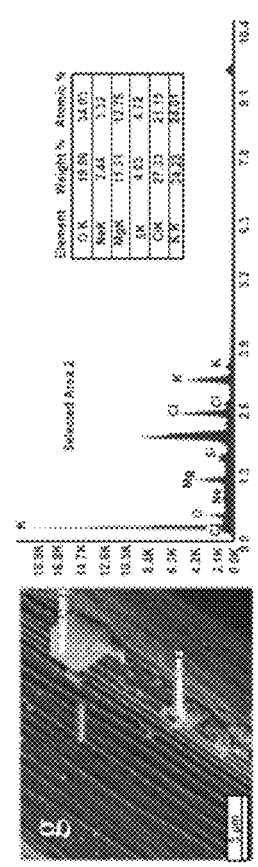
FIG. 28G: WS-Mg char before phosphate adsorption.
Figure 28J:
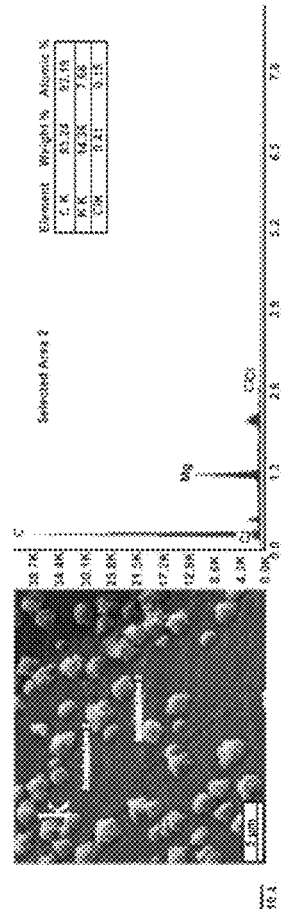
FIG. 28J: ND-WS (One Step)-Mg char after phosphate adsorption.
Figure 28L:
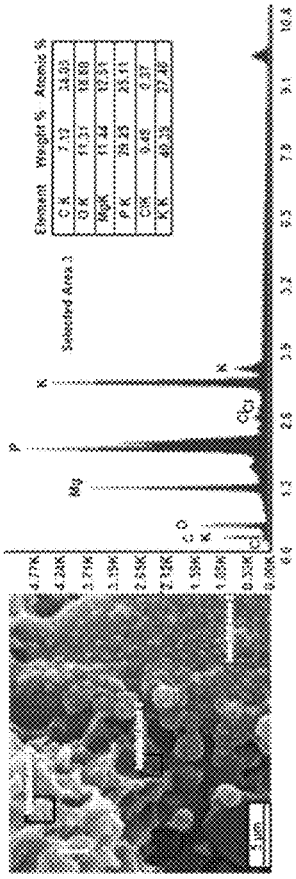
FIG. 28L: DFW-Mg char after phosphate adsorption.
Figure 28I:
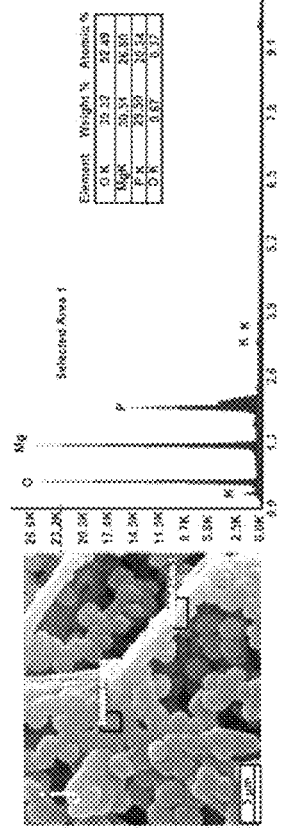
FIG. 28I: ND-WS (One Step)-Mg char before phosphate adsorption.
Figure 28K:
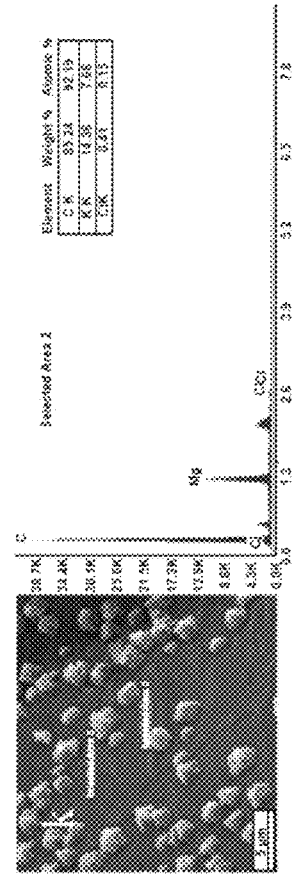
FIG. 28K: DFW-Mg char before phosphate adsorption.
Figure 28N:
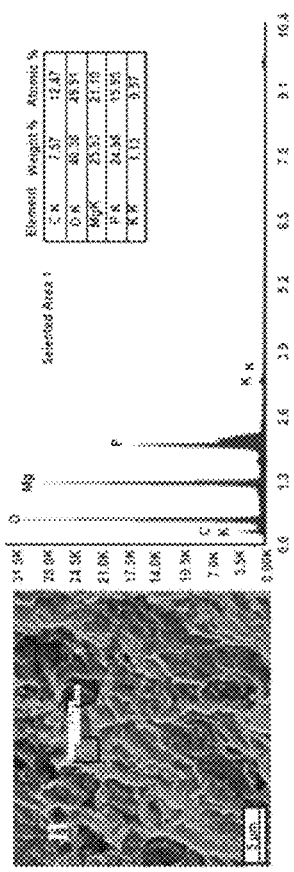
Figure 28M:
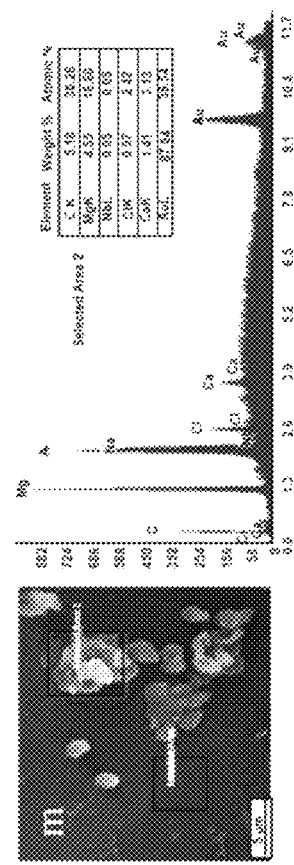
FIG. 28M: ND-DFW (One Step)-Mg char before phosphate adsorption.

SEM and EDX analyses were performed to evaluate the surface morphology of the chars before and after adsorption (FIGS. 28A-28N). Fine spherical clusters are dispersed on the surface of ND-ADF (One Step) char, which were not observed before adsorption. These clusters could be formed due to precipitation of phosphate with metals on the surface of the char. The EDS data showed peaks for Ca and Mg in ND-ADF (One Step) char before and after phosphate adsorption. The surface of the ND-WS (One Step) and ND-DFW (One Step) chars were relatively smooth before and after phosphate adsorption, and fine spherical clusters were rarely found on SEM images. SEM images were similar without significant observable difference before and after phosphate adsorption. The EDS data is in accordance with ICP-MS and adsorption isotherms. ND-ADF (One Step) char has high content of metals (e.g., Ca, Mg) compared to other chars. Thus, possible Ca—P or Mg-P precipitation can be formed.

Figure 29:
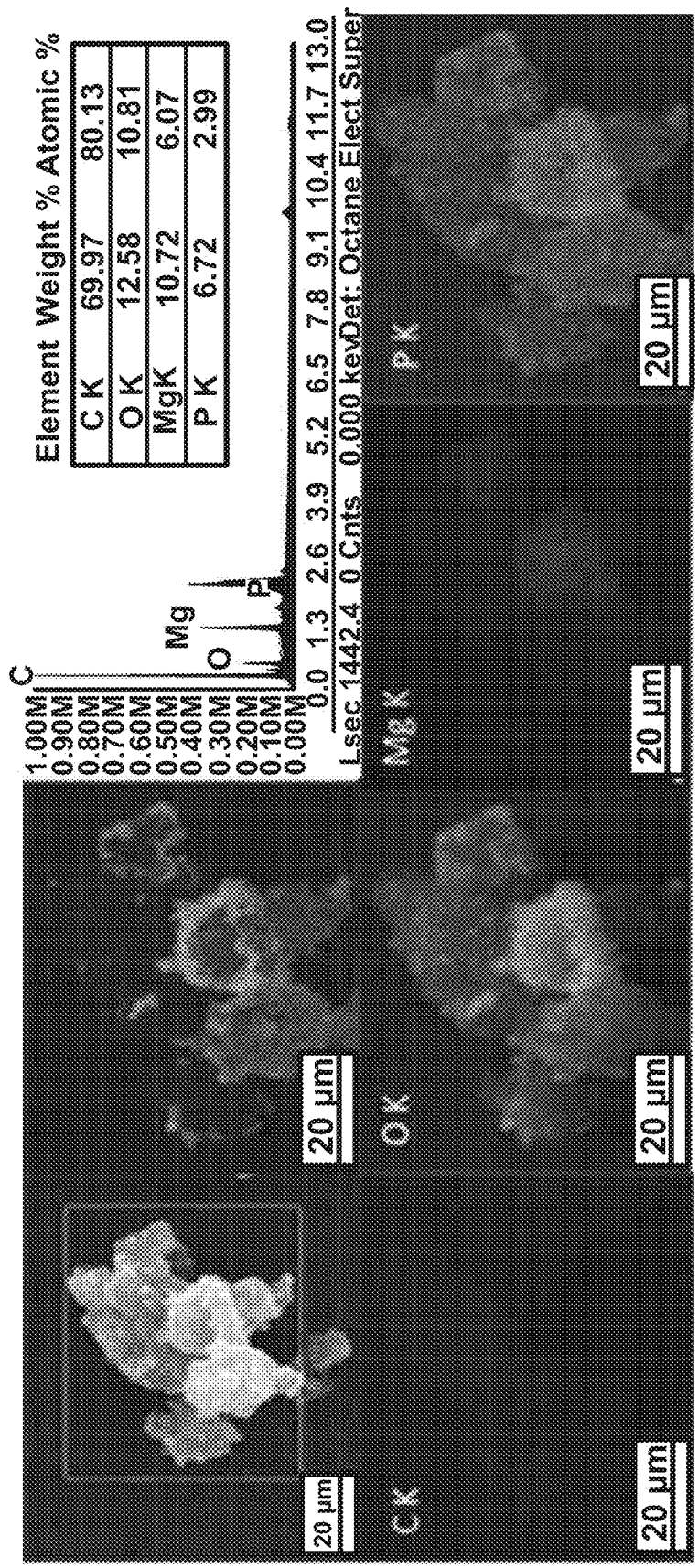
FIG. 29 shows EDS spectrum mapping of ND-DFW (One Step)-Mg char after adsorption.
Figure 30:
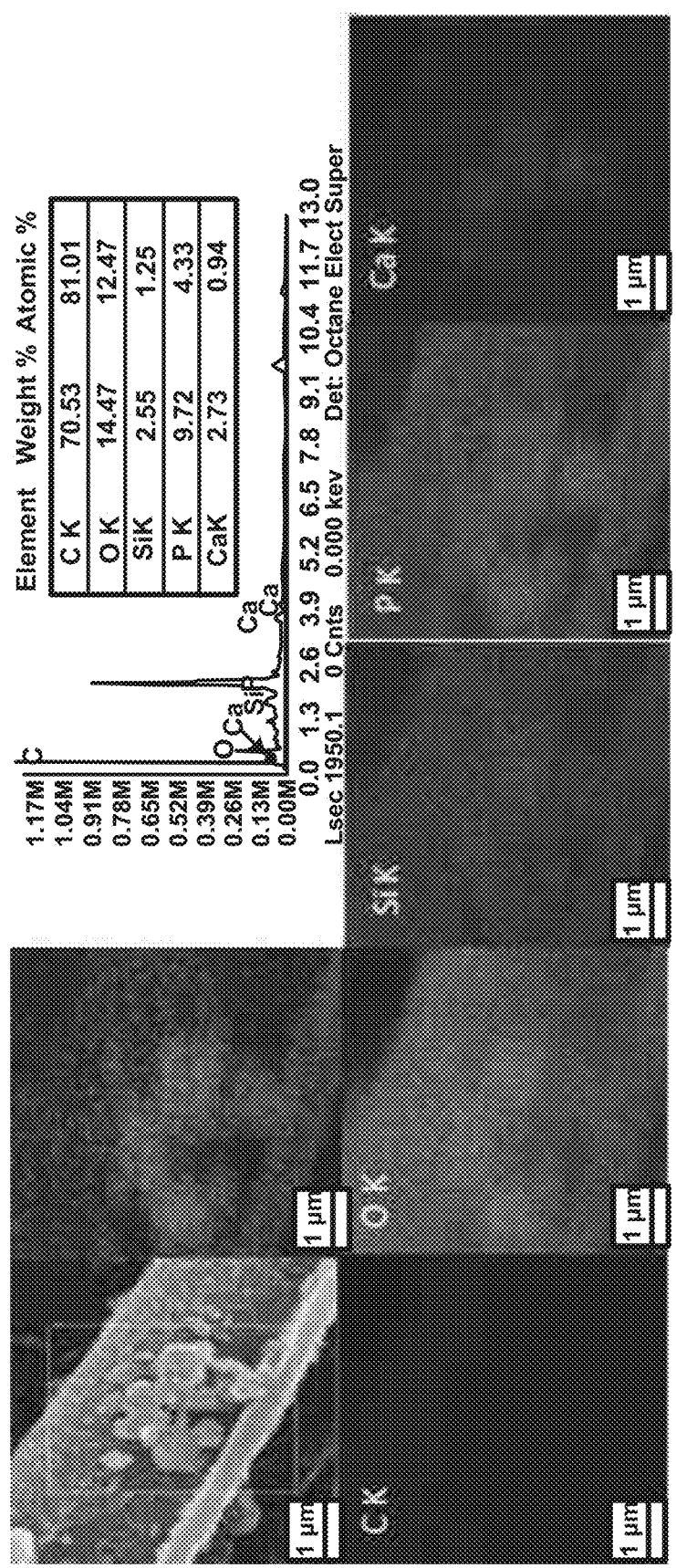
FIG. 30 shows EDS spectrum mapping of ND-ADF (One Step) char after adsorption.

The pH of solutions before and after adsorption were measured, and the initial pH of solutions before adsorption were between 5 to 5.7. After adsorption of phosphate on the surface of chars, the pH of solutions increased to a value between 10 and 10.8 for ND-ADF (One Step), 7.4 and 9.7 for ND-WS (One Step) and 6.1 and 7 for ND-DFW (One Step). The high pH solution of ND-ADF (One Step) could be attributed to formation of hydroxides of Ca, K, and Mg on the surface of char. Phosphate precipitation typically takes place in alkaline conditions. Therefore, increasing pH with the presence of Ca, Mg, Fe and Al in the ash will result in $PO_4^{3-}$ precipitation. The most important metals for precipitation, which were reported in previous studies, are Fe, Mg, Ca and Al. Calcium and magnesium can react with phosphate and form Ca—P and Mg-P crystals, including: $Ca_5(PO_4)_3$ (OH), brushite ($CaHPO_4 \cdot 2H_2O$), $Mg_3(PO_4)_2$, $MgHPO_4$, and $Mg(H_2PO_4)_2$. As shown in FIGS. 28A-28N, Mg and O were distributed in the form of nano flakes on the ND-DFW (One Step)-Mg, ND-WS (One Step)-Mg, DFW-Mg and WS-Mg chars surface. This nano-flake presence could be a result of formation of magnesium oxide on the surface of the chars. After adsorption of phosphate, spherical clusters are dispersed on the surface, which were not observed in ND-DFW (One Step) and ND-WS (One Step) char. EDS mapping was used to analyze the elemental composition distribution on ND-ADF (One Step) and ND-DFW (One Step)-Mg char after phosphate adsorption (FIGS. 29 and 30). EDS mapping shows Mg in ND-DFW (One Step)-Mg char dispersed throughout the char surface.

Figure 31A:
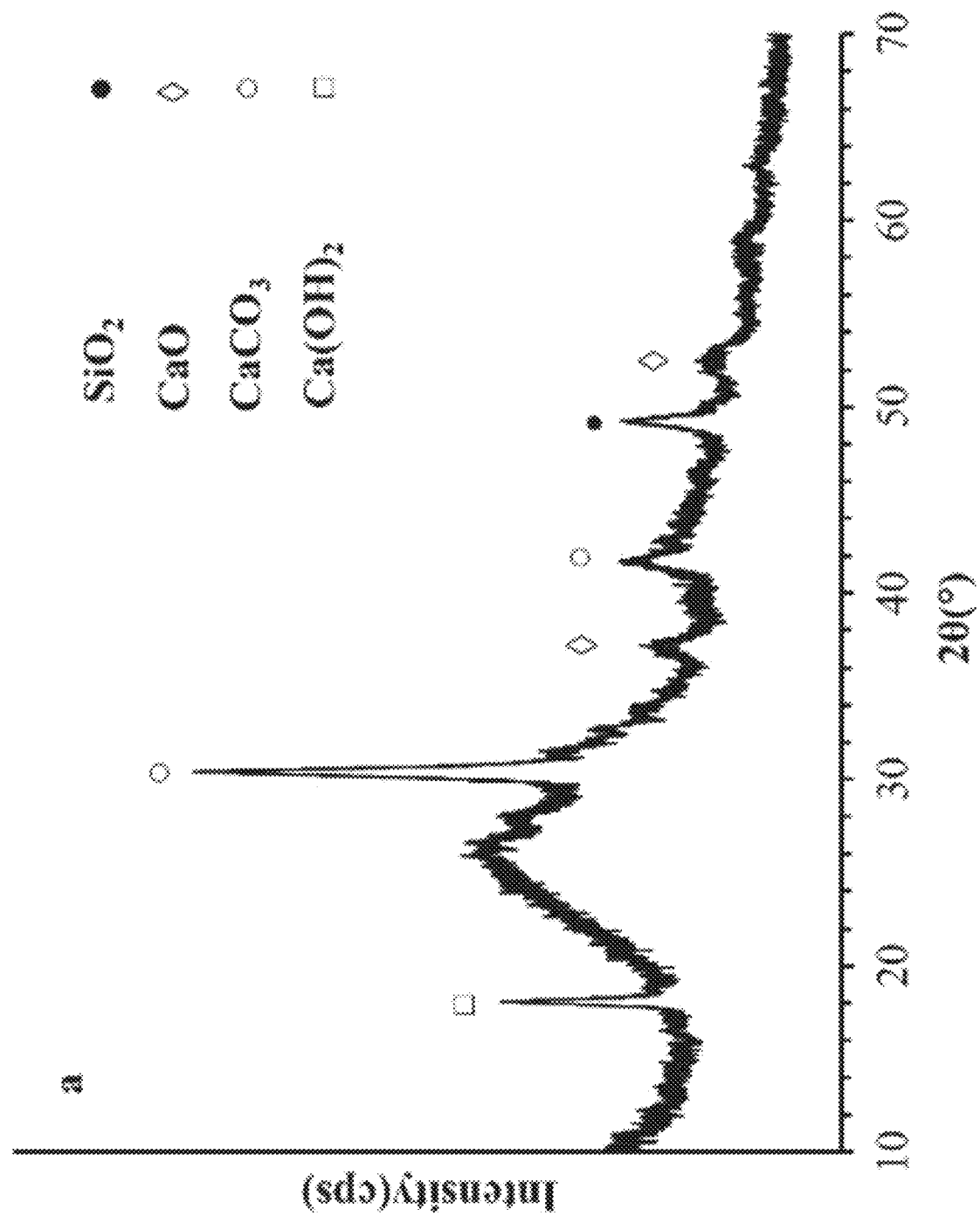
Figure 31B:
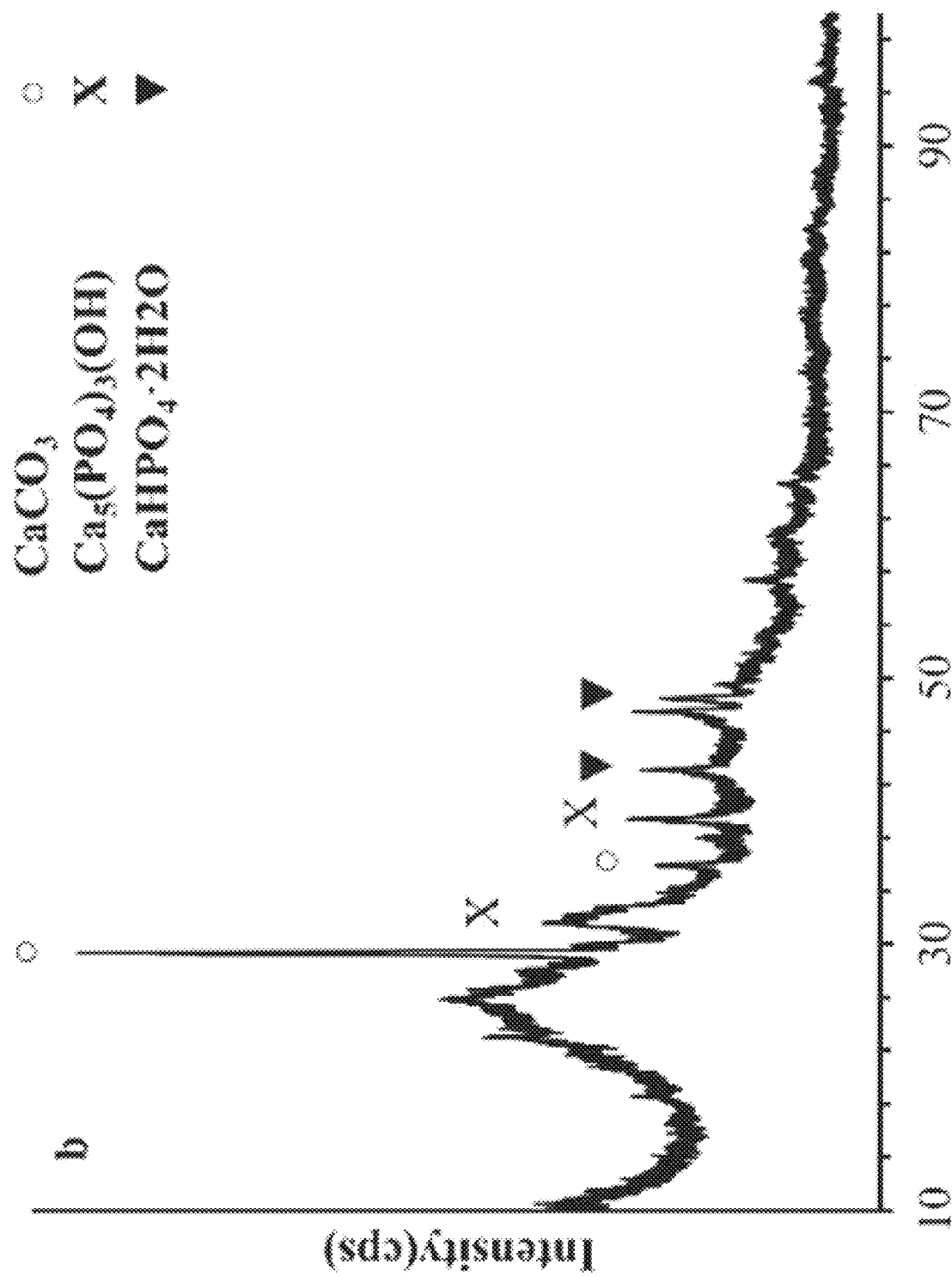
Figure 31C:
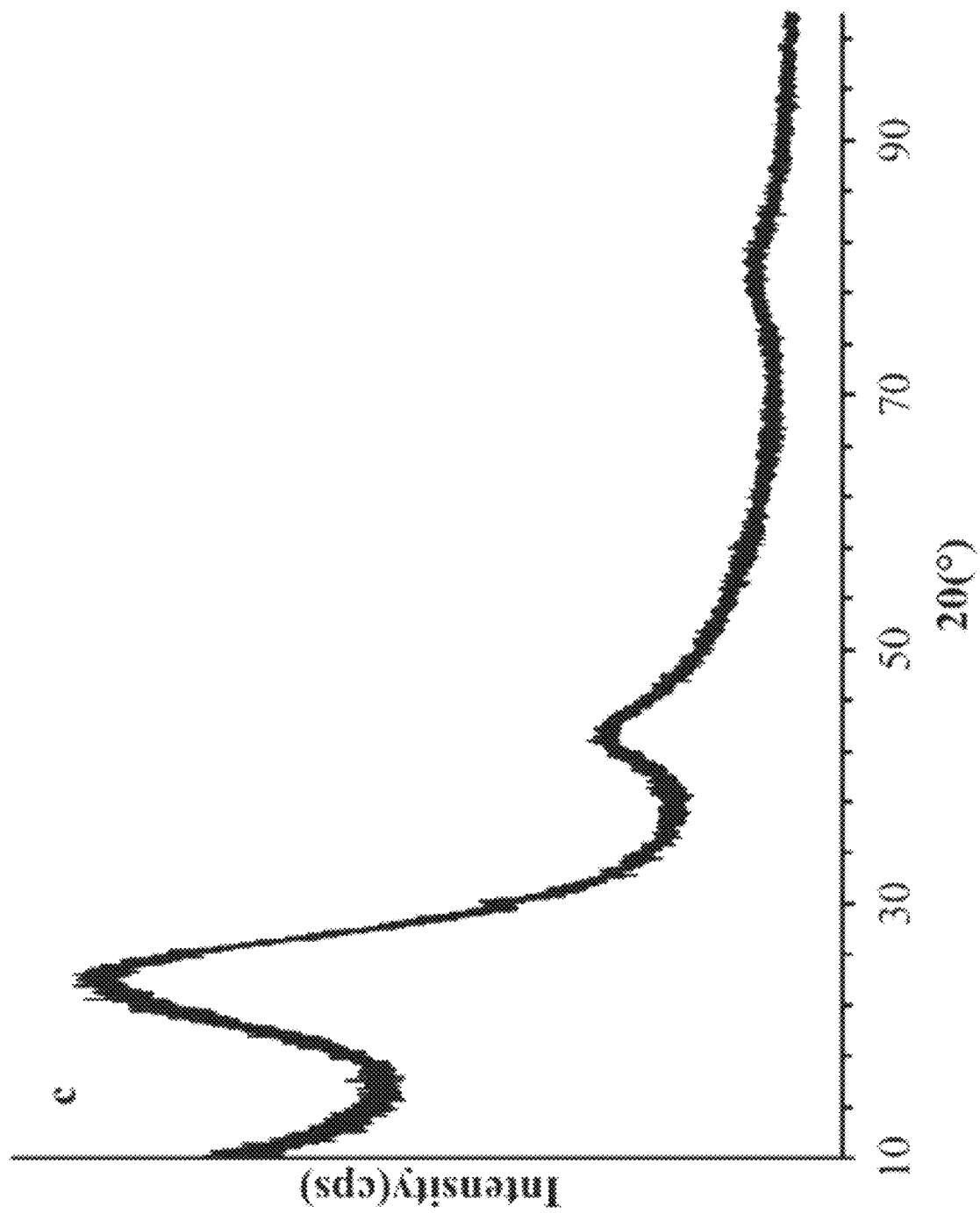
Figure 31D:
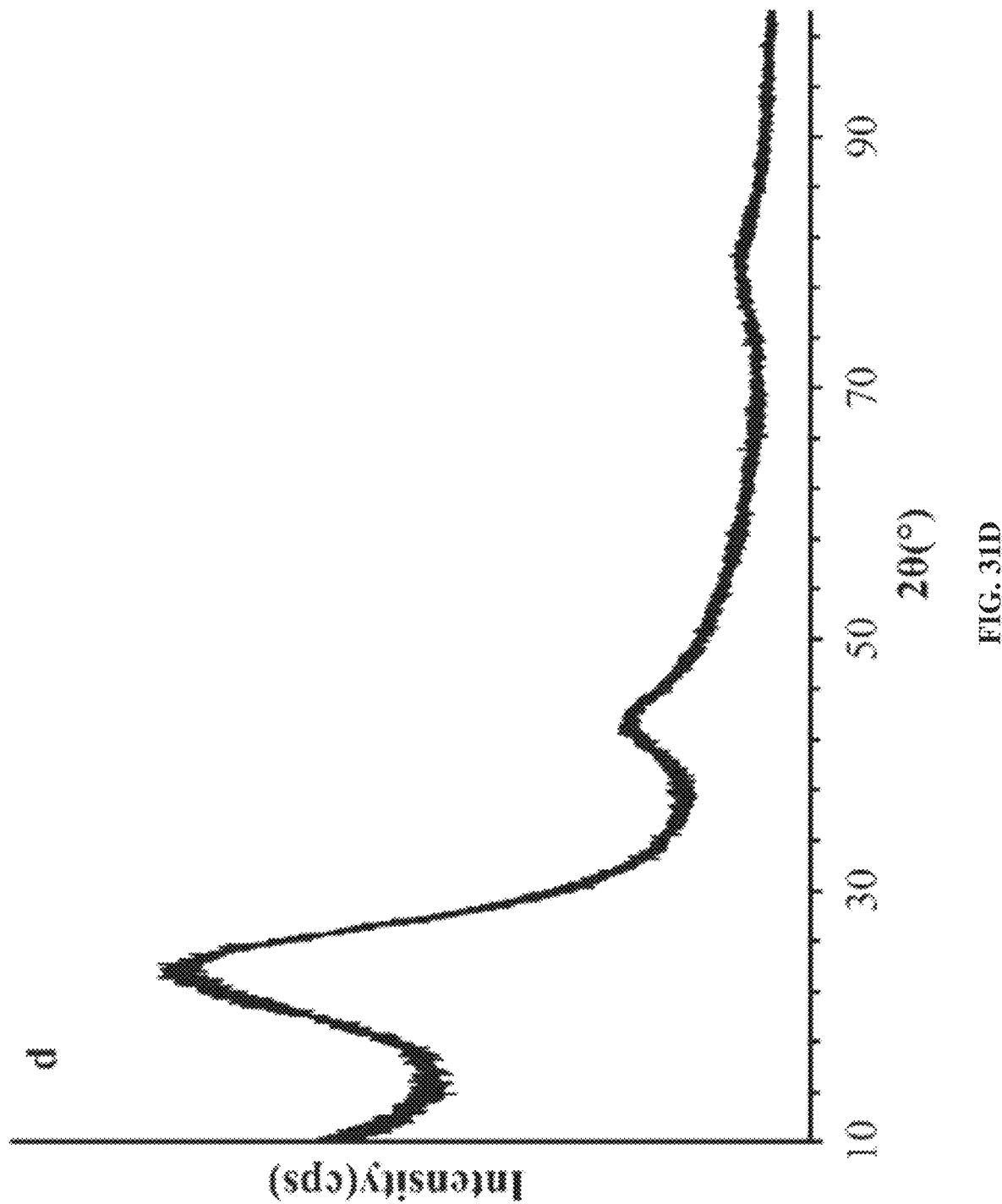
Figure 31E:
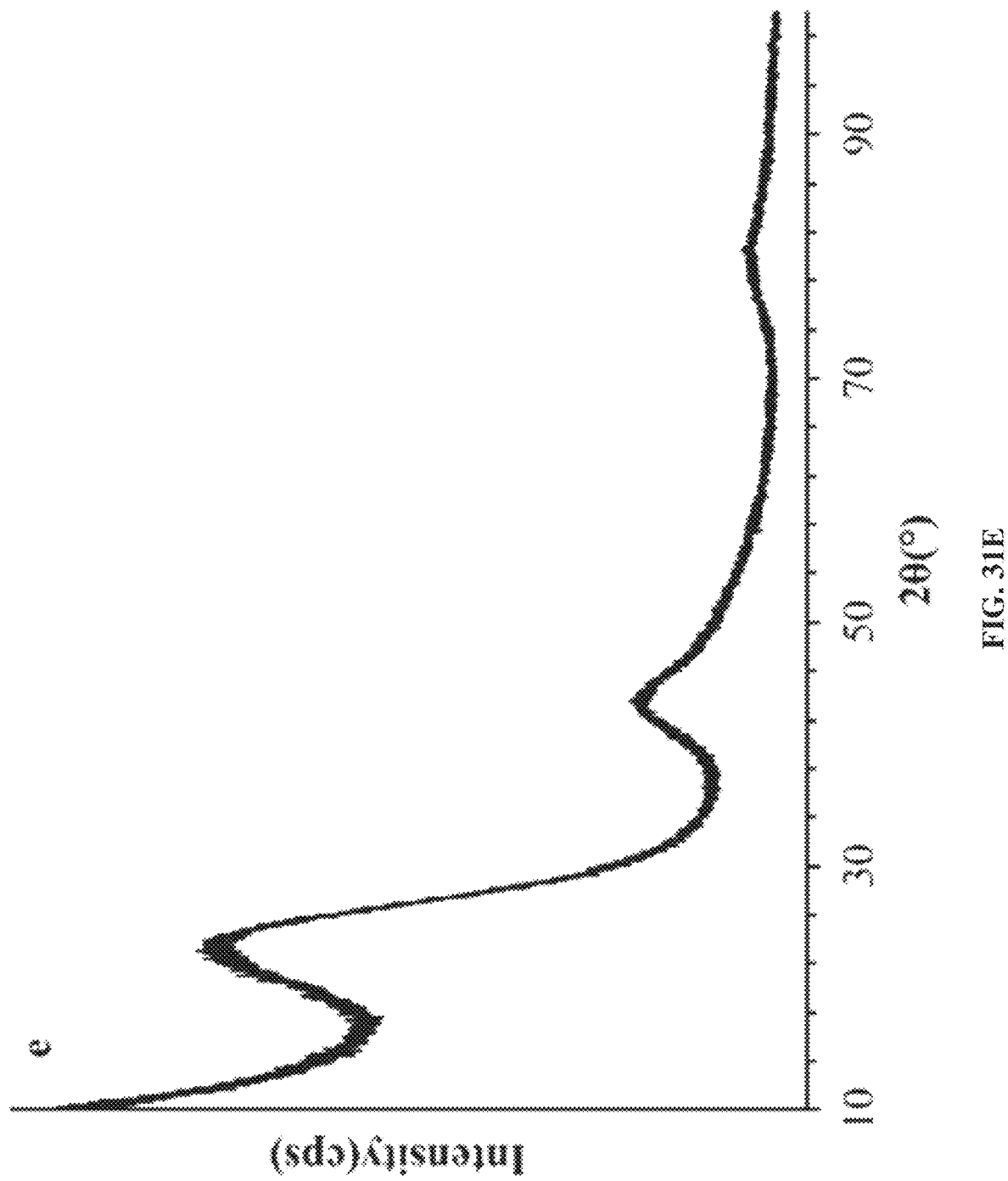
Figure 31F:
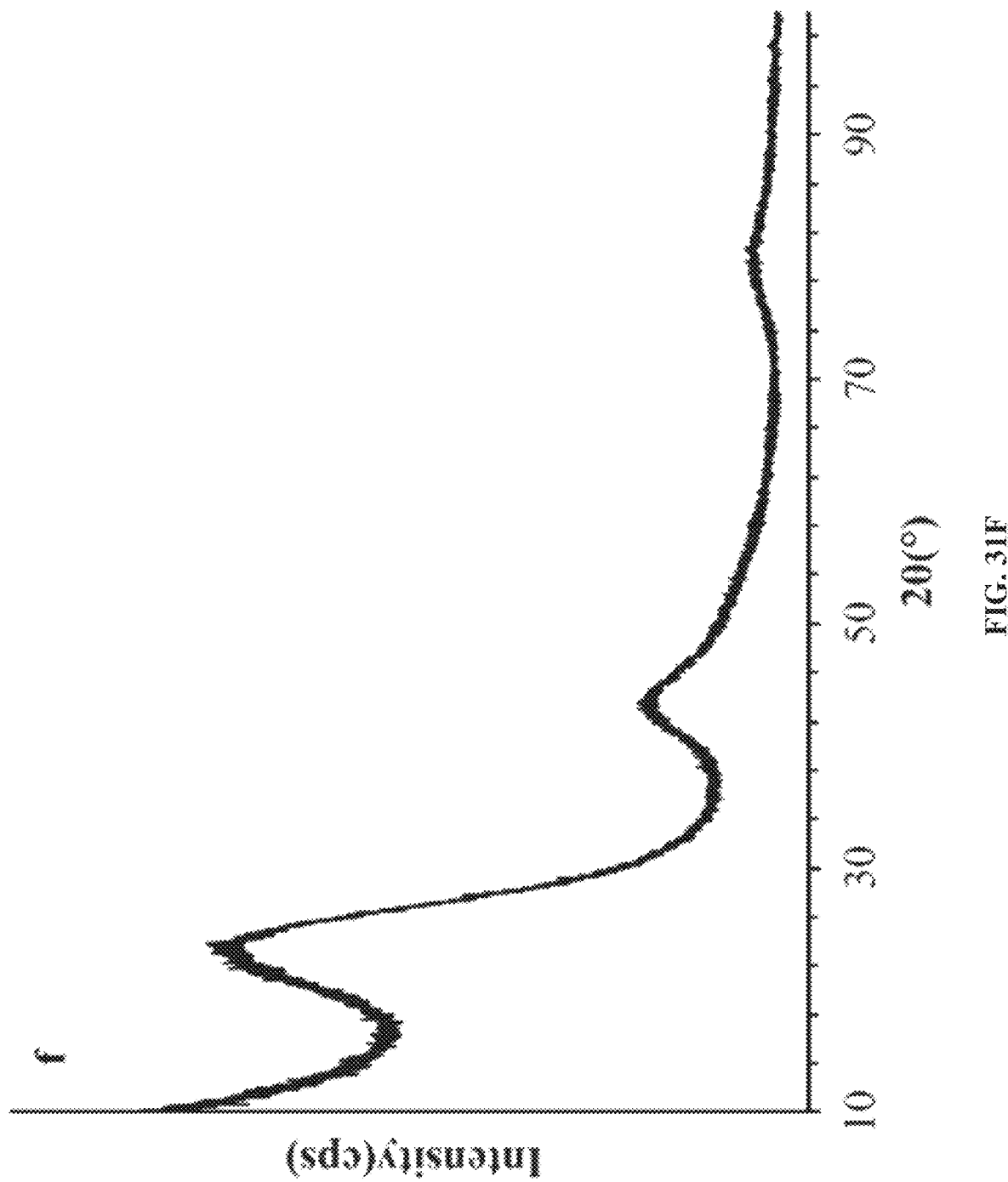
Figure 31G:
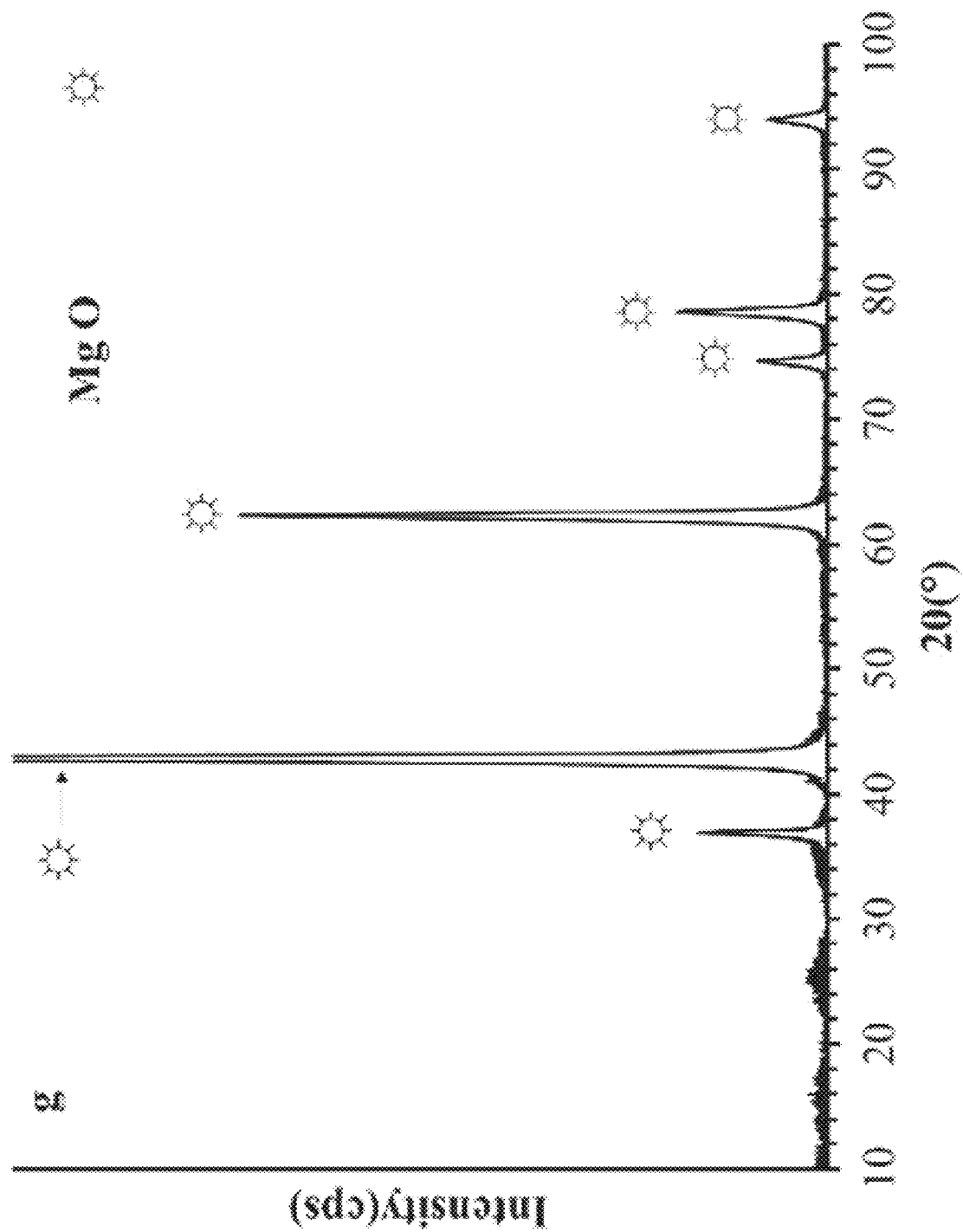
Figure 31H:
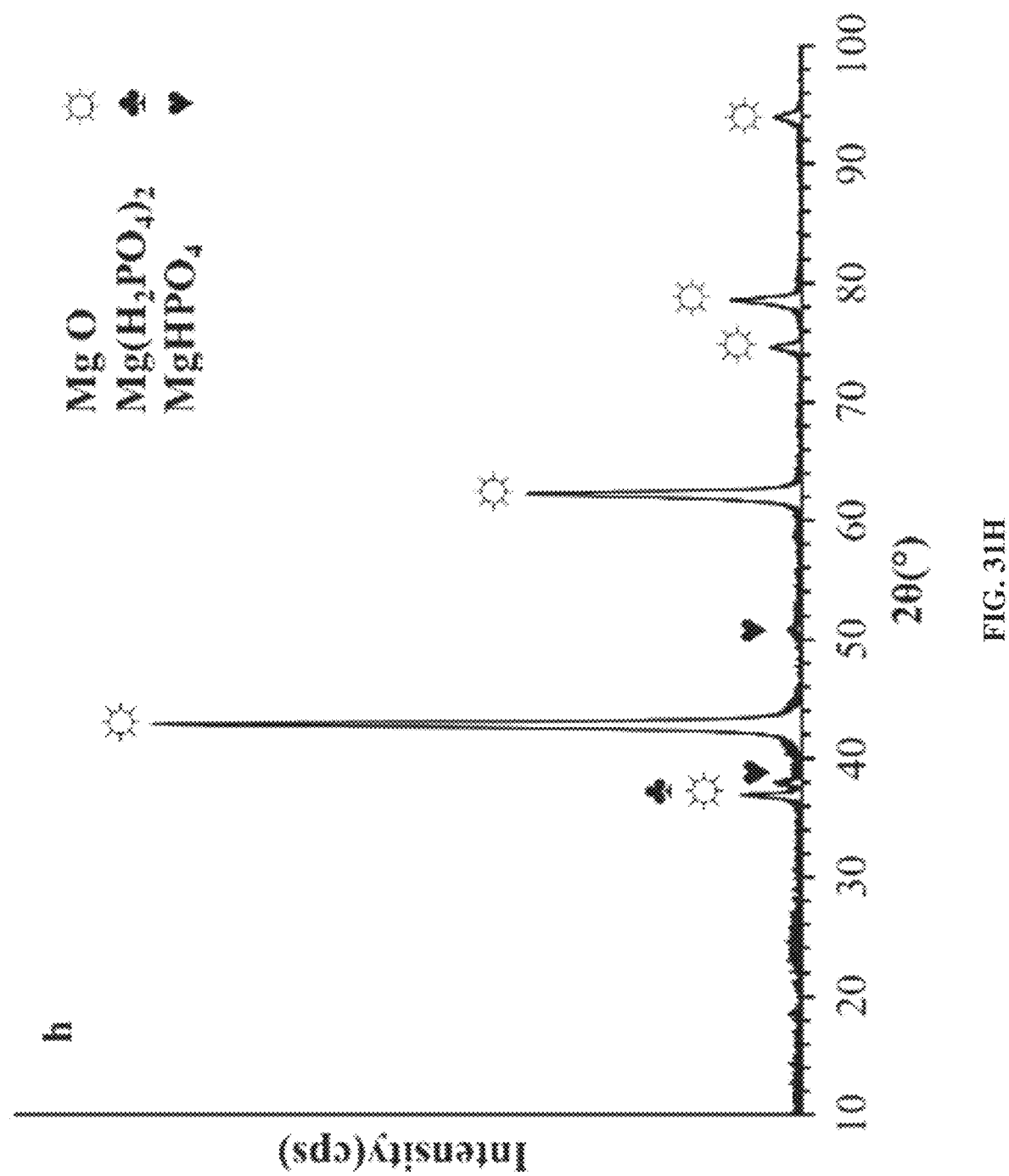
Figure 31I:
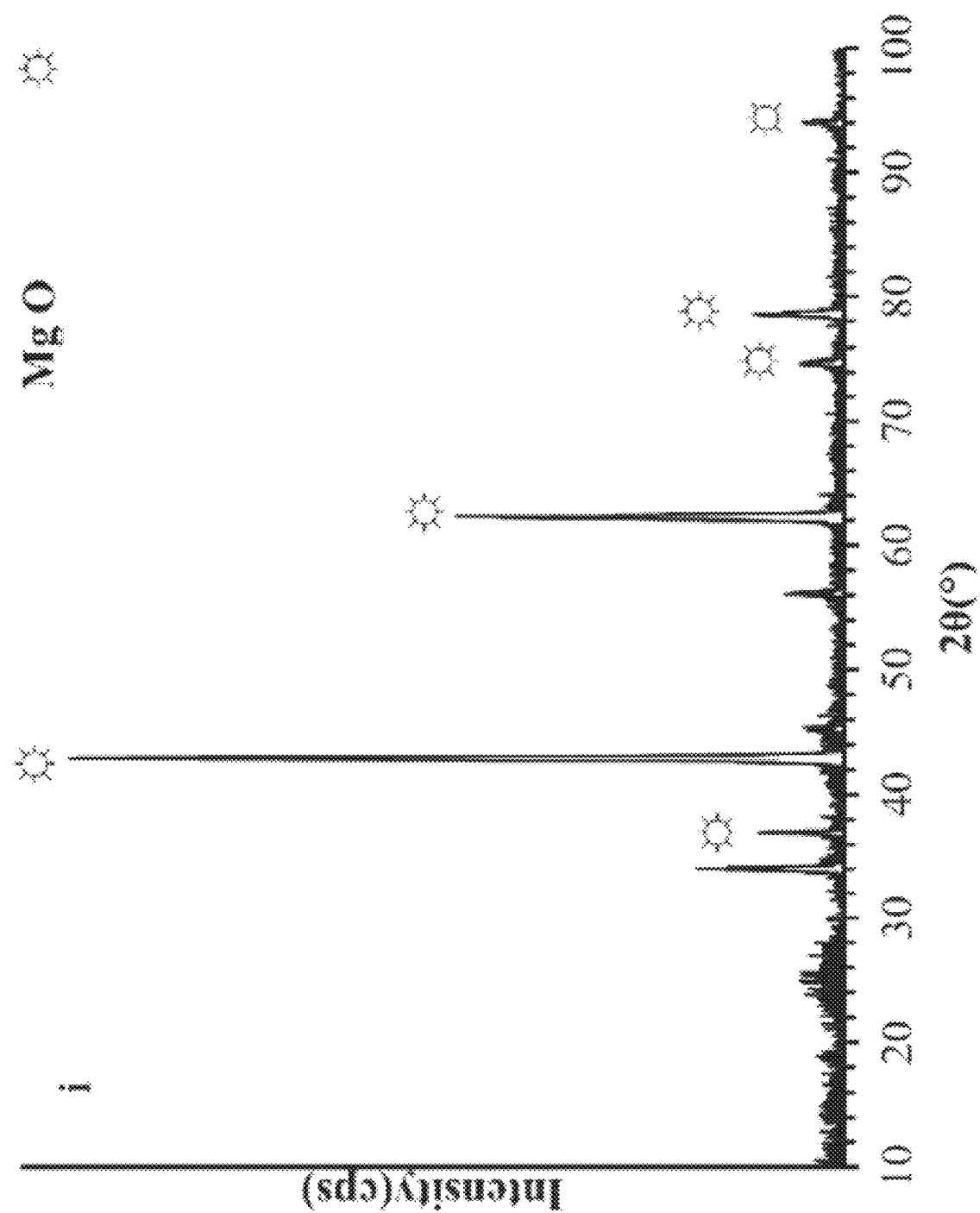
Figure 3L:
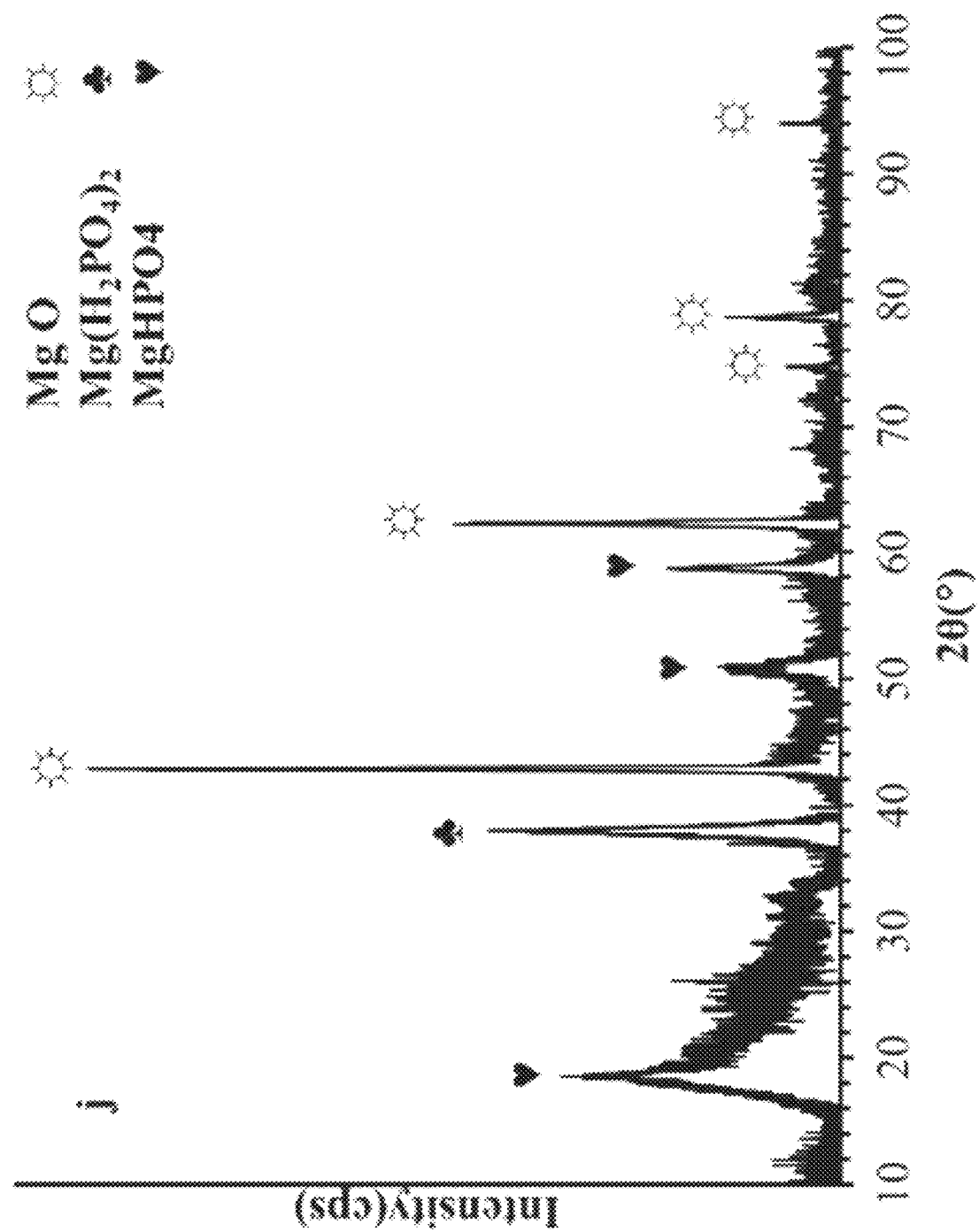

FIGS. 31A-31J show the results of X-ray diffraction (XRD) analysis of the ND-ADF (One Step), ND-WS (One Step), ND-DFW (One Step), DFW-Mg and ND-DFW (One Step)-Mg chars before and after phosphate adsorption. The main phase presented in ND-ADF (One Step) samples before phosphate adsorption was calcium carbonate ($CaCO_3$) (FIGS. 31A-31B). The broad feature at approximately 2θ=24° can be ascribed to the presence of the amorphous carbon structure, which could be due to the activation process under $NH_3$. High pyrolysis temperature typically causes a higher degree of graphitization under an inert gas environment; however, ammonia gas at high temperature has an opposite effect.

After the phosphate adsorption, diffraction patterns at $2\theta=18.1$ and $2\theta=37.4$, assigned to $Ca(OH)_2$ and CaO, no longer appeared. New peaks emerged, which could correspond to Hydroxyapatite ($Ca_5(PO_4)_3(OH)$) and brushite, also known as calcium hydrogen phosphate dihydrate ($CaHPO_4 \cdot 2H_2O$). Hydroxyapatite is thermodynamically stable in a neutral and alkaline environment. During adsorption, $Ca(OH)_2$ and CaO on the surface of the char could react with $PO_4^{3-}$ in the P solution forming Ca—P crystals. Two broad peaks were observed at $2\theta=24°$ and $2\theta=44°$ in the XRD pattern of ND-WS (One Step) and ND-DF (One Step), before and after phosphate adsorption (shown in FIGS. 31C-31F), which were assigned to (002) and (100) diffractions of amorphous carbon, respectively. The XRD pattern of ND-WS and ND-DFW before and after phosphate adsorption are similar and any peaks showing formation of Ca—P or Mg-P do not emerge. The main phase presented in DFW-Mg and ND-DFW (One Step)-Mg Chars is MgO. MgO could be formed as a result of decomposition of $MgCl_2$ at high temperature (equations 3.9-3.11).

$$MgCl_2 \cdot 6H_2O \rightarrow MgCl_2 \cdot 2H_2O + 4H_2O\uparrow \quad (3.9)$$

$$MgCl_2 \cdot 2H_2O \rightarrow (MgOH)Cl + H_2O\uparrow + HCl\uparrow \quad (3.10)$$

$$(MgOH)Cl \rightarrow MgO + HCl\uparrow \quad (3.11)$$

Several peaks appeared in ND-DFW (One Step)-Mg chars that were not observed in DFW-Mg char before adsorption. Thus, these peaks emerged as a result of nitrogen doping. After adsorption, new crystals were formed ($MgHPO_4$ and $Mg(H_2PO_4)_2$) indicating precipitation of magnesium oxide and phosphate. Furthermore, with the presence of metallic oxides (e.g., CaO and MgO), phosphate could form as surface depositions through hydrogen bonds.

Example 10

Preparation of N-Metal Doped Biochars

In the instant example, cellulose was pyrolyzed in the presence of ammonia at different temperatures (500, 600, 700, 800, 850 and 900° C.). A solution of 5 wt. % Mg, Ca and Fe was prepared and later mixed with powdered cellulose. A one-step carbonization process was carried out under ammonia. The resulting biochar doped with nitrogen and metals was then characterized.

Figure 32A:
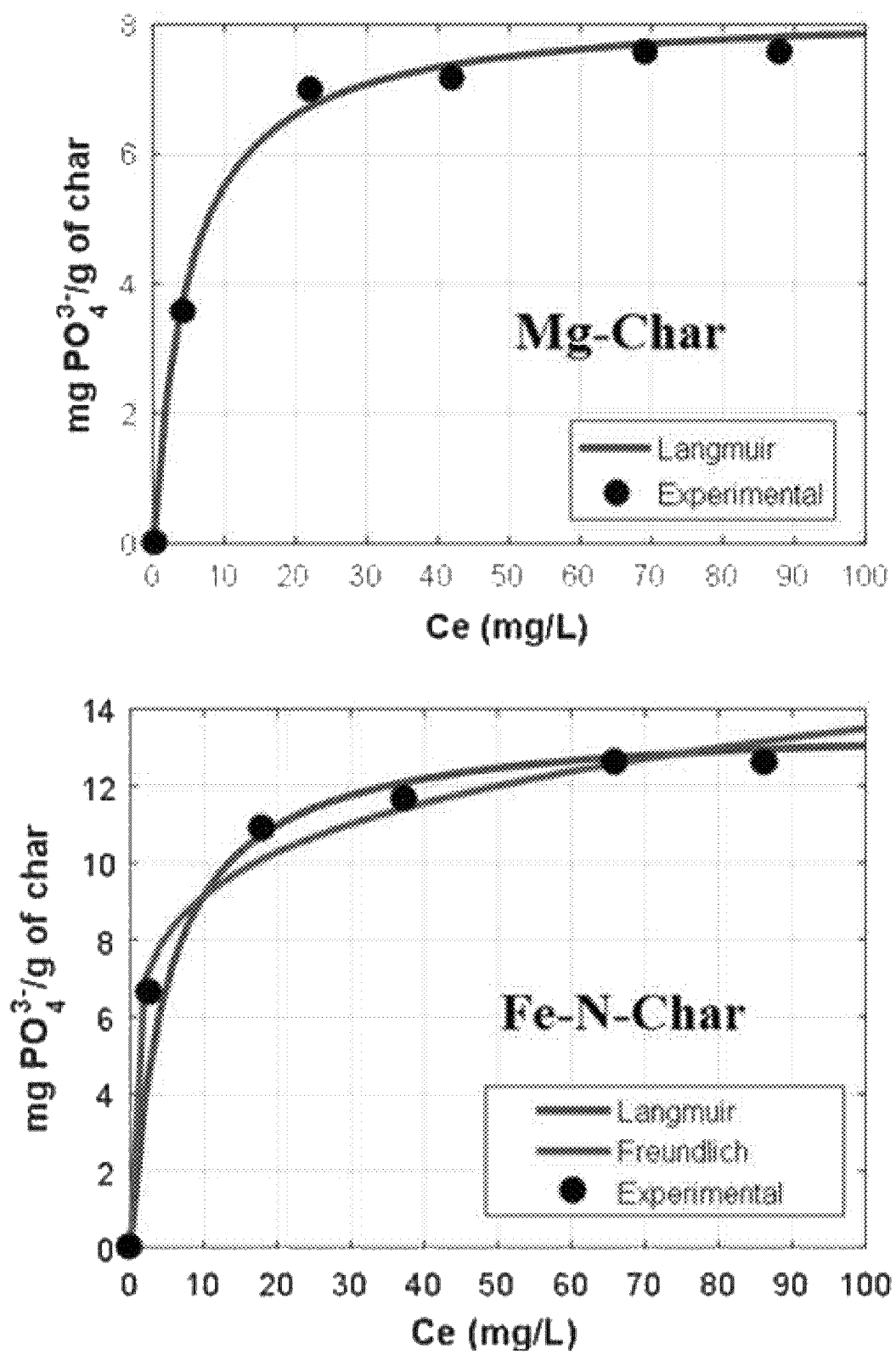
Figure 32C:
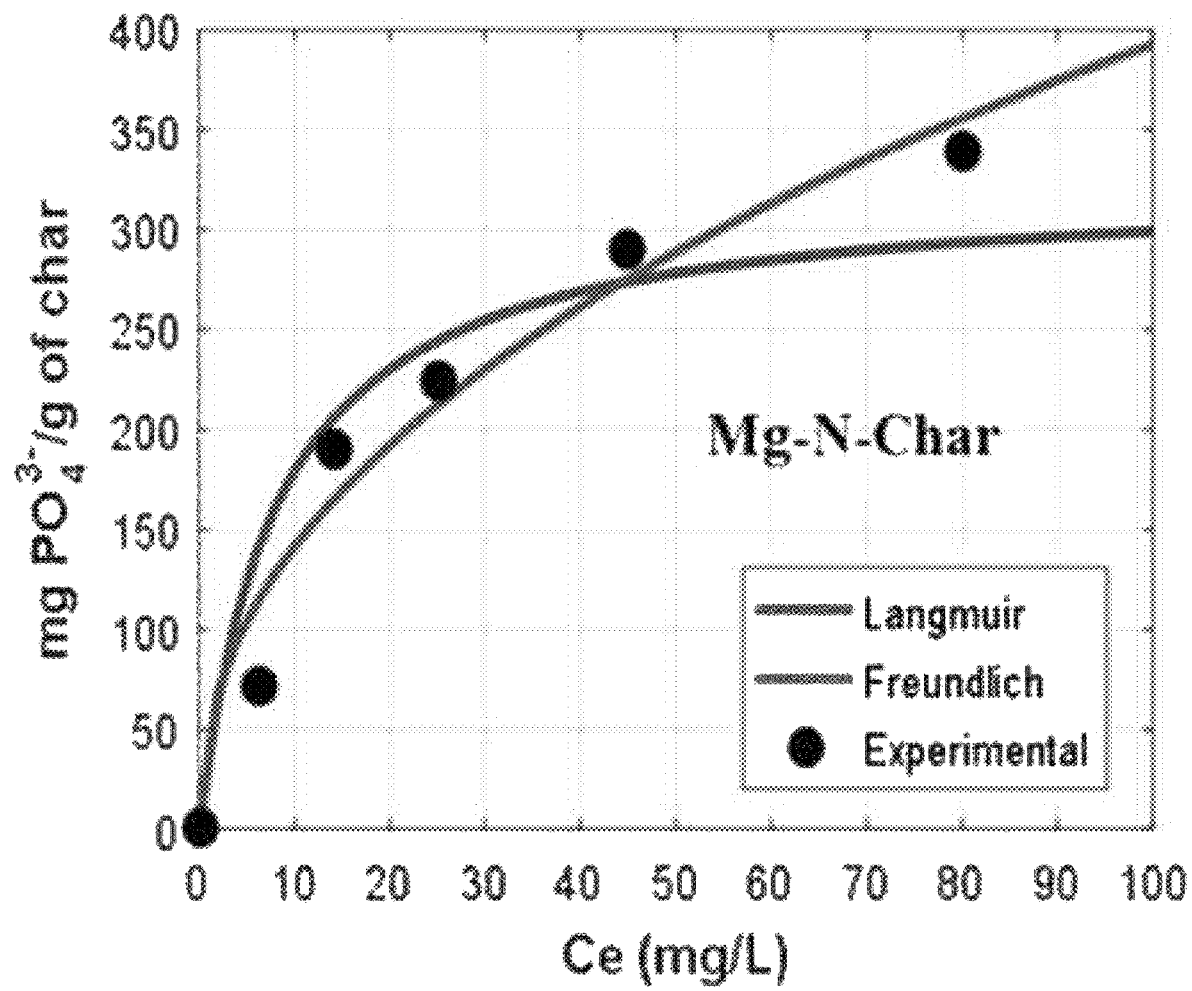

The bio-chars containing metals and nitrogen were tested for phosphate adsorption capacity. FIG. 32 shows the adsorption isotherms obtained from each of them. The results demonstrate that N-Mg and N—Ca doped biochar had excellent phosphate adsorption capacity (335 mg $g^{-1}$ mg $g^{-1}$ and 100 mg $g^{-1}$, respectively). However, N—Fe-doped biochar had poor capacity for adsorption of phosphate ions. Interestingly, biochars with N or Mg alone did not have nearly the phosphate adsorption capacity of the Mg-N-doped biochars, demonstrating an unexpected, synergistic effect between metals (specifically, Mg and Ca) and N on the phosphate removal.

Phosphate Adsorption Analysis

In the instant example, adsorption isotherms of phosphate on the biochar were determined by mixing 0.03 g of biochar with 45 mL of phosphate solutions of different concentrations ranging from 10 to 100 mg·$L^{-1}$ in the 50 mL tubes. Phosphate solutions were prepared by dissolving potassium phosphate monobasic ($KH_2PO_4$, Fisher Scientific) in deionized water. The tubes were shaken in a mechanical shaker for 24 hours at 25° C. temperature to reach adsorption equilibrium. The samples were then withdrawn and filtered through a 0.45 μm filter to determine adsorbed phosphate concentrations.

The pH of the resulting solutions was measured with a pH meter (Mettler Toledo, SevenEasy S20) before and after phosphate sorption. Phosphate adsorptions were calculated on the basis of the initial and final aqueous concentrations, which were determined by a molybdovanadate method using the acid persulfate digestion method (1.0 to 100 $mgL^{-1}$) (Hach, 2014). The results obtained were then fitted to the two most common adsorption isotherm models (Langmuir and Freundlich). The least square method was used for the fitting process and statistical parameters (such as $R^2$) were calculated.

SEM: Scanning electron micrographs of all chars were collected using an Apreo VolumeScope™ equipped with a field emission gun electron source. All samples were prepared by coating with 3 nm of gold to enhance resolution using a Cressiongton Hi-Res Sputter Coater. The images were collected under vacuum with a chamber pressure below 10 mPa. The accelerating voltage was set at 30 kV for all samples.

X-Ray Photoelectron Spectroscopy: Analysis using XPS was performed using an AXIS-165 upgraded to an Ultra manufactured by Kratos Analytical Inc. Achromatic X-ray radiation of 1253.6 eV (MgKα) was used to analyze each material. All high-resolution spectra were recorded using a pass energy of 40 eV and spot size of approximately 120 μm. The spectrometer was calibrated against both the Au $4f_{7/2}$ peak at 84.0 eV and the Ag $3d_{5/2}$ peak at 368.3 eV. The minimum full width at half maximum (FWHM) for the Au $4f_{7/2}$ peak is approximately 0.85 eV, representing the absolute minimum possible broadness achievable for this configuration. Survey scans have been obtained using a pass energy of 80 eV and step sizes of 1 eV to determine the overall chemical composition of each sample. To determine the speciation of carbon, nitrogen and oxygen groups, high resolution scans of the C 1s, N 1s, O 1s and Mg 2p, Ca 2p and F 2p regions (280-295, 394-404, 527-538 eV, 45-60 eV, 340-365 eV, and 700-740 eV respectively) were collected for each material using 0.1 eV step sizes.

The fitting of the experimental results to the two most common adsorption isotherm models was done using the least square method. Table 16 presents the statistical parameters obtained in the fitting.

TABLE 16

Isotherm parameter of phosphate adsorption and deduced parameters from Langmuir and Freundlich models.

| | Experimental | Langmuir | | | Freundlich | | |
|---|---|---|---|---|---|---|---|
| | $Q_{max}$ | $Q_{max}$ | | | | | |
| Samples | (mg/g) | (mg/g) | $K_L$ | $R^2$ | $K_F$ | 1/n | $R^2$ |
| N-Char | 10 | 21.4 | — | — | 0.58 | 0.63 | — |
| Mg-Char | 7.8 | 7.8 | 0.5 | 0.998 | — | — | — |
| N-Fe-Char | 11.7 | 11.7 | 0.23 | 0.996 | 6.2 | 0.17 | 0.996 |
| N-Ca-Char | 100 | 178 | 0.10 | 0.940 | 50.70 | 0.21 | 0.946 |
| N-Mg-Char | 335 | 436.9 | 0.01 | 0.938 | 65.2 | 0.56 | 0.986 |

Figure 33:
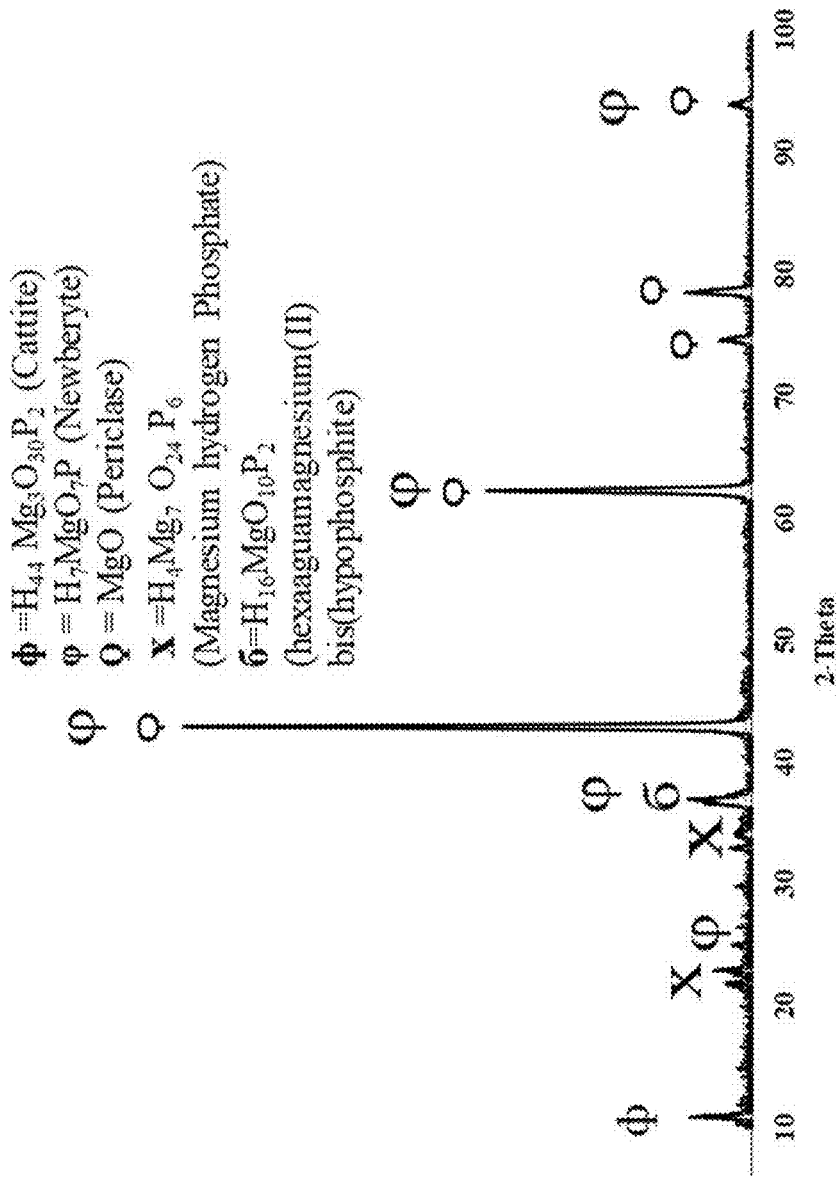
FIG. 33 shows XRD of the N-Mg-Char after phosphate retention.
Figure 34A:
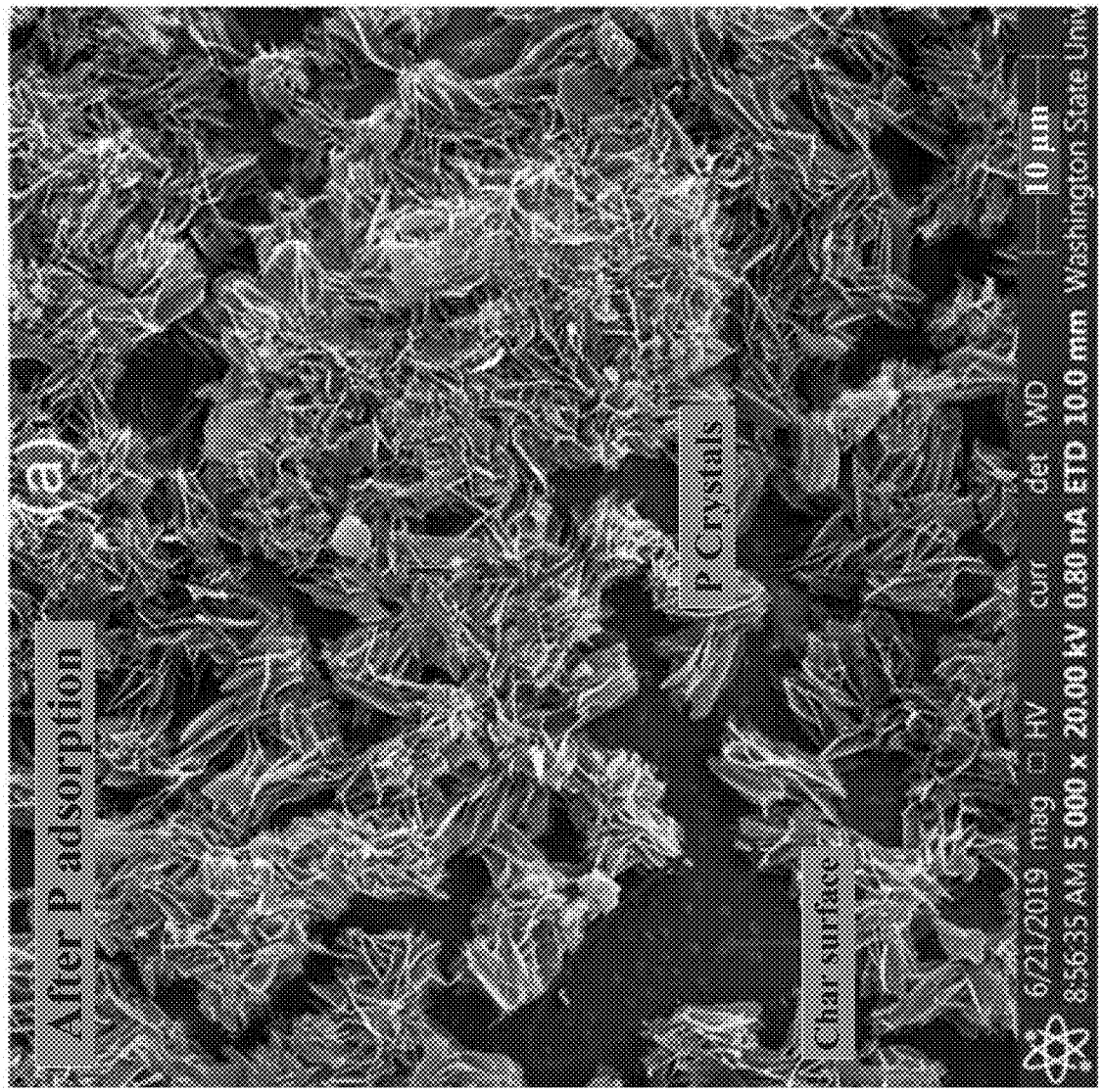
FIGS. 34A-34E show N-Mg-Char (biochar with magnesium and nitrogen doped).
Figure 34B:
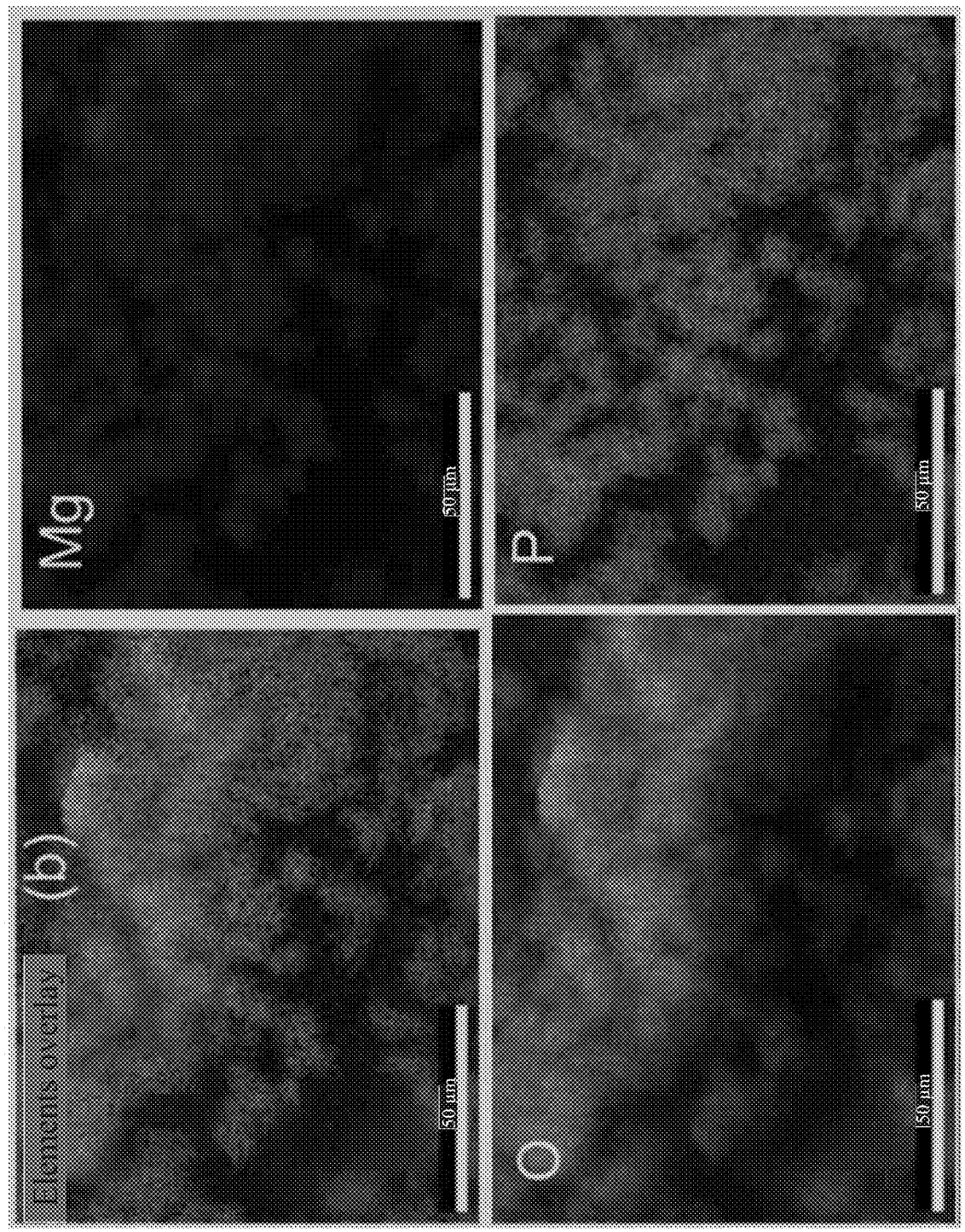
Figure 34C:
Figure 34D:
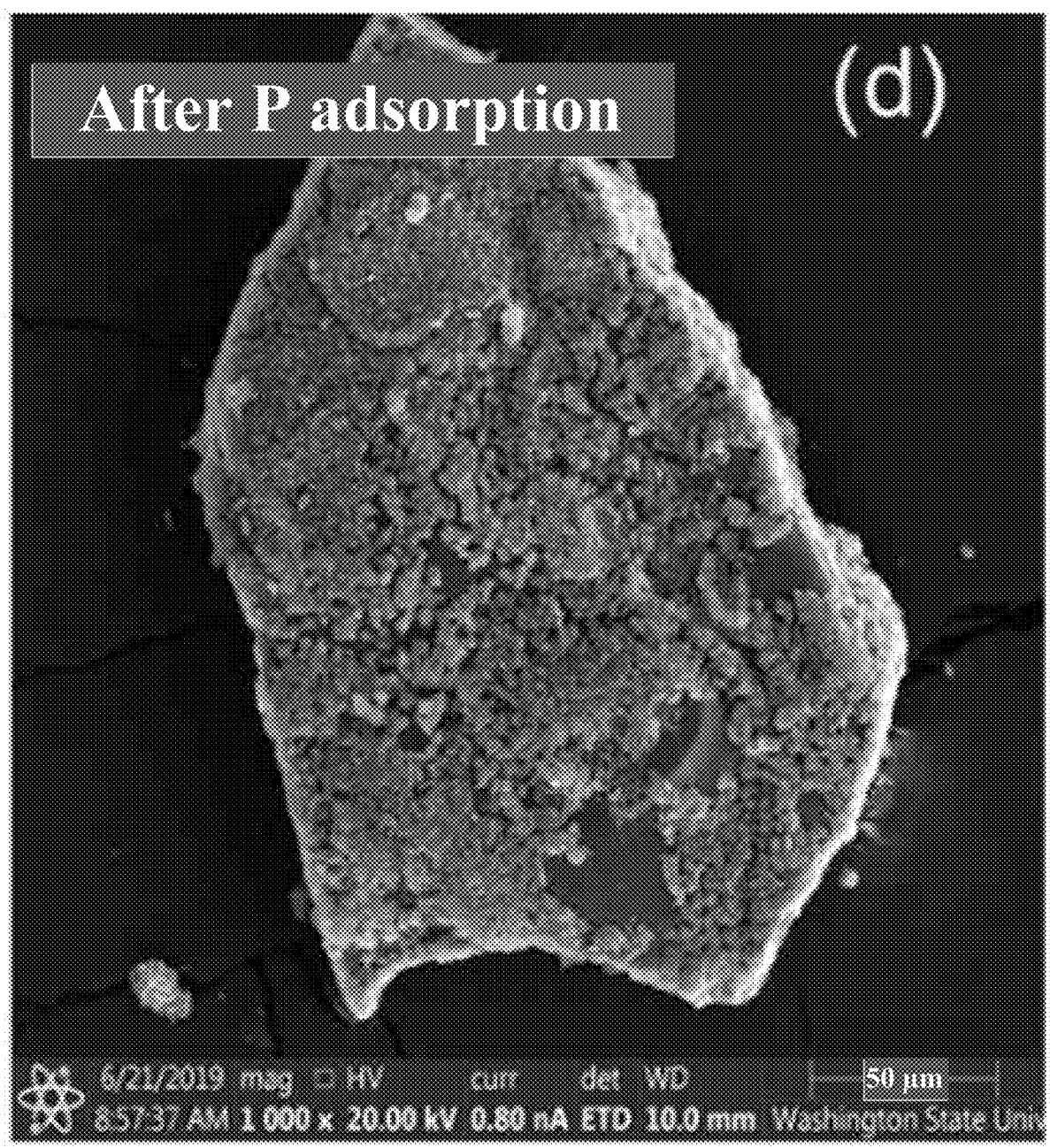
Figure 34E:
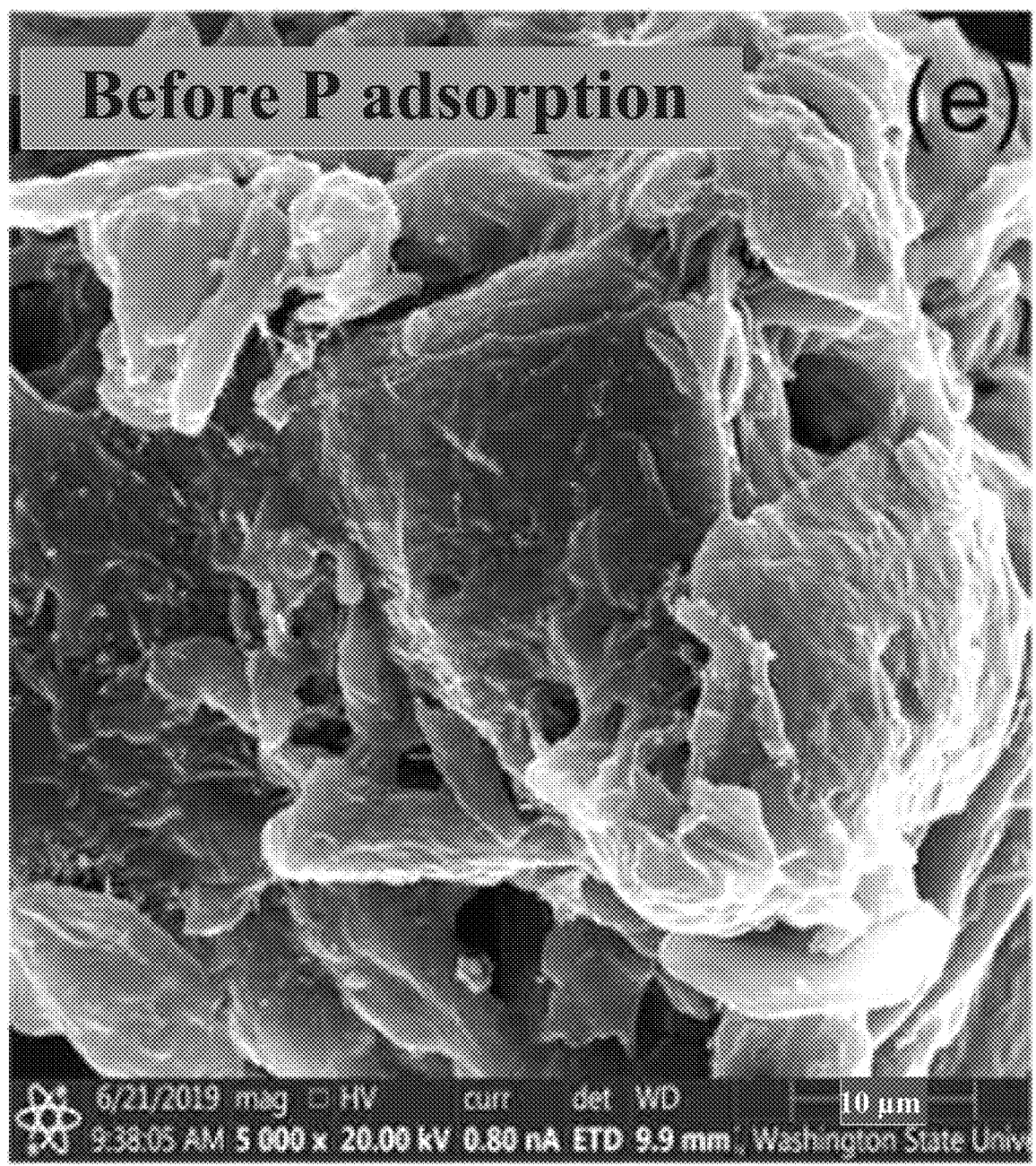
Figure 35A:
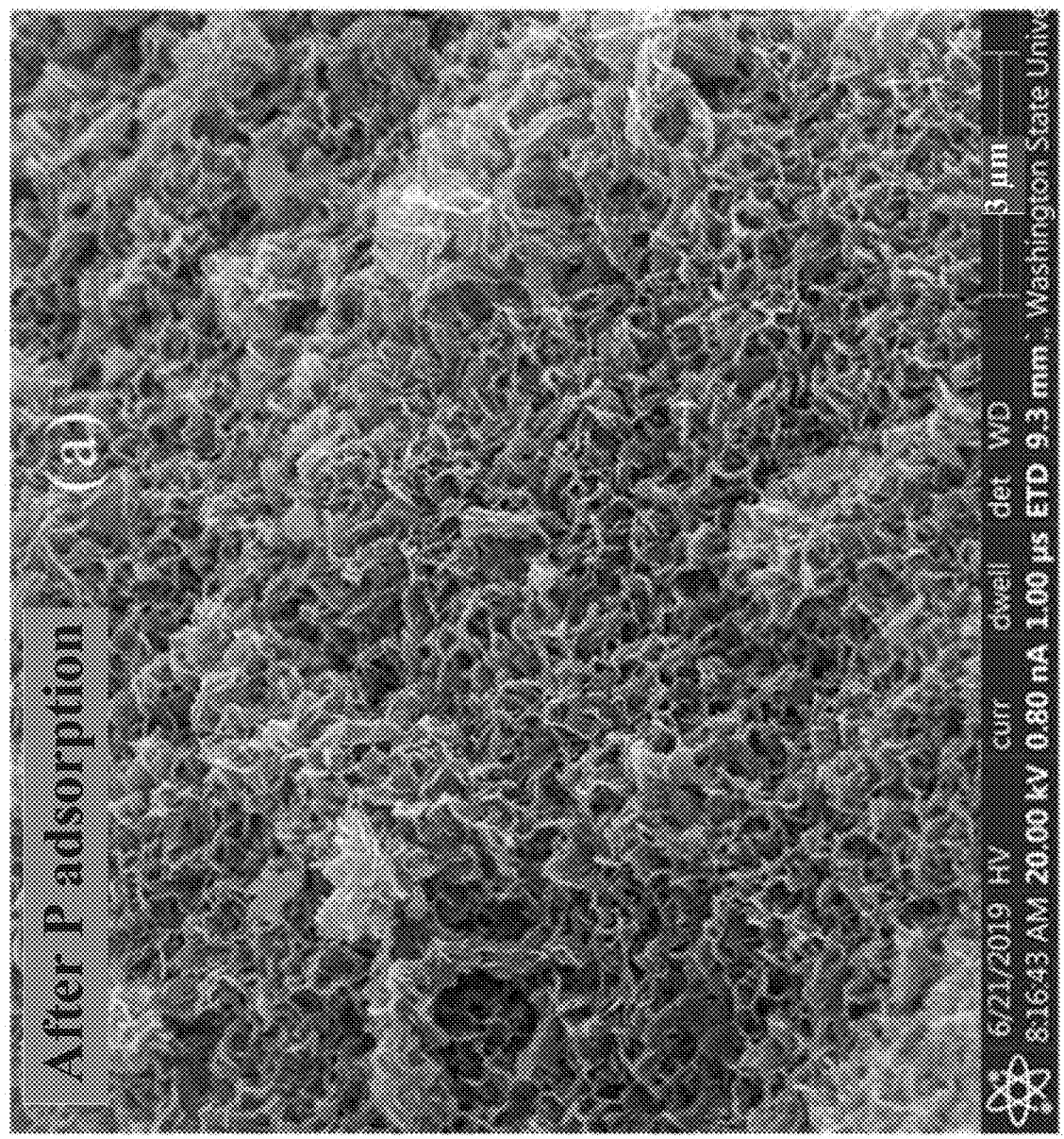
FIGS. 35A-35E show N—Ca-Char (biochar with calcium and nitrogen doped).
Figure 35B:
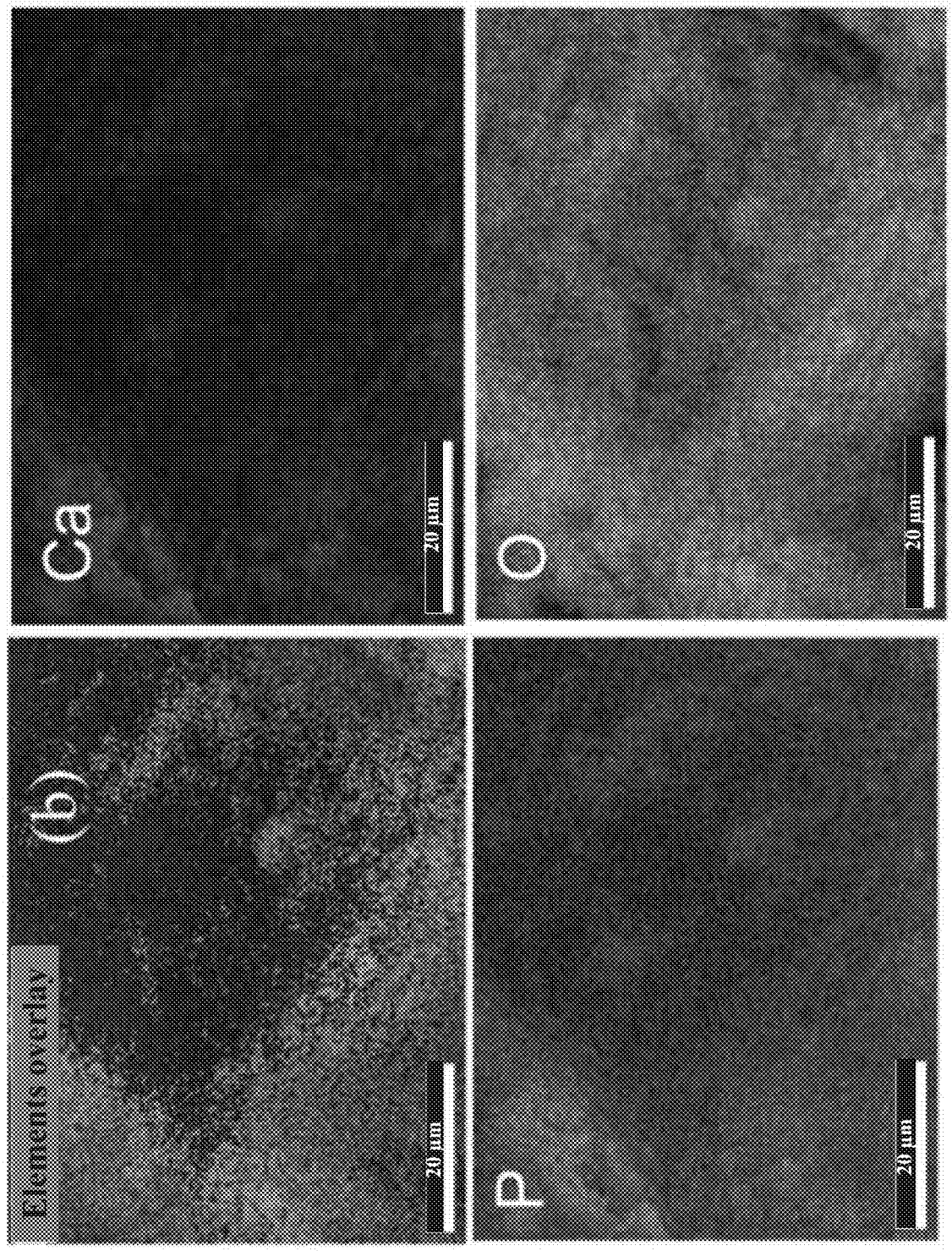
Figure 35C:
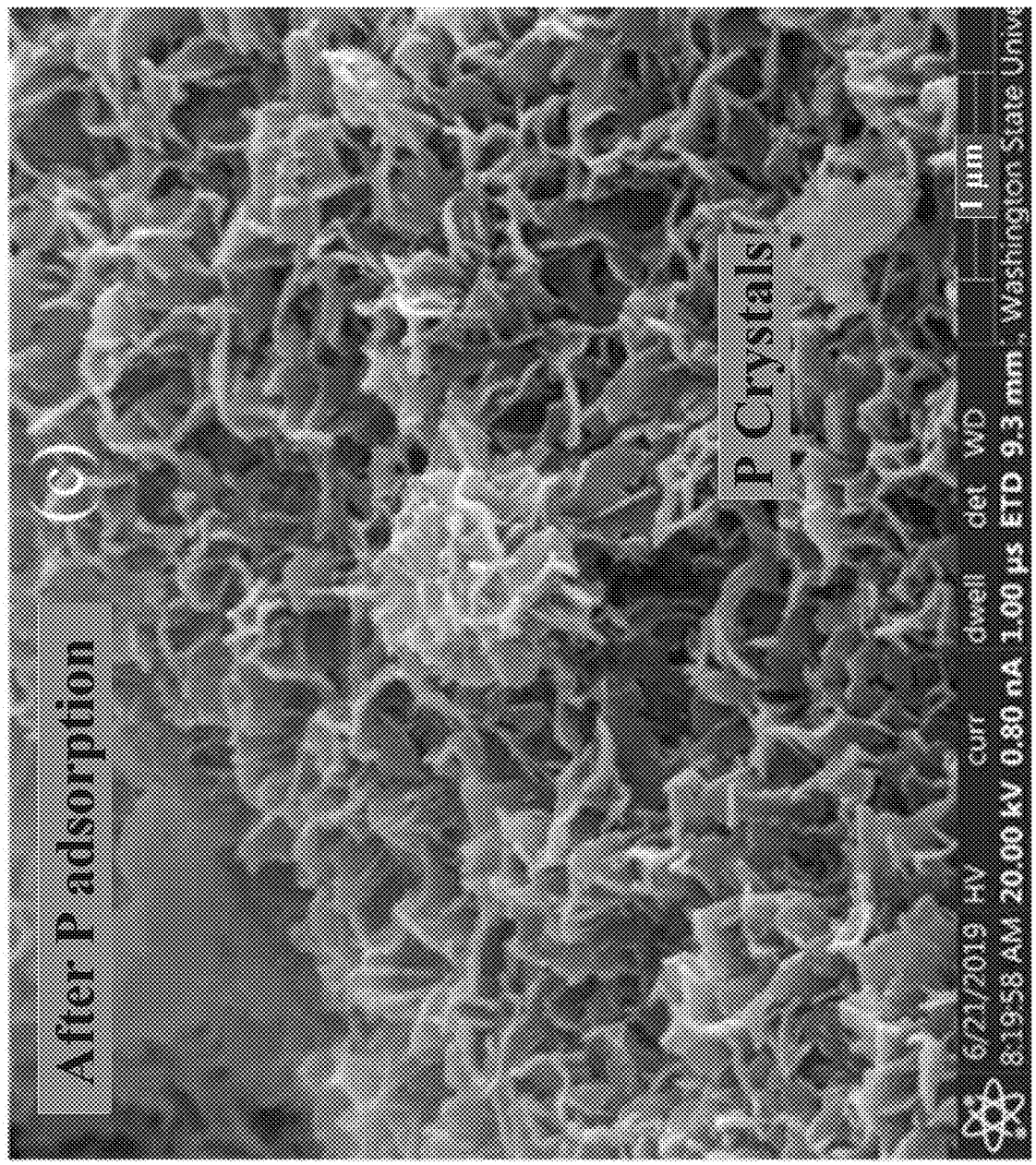
Figure 35D:
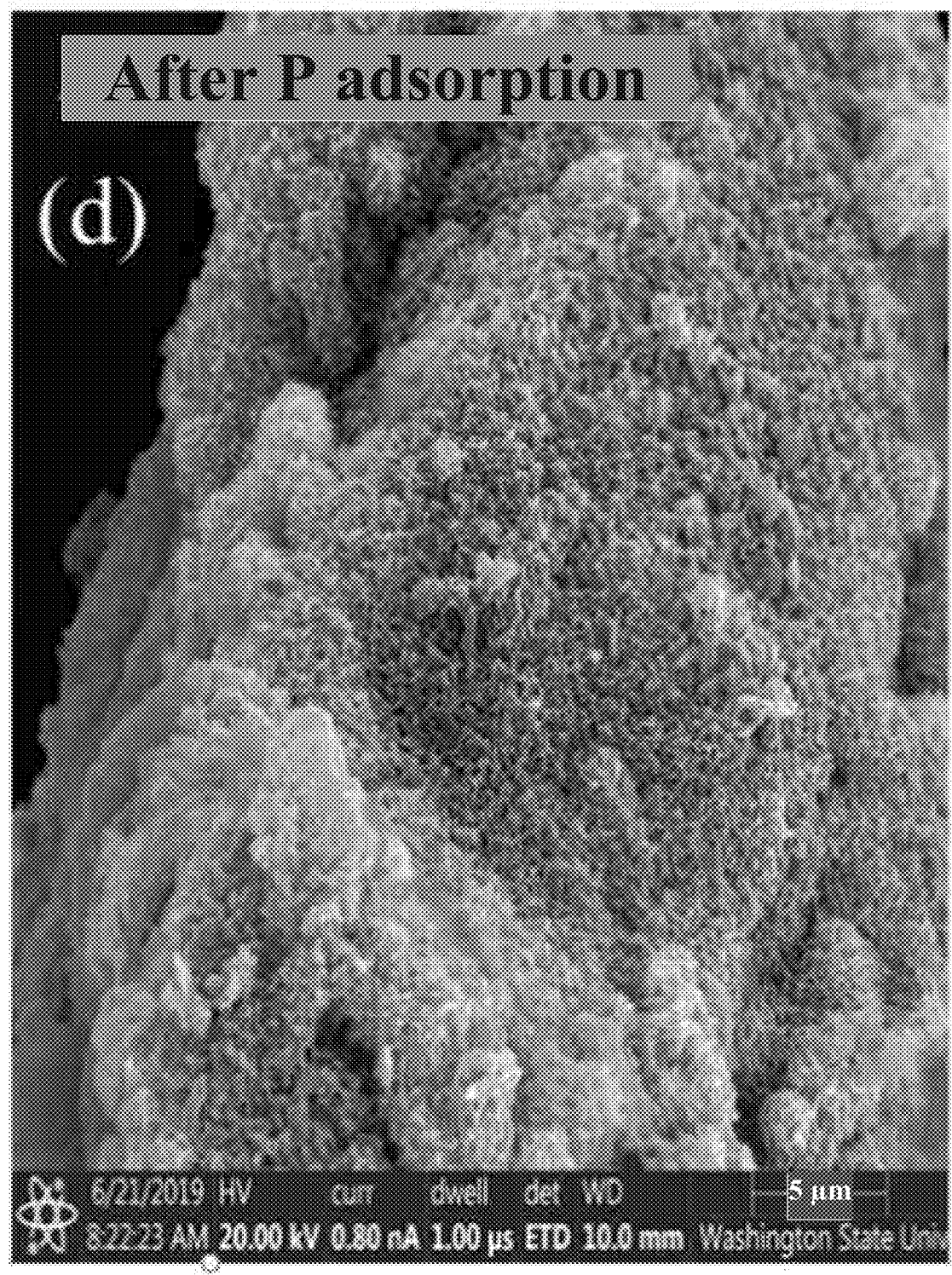
Figure 35E:
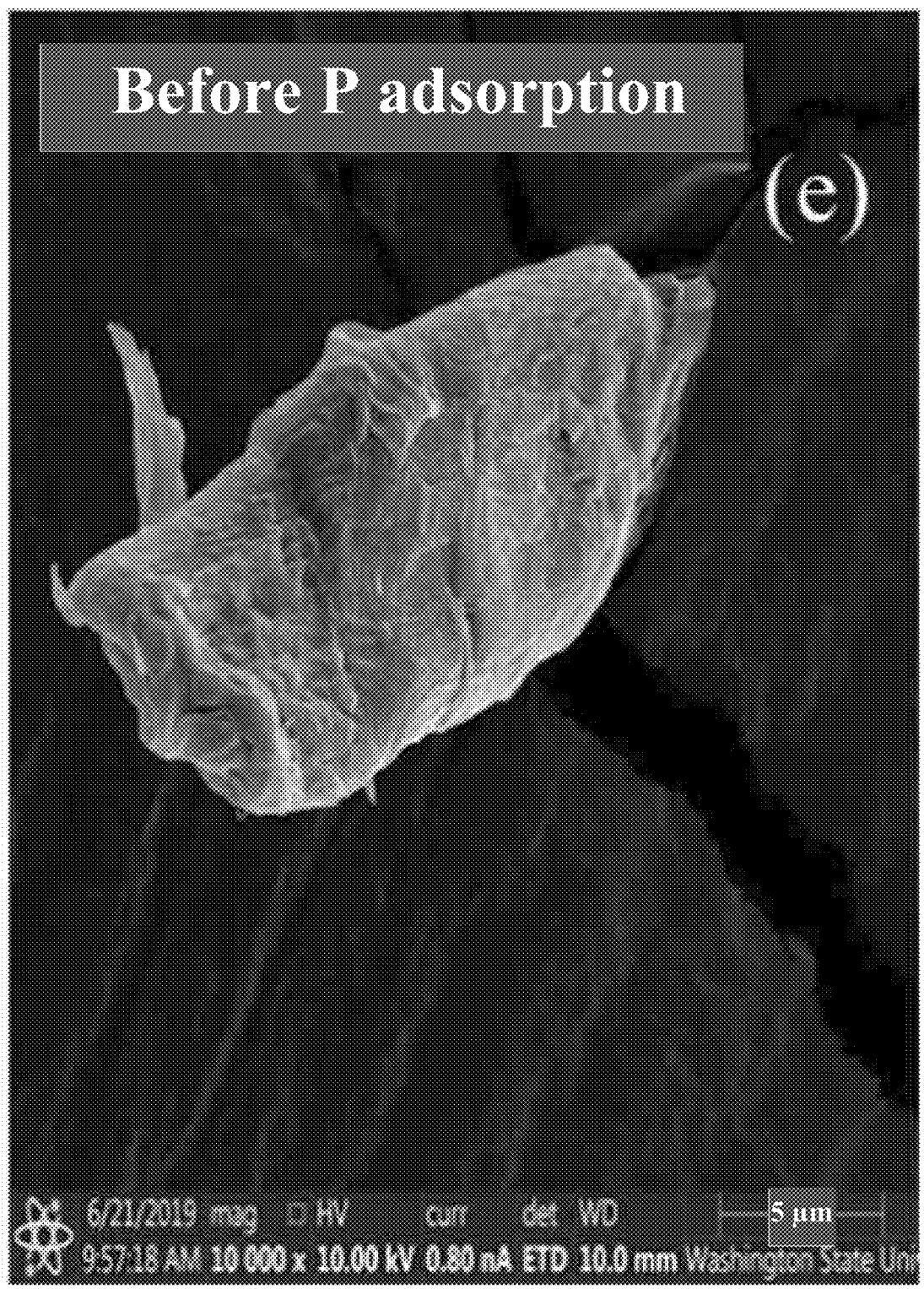

XRD studies of the N-Mg-Chars after the adsorption of phosphate shows different types of phosphate crystals such Cattiite, magnesium hydrogen phosphate, Newberyte and hexaaquamagnesium (II) bis (hypophosphite). However, Cattiite shows the highest probability density among the other crystals. Based on the experimental conditions performed in prior studies (room temperature), the final pH of the solution after the adsorption test for the N-Mg-char ranged from 10.5-11 while the N—Ca-Char was 6.5-7.4. At a pH level between 10.5-11, phosphate ions tend to be in a form of tribasic leading to the formation of crystal that is related to Cattiite ($Mg_3(PO_4)_2 \cdot 22H_2O$). On the other hand, based on the experimental condition of N—Ca-char (room temperature and pH=6.5), Octacalcium phosphate (OCP) $Ca_5(HPO_4)_2(PO_4)_4 5H_2O$ might be the structure formed. The XRD data is shown in FIG. 33 and Table 17 shows the different crystal phases and the crystallite size. These crystallite sizes were estimated using the Scherrer equation built into the XRD software (MATCH version 3.9.0.158). The average estimated crystals size is 40 nm.

Figure 37B:
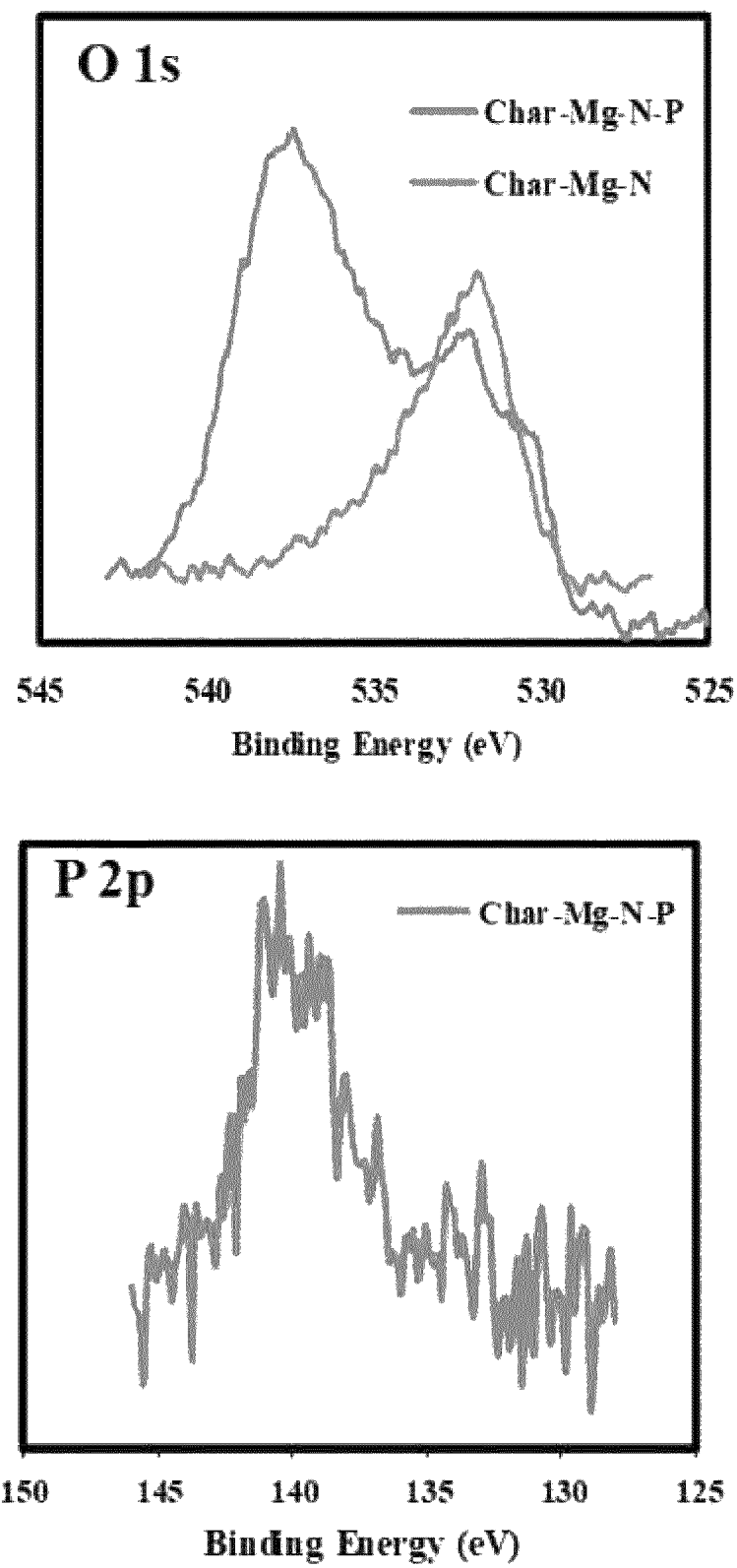
Figure 38A:
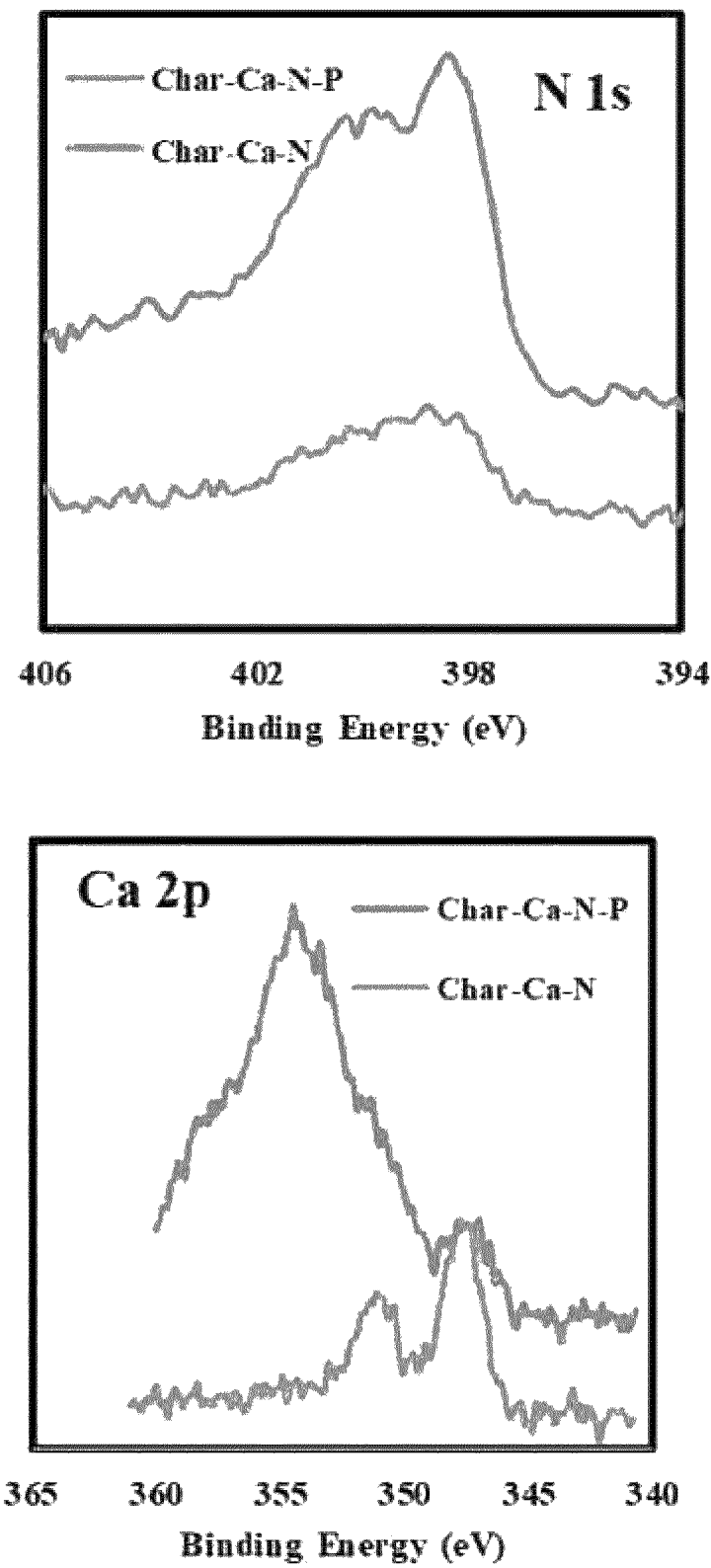
Figure 39A:
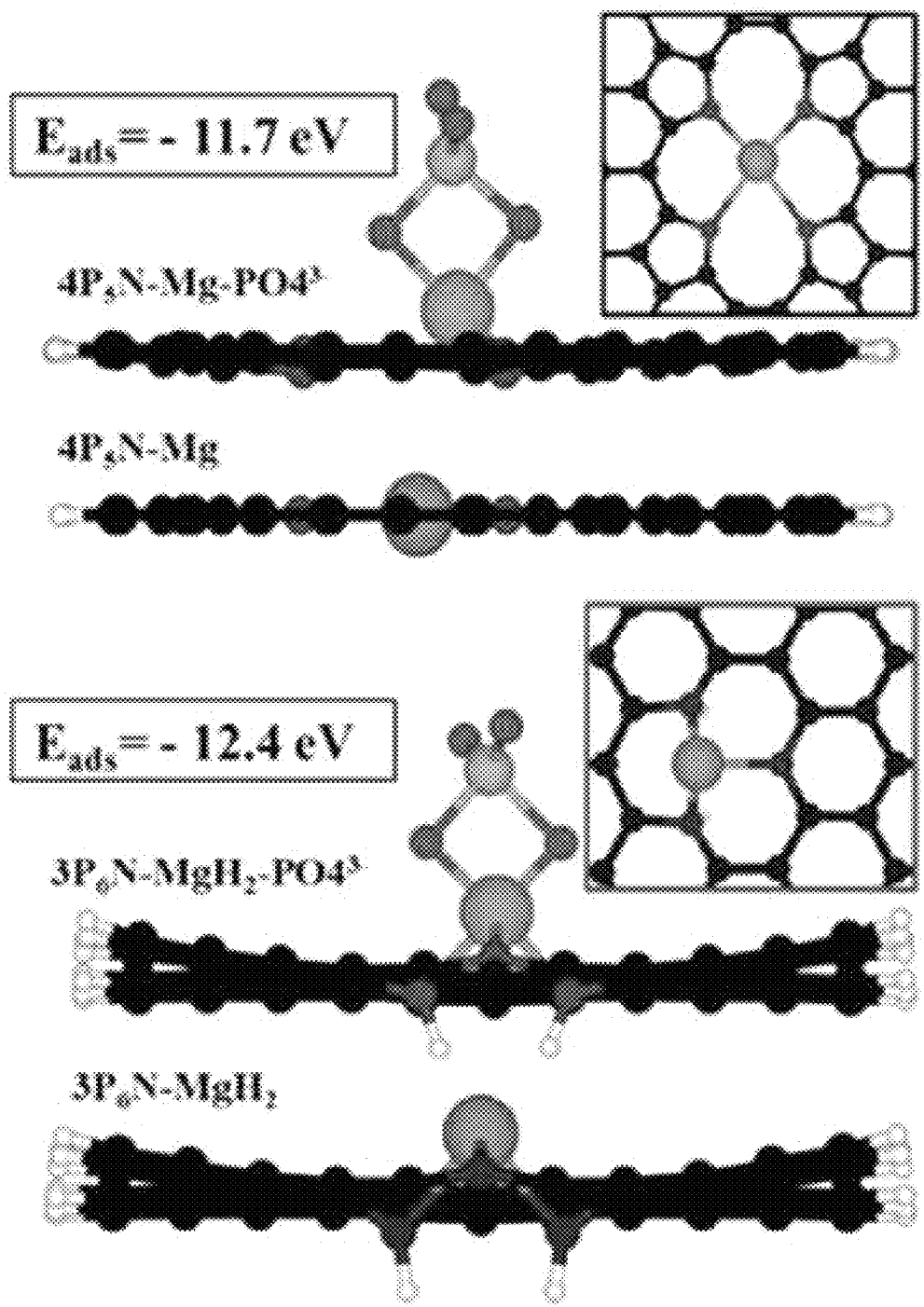
FIGS. 39A-39B show a structural configuration of N-Mg-graphene sheet and phosphate.
Figure 39B:
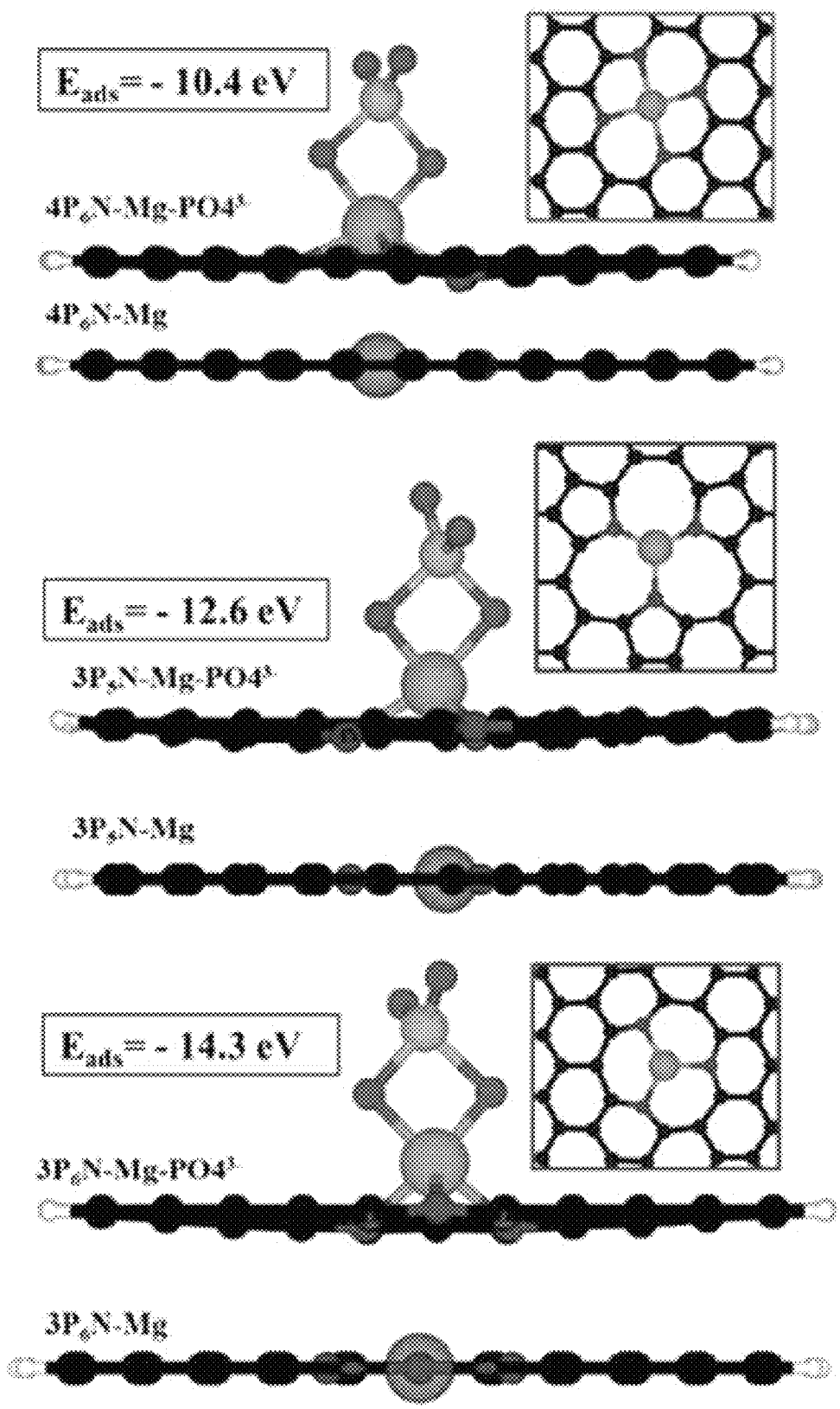
Figure 40A:
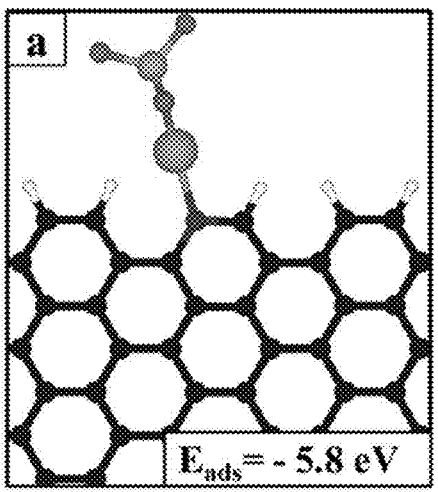
FIGS. 40A-40D show a Comparison of adsorption energy of single and double pyrrolic and pyridine groups, where
Figure 40B:
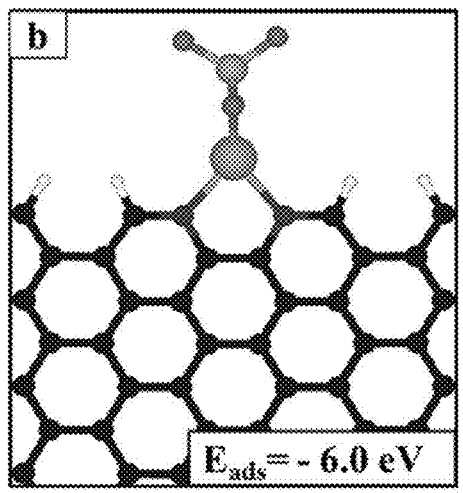
Figure 40C:
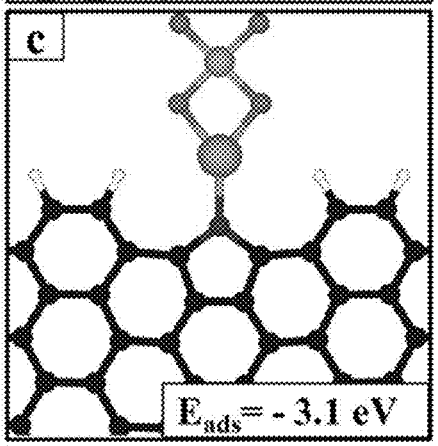
Figure 40D:
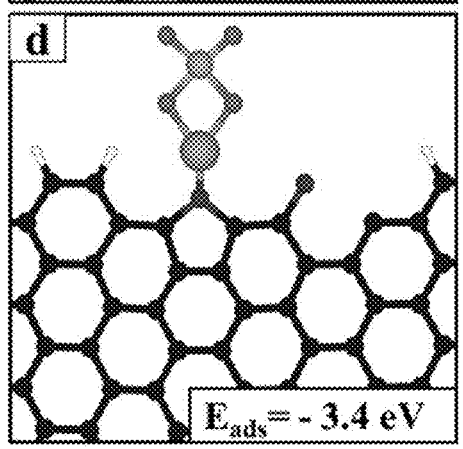
Figure 41A:
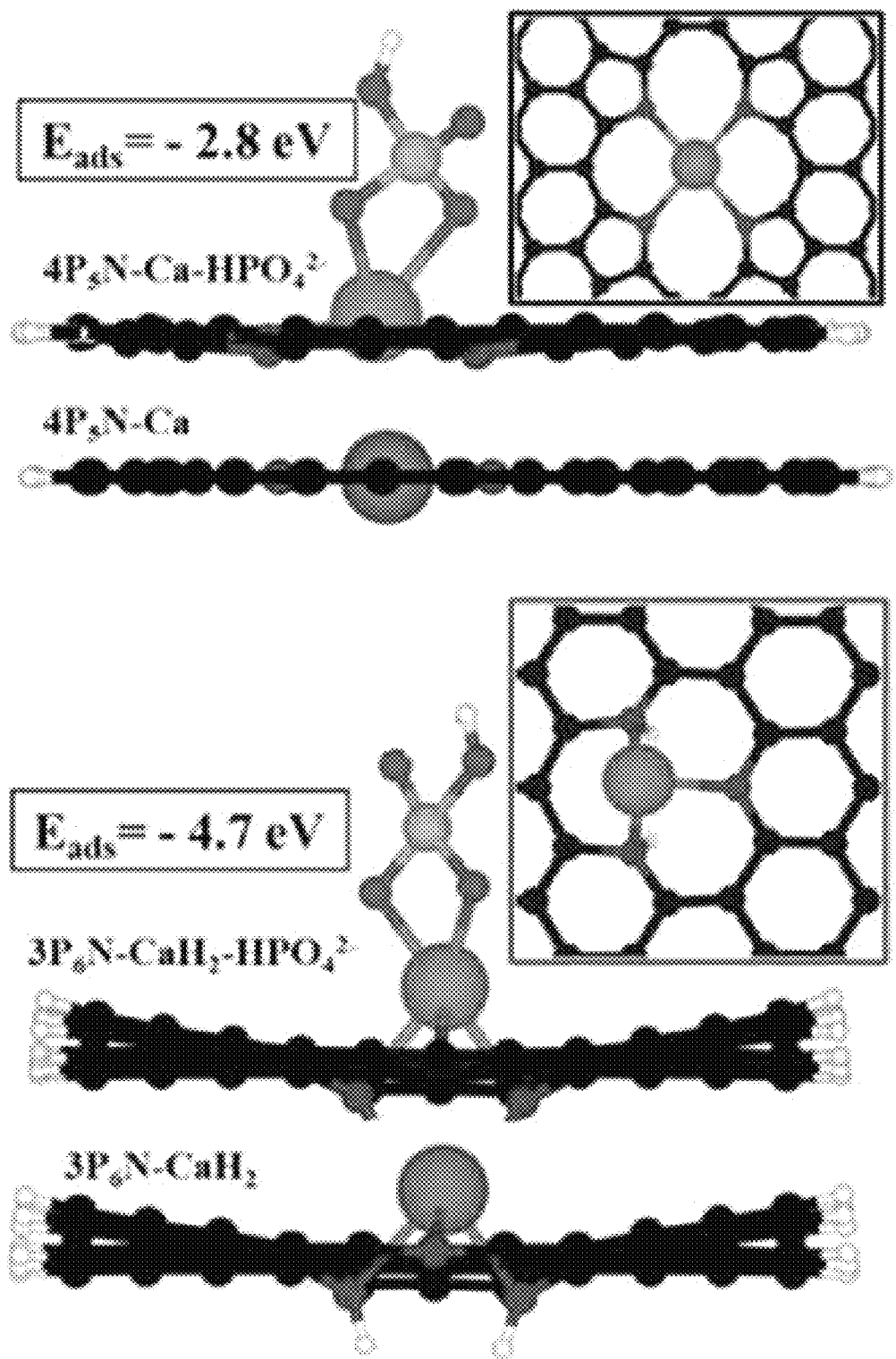
Figure 41B:
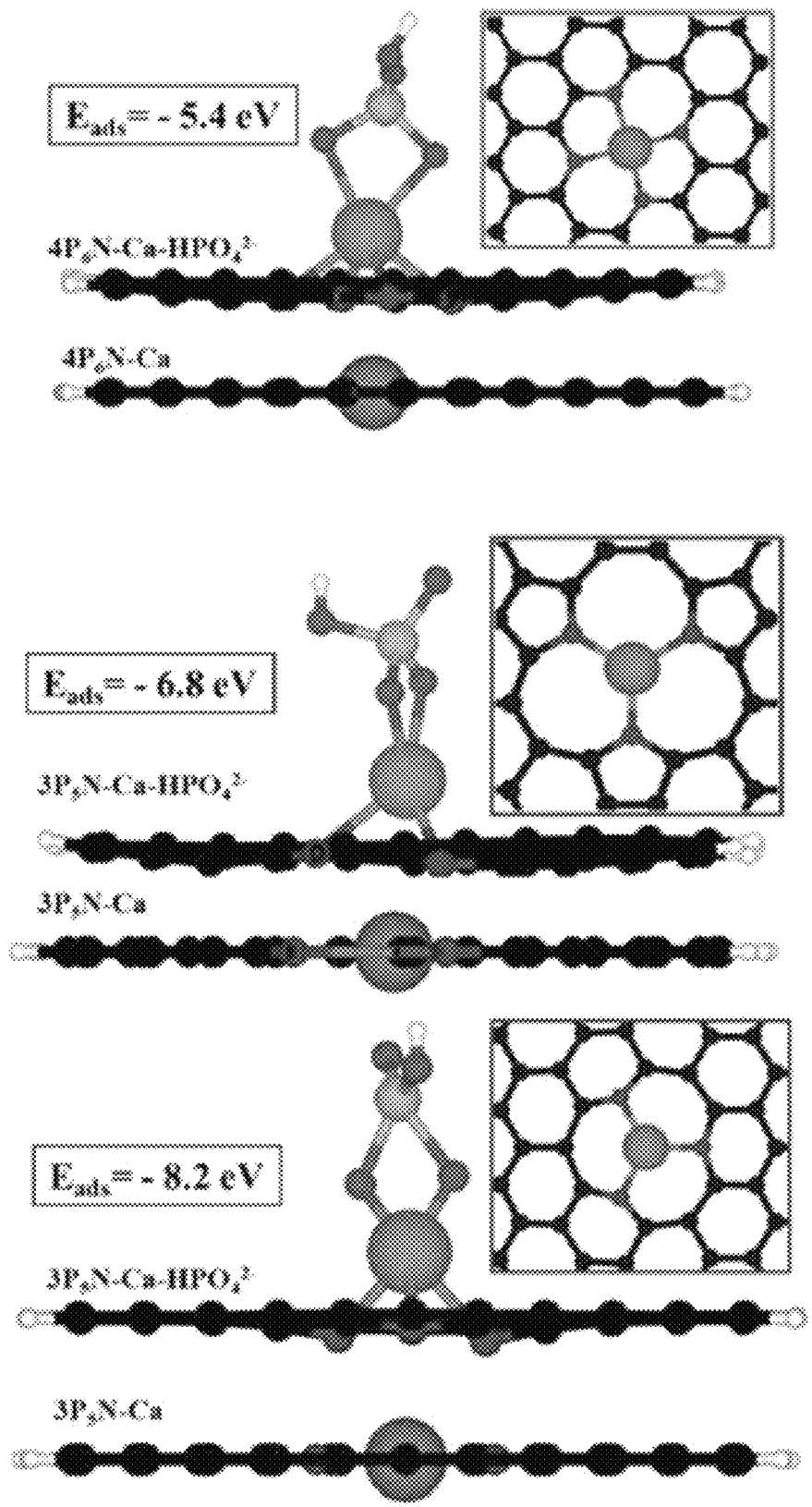
Figure 42A:
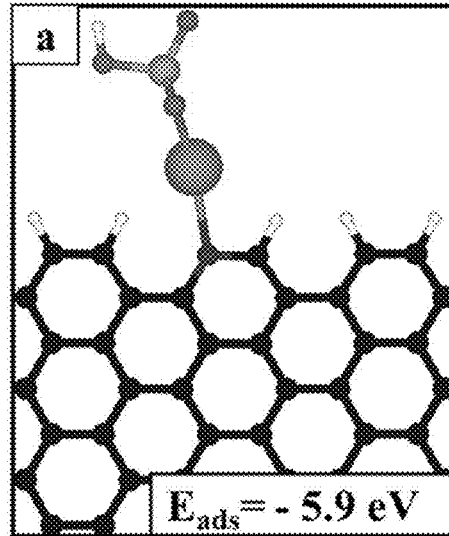
Figure 42B:
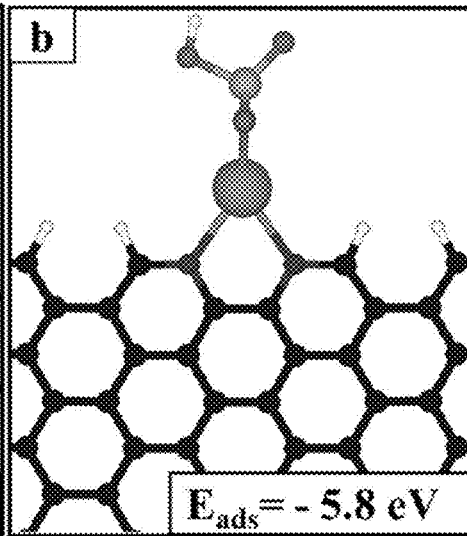
Figure 42C:
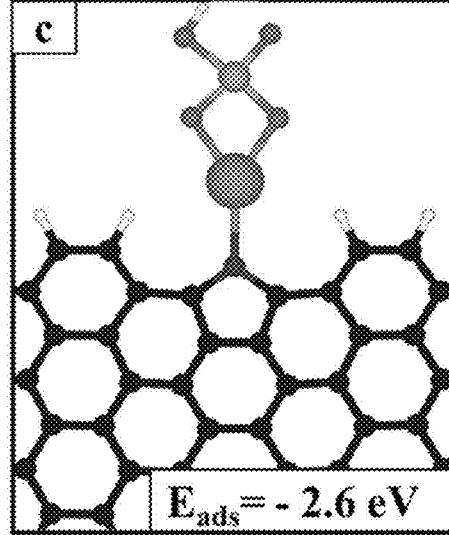
Figure 42D:
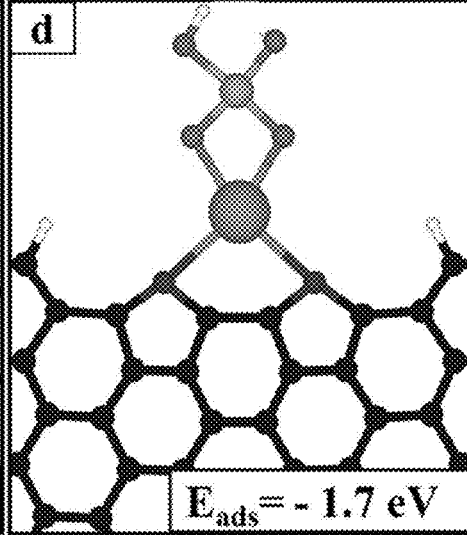

XPS Study of Biochar After P Adsorption: A high resolution XPS analysis was done on the samples before and after to see the change of environment of the different functional groups on the biochar surface. FIGS. 37 and 38 present the high-resolution spectra. The notable change in environment is observed in the O 1s and Mg 2p spectra. After the adsorption process a fundamental peak is observed at 538 eV in the O 1s spectra. The peak is clearly associated with the oxygen linked to the phosphorus. The Mg 2p also shows a new peak at 57 eV, this peak is an indication of a link between the Mg metal and the phosphate ions. The fact that we did not find any significant change in environment in the N 1s after the adsorption might indicate that the nitrogen group does not directly participate in the crystal formation.

Without being bound by any theory, based on the experimental Mg 2p spectra and the computational XPS data, the results suggest that the Mg in the edges is removed by the phosphorous, because we do not see any more the Mg-N features at 49.85 eV after the adsorption of phosphate. The

TABLE 17

Crystals phase and crystallite size estimation.

| 2theta [deg] | Correlated phase(s) | Crystallite size [nm] |
|---|---|---|
| 10.89 | Cattiite | 36.17 |
| 21.86 | $H_{12} Mg_2 O_{13} P_2$, magnesium hydrogen phosphate | 29.31 |
| 22.85 | $H_{12} Mg_2 O_{13} P_2$, magnesium hydrogen phosphate | 18.86 |
| 24.94 | Cattiite, Newberyite, $H_{12} Mg_2 O_{13} P_2$, hexaaquamagnesium (II) bis(hypophosphite), magnesium hydrogen phosphate | 33.04 |
| 32.95 | Cattiite, Newberyite, magnesium hydrogen phosphate | 37.66 |
| 34.37 | Cattiite, $H_{12} Mg_2 O_{13} P_2$, hexaaquamagnesium (II) bis(hypophosphite), magnesium hydrogen phosphate | 9.08 |
| 36.79 | Periclase, Cattiite, Newberyite, $H_{12} Mg_2 O_{13} P_2$, hexaaquamagnesium (II) bis(hypophosphite), magnesium hydrogen phosphate | 17.19 |
| 42.93 | Periclase, Cattiite, Newberyite, $H_{12} Mg_2 O_{13} P_2$, hexaaquamagnesium (II) bis(hypophosphite), magnesium hydrogen phosphate | 165.63 |
| 62.25 | Periclase, Cattiite, Newberyite, $H_{12} Mg_2 O_{13} P_2$, hexaaquamagnesium (II) bis(hypophosphite), magnesium hydrogen phosphate | 36.39 |
| 74.87 | Periclase, Newberyite, hexaaquamagnesium (II) bis(hypophosphite), magnesium hydrogen phosphate | 21.64 |
| 78.71 | Periclase, Newberyite, hexaaquamagnesium (II) bis(hypophosphite), magnesium hydrogen phosphate | 51.4 |
| 94.07 | Periclase, Newberyite | 26.73 |

Figure 36A:
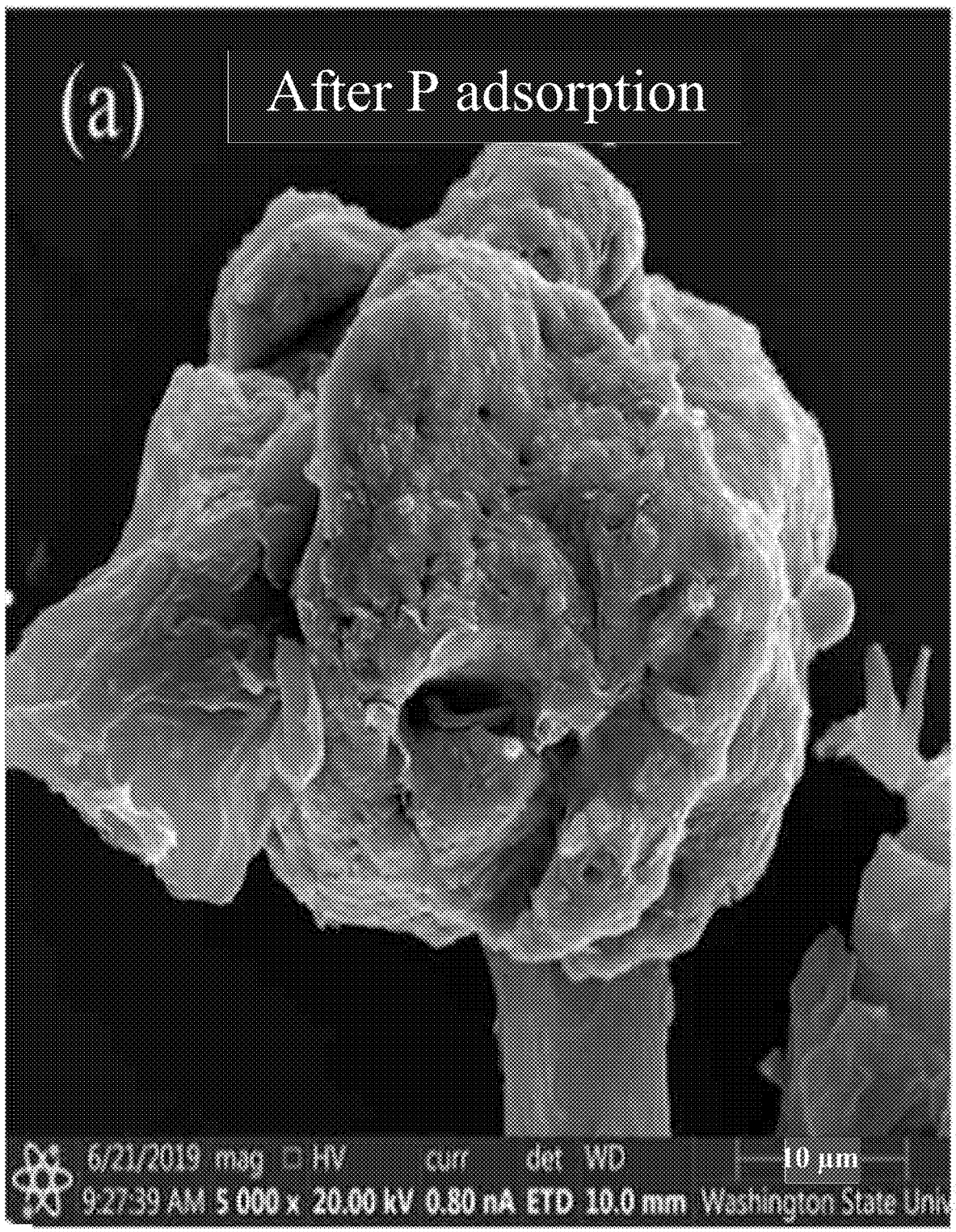
FIGS. 36A-36C show N—Fe-Char (biochar with iron and nitrogen doped).
Figure 36B:
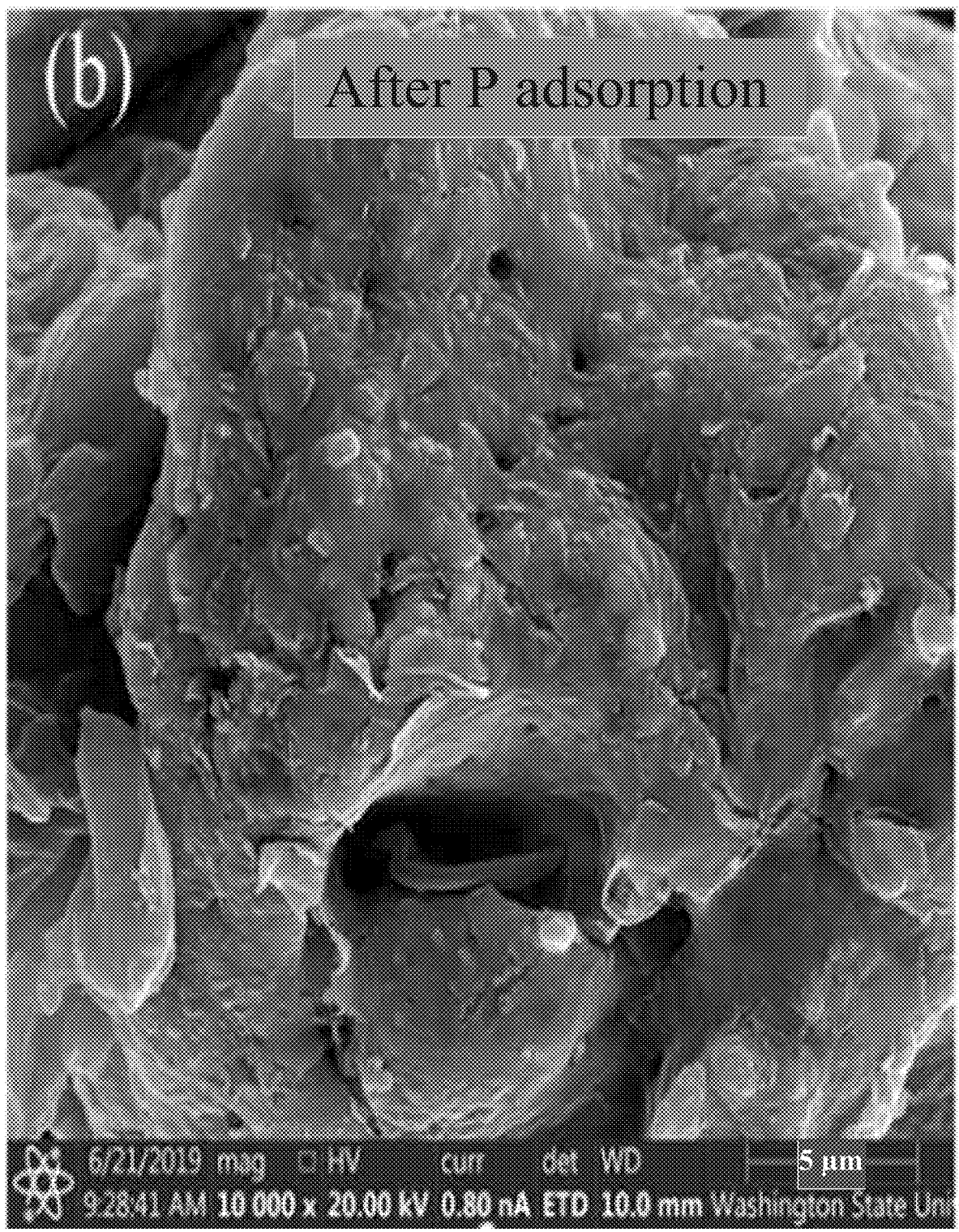
Figure 36C:
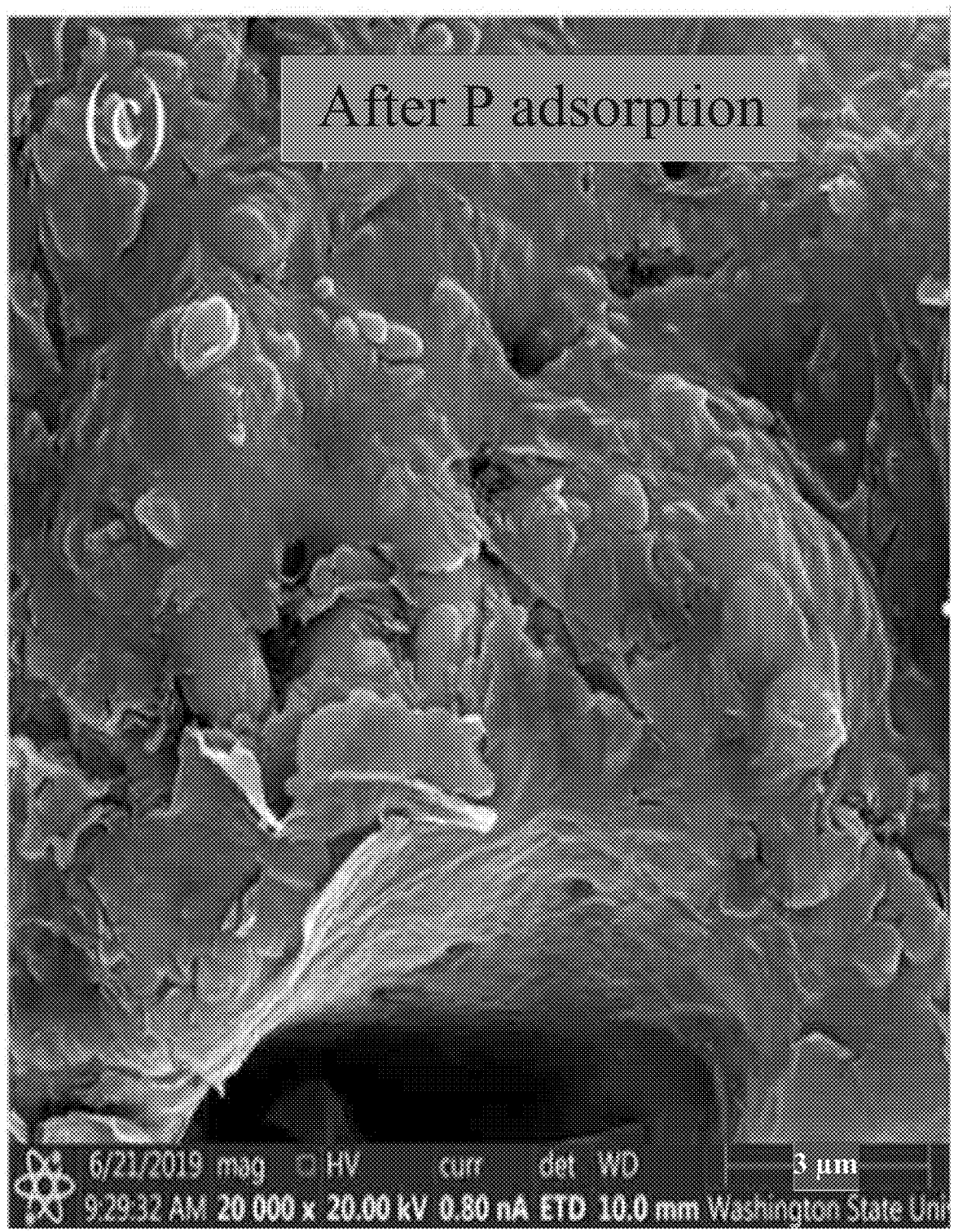

SEM: FIGS. 34A-34E and FIGS. 35A-35E show the SEM image of the N-Mg and N—Ca doped biochars, respectively. The solid morphology formation for phosphorus was confirmed with SEM analysis. The unique distinction of the solids on the biochar surface is clearly depicted. The crystals formed with N-Mg-Char look like a pentagrammic prism with a clear sheet definition. However, the crystals on the surface of the N—Ca-Char are much more like an octagram kind of shape. These morphological differences may be caused by the differences in the sequence of ionic and noncovalent interactions, rearrangements and clustering of ions during crystal formation depending on pH, temperature, residence time and dynamics of ionic interactions which may affect the precipitation sequence. EDS color mapping of the surface of the biochars indicates that in the N-Mg and N—Ca doped biochar, the metals are distributed in the whole structure. This may explain the higher adsorption capacity observed by the Mg-N-doped biochars. FIGS. 36A-36C show the SEM image of N—Fe biochars, which lack the same apparent crystal structures as in FIGS. 34A-34E and FIGS. 35A-35E.

Mg in the porphyrin structure remains as part of the structure as the peak at 53.15 eV remains unchanged before and after adsorption of phosphate. It may suggest that the porphyrin acts as nucleation center while the Mg in the edges solubilizes.

Example 11

DFT Analysis to Understand the Nature of Interactions Between N-Metal Doped Biochars and Phosphate Ions In the instant example, interaction between N-Metal-graphene and phosphate ions, DFT calculations were carried out using the Vienna Ab Initio Simulation Package (VASP). In order to explore the association of phosphate ions on N-Metal-graphene macromolecules, the whole structure is modelled by having one $PO_4^{3-}$ and $HPO_4^{2-}$ molecule with a graphene supercell with periodic boundary conditions. Electron count was increased to add charge to adsorbing species. The adsorption energy was calculated according to the equation below:

$$E_{ads} = E_{complex(surface+HPO_4^{2-}/PO_4^{3-})} - (E_{HPO_4^{2-}/PO_4^{3-}} + E_{Mg/Ca} + E_{Surface(N-graphene)})$$

where $E_{ads}$ denotes the energy of the bound phosphate complex, $E_{HPO_4^{2-}/PO_4^{3-}}$ indicates the energy of a gas-phase phosphate ion, and $E_{Surface(N-graphene)}$ represents the energy of the nitrogen doped graphene sheet. Based on the experimental pH value (6.5-7.4) of N—Ca-Char, the Ca was modelled with $HPO_4^{2-}$ while Mg was modelled with $PO_4^{3-}$ because the PH level range between 10.5-11. These assumptions were made based on the dissociation of phosphoric acid respect to pH.

Computational calculations to elucidate the interactions between Mg in the porphyrin/edge structure and phosphate were carried out. The species selected to model the interaction is based on the dissociation of phosphoric acid with respect to pH. Based on our experimental adsorption conditions, magnesium interaction was modeled with phosphate tribasic ($PO_4^{3-}$) because the pH ranged from 10.5-11 while Ca interaction was modeled using phosphate dibasic ($HPO_4^{2-}$) species.

The model structures are shown in FIGS. 39, 40A-40D, 41, and 42A-42D, which display the adsorption energies of the metals and phosphate ions with the active sites at the center and at the edge. The calculation indicates that N-Mg doped structures binds strongly to the phosphate ions than the N—Ca doped structures. This observation is consistent to the experimental results where the adsorption of phosphate in N-Mg-Char (335 mg/g) shows a higher adsorption capacity than N—Ca-Char (100 mg/g). The results also show that the centered active sites bind favorably (since their adsorption energies are more negatives) to the phosphate ions than the edge active sites.

Although the centered sites of the metals (except $3P_6N$-Mg and $3P_6N$-$MgH_2$) are relatively are more stable than the edge actives, they still bind strongly to phosphate ions.

Figure 43A:
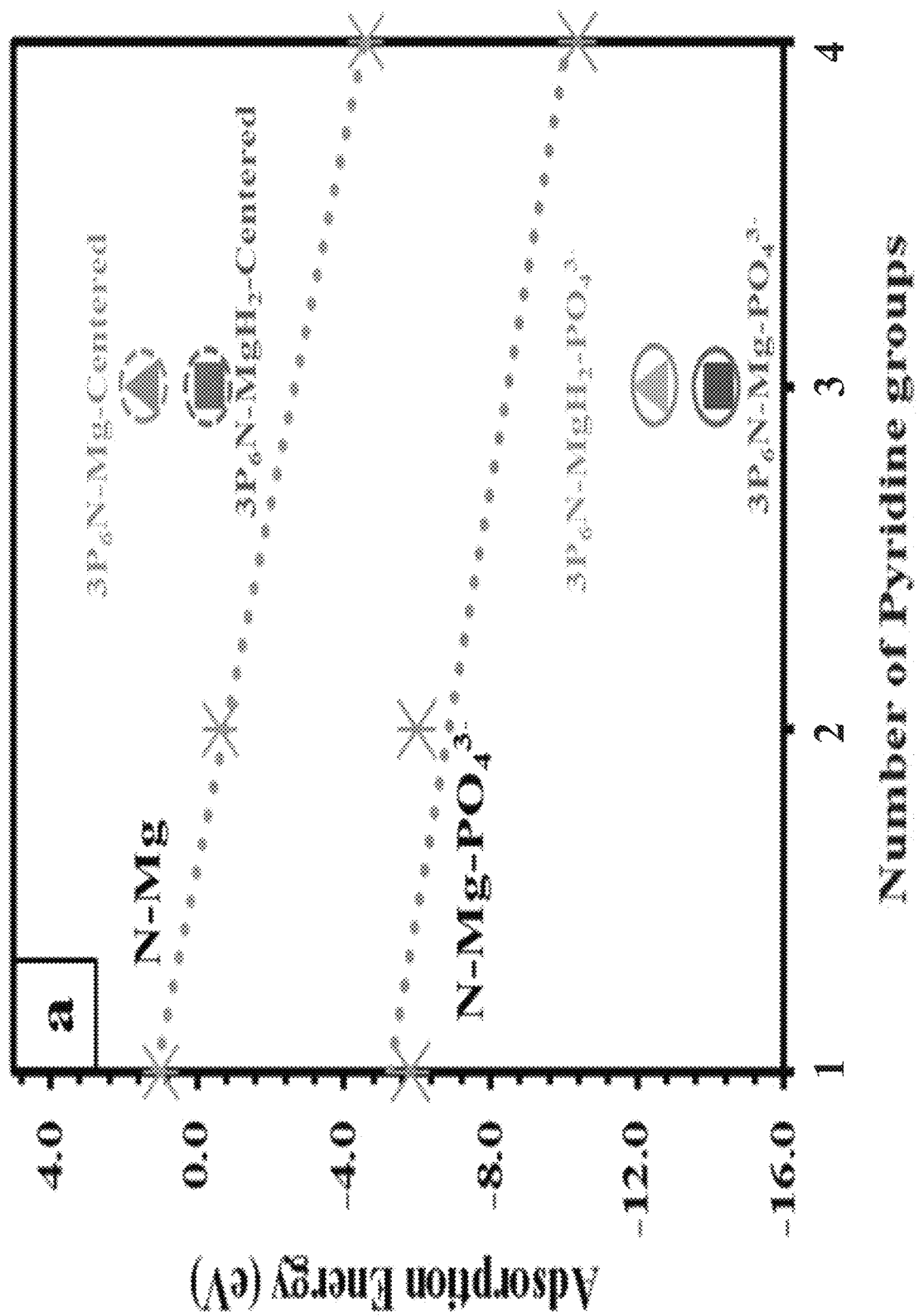
FIGS. 43A-43B show a correlation between phosphate adsorption energy and increasing number of pyridine functional groups.
Figure 43B:
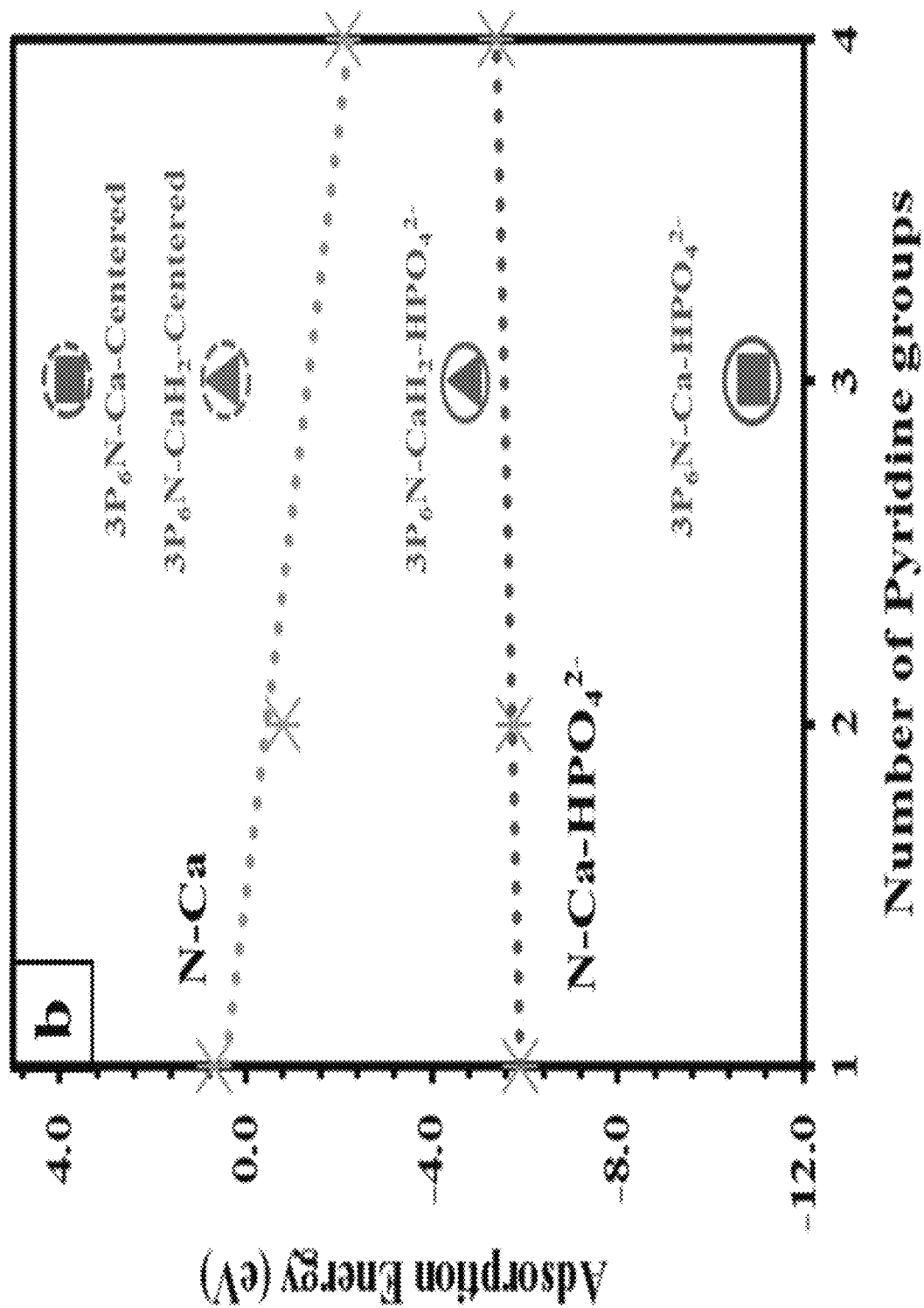

FIGS. 43A-43B show a correlation between the number of nitrogen atoms and the adsorption energy of the metal and phosphate binding. The results show that for N-Mg doped structure (FIG. 43A) as the number of nitrogen atoms increases the adsorption energy becomes more negative indicating a strong binding of the species to the graphene structure. However, with respect to N—Ca structure (see FIG. 43B) the adsorption energy of phosphate decreases slightly as the number of nitrogen atoms increases.

Figure 44:
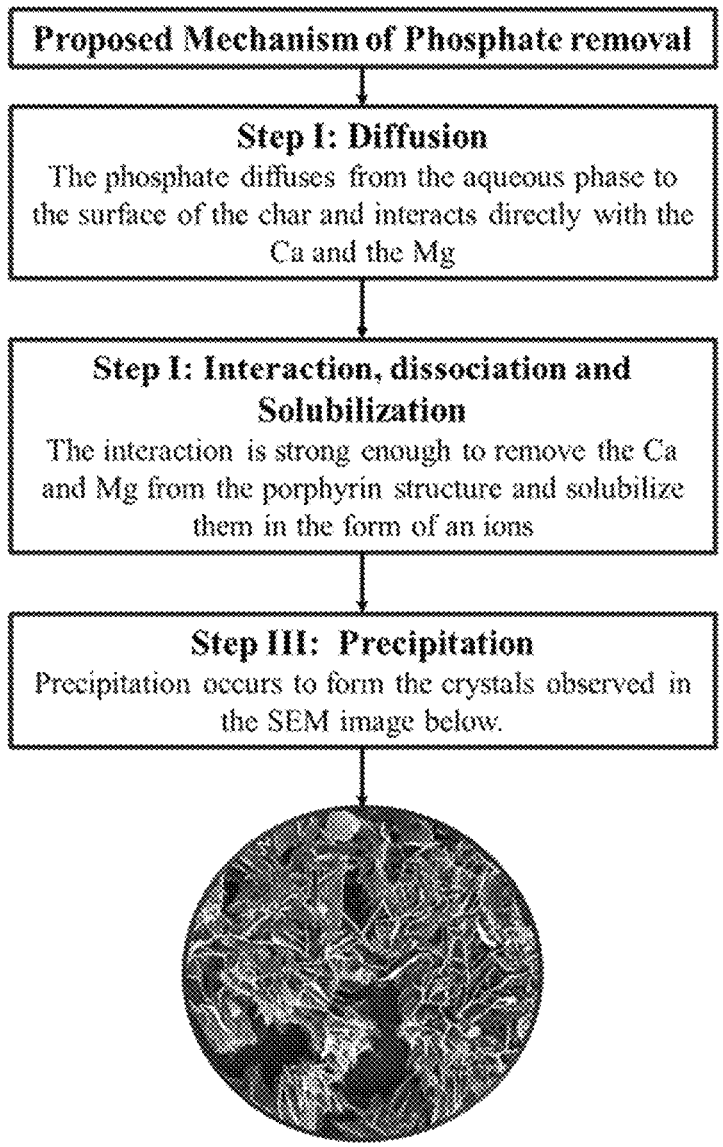
FIG. 44 shows a scheme with the mechanism proposed for the removal of phosphate with N-Mg and Ca doped biochars with porphyrin structures.
Figure 45:
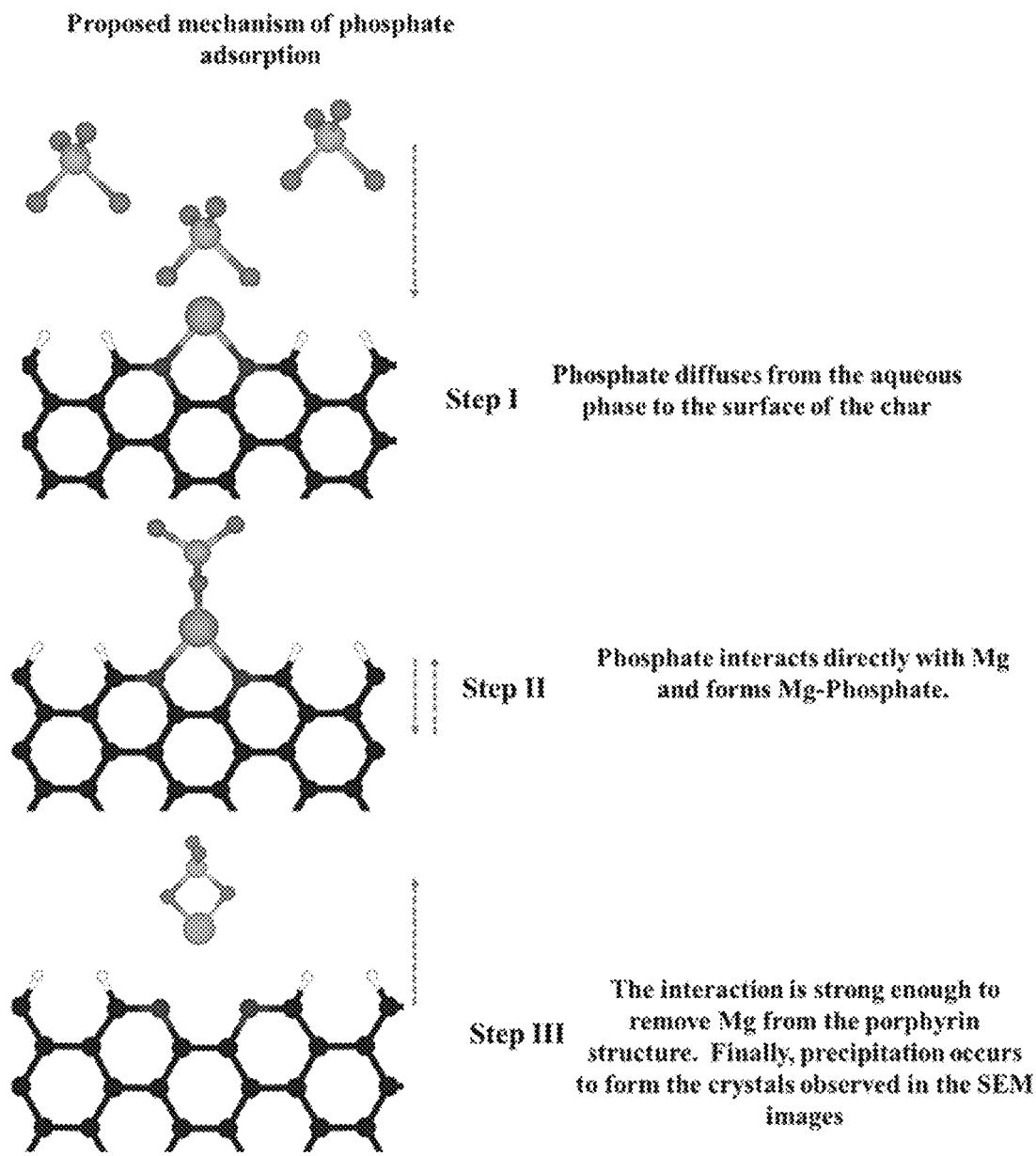
FIG. 45 shows an atomistic scheme describing phosphate adsorption mechanism.

Based on the existing information gathered from the SEM images, the XPS results and the computational calculations, we propose the following mechanism of phosphate interaction with magnesium. In the first step, the phosphate diffuses from the aqueous phase to the surface of the biochar and interacts directly with the Ca and the Mg. The interaction is strong enough to remove the Ca and Mg at least from the edge sites and solubilize them in the form of ions, which then precipitates to form the crystals observed in the SEM images. FIG. 44 shows a scheme with the mechanism proposed for the removal of phosphate with N-Mg and N—Ca doped biochars with both porphyrin and edge active sites structures. FIG. 45 depicts an atomistic view of the whole mechanism.

What is claimed is:

1. A method of adsorbing phosphate, said method comprising the step of contacting an adsorbent composition with a liquid composition comprising the phosphate,
   wherein the phosphate in the liquid composition is adsorbed by the adsorbent composition, and
   wherein the adsorbent composition comprises i) a carbon-containing material, ii) nitrogen, and iii) one or more metals, wherein the carbon-containing material is biochar, and wherein the one or more metals comprises magnesium, calcium, or a combination thereof,
   wherein the carbon-containing material are doped with the nitrogen, and
   wherein the one or more metals is embedded in a matrix of the carbon-containing material.

2. The method of claim 1, wherein the liquid composition comprises waste water.

3. The method of claim 1, wherein the liquid composition comprises biomass feedstock.

4. The method of claim 1, wherein the method further comprises a step of forming a crystalline structure comprising the one or more metals and the phosphate.

5. The method of claim 4, wherein the crystalline structure is magnesium phosphate or calcium phosphate.

6. The method of claim 1, wherein the carbon-containing material comprises anaerobically digested carbon.

7. The method of claim 1, wherein the one or more metals comprise magnesium.

8. The method of claim 1, wherein the one or more metals comprise calcium.

9. The method of claim 1, wherein the carbon-containing material comprises one or more active sites, wherein the one or more active sites comprises the one or more metals coordinated with the nitrogen.

10. The method of claim 9, wherein the one or more active sites comprises one or more edge sites.

11. The method of claim 9, wherein the one or more active sites comprise one or more centered sites.

12. The method of claim 1, wherein the carbon-containing material comprises an ash content of between 10 to 40 wt %.

* * * * *